US012562325B2

(12) United States Patent
Zhou et al.

(10) Patent No.: US 12,562,325 B2
(45) Date of Patent: Feb. 24, 2026

(54) WALL INTELLIGENT SWITCH, WIRELESS INTELLIGENT SWITCH AND SWITCH MOUNTING FRAME

(71) Applicant: Wuhan Linptech Co., Ltd., Wuhan (CN)

(72) Inventors: Fei Zhou, Wuhan (CN); Jiacheng Tan, Wuhan (CN); Mingchun Yan, Wuhan (CN); Jiaxing Niu, Wuhan (CN)

(73) Assignee: Wuhan Linptech Co., Ltd., Wuhan (CN)

( * ) Notice: Subject to any disclaimer, the term of this patent is extended or adjusted under 35 U.S.C. 154(b) by 527 days.

(21) Appl. No.: 18/190,960

(22) Filed: Mar. 27, 2023

(65) Prior Publication Data

US 2024/0013989 A1     Jan. 11, 2024

Related U.S. Application Data

(63) Continuation of application No. PCT/CN2022/104394, filed on Jul. 7, 2022.

(51) Int. Cl.
*H01H 13/14*          (2006.01)
*F21V 8/00*          (2006.01)
(Continued)

(52) U.S. Cl.
CPC ............. *H01H 13/14* (2013.01); *G02B 6/006* (2013.01); *H01H 13/023* (2013.01); *H01H 13/10* (2013.01); *H01H 13/20* (2013.01)

(58) Field of Classification Search
CPC ...... H01H 3/125; H01H 13/705; H01H 13/14; H01H 13/04; H01H 13/10; H01H 13/70;

H01H 13/704; H01H 13/7065; H01H 13/7006; H01H 13/7057; H01H 13/78; H01H 13/79; H01H 13/52; H01H 13/703;
(Continued)

(56) References Cited

U.S. PATENT DOCUMENTS 4,529,849 A * 7/1985 Kamei ................. H01H 13/705
200/535
2017/0317263 A1    11/2017 Sugimoto et al.
(Continued)

FOREIGN PATENT DOCUMENTS

CN        106057536 A      10/2016
CN        106972780 A       7/2017
(Continued)

*Primary Examiner* — Ahmed M Saeed

(57)          ABSTRACT

The present application provides a wall intelligent switch, a wireless intelligent switch and a switch mounting frame, wherein the wall intelligent switch comprises a housing, a detection member, a wireless communication module, a reset portion and at least one key; the reset acting force cooperates with a first rebound force of the detection member so that when the key is at the first pressing position, the reaction force is F1; when the key is pressed from the first pressing position to the second pressing position, the reaction force of the key jumps from F1 to F2, where F2<F1<400 g; and the difference between the displacement of the key at the first pressing position and the displacement at the second pressing position is ≤2 mm. This enables the keys to give clear feedback to the user while improving the smooth degree of pressing.

20 Claims, 61 Drawing Sheets

(51) Int. Cl.
*H01H 13/02* (2006.01)
*H01H 13/10* (2006.01)
*H01H 13/20* (2006.01)

(58) Field of Classification Search
CPC ........ H01H 13/507; H01H 3/12; H01H 13/20; H01H 2221/044; H01H 2223/016; H01H 2219/056; H01H 2229/042; G02B 6/006
See application file for complete search history.

(56) References Cited

U.S. PATENT DOCUMENTS

| | | | | |
|---|---|---|---|---|
| 2019/0235637 | A1* | 8/2019 | Deily ..................... | H01H 13/85 |
| 2022/0122786 | A1* | 4/2022 | Truong ................. | H01H 13/20 |

FOREIGN PATENT DOCUMENTS

| | | |
|---|---|---|
| CN | 208368398 U | 1/2019 |
| CN | 110853957 A | 2/2020 |
| CN | 211319978 U | 8/2020 |
| CN | 214477126 U | 10/2021 |
| CN | 113903610 A | 1/2022 |

* cited by examiner

19

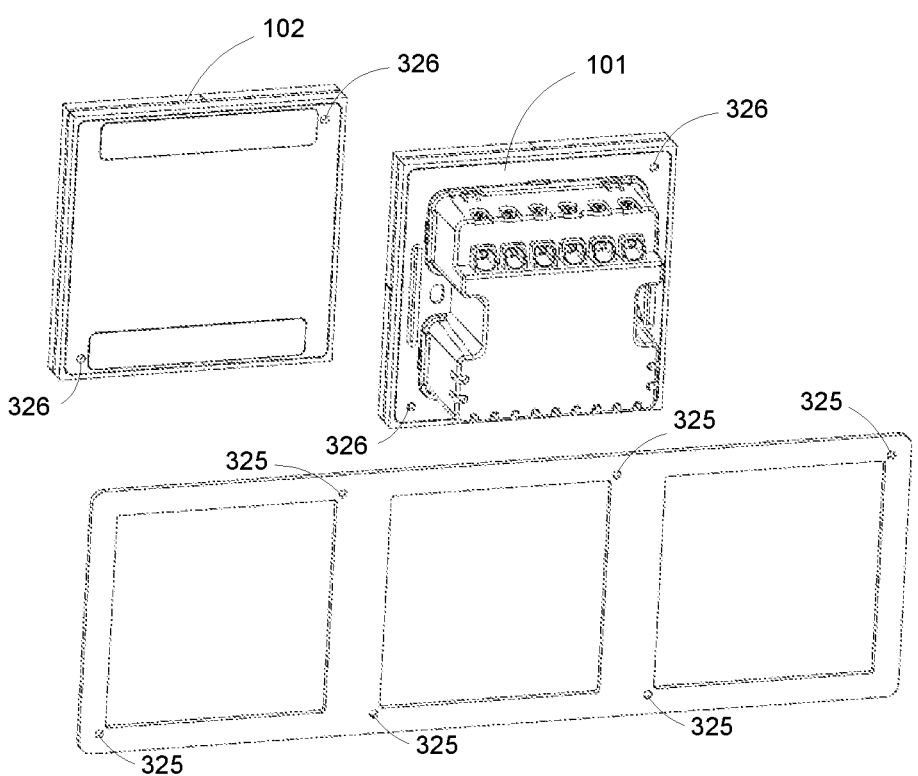
FIG. 68
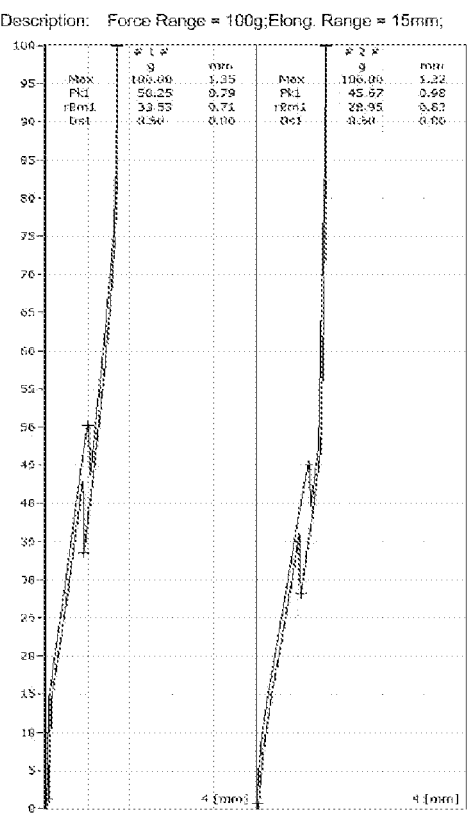
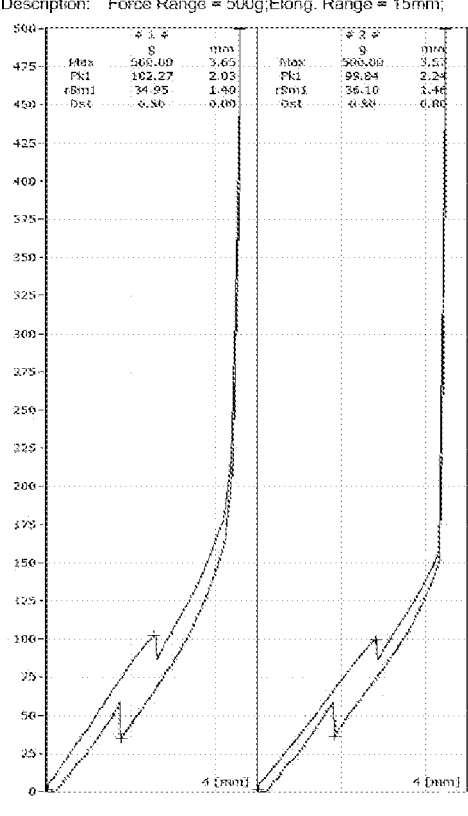
FIG. 69             FIG. 70

Description:   Force Range = 500g;Elong. Range = 15mm;

Description:   Force Range = 500g;Elong. Range = 15mm;

Description:   Force Range = 500g;Elong. Range = 15mm;

Description:   Force Range = 500g;Elong. Range = 15mm;

WALL INTELLIGENT SWITCH, WIRELESS INTELLIGENT SWITCH AND SWITCH MOUNTING FRAME

TECHNICAL FIELD

The present application relates to the field of switches, and more particularly to a wall intelligent switch, a wireless intelligent switch and a switch mounting frame.

BACKGROUND OF THE INVENTION

An intelligent switch is generally composed of a key, a detection member and a wireless communication module. A user gives an operation and control force to a key so that the key generates a movement. The key triggers a detection member during the movement so as to control the on-off of the switch. The wireless communication module is used for receiving and sending a wireless signal. The switch can also control the on-off according to the wireless signal. In the process of springback of intelligent switch, the current intelligent switch has obvious rebound force jump and large displacement of springback jump, which results in a strong sense of falling when the user presses the key.

SUMMARY OF THE INVENTION

In order to solve the above problems, the present invention provides a wall intelligent switch, a wireless intelligent switch and a switch mounting frame.

According to a first aspect of an embodiment of the present invention, a wall intelligent switch is provided, comprising a housing, at least one key, a detection member, a reset portion and a wireless communication module, wherein the key is provided on the housing, and at least part of the key is capable of performing a pressing movement in response to an operation and control force so as to generate a displacement, so that the key passes through at least a first pressing position and a second pressing position in sequence, and generates a reaction force; the detection member may be provided for being triggered based on the displacement and generating a first rebound force against the displacement; the reset portion is configured for supporting the key to deform directly or indirectly in response to the pressing movement and generating a reset acting force to overcome the deformation; the wireless communication module is electrically connected to the detection member to receive a trigger signal of the detection member and to control the on-off of the wall intelligent switch based on the trigger signal;

wherein the detection member and the reset portion cooperate such that when the key moves to the first pressing position, the reaction force is F1; when the key moves from the first pressing position to the second pressing position, the reaction force jumps from F1 to F2, where F2<F1<400 g; the displacement S1 of the key at the first pressing position and the displacement S2 of the key at the second pressing position satisfy a relationship: S2-S1≤2 mm.

According to a second aspect of an embodiment of the present invention, a wireless intelligent switch is further provided, comprising a housing, at least one key, a detection member, a reset portion and a wireless communication module, wherein the key is provided on the housing, and at least part of the key is capable of performing a pressing movement in response to an operation and control force so as to generate a displacement, so that the key passes through at least a first pressing position and a second pressing position in sequence, and generates a reaction force; the detection member may be provided for being triggered based on the displacement and generating a first rebound force against the displacement; the reset portion is configured for supporting the key to deform directly or indirectly in response to the pressing movement and generating a reset acting force to overcome the deformation; the wireless communication module is communicatively connected to the detection member so as to receive a corresponding trigger signal and send a wireless message to the outside based on the trigger signal;

wherein the detection member and the reset portion cooperate such that when the key moves to the first pressing position, the reaction force is F1; when the key moves from the first pressing position to the second pressing position, the reaction force jumps from F1 to F2, where F2<F1<400 g; the displacement S1 of the key at the first pressing position and the displacement S2 of the key at the second pressing position satisfy a relationship: S2-S1≤2 mm.

According to a third aspect of an embodiment of the present invention, a switch mounting frame is further provided, comprising a connector frame provided for mounting the above-mentioned wall intelligent switch and/or the above-mentioned wireless intelligent switch; at least one switch mounting position is arranged on the connector frame; and the wall intelligent switch or the wireless intelligent switch is detachably connected to the switch mounting position.

Advantageous effects of the present invention are as follows.

The present invention provides a wall intelligent switch and a wireless intelligent switch. By providing a reset portion and a detection member cooperating with a key, a reaction force generated by the key during a pressing process is associated with a reset acting force provided by the reset portion and a first rebound force provided by the detection member, and the reset acting force and the first rebound force are configured such that the reaction force when the key is pressed from a first pressing position to a second pressing position is less than or equal to 400 g. Furthermore, the pressing force required for the triggering process of the key can be controlled within 400 g, so that the user presses a key with less effort to optimize the user experience. In addition, the difference between the displacements of the key at the first pressing position and the second pressing position is set to be less than or equal to 2 mm, so that the displacement of the key that jumps during the pressing process is reduced to be less than 2 mm, and the user's feeling of sticking when pressing the key is weakened, thereby improving the smooth degree of key pressing. At the same time, the feedback of the key trigger detection member is more directly due to the decrease of the jump displacement during the key press, which reduces the sticky feeling of the key press, so that the key can give clear feedback to the user while improving the smooth degree of the press.

BRIEF DESCRIPTION OF DRAWINGS

In order to explain the embodiments of the present invention or the technical solutions in the prior art more clearly, a brief description will be given below with reference to the accompanying drawings which are used in the description of the embodiments or the prior art. It is obvious that the drawings in the description below are merely some embodiments of the present invention. A person of ordinary skill in the art may obtain other drawings according to these drawings without involving any inventive effort.

FIG. 68 is a structural diagram of a connector frame according to an embodiment of the present invention;

FIG. 69 is a curve graph of pressing force versus displacement of a key according to an embodiment of the present invention;

FIG. 70 is a curve graph of pressing force versus displacement of a key according to an embodiment of the present invention;

REFERENCE NUMERALS

Figure 1:
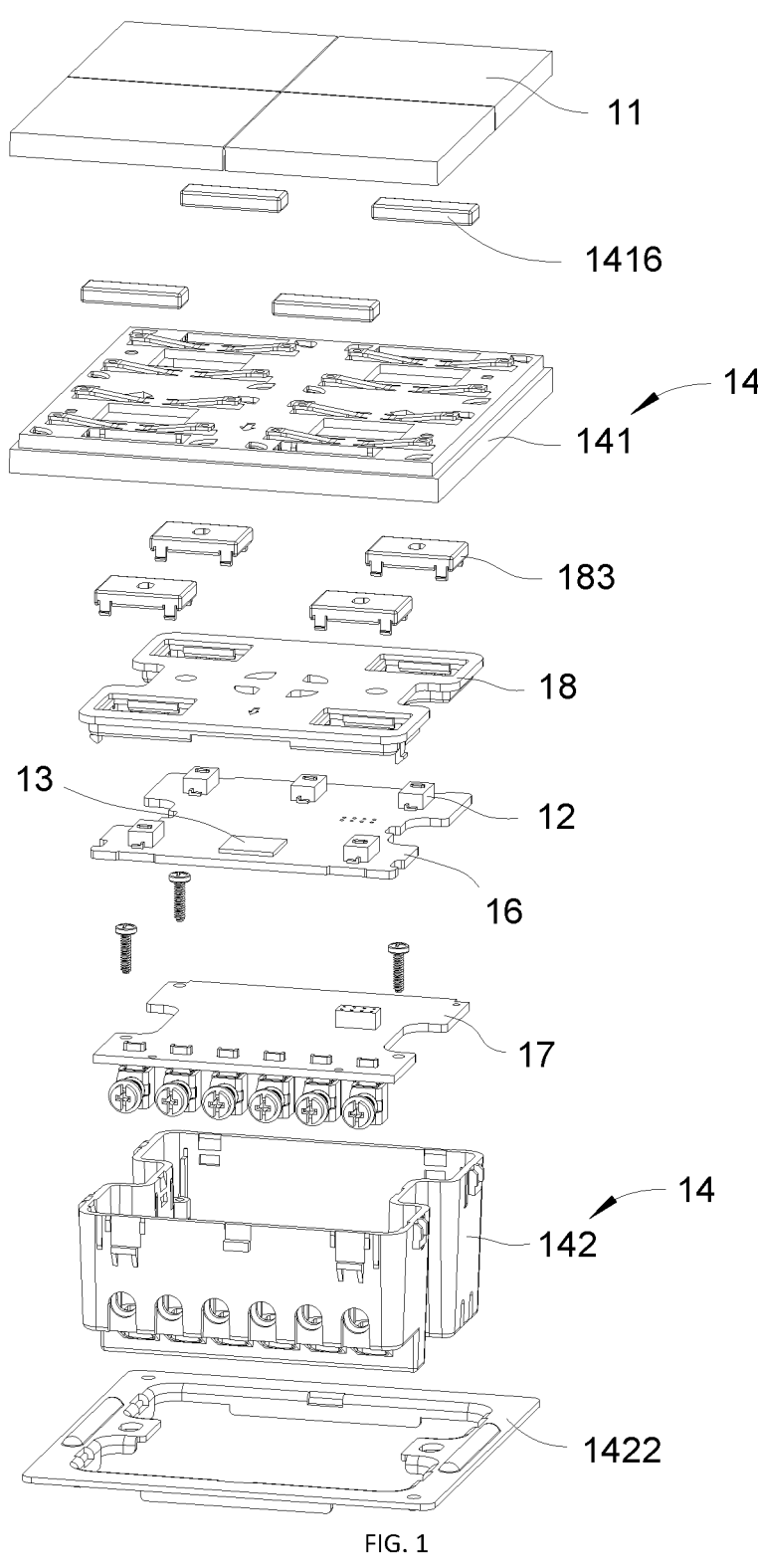
FIG. 1 is an exploded view of an embodiment of the present invention.

11, key; 111, key positioning pin; 112, key snap; 1121, hook portion; 1122, bracing portion; 113, abutting portion; 114, light guide portion; 1141, predetermined pattern; 115, display screen keep-space position; 116, reinforcement seat; 1161, reinforcement unit; 117, coating; 118, spring limiting portion; 1191, functional cover; 1192, surface cover; 1193, gripping portion placing groove; 1194, positioning boss; 1195, first clamping jaw; 11951, first clamping jaw arm; 11952, first clamping hole; 1196, key body; 1197, connecting portion; 11971, first clamping portion; 11972, second clamping jaw; 11973, second clamping jaw arm; 11974, second clamping hole; 1198, second hook; 1199, pressing boss;

101, wall intelligent switch; 102, wireless intelligent switch;

12, detection member; 121, force guide member; 122, elastic jump device; 13, wireless communication module;

14, housing; 141, upper housing; 1411, relief portion; 1412, first strip-shaped through hole; 1413, second strip-shaped through hole; 1414, third strip-shaped through hole; 1415, snap-fit position; 14151, first guide slope; 1416, magnet; 14161, magnet mounting groove; 14162, hollowed-out through hole; 14171, first forward mark; 14172, second forward mark; 1418, second positioning portion; 14181, square protrusion; 1419, light uniforming shade light-transmitting through hole; 143, keep-space position; 144, first rotating shaft; 145, second clamping portion; 1451, clamping shaft; 146, hook through hole; 147, gradienter; 148, PCB board mounting housing; 1481, PCB housing positioning portion; 1482, PCB housing snap; 1483, second snap-fit position; 149, insulation plate; 1491, pin header passing hole;

142, lower housing; 1421, snap movable space; 1422, magnetic attraction member; 14221, sheet metal part; 14222, screw hole; 14223, attaching portion; 14224, base portion; 14225, magnetic attraction member recess portion; 14231, first outer side wall; 14232, second outer side wall; 14233, third outer side wall; 14234, fourth outer side wall; 14235, sheet metal part snap; 14236, first abutting portion; 14237, second abutting portion; 14238, third abutting portion; 14239, fourth abutting portion; 1424, first positioning portion; 14241, positioning rib; 14242, guide portion; 1425, power supply board limiting rib; 14261, first wiring through hole; 14262, second wiring through hole; 14264, wiring module placing groove; 14265, bolt limiting rib; 14266, stop limiting portion; 1427, heat dissipation hole; 1428, U-shaped recess; 1429, power supply board positioning post; 14291, power supply board bolt hole;

15, reset portion; 151, resilient limiting member; 1511, fixing end; 1512, free end; 1513, first positioning hole; 1514, bearing portion; 152, resilient reset member; 1521, spring; 153, reed; 1531, gripping portion; 1532, deformation portion; 1533, positioning through hole; 154, first resilient arm; 155, second resilient arm;

16, PCB board; 161, pin header; 162, U-shaped notch; 163, LED lamp; 164, display screen; 165, flat cable; 1651, flat cable connecting head; 166, flat cable connector; 16a, second relief hole; 16b, first welding hole; 16c, first snap-fit hole; 16d, third relief hole; 16e, third placing through hole;

17, power supply board; 171, wiring post; 172, wiring module; 1721, wiring sleeve; 1722, wiring bolt; 17221, nut; 17222, screw rod; 17223, stopper portion; 173, female header; 174, power supply board positioning hole; 175, relay; 176, AC/DC conversion module; 177, on-off switch; 1771, first keep-space hole; 1772, second keep-space hole;

18, isolation cover; 181, PCB board abutment portion; 182, snap-fit brim; 183, light uniforming shade; 1831, light uniforming shade snap; 1832, isolation cover through hole; 1833, light uniforming shade snap-fit position; 1834, contact-pressure through hole; 184, display screen mounting position; 1841, first side portion; 1842, second side portion; 1843, third side portion; 1844, fourth side portion; 185, third forward mark; 186, isolation cover snap; 187, sealing portion; 1881, light uniforming piece; 1882, light uniforming piece mounting groove; 1883, light-transmitting piece; 189, sound generator; 1891, speaker; 1892, speaker mounting position; 1893, speaker main body; 1894, speaker base; 1895, speaker wire; 1896, speaker connector; 1897, speaker plug-in interface; 1898, sound-emitting hole; 18a, second mounting hole; 18b, compensation hole; 18c, battery removal slot; 18d, second placing through hole; 18e, first relief hole;

19, bottom housing; 191, accommodating cavity; 192, mounting post; 193, first mounting hole; 194, first limiting groove; 195, first positioning post; 196, second limiting groove; 197, second positioning post; 198, first relief accommodating groove; 199, second relief accommodating groove;

21, power supply module; 211, button battery; 212, negative electrode elastic sheet; 2121, negative electrode current-carrying piece sheet; 2121a, first solder-climbing hole; 21b, first limiting hole; 2121c, limiting accommodating hole; 2121d, negative electrode current-carrying piece body; 2121e, first bent connecting arm; 2121f, first clamp arm; 2121g, first operating arm; 2121h, placing hole; 2122, negative electrode resilient contact arm; 2123, first contact terminal; 2124, first welding leg; 2125, first clamping arm; 2126, first snap; 2127, first resilient contact pin; 2128, second contact terminal;

213, positive electrode elastic sheet; 2131, positive electrode current-carrying piece sheet; 2131a, second solder-climbing hole; 2131b, second limiting hole; 2131c, positive electrode current carrier main body; 2131d, second bent connecting arm; 2131e, second clamp arm; 2131f, second operating arm; 2131g, fourth placing through hole; 2132, positive electrode resilient contact arm; 21321, connecting sheet; 21322, conductive sheet; 2133, second welding leg; 2134, second clamping arm; 2135, second snap; 2136, second resilient contact pin; 2137, third contact terminal;

22, battery accommodating cavity; 221, resilient wall; 222, first accommodating through hole; 223, second accommodating through hole;

23, battery fixing structure; 231, movable snap; 2311, connecting portion; 2312, snap-fit portion; 2313, holding portion; 232, limiting button; 24, resilient member;

3, switch mounting frame; 31, connector frame; 32, switch mounting position; 321, second positioning groove; 322, third snap; 323, third snap-fit position; 324, housing passing hole; 325, positioning protrusion; 326, positioning hole; 41, waterproof light-transmitting member; 411, light-transmitting portion; 42, magnetic attraction member fixing portion; 421, magnetic attraction member through hole; 422, magnetic attraction member fixing through hole; 43, anti-slip sticker; 44, magnetic attraction member protrusion.

DETAILED DESCRIPTION OF THE INVENTION

In the description of the present invention, the terms "inner", "outer", "longitudinal", "transverse", "upper", "lower", "top", "bottom", and the like designate orientations or positional relationships based on the orientation or positional relationships shown in the figures, are merely for convenience in describing the invention and not requiring the invention to be necessarily constructed and operated in a particular orientation, which thus should not be construed as limiting the invention.

In the description of the present specification, the terms "first" and "second" are used for descriptive purposes only and should not be understood as indicating or implying relative importance or implicitly indicating the number of technical features indicated. Thus, a feature defined as "first" or "second" may explicitly or implicitly include one or more of the features.

In the description of the present description, unless expressly stated or limited otherwise, the term "connected" is construed broadly, e.g. fixedly or removably connected, or integrally formed; it can be a mechanical connection, can be an electrical connection or can communicate with each other; it can be directly connected or indirectly connected by an intermediate medium, and can be the communication between two elements or the interaction relationship between two elements. The specific meaning of the above terms in the present invention can be understood by those skilled in the art according to specific circumstances.

The technical solutions in the embodiments of the invention will be described clearly and completely in conjunction with the accompanying drawings in the embodiments of the invention. Obviously, the described embodiments are only part of the embodiments of the invention, rather than all of the embodiments. Based on the embodiments in the invention, all other embodiments obtained by a person skilled in the art without involving any inventive effort are within the scope of protection of the invention.

Figure 56:
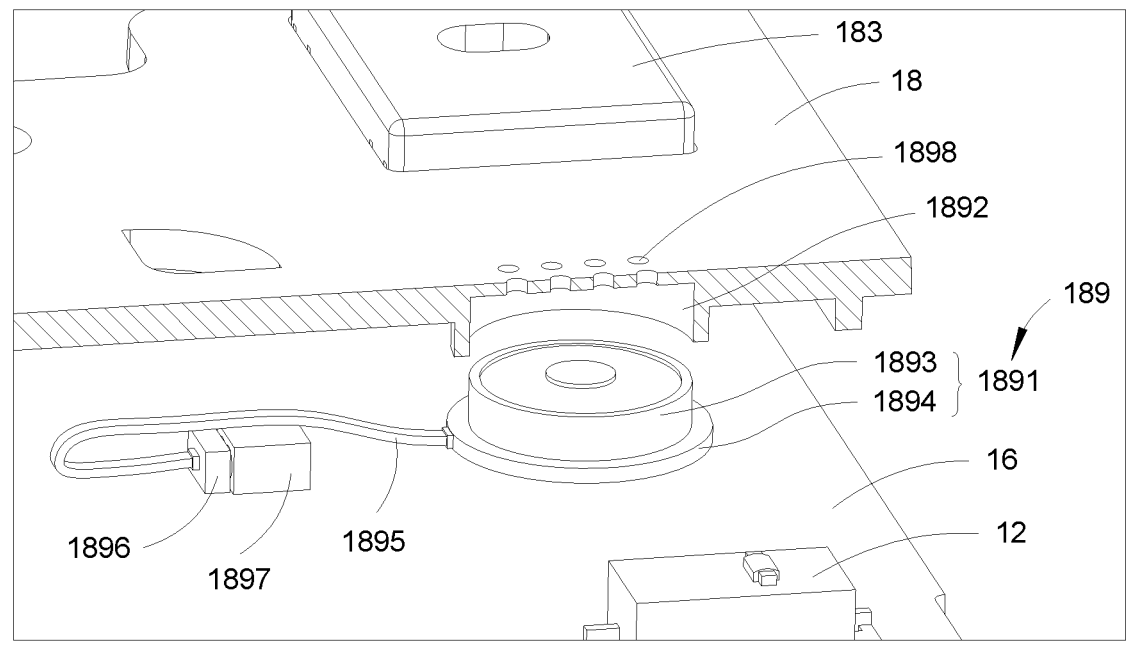
FIG. 56 is a structural diagram of a speaker according to an embodiment of the present invention.

With reference to FIGS. 1-56 and based on FIGS. 1-56, a wall intelligent switch 101 proposed by the present invention is specifically explained. When in use, the wall intelligent switch 101 proposed by the present invention is fixedly arranged on a fixed arrangement reference plane such as a wall and a ground, and is connected to a household electrical circuit for being electrically connected to a controlled apparatus. It can control the controlled apparatus to be switched on and off, and has a wireless communication function, can receive a wireless message, and executes a corresponding control instruction according to the content of the wireless message, thereby controlling the corresponding controlled apparatus to be switched on and off.

Figures 2, 3:
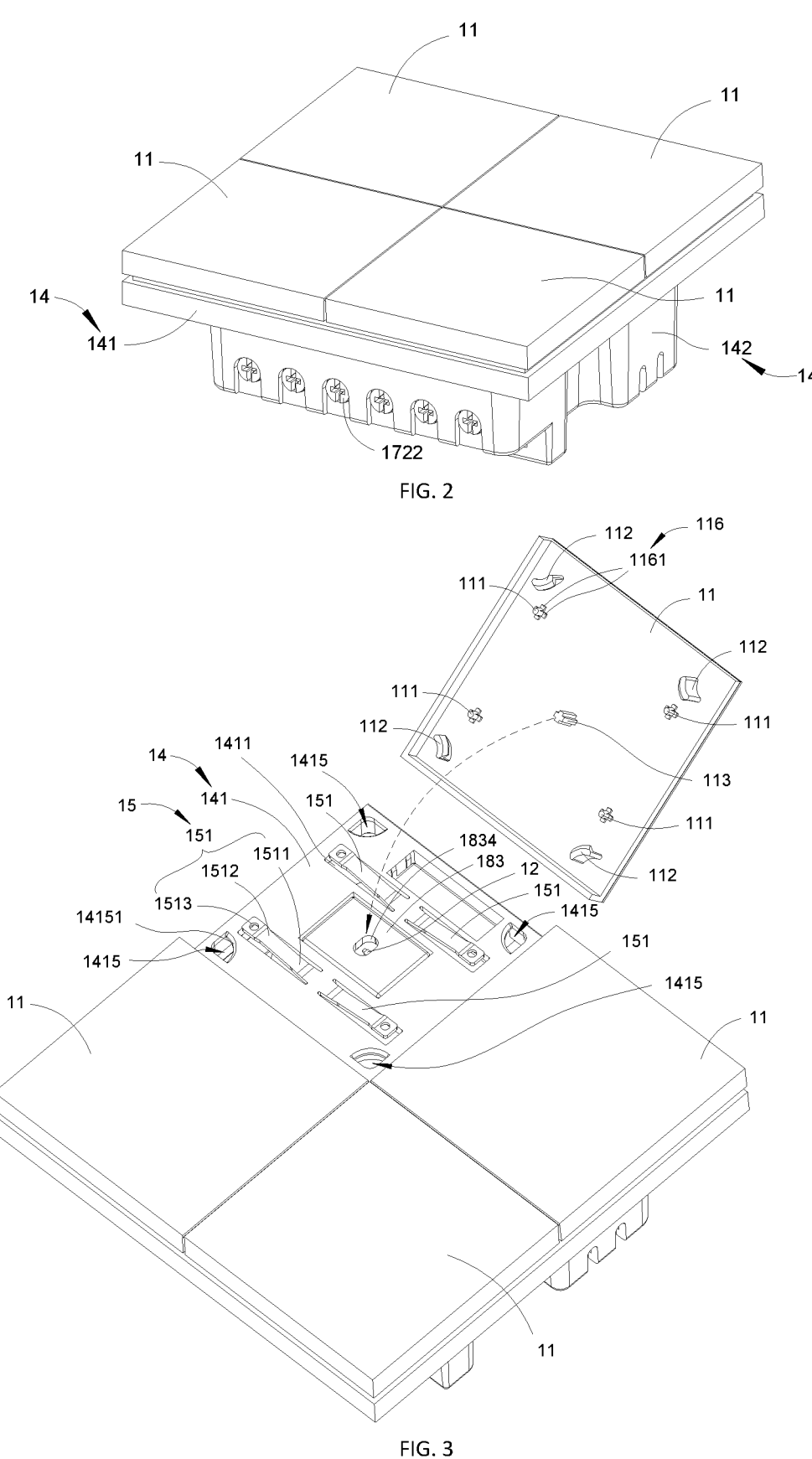
FIG. 2 is an overall structural diagram of an embodiment of the present invention.
FIG. 3 is a structural diagram of an embodiment of the present invention.

Specifically, as shown in FIGS. 1 and 2, the wall intelligent switch 101 at least includes a housing 14, at least one key 11, a detection member 12 and a wireless communication module 13.

The key 11 is arranged on the housing 14, and at least part of the position of the key 11 is capable of performing a pressing movement in response to an operation and control force so as to generate a displacement, so that the key 11 passes through at least a first pressing position and a second pressing position in sequence, and generates a reaction force. The detection member 12 may be provided for being triggered based on the displacement and generating a first rebound force against the displacement. The reset portion 15 is configured for supporting the key 11 to deform directly or indirectly in response to the pressing movement and generating a reset acting force to overcome the deformation. The wireless communication module 13 is electrically connected to the detection member 12 to receive a trigger signal of the detection member 12 and to control the on and off of the wall intelligent switch 101 based on the trigger signal.

Herein, according to at least part of the key 11 being capable of performing a pressing movement in response to an operation and control force, it is to be understood that the part of the key 11 is capable of performing a pressing movement in response to the operation and control force, or the key 11 as a whole is capable of performing a pressing movement in response to the operation and control force. The pressing movement can be, for example, a pivotal movement, a linear movement or a combined movement of displacement and rotation, etc. The reaction force should be understood as the reaction force in the direction opposite to the displacement generated by the operation and control force at the position where the key 11 is pressed and displaced. The detection member 12 may be a push switch with a self-resetting function, which when activated is able to generate the first rebound force against the pressing of the key 11. The wireless communication module 13 controls the on-off of the wall intelligent switch 101 based on the trigger signal. It can be understood that the wireless communication module 13 can trigger a switch on-off instruction so as to control the on-off of a controlled apparatus. A user can manipulate the key 11 for triggering the detection member 12. The wireless communication module 13 controls the switch on-off according to the triggering of the detection member 12. Furthermore, the user can also send a wireless message to the switch. The wireless communication module 13 controls the switch to be on/off according to the instruction of the wireless message.

Figure 5:
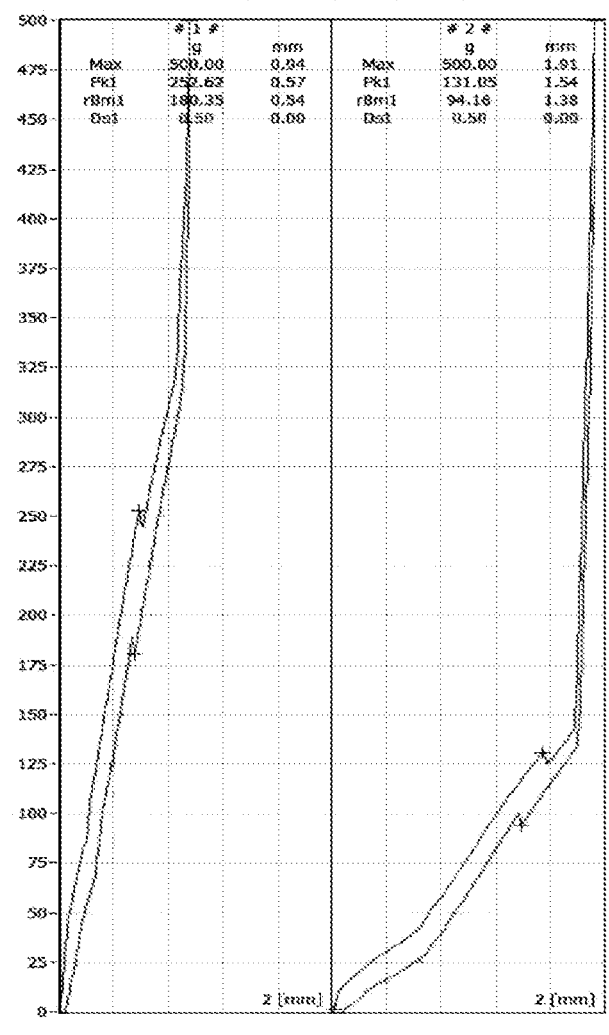
FIG. 5 is a curve graph of pressing force versus displacement of a key according to an embodiment of the present invention.

Herein, as shown in FIG. 5, the detection member 12 and the reset portion 15 cooperate so that when the key 11 moves to the first pressing position, the reaction force is F1; when the key 11 moves from the first pressing position to the second pressing position, the reaction force jumps from F1 to F2, where F2<F1<400 g; the displacement S1 of the key 11 at the first pressing position and the displacement S2 of the key 11 at the second pressing position satisfy a relationship: S2-S1≤2 mm.

It can be seen that the above-mentioned solution relates to providing a reset portion 15 and a detection member 12 cooperating with a key 11, so that a reaction force generated by the key 11 during a pressing process is associated with a reset acting force provided by the reset portion 15 and a first rebound force provided by the detection member 12, and the reset acting force and the first rebound force are configured such that the reaction force when the key 11 is pressed from a first pressing position to a second pressing position is less than or equal to 400 g. Furthermore, the pressing force required for the triggering process of the key 11 can be controlled within 400 g, so that the user presses the key 11 with less effort to optimize the user experience. Here, it should be noted that 400 g represents the gravity generated by 400 g of an object. In addition, the above-mentioned solution also sets the difference between the displacements of the key 11 at the first pressing position and the second pressing position to be less than or equal to 2 mm, so that the displacement of the key 11 that jumps during the pressing process is reduced to within 2 mm, and the user's feeling of sticking when pressing the key 11 is weakened, thereby improving the smooth degree of pressing the key 11. At the same time, the feedback of the key 11 trigger detection member 12 is more directly due to the decrease of the jump displacement during the key press, which reduces the sticky feeling of the key press, so that the key 11 can give clear feedback to the user while improving the smooth degree of the press.

As shown in FIG. 5 and FIGS. 69-76, they show a force-displacement curve of pressing a plurality of switches. The applicant designs a plurality of switch structures, configures different types of detection members 12, and performs a pressure test via a press. A contact of the press presses against the key 11 to perform a pressing movement, and the key 11 generates a displacement and a reaction force during the pressing process. A force sensor and a displacement sensor are arranged on the contact of the press. The press records a force-displacement curve during the pressing process of the key 11 and during the rebound process, where an ordinate in the figure is a value of the pressing force, and an abscissa is a displacement amount of the key 11. The left side is a curve when pressing the main pressing region of the key 11 (the middle position of the key 11), and the right side is a curve when pressing the corner position of the key 11. There are two curves on either side, one above is a curve when pressing and one below is a curve when rebounding. Specifically, with reference to left curves of FIG. 5 and FIGS. 69-76, in the FIG. 5, F1=252.62 g and S2-S1<0.2 mm; in FIG. 69, F1=50.25 g, S2-S1<0.3 mm; in FIG. 70, F1=50.25 g, S2-S1<0.3 mm; in FIG. 70, F1=102.27 g, S2-S1<0.3 mm; in FIG. 71, F1=130.95 g, S2-S1<0.6 mm; in FIG. 72, F1=95.49 g, S2-S1<1 mm; in FIG. 73, F1=237.99 g, S2-S1<0.2 mm; in FIG. 74, F1=199.55 g, S2-S1<0.3 mm; in FIG. 75, F1=341.97 g, S2-S1<0.2 mm; in FIG. 76, F1=264.94 g and S2-S1<0.3 mm. It can be seen that the reaction force of the switch structure key 11 designed by the applicant is less than or equal to 400 g. The difference in displacement of the key 11 between the first pressing position and the second pressing position is less than or equal to 2 mm. This makes it more labor-saving for the user to press the key 11 and improves the smooth degree of pressing the key 11.

Furthermore, as shown in FIG. 5, the reset portion 15 is also configured to be able to use the reset acting force to drive the key 11 to generate a reset movement, so that the key 11 passes through at least a first rebound position, a second rebound position and a third rebound position in sequence. The reset acting force of the reset member cooperates with the first rebound force of the detection member 12, so that when the key 11 is at the first rebound position, the reaction force is F3. When the key 11 rebounds from the first rebound position to the second rebound position, the reaction force jumps from F3 to F4, and the reaction force at the third rebound position is 0, where F4>F3≥22 g, F2<F1, and F3/F1>0.3. When the key 11 triggers the detection member 12, the user withdraws the operation and control force, and the key 11 generates a rebound motion. During the rebound process, the key 11 is subjected to the reset acting force of the reset portion 15 on the key 11, the first rebound force of the detection member 12 on the key 11 and the elastic force generated by the deformation of the key 11 itself. At the same time, during the rebound process of the key 11, the user's finger is not separated from the surface of the key 11, and the key 11 is still subjected to the operation and control force of the user and the supporting force of the housing 14. The key 11 generates a rebound motion under the combined action of these forces. The rebound motion can be a uniform motion, an acceleration motion, a deceleration motion or a combined movement due to the interaction between various forces, and the reaction force of the key 11 is mainly composed of a reset acting force and a first rebound force. The applicant controls the reset acting force and the first rebound force, and performs a structural design (see the specific key structure embodiment below for details). After multiple pressing tests, the reaction force of the key 11 is greater than or equal to 22 g when the key 11 rebounds from the first rebound position to the second rebound position, ensuring that the key 11 rebounds with a sufficient rebound force. With reference to the left curves in FIGS. 5 and FIGS. 69-76, F1 is the reaction force of the key 11 when the detection member 12 jumps from a non-trigger state to a trigger state, and F3 is the reaction force of the key 11 when the detection member 12 jumps from a trigger state to a non-trigger state; in FIG. 5, F4>F3=180.35 g, and F3/F1=0.71; in FIG. 69, F4>F3=33.53 g, F3/F1=0.67; in FIG. 70, F4>F3=34.95 g, F3/F1=0.34; in FIG. 71, F4>F3=23.77 g, F3/F1=0.18; in FIG. 72, F4>F3=35.15 g, F3/F1=0.37; in FIG. 73, F4>F3=161.51 g, F3/F1=0.68; in FIG. 74, F4>F3=72.39 g, F3/F1=0.36; in FIG. 75, F4>F3=199.82 g, F3/F1=0.58; in FIG. 76, F4>F3=119.21 g, F3/F1=0.45. It can be seen from the above figures that the applicant controls F3/F1>0.3 by optimizing the cooperation relationship between the reset acting force and the first rebound force, so that the pressing of the key 11 does not differ too much from the force triggering the detection member 12 in the rebound process, and reduces the sticky feeling of the triggering of the detection member 12 by the key 11.

Figures 6, 7:
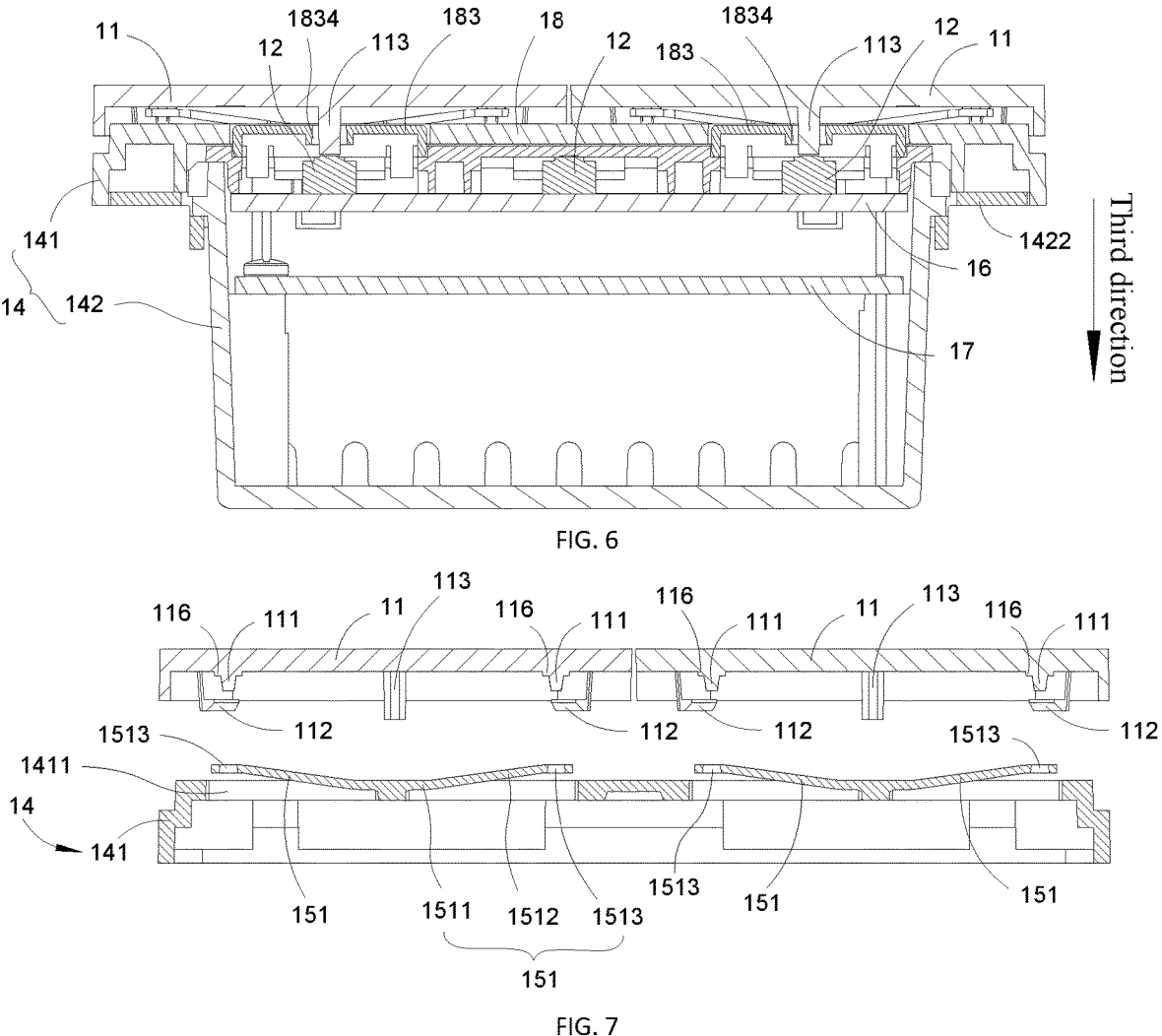
FIG. 6 is a cross-sectional view of an embodiment of the present invention.
FIG. 7 is a structural diagram of an embodiment of the present invention.
Figures 18, 19:
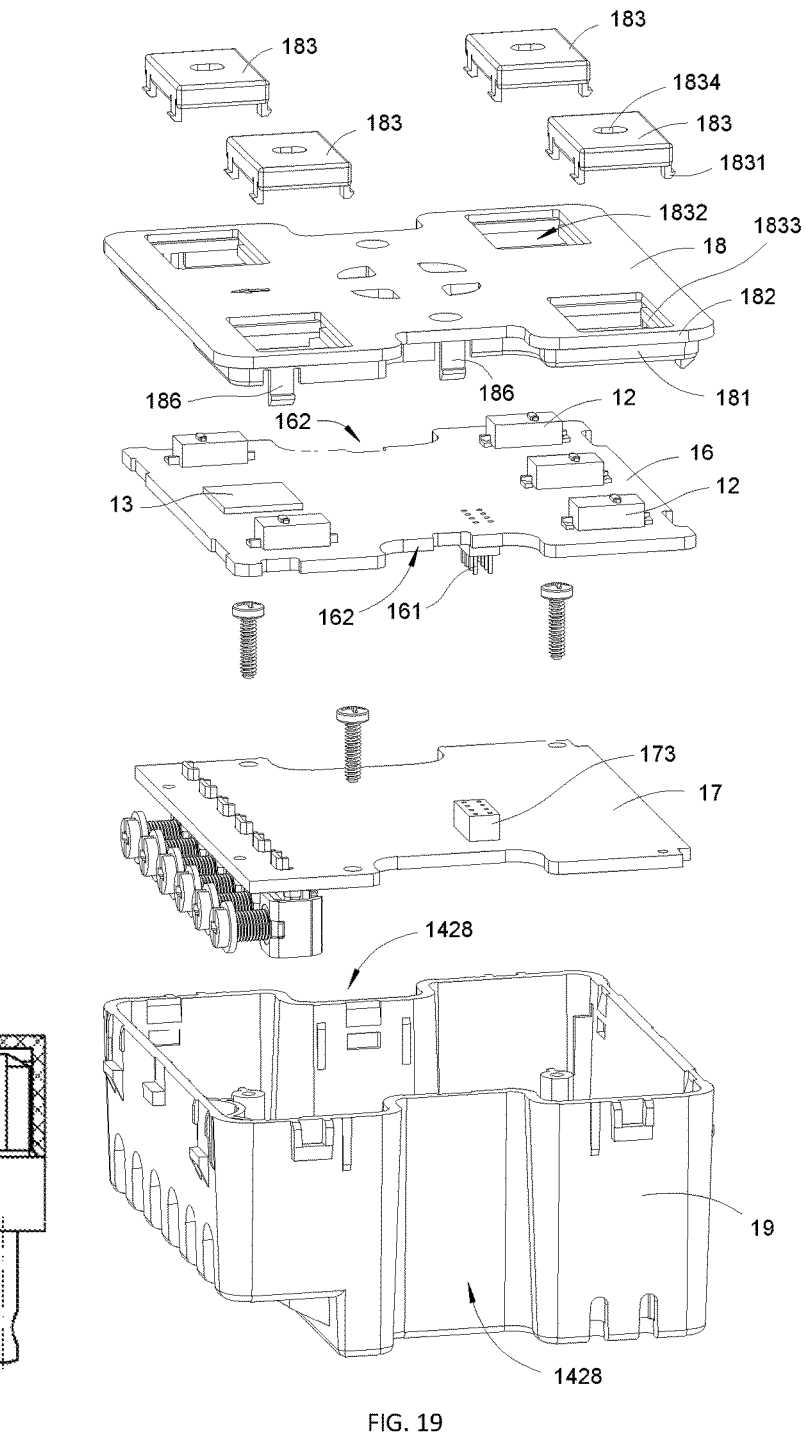
FIG. 18 is a structural diagram of a detection member according to an embodiment of the present invention.
FIG. 19 is an exploded view of an embodiment of the present invention.

Further, the difference between F1 and F3 is less than or equal to 70 g. Thus, the force of the trigger detection member 12 during the pressing and rebounding of the key 11 does not differ too much, the sticky feeling of the trigger detection member 12 of the key 11 is reduced, and the smooth degree of the pressing and rebounding of the key 11 is improved. Further, in a preferred embodiment, the difference between F1 and F3 is less than or equal to 20 g. Specifically, with reference to the left curves in FIGS. 69, 70 and 72, in FIG. 69, F1-F3=16.72 g; in FIG. 70, F1-F3=67.32 g; in FIG. 72, F1-F3=60.34 g;

Furthermore, as shown in FIGS. 6 and 18, the key 11 is movably connected to the housing 14. The key 11 is provided with an abutting portion 113 facing towards the detection member 12 for abutting and triggering the detection member 12. The detection member 12 is provided with a force guide member 121 at a corresponding position of the abutting portion 113. The force guide member 121 generates movement in response to the abutting of the abutting portion 113. When the force guide member 121 moves to a preset position, the contact force with the abutting portion 113 jumps. The manner of connection of the key 11 with the housing 14 and the positional relationship of the abutting portion 113 with respect to the key 11 are adapted to the force guide 121. Therefore, when the key 11 is pressed, the reaction force jumps from F1 to F2. When the key 11 rebounds, the reaction force jumps from F3 to F4. The movable connection includes a pivot connection, a sliding rail connection, a movable snap connection, an resilient arm connection or other connection modes which can be implemented by a person skilled in the art. The key 11 can be pressed to perform a movement, including a pivotal movement, a linear movement or a combined movement of displacement and rotation. The connection manner of the key 11 and the housing 14 and the positional relationship of the abutting portion 113 with respect to the key 11 being adapted to the force guide member 121 can be understood as that the applicant obtains a plurality of relative movement manners between the key 11 and the housing 14 by designing a plurality of connection structures of the key 11 and the housing 14, and selects a suitable connection structure by means of force analysis and performs structural optimization so as to obtain a structure conforming to the pressing rebound characteristic of the present invention. However, the position where the abutting portion 113 is arranged on the key 11 has a direct effect on the pressing rebound force and displacement of the key 11. The applicant obtains the position corresponding to the pressing rebound characteristic of the present invention by changing the position of the abutting portion 113 relative to the key 11 and performing force analysis. Therefore, when the key 11 is pressed, the reaction force jumps from F1 to F2. When the key 11 rebounds, the reaction force jumps from F3 to F4.

Furthermore, as shown in FIG. 18, the detection member 12 also comprises an elastic jump device 122. The force guide member 121 abuts against the elastic jump device 122 and can move relative to the detection member 12. The elastic jump device 122 is configured for receiving an abutting force to generate resilient deformation and generate elastic force. When the abutting force reaches a preset value, the elastic force jumps. When the displacement of the key 11 occurs in response to the operation and control force, the force guide member 121 elastically deforms against the elastic jump device 122 in response to the displacement of the key 11. When the operation and control force increases to F1, the abutting force of the force guide member 121 acting on the elastic jump device 122 reaches the preset value, and the elastic force of the elastic jump device 122 jumps, so that the reaction force of the key 11 jumps stepwise from the F1 to the F2. When the key 11 rebounds, the operation and control force gradually decreases to F3. The abutting force of the force guide 121 on the elastic jump device 122 reaches another preset value, and the elastic force of the elastic jump device 122 jumps, so that the reaction force of the key 11 jumps stepwise from the F3 to the F4. Herein, the elastic jump device 122 can be an elastic sheet or a spring. The force guide member 121 abuts against the elastic jump device 122 and can move relative to the detection member 12. The elastic jump device 122 can receive an abutting force to generate resilient deformation and generate an elastic force. When the abutting force reaches a critical pressure, the elastic force jumps. A metal contact located at the right end of the elastic sheet rapidly moves from an upper limit position to a lower limit position, so that the detection member 12 switches the on-off state (namely, being triggered). When the displacement of the key 11 occurs in response to the operation and control force, the key 11 directly or indirectly presses the force guide member 121. The force guide member 121 moves and elastically deforms against the elastic jump device 122. When the operation and control force increases to F1, the abutting force of the force guide member 121 acting on the elastic jump device 122 reaches the critical pressure, and the elastic force of the elastic jump device 122 jumps, in cooperation with the reset acting force of the reset portion 15, so that the reaction force of the key 11 jumps from F1 to F2. When the key 11 rebounds, the operation and control force gradually decreases. When the operation and control force decreases to F3, the abutting force of the force guide member 121 acting on the elastic jump device 122 reaches another critical pressure, and the elastic force of the elastic jump device 122 jumps, in cooperation with the reset acting force of the reset portion 15, so that the reaction force of the key 11 jumps stepwise from F3 to F4. The detection member 12 can be a microswitch, a touch switch, a membrane switch, a piezo-electric switch or other switches that can be implemented by a person skilled in the art. By selecting the type of the detection member 12, the applicant brings the triggering force and triggering displacement parameters thereof into the structure of the key 11 for force analysis, and obtains the type of the detection member 12 conforming to the structure of the key 11, so that the pressing rebound characteristic of the key 11 achieves the expectation of the present invention.

Further, as shown in FIG. 5 and FIGS. 69-76, the differ-ence between the reaction force F1 when the key 11 is at the first pressing position and the reaction force F2 when the key 11 is at the second pressing position is set to F3, and F3<0.5F1. The reset portion 15 cooperates with the use of the detection member 12. The design of the structure of the key 11 and the selection of the detection member 12 are optimized by rationally matching the values of the reset acting force and the first rebound force to make the spring jump variable smaller when the key 11 triggers the detection member 12, so as to buffer the impact force of the key 11 on the user's finger and improve the smooth feeling of pressing.

Further, as shown in FIG. 5 and FIGS. 69-76, the maxi-mum value of the displacement of the key 11 in response to the operation and control force is set to S4. When the key 11 is at the first pressing position, the displacement of the key 11 is set to S3, where the manipulation displacement margin ratio (S4-S3)/S4≥is 0.2. Herein, when designing the struc-ture of the key 11, the key 11 is designed with a maximum pressing amount, namely, the maximum value of the dis-placement. When the key 11 reaches the maximum pressing amount, the key 11 abuts against the housing 14, and the key 11 is difficult to continue to press down. The manipulation displacement margin ratio can reflect the amount that the key 11 can continue to press down after triggering the detection member 12. When designing the structure of the key 11, the size of the key 11 and the housing 14 is controlled so that the manipulation displacement margin ratio is greater than or equal to 0.2. Therefore, the key 11 still has a pressing margin after triggering the detection member 12, ensuring that the detection member 12 is triggered successfully.

Further, the manipulation displacement margin ratio of the corner positions of the key 11 is greater than 0.5 times the manipulation displacement margin ratio of the middle position of the key 11. By increasing the rigidity of the key 11 and reducing the deformation amount of the key 11, it is ensured that the operation displacement margin ratio of the corner position of the key 11 is not significantly different from the operation displacement margin ratio of the middle position, thereby improving the pressing feel of the corner position of the key 11.

Furthermore, as shown in FIG. 2, the key 11 is movably connected to the housing 14, the housing 14 being capable of limiting at least two degrees of freedom of displacement and at least one degree of freedom of rotation of the key 11, so that the key 11 can perform a movement of displacement and/or rotation and trigger the detection member 12 during the movement. The movable connection includes a pivot connection, a sliding rail connection, a movable snap con-nection, an resilient arm connection or other connection modes which can be implemented by a person skilled in the art. The housing 14 can limit at least two degrees of freedom of displacement and at least one degree of freedom of rotation of the key 11. It can be understood that the key 11 has three degrees of freedom of displacement and three degrees of freedom of rotation. The housing 14 limits at least two degrees of freedom of displacement and at least one degree of freedom of rotation of the key 11, namely, the degree of freedom that the key 11 can move includes at most one degree of freedom of displacement and two degrees of freedom of rotation. The key 11 generates a movement under the constraint of the housing 14, including a pivotal move-ment, a linear movement or a combined movement of displacement and rotation. The specific movement mode is determined by the connection structure of the key 11 and the housing 14.

Figure 4:
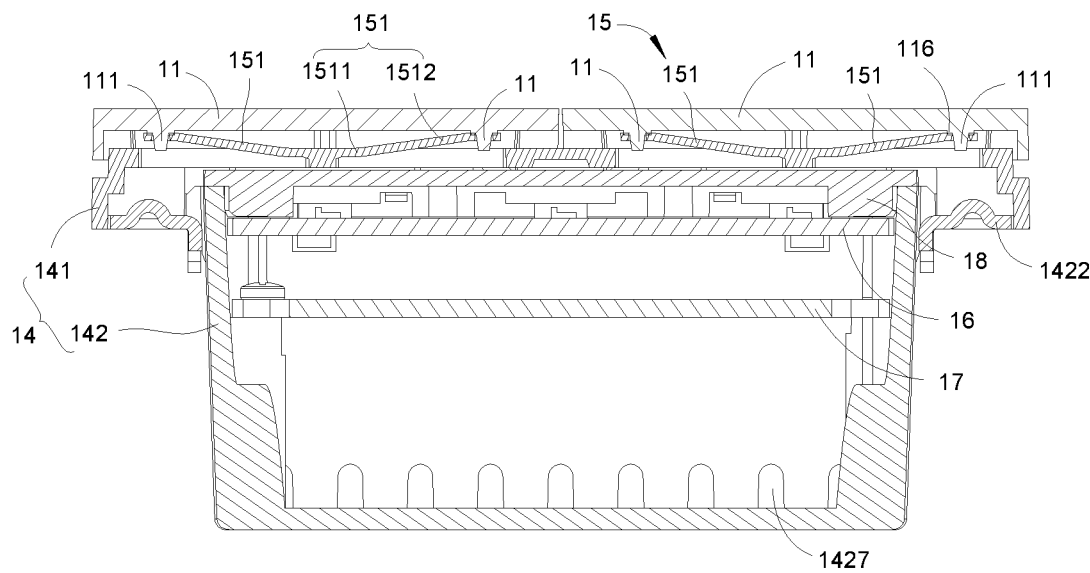
FIG. 4 is a cross-sectional view of an embodiment of the present invention.

Furthermore, in the present embodiment, as shown in FIGS. 3 and 4, the reset portion 15 is provided as at least one resilient limiting member 151. The housing 14 is provided with the resilient limiting member 151 at the corresponding position of the key 11. The resilient limiting member 151 is a cantilever beam structure, and includes a fixing end 1511 and a free end 1512 away from the fixing end 1511. The fixing end 1511 is fixedly connected to or integrally formed with the housing 14. The free end 1512 abuts against the key 11 to provide a reset acting force for the key 11. At the same time, the free end 1512 of the resilient limiting member 151 is positionally connected to the key 11 so as to limit two degrees of freedom of displacement in the horizontal direc-tion and one degree of freedom of rotation in the horizontal direction of the key 11, so that the key 11 can have a superimposed movement of displacement plus rotation in the vertical direction. It can be understood that the resilient limiting member 151 being arranged on the housing 14 at the corresponding position of the key 11 can be understood as that the resilient limiting member 151 arranged on the housing 14 can abut under the key 11 or the side surface of the key 11 to provide a reset acting force for the key 11. The positioning connection can be understood as a connection mode having a positioning function, including that the key 11 and the free end 1512 are respectively provided with a positioning pin and a positioning post, and the positioning pin and the positioning post are cooperatively connected so as to position between the free end 1512 and the key 11. Alternatively, the key 11 is provided with a positioning groove, and the shape of the positioning groove is adapted to the free end 1512, so that the free end 1512 is positioned by the positioning groove. It also includes other connection means with a positioning function that can be implemented by a person skilled in the art. The superimposed movement of the key 11 capable of displacement plus rotation in the vertical direction is understood to mean that the key 11 has three degrees of freedom of displacement and three degrees of freedom of rotation, the housing 14 defining two degrees of freedom of displacement in the horizontal direction and one degree of freedom of rotation in the horizontal direction of the key 11, releasing one degree of freedom of displace-ment in the vertical direction and two degrees of freedom of rotation in the vertical direction of the key 11, so that the key 11 can tilt in response to the operation and control force and be displaced downwards so as to press against and trigger the detection member 12.

In the intelligent switch provided in the present invention, the key 11 is supported by the resilient limiting member 151 and positioned by the resilient limiting member 151. The degree of freedom of the key 11 is relatively high. When the key 11 is pressed, a combined movement of displacement and rotation is generated, and the key 11 can be inclined towards multiple directions, so that the surface of the key 11 is more close to a user's finger. The difference in pressing force required everywhere of the key 11 is relatively small, and a relatively close hand feel of pressure can be achieved everywhere of the pressing key 11. At the same time, the free end 1512 of the resilient limiting member 151 can provide an elastic positioning effect for the key 11. When the key 11 moves, the free end 1512 of the resilient limiting member 151 does not slide relative to the key 11. However, a rigid positioning such as a snap or a positioning plate is conventionally used. During the same time of positioning, a relative sliding occurs between the resilient limiting member 151 and the key 11 or the housing 14, resulting in a large frictional resistance, so that pressing the key 11 generates a non-smooth feeling. With the elastic positioning scheme of the resilient limiting member 151 in the present invention, the flexibility of the key 11 is higher, the movement friction force is smaller, and the pressing feedback is clearer.

Furthermore, the detection member 12 may be a microswitch, a touch switch, a membrane switch, a piezoelectric switch or other switches that can be implemented by a person skilled in the art. Preferably, the detection member 12 is a microswitch. The microswitch is also known as a sensitive switch, and is commonly used for a mouse key 11. Compared with a touch switch, the contact distance of the microswitch is relatively small, and is easy to trigger. Generally, the trigger force of the microswitch only needs to be 60 g. The trigger feedback is relatively light. The displacement of the jump occurring during the triggering is small. The microswitch cooperates with the structure of the resilient limiting member 151, so that a slight trigger feedback of the microswitch can be transmitted. At the same time, it ensures a smooth pressing feeling and provides a clear trigger feedback. Here, the 60$g$ can be understood as the gravity generated by a 60$g$ object.

As shown in FIG. 5, it is a press force-displacement graph of the key 11. The ordinate is the value of the operation and control force, and the abscissa is the displacement amount of the key 11. The left side is a curve when the key 11 is pressed in the main pressing region (the middle position of the key 11). The right side is a curve when the key 11 is pressed in the corner position. There are two curves on either side of the curve, one above is a curve when pressing, and one below is a curve when rebounding. It can be seen from the Fig. that when at the first rebound position, the reaction force of the key 11 is F3. When the key 11 rebounds from the first rebound position to the second rebound position, the reaction force jumps from F3 to F4. The structure of the resilient limiting member 151 is used in combination with the microswitch. The length of the resilient limiting member 151 is designed and calculated such that F4>F3≥22 g, so as to ensure that the key 11 rebounds with sufficient rebound force, where the reaction force at the third rebound position is 0. At the same time, the displacement of the key 11 when at the first rebound position is set as S1. The displacement of the key 11 when at the second rebound position is set as S2, and S1-S2≤2 mm, so that when the detection member 12 changes from the trigger state to the non-trigger state, the displacement jump variable generated by the key 11 is smaller, making the pressing feedback more direct, and improving the pressing feel. In a specific embodiment, as shown in FIG. 5, S1-S2<0.2 mm. Since the detection member 12 of the present embodiment uses a microswitch, the trigger feedback is relatively small, and the amount of jump displacement when triggering is small. The microswitch cooperates with the structure of the resilient limiting member 151, so that a slight trigger feedback of the microswitch can be transmitted, and the key 11 can achieve a smooth and clear pressing feel. If other detection members 12 are used, such as a contact switch, the trigger feedback is large. The S1-S2 may even exceed 1 mm. The pressing vibration feeling is strong. The hand feeling is not as good as that of the microswitch.

Furthermore, as shown in FIGS. 3, 4 and 7, the free end 1512 is provided with a first positioning hole 1513. The key 11 is convexly provided with a key positioning pin 111 at a corresponding position of the first positioning hole 1513. The key positioning pin 111 is inserted into the first positioning hole 1513 so as to realize the positioning connection between the key 11 and the free end 1512. Herein, the first positioning hole 1513 is a through hole. The key positioning pin 111 is a cylindrical or truncated cone-shaped protrusion, the axial diameter of which is adapted to the aperture of the first positioning hole 1513, so that the first positioning hole 1513 can limit the horizontal displacement of the key positioning pin 111 to position the key 11. The beneficial effect of positioning the key 11 is that the relative position accuracy of the key 11 and the detection member 12 can be ensured, and the positional relationship between the key 11 and the detection member 12 is prevented from being offset, so that the detection member 12 cannot be triggered. At the same time, the gap between the keys 11 can be kept consistent and the aesthetics can be improved by positioning the keys 11.

Furthermore, there are a plurality of the resilient limiting members 151 corresponding to each of the keys 11. Accordingly, there are also a plurality of the first positioning holes 1513 and the key positioning pins 111 corresponding to each of the keys 11. The key positioning pin 111 includes a root portion integrally formed to the key 11 and an end portion away from the root portion. The key positioning pin 111 has a truncated cone shape in which a diameter of the root portion is greater than that of the end portion. The key positioning pin 111 is provided as a truncated cone shape with a root portion diameter being greater than an end portion diameter, so that the key positioning pin 111 is inserted into the first positioning hole 1513, and the positioning accuracy of the key 11 can be improved. The reason is that since there are a plurality of resilient limiting members 151 corresponding to each key 11 and each resilient limiting member 151 has a first positioning hole 1513, when the number of the first positioning holes 1513 is three or more, each first positioning hole 1513 forms an over-positioning structure for the key 11. If the key positioning pin 111 is cylindrical, the key positioning pin 111 cannot be fully inserted into the first positioning hole 1513. The conventional solution is to increase the gap between the key positioning pin 111 and the first positioning hole 1513, but this would lead to a decrease in positioning accuracy. The key positioning pin 111 of the present invention adopts a truncated cone-shaped structure, and the end portion of the truncated cone-shaped structure has a guiding function, so that the key positioning pin 111 can be smoothly inserted into the first positioning hole 1513. After the insertion, as the key 11 approaches the housing 14, the gap between the key positioning pin 111 and the first positioning hole 1513 gradually decreases, so as to achieve the effect of accurate positioning.

In a preferred embodiment, as shown in FIG. 7, the first positioning hole 1513 is a truncated cone-shaped hole, with the hole diameter of the side thereof facing towards the key 11 being smaller than the hole diameter of the side thereof facing away from the key 11. The key positioning pin 111 is inserted into the first positioning hole 1513 and then is thermally fused and fixed. Herein, the aperture of the first positioning hole 1513 on the side facing towards the key 11 is less than the aperture of the side facing away from the key 11, so that the key positioning pin 111 cannot easily fall off after being inserted into the first positioning hole 1513 and thermally fused and fixed. The use of the hot-melt fixing is advantageous in that the sloshing between the key 11 and the upper housing 141 can be further reduced. The pressing stability of the key 11 can be improved. The positioning accuracy of the resilient limiting member 151 can be further improved.

Figure 8:
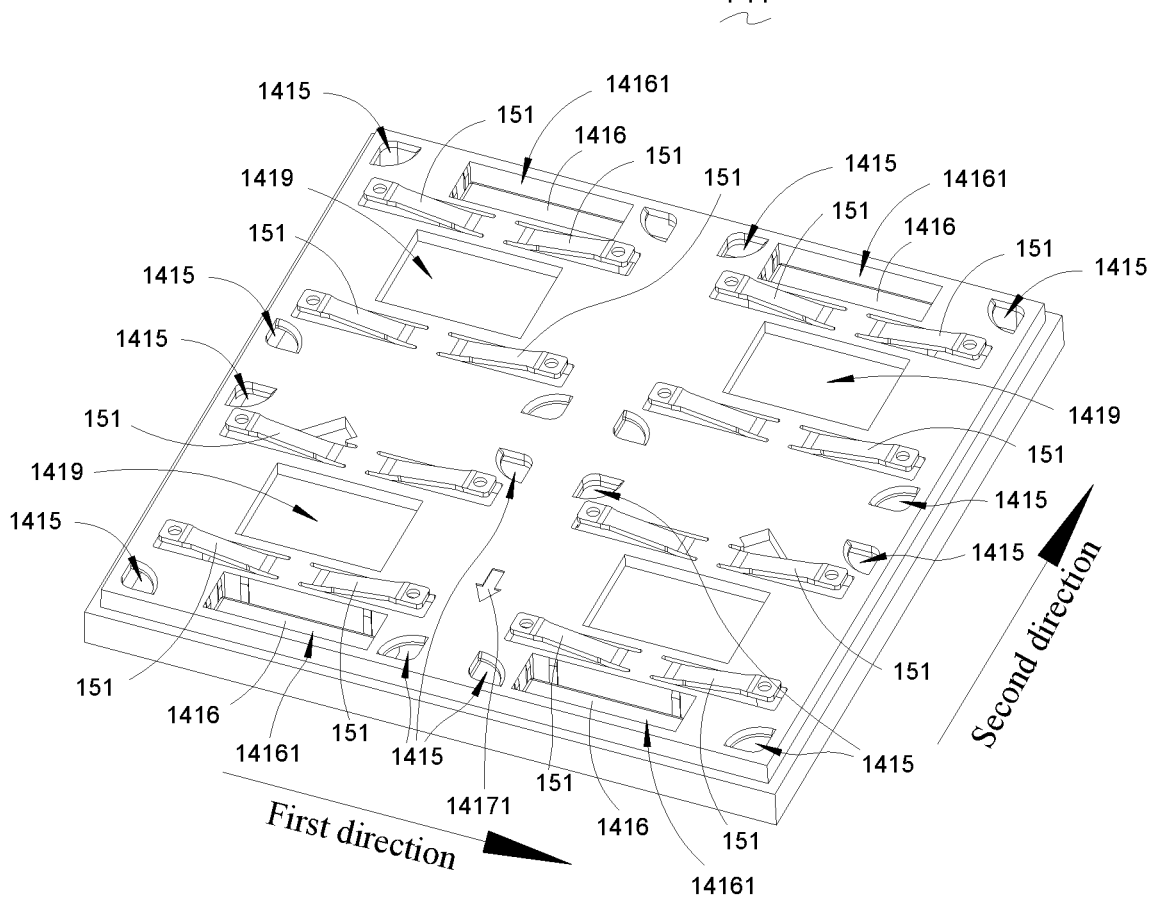
FIG. 8 is a structural diagram of an upper housing according to an embodiment of the present invention.

Further, as shown in FIGS. 8 and 3, the resilient limiting member 151 corresponding to each of the keys 11 extends from a middle position of the key 11 towards an edge of the key 11 in a first direction parallel to a side surface of the key 11 and parallel to an upper surface of the key 11. The resilient limiting member 151 extending from the middle position of the key 11 towards the edge of the key 11 can be understood as that the resilient limiting member 151 is integrally formed or fixedly connected to the housing 14. The housing 14 extends out of the resilient limiting member 151 at the middle position of the key 11 and extends towards the edge of the key 11 and abuts against the edge position of the key 11, so that the reset acting force of each resilient limiting member 151 acts on the position close to the edge of the key 11 to improve the stability of the support. The first direction has been shown in FIG. 8 with arrows.

Furthermore, there are four resilient limiting members 151 corresponding to each key 11. In the first direction, the four resilient limiting members 151 are symmetrically distributed in pairs. In the second direction, the four resilient limiting members 151 are juxtapositioned in pairs. The second direction is arranged parallel to the upper surface of the key 11. The second direction is arranged perpendicularly to the first direction. The first direction and the second direction are as shown by an arrow in FIG. 8. The resilient limiting members 151 are symmetrically distributed in pairs and are juxtapositioned in pairs, so that the resilient limiting members 151 provide a symmetrically reset acting force to the key 11, which can be adapted to the combined movement of displacement and rotation of the key 11. The key 11 can be inclined towards multiple directions, while the symmetrically reset acting force provided by the resilient limiting members 151 can make the reset acting force received by the key 11 close when the key 11 is inclined towards any direction by an operation and control force.

At the same time, the symmetrical reset acting force provided by the four resilient limiting members 151 enables the reset acting force to be easily controlled by structural design. The applicant controls the reset acting force to cooperate with the elastic force of the detection member 12 through calculation and simulation by changing the angle, thickness, width and length of the resilient limiting members 151. Therefore, when the key 11 moves to the first pressing position, the reaction force is F1. When the key 11 moves from the first pressing position to the second pressing position, the reaction force jumps from F1 to F2, where F2<F1<400 g. The displacement S1 of the key 11 at the first pressing position and the displacement S2 of the key 11 at the second pressing position satisfy the relationship: S2-S1≤2 mm.

Furthermore, the extension direction of the resilient limiting member 151 is parallel to one side edge of the key 11, so that the space occupied by the resilient limiting member 151 in the second direction is reduced, and a space is reserved for other components to be arranged on the housing 14.

Further, as shown in conjunction with FIGS. 8 and 3, in the first direction, the length of the resilient limiting member 151 is greater than ¼ of the length of the key 11. Since in the first direction, the four resilient limiting members 151 are symmetrically distributed in pairs. The resilient limiting members 151 extend from the middle position of the key 11 towards the edge position of the key 11. The length of the resilient limiting members 151 is controlled to be greater than ¼ of the length of the key 11, so that the resilient limiting members 151 can be lengthened as far as practicable. When the thickness of the resilient limiting members 151 is constant, the longer the length thereof is, the better the flexibility thereof is, and the less likely it is broken.

Figure 9:
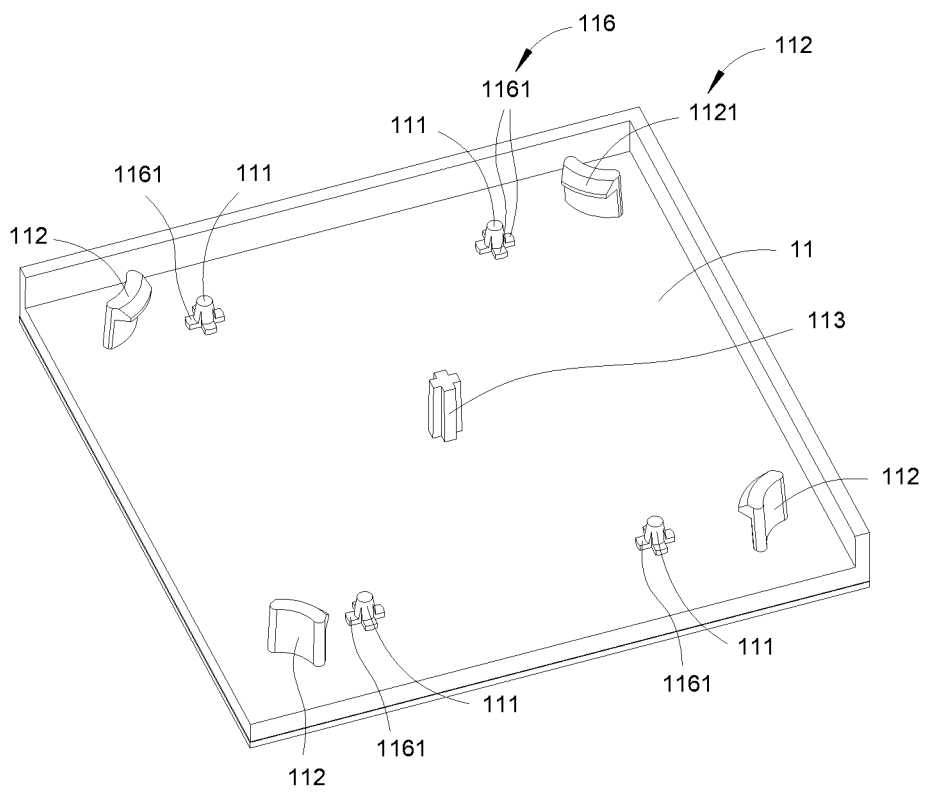
FIG. 9 is a structural diagram of a key according to an embodiment of the present invention.
Figure 10:
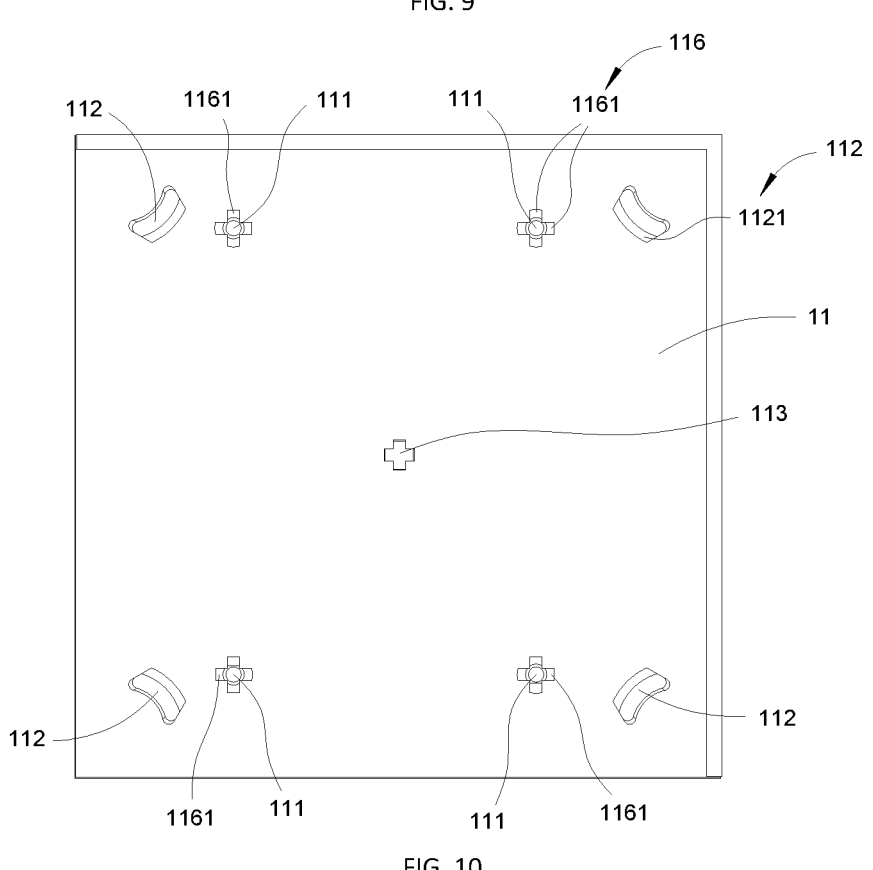
FIG. 10 is a front view of a key according to an embodiment of the present invention.

Further, as shown in FIGS. 9, 4 and 3, a reinforcement seat 116 is provided at the root portion of the key positioning pin 111. When the key positioning pin 111 is inserted into the first positioning hole 1513, the reinforcement seat 116 abuts against the resilient limiting member 151. Since the root portion of the key positioning pin 111 is prone to stress concentration and breakage, the reinforcement seat 116 provided at the root portion of the key positioning pin 111 can prevent the root portion of the key positioning pin 111 from breakage. In a specific embodiment, as shown in FIGS. 9 and 10, the reinforcement seat 116 is provided as four reinforcement units 1161, which are uniformly distributed along the circumferential direction of the root portion of the key positioning pin 111. The reinforcement unit 1161, the key positioning pin 111, and the key 11 are integrally formed. Specifically, the reinforcement unit 1161 is a square connecting block. The reinforcement seat 116 can reinforce the strength of the root portion of the key positioning pin 111 to prevent breakage. At the same time, the four reinforcement units 1161 are uniformly distributed along the circumferential direction of the key positioning pin 111, so that the key positioning pin 111 is not prone to be skewed when the injection molding is cooled, thereby improving the positioning accuracy of the key positioning pin 111.

Further, as shown in FIG. 7, a face of the resilient limiting member 151 towards the key 11 is parallel to the key 11 at a corresponding position of the first positioning hole 1513. Namely, the upper surface of the free end 1512 of the resilient limiting member 151 is parallel to the lower surface of the key 11, so that the first positioning hole 1513 maintains a vertical state during injection molding. The key positioning pin 111 is conveniently inserted into the first positioning hole 1513. The positioning accuracy of the first positioning hole 1513 can be improved. At the same time, when the key positioning pin 111 is inserted into the first positioning hole 1513, the upper surface of the resilient limiting member 151 abuts against the key 11 at the corresponding position of the first positioning hole 1513. The resilient limiting member 151 is in surface contact with the key 11, thereby improving the stability of the resilient limiting member 151 for supporting the key 11.

Further, as shown in FIG. 8, the resilient limiting member 151 is extended from the housing 14, and the fixing end 1511 is integrally formed with the housing 14. Since the resilient limiting member 151 is integrally formed with the housing 14, there is no need for an additional reset member, simplifying the structure, reducing the cost, and reducing the number of parts and the assembly steps. As shown in FIG.

Figures 12, 13:
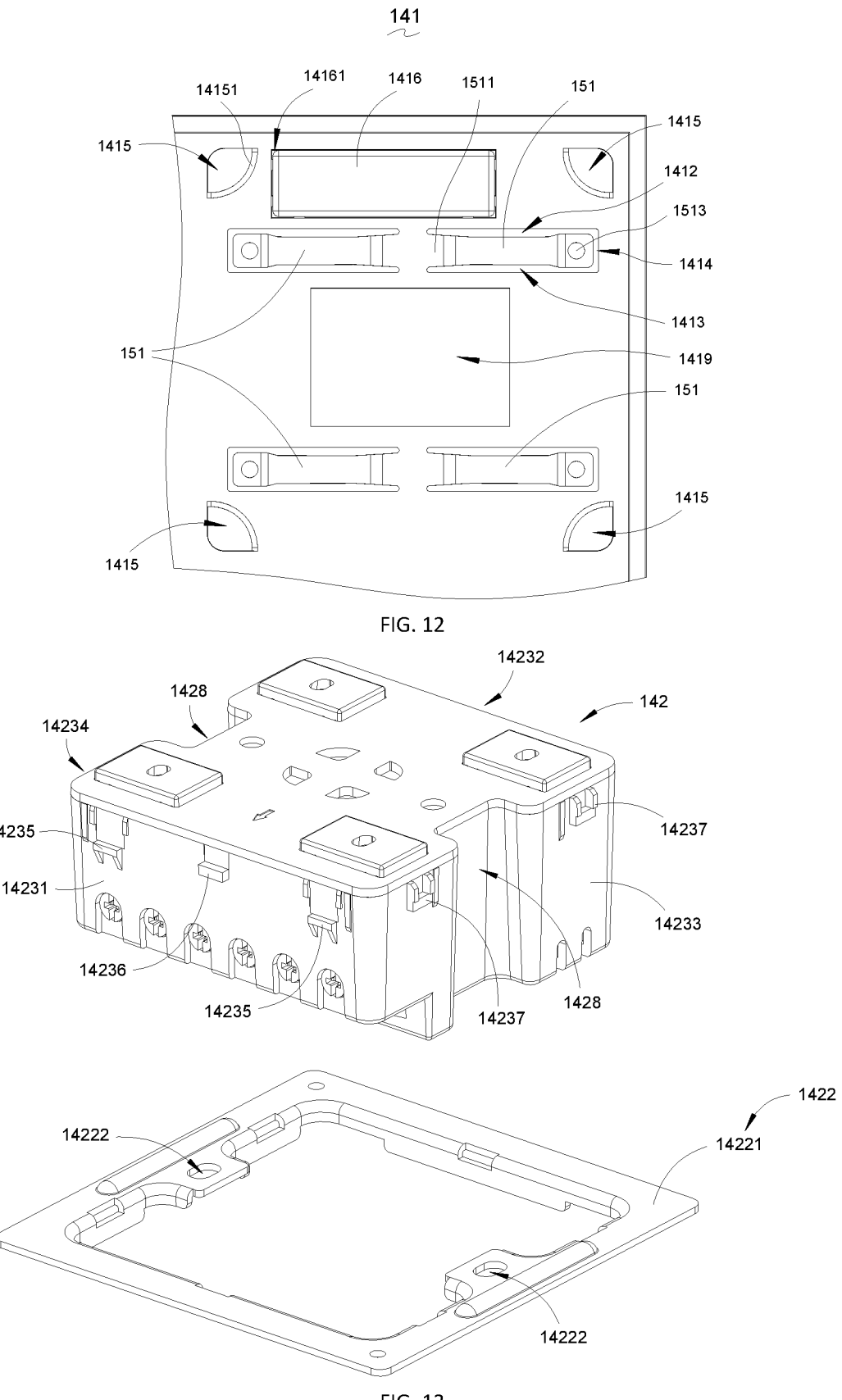
FIG. 12 is an enlarged partial view of an upper housing according to an embodiment of the present invention.
FIG. 13 is a schematic view showing the arrangement of a magnetic attraction member according to an embodiment of the present invention.

7, the resilient limiting member 151 is an elongated sheet-like structure, the thickness of which is less than the thickness of the housing 14, and the width of two ends thereof is wider than the width of the middle part as shown in FIGS. 12 and 8. The resilient limiting member 151 is elastically deformed in response to the pressure of the key 11. The resilient deformation of the resilient limiting member 151 is restored when the pressure is removed. The housing 14 needs to have a certain rigidity, and the resilient limiting member 151 needs to have a certain flexibility. Since the resilient limiting member 151 extends out from the housing 14, the thickness of the resilient limiting member 151 is made thin, so that the resilient limiting member 151 has a certain flexibility while ensuring the rigidity of the housing 14. It can be understood that the width of the two ends is wider than the width of the middle part. In the second direction, the width of the connecting portion 1197 between the resilient limiting member 151 and the housing 14 and the width of the end portion are widened. Since the cantilever beam structure of the resilient limiting member 151 is prone to breakage at the connecting portion 1197 between the resilient limiting member 151 and the housing 14, the width of the two ends of the resilient limiting member 151 controlled to be wider than the width of the middle part enables the strength of the connecting portion 1197 between the resilient limiting member 151 and the housing 14 to be enhanced so as to prevent breakage due to excessive stress. At the same time, narrowing the width of the middle part can ensure the flexibility of the resilient limiting member 151. Meanwhile, the end portion of the resilient limiting member 151 is widened so that the first positioning hole 1513 is enlarged, thereby thickening the diameter of the key positioning pin 111 to prevent the key positioning pin 111 from being broken.

Furthermore, as shown in FIGS. 7 and 8, the resilient limiting member 151 is arranged to extend obliquely in a direction facing towards the key 11. A face of the key 11 towards the housing 14 is provided as a first surface. The included angle between the extending direction of the resilient limiting member 151 and the first surface of the key 11 is less than or equal to 40°. Herein, the first surface is the lower surface of the key 11 in FIG. 7. The resilient limiting member 151 extends obliquely in the direction towards the key 11, so that the key 11 can be lifted upwards by a certain height, and the key 11 has a certain space for moving downwards, so as to ensure that the key 11 successfully triggers the detection member 12. At the same time, since the resilient limiting member 151 abuts against the reinforcement seat 116 of the key positioning pin 111, the height of the resilient limiting member 151 tilted upwards combined with the height of the reinforcement seat 116 is the height of the key 11 being lifted. Therefore, the resilient limiting member 151 being tilted upwards can prevent the reinforcement seat 116 from being too high and skewed, thus affecting the positioning accuracy. The included angle between the extending direction of the resilient limiting member 151 and the first surface of the key 11 can be understood as the included angle between the extending direction of the resilient limiting member 151 and the upper surface of the housing 14 in FIG. 7. The included angle is less than or equal to 40°, so as to prevent the resilient limiting member 151 from being difficult to bend and deform due to an excessive included angle or breaking during bending. In a specific embodiment, the included angle is equal to 7.9°.

In a preferred embodiment, an intermediate portion of the resilient limiting member 151 is bent in a radian (not shown in the drawing) with the center of the arc facing towards a side away from the key 11. Since the key 11 moves toward the housing 14 when the key 11 is pressed, the key 11 is bent and deformed towards the housing 14 against the resilient limiting member 151. In the manufacturing process, the middle part of the resilient limiting member 151 is bent by an radian of circle in advance towards the side away from the key 11, so that the middle part of the resilient limiting member 151 is not easily broken when the bending deformation occurs.

Further, as shown in FIGS. 7 and 8, a circular arc transition is adopted at the junction of the resilient limiting member 151 and the housing 14. Since the resilient limiting member 151 is inclined towards the key 11, a part where the resilient limiting member 151 is connected to the housing 14 is a buckling point at which stress concentration is likely to occur. An excessive arc is used here to reduce the stress concentration and prevent the resilient limiting member 151 from being broken.

In another embodiment, the surface of a side of the housing 14 facing towards the key 11 is provided as a second surface. The direction in which the resilient limiting member 151 extends is parallel to the second surface (not shown). The surface of a side of the resilient limiting member 151 facing towards the key 11 is coplanar with the second surface. The second surface is an upper surface of the housing 14. In the present embodiment, the upper surface of the resilient limiting member 151 is parallel to and coplanar with the upper surface of the housing 14, so that the resilient limiting member 151 extends horizontally out from the housing 14. When the resilient limiting member 151 is bent downwards under pressure, a tearing point is not easy to occur, and a connection of the resilient limiting member 151 and the housing 14 is not bent in a vertical direction. A stress concentration phenomenon at this connection is weakened, so that the resilient limiting member 151 is not easy to break. Accordingly, the height of the reinforcement seat 116 of the key positioning pin 111 is matched with the trigger displacement of the detection member 12, so that the reinforcement seat 116 abuts against the resilient limiting member 151 and lifts the key 11 by a height. Therefore, the key 11 has a certain pressing space to successfully trigger the detection member 12.

Furthermore, as shown in FIG. 3, the housing 14 is provided with a relief portion 1411 at a side of the resilient limiting member 151 away from the key 11. The relief portion 1411 is provided with a through hole or a groove with a shape adapted to the resilient limiting member 151. The resilient limiting member 151 is deformed in response to the pressure of the key 11, and at least a part thereof is accommodated in the relief portion 1411. The housing 14 provided with a relief portion 1411 at a side of the resilient limiting member 151 away from the key 11 can be understood that the upper surface of the housing 14 is provided with the relief portion 1411 at a corresponding position of the resilient limiting member 151. The relief portion 1411 provided with a through hole or groove with a shape adapted to the resilient limiting member 151 should be understood that the size of the relief portion 1411 is slightly greater than the size of the resilient limiting member 151, so that the resilient limiting member 151 can be received in the relief portion 1411. In a specific embodiment, as shown in FIG. 12, the resilient limiting member 151 includes a first side surface, a second side surface and a third side surface. The housing 14 is provided with a first strip-shaped through hole 1412 penetrating at a corresponding position of the first side surface, a second strip-shaped through hole 1413 penetrating at a corresponding position of the second side surface and a third strip-shaped through hole 1414 penetrating at a corresponding position of the third side surface. The first strip-shaped through hole 1412 is arranged opposite to the second strip-shaped through hole 1413. The third strip-shaped through hole 1414 is arranged opposite to the fixing end 1511 of the resilient limiting member 151. The first strip-shaped through hole 1412, the second strip-shaped through hole 1413 and the third strip-shaped through hole 1414 communicate with each other so as to divide the resilient limiting members 151 from the housing 14. As shown in FIGS. 7 and 3, the resilient limiting members 151 are tilted towards the key 11, so that the housing 14 forms the relief portion 1411 at the corresponding position of the resilient limiting member 151. The resilient limiting member 151 is integrally formed by injection molding of the housing 14. The first strip-shaped through hole 1412, the second strip-shaped through hole 1413 and the third strip-shaped through hole 1414 are formed by cutting during injection molding of the housing 14. During injection molding of the housing 14, a space is reserved below the resilient limiting member 151, the resilient limiting member 151 is tilted upwards, and the relief portion 1411 is formed below the resilient limiting member 151.

In another embodiment, the key 11 is provided with a first positioning groove (not shown in the figures) towards the resilient limiting member 151. The width and length of the first positioning groove are respectively adapted to the width and length of the resilient limiting member 151. When the key 11 is mounted on the housing 14, the first positioning groove is sleeved on the free end 1512 of the resilient limiting member 151, so that the first positioning groove is positioned by the resilient limiting member 151 to realize the positioning connection between the key 11 and the free end 1512. Specifically, the resilient limiting member 151 has a rectangular long strip structure. The key 11 has a certain thickness. The lower surface of the key 11 is provided with the first positioning groove. The first positioning groove is a rectangular groove with a size slightly greater than the size of the resilient limiting member 151, so that the resilient limiting member 151 fits with the first positioning groove in a clearance manner, thereby enabling the first positioning groove to be completely sleeved into the resilient limiting member 151. The resilient limiting member 151 abuts against the top wall of the first positioning groove. Furthermore, when the first limiting groove is sleeved on the resilient limiting member 151, the gap between the side wall of the resilient limiting member 151 and the side wall of the first limiting groove is less than 0.1 mm, so as to prevent the gap from being too large and resulting in poor positioning accuracy. In another preferred embodiment, the first positioning groove has a stepped shape with a lower end opening dimension being greater than an upper end dimension, so that the first positioning groove is sleeved into the resilient limiting member 151. The upper end of the first positioning groove and the resilient limiting member 151 adopt a transitional fit. When the resilient limiting member 151 abuts against the top wall of the first positioning groove, the gap between the first positioning groove and the resilient limiting member 151 is reduced, so that the positioning accuracy is greatly increased.

Further, as shown in FIGS. 3 and 9, the key 11 is provided with a plurality of key snaps 112 towards the housing 14. The housing 14 is provided with snap-fit positions 1415 adapted to the key snaps 112 at corresponding positions of the key snaps 112. The key snaps 112 are snapped into the snap-fit positions 1415, so that the limit position of the upward movement of the key 11 is limited. The key snap 112 extends integrally from the key 11, or the key snap 112 is fixedly connected to the key 11. The housing 14 provided with a snap-fit position 1415 adapted to the key snap 112 at a corresponding position of the key snap 112 can be understood that the snap-fit position 1415 is located directly below the key snap 112, and the shape of the snap-fit position 1415 is adapted to the end portion of the key snap 112, and is slightly greater than the end portion of the key snap 112, so that the key snap 112 cannot be disengaged after being fastened into the snap-fit position 1415. The plurality of key snaps 11 mean that each key 11 is provided with three, four, six, eight or another number of key snaps 112, each key snap 112 being evenly distributed along the circumference of the key 11. Specifically, when there are three key snaps 112, the keys 11 may be arranged in a triangular shape (not shown in the figure), and the key snaps 112 are arranged at three corner positions of the triangular key 11. When the key snaps 112 are four, the keys 11 may be arranged in a quadrangular shape, and the key snaps 112 are arranged at four corner positions of the quadrangular key 11. When the key snaps 112 are six or eight (not shown), the keys 11 may be arranged in a quadrangular shape. The key snaps 112 are symmetrically distributed on four sides of the keys 11. In the present embodiment, a face of the key 11 towards the housing 14 is rectangular. Four of the key snaps are arranged at four corners of the rectangular and extend from the key 11 towards the housing 14. The key snaps 112 are arranged at four corners of the key 11, so that the key snaps 112 symmetrically limit the key 11 at the four corners of the key 11, and can be adapted to the combined movement of the displacement and rotation of the key 11, facilitating the key 11 to tilt towards multiple direction. When a corner part of the key 11 is subjected to an operation and control force, the part generates the displacement downwards. The key snaps 112 with an opposite angular distribution to the part bear the function of a fulcrum, preventing the key 11 from lifting upwards, and facilitating the key 11 to trigger the detection member 12. However, the symmetrical limit provided by the key snap 112 can enable the reset acting force to be similar when the key 11 is tilted in various directions. At the same time, the key snaps 112 are located at the four corners of the keys 11, so that the spacing between the key snaps 112 is greater. Due to machining errors, there is an error in the height of each key snap 112, and there is an error in the height of the snap-fit positions 1415, resulting in that the upper surface of the keys 11 is not horizontal. Increasing the distance between each key snap 112 can reduce the influence of the height error on the horizontal degree of the upper surface of the keys 11.

Furthermore, as shown in FIGS. 9 and 10, an end portion of the key snap 112 is provided with a hook portion 1121. The key snap 112 is hooked on the lower edge of the snap-fit position 1415 via the hook portion 1121 so as to limit the limit position of the upward movement of the key 11. The hook portion 1121 is oriented in a direction from the four corners of the key 11 towards the center of the key 11. The hook portion 1121 can be understood as a hook-shaped structure extending laterally from an end portion of the key snap 112. When the key snap 112 is snapped into the snap-fit position 1415, the hook-shaped structure of the hook portion 1121 snaps the lower edge of the snap-fit position 1415, so that the key snap 112 cannot move upwards out of the snap-fit position 1415. When the corner of the key 11 is pressed, the key snap 112 located on the opposite corner of the pressing part assumes the role of a fulcrum and inclines towards the outside of the key 11. The hook portion 1121 towards the inside of the key 11 can prevent the key snap 112 from interfering with the housing 14, thereby affecting the pressing feel. Further, the orientation of the hook portion 1121 is inclined with respect to the side of the key 11, so that the four key snaps 112 cooperate with each other to restrict the horizontal displacement and rotation of the key 11 so as to have a positioning effect on the key 11. Since the positioning accuracy of the key snap 112 is relatively low, if only relying on the positioning function of the key snap 112 and not using the resilient limiting member 151 for limitation, a small distance displacement can occur on the keys 11 in the horizontal direction, resulting in different gaps between the keys 11. It is necessary to reduce the matching gap between the key snap 112 and the housing 14 to improve the positioning accuracy of the key snap 112, thereby causing the friction between the key snap 112 and the housing 14 to become larger and the pressing resistance to increase. In the present invention, the key snap 112 is used in combination with the resilient limiting member 151. The key snap 112 is pre-positioned so that the key positioning pin 111 is aligned with the first positioning hole 1513 of the resilient limiting member 151, so as to facilitate the key positioning pin 111 being fitted into the first positioning hole 1513. The resilient limiting member 151 is used as the main positioning, which not only improves the positioning accuracy of the keys 11 and making the gaps between the keys 11 consistent, but also avoids the mutual friction between the key snap 112 and the housing 14, resulting in an increased pressing resistance of the keys 11 and an unsmooth feeling of pressing.

Furthermore, as shown in FIG. 10, a face of the key 11 towards the housing 14 is provided as a first surface. The projection of the key snap 112 on the first surface is a first circular arc shape, with the center of the circle of the first circular arc shape pointing to the direction of the key snap 112 towards the center of the key 11. Accordingly, the projection of the hook portion 1121 on the first surface is a second circular arc shape, with the center of the circle of the second circular arc shape being at the same position as the center of the first circular arc shape. The use of a circular arc snap further prevents the key 11 from disengaging the housing 14 and provides a symmetrical stop for the key 11 to accommodate pressing in all directions of the key 11. Accordingly, the projection of the snap-fit position 1415 of the housing 14 on the upper surface of the housing 14 is fan-shaped. The arc edge of the fan-shape matches the arc shape of the key snap 112. As shown in FIG. 3, the snap-fit position 1415 is a through hole. A first guide slope 14151 is provided at the arc of the fan-shape at the side facing towards the key 11, so as to facilitate the key snap 112 to snap into the snap-fit position 1415.

Figure 11:
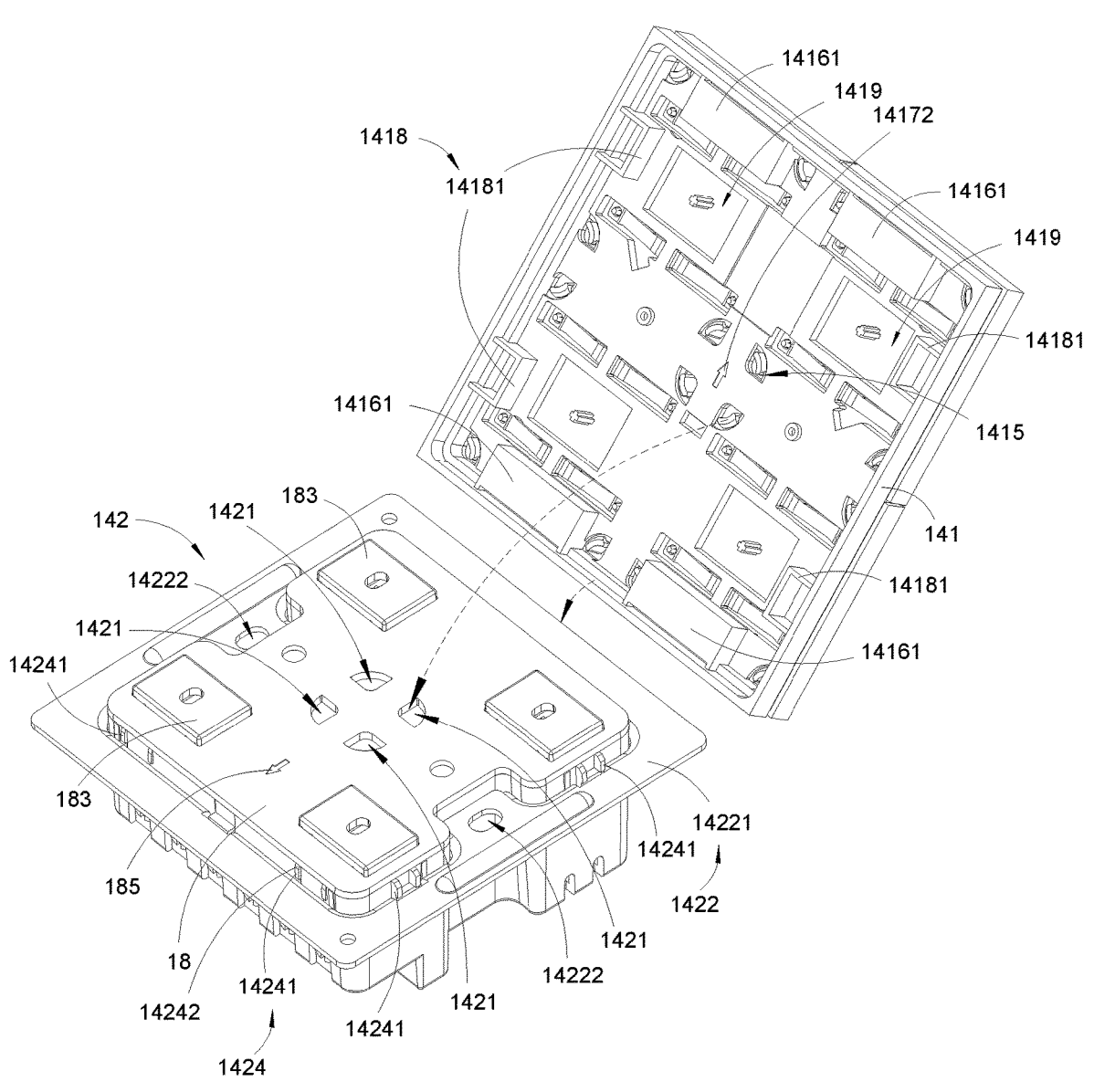
FIG. 11 is a schematic view showing the arrangement of an upper housing and a lower housing according to an embodiment of the present invention.

Further, as shown in FIG. 11, the housing 14 is provided with a snap movable space 1421 at a corresponding position of the snap-fit position 1415. The movable space is configured as a groove with a shape adapted to the snap-fit position 1415 so as to prevent the key snap 112 from interfering with the housing 14 when moving. Specifically, the housing 14 includes an upper housing 141 and a lower housing 142. The key 11 is arranged on the upper housing 141. Accordingly, the upper housing 141 is penetratingly arranged on the snap-fit position 1415. The lower housing 142 is provided with a groove with a shape matching the key snap 112 below the snap-fit position 1415 so as to form the snap movable space 1421.

Furthermore, as shown in FIGS. 3, 6 and 9, the key 11 is provided with an abutting portion 113 at a corresponding position of the detection member 12. When the key 11 generates the displacement in response to the operation and control force, the abutting portion 113 directly or indirectly abuts against and triggers the detection member 12. The abutting portion 113 directly or indirectly abutting against and triggering the detection member 12 can be understood that the abutting portion 113 is placed above the detection member 12 and can directly abut against the detection member 12. Alternatively, a waterproof silicone sleeve is provided between the abutting portion 113 and the detection member 12. The detection member 12 is indirectly triggered by abutting the waterproof silicone sleeve. Alternatively, a buffer member is provided between the abutting portion 113 and the detection member 12. The abutting portion 113 triggers the detection member 12 by buffer member detection. The buffer member serves to prevent the detection member 12 from being damaged by excessive pressing force of the key 11. Specifically, the detection member 12 is arranged below the center position of the key 11. The abutting portion 113 is integrally formed and extends downward towards the housing 14 at the center of the key 11. Further, in the third direction, the length of the key snap 112 is adapted to the length of the abutting portion 113, so that when the displacement of the key 11 is not generated, the gap between the abutting portion 113 and the detection member 12 is less than or equal to 1.5 mm. The third direction is the direction in which the key 11 points towards the housing 14. When the key 11 is not pressed, the key snap 112 hooks the snap-fit position 1415 so as to limit the upward movement of the key 11 and prevent the key 11 from departing from the housing 14, and the gap between the abutting portion 113 and the detection member 12 is less than or equal to 1.5 mm. Namely, the idle stroke of the key 11 pressing downward is less than or equal to 1.5 mm, so as to improve the pressing hand of the key 11. In the present embodiment, the gap between the abutting portion 113 and the detection member 12 is set to 0.1 mm. The purpose of the provision of a clearance between the abutting portion 113 and the detection member 12 is to prevent assembly errors from causing the detection member 12 to be pre-stressed and even to cause false triggering. Further, the key 11 generates the displacement at a limit value greater than or equal to 1.2 mm, the key 11 at least partially abutting against the housing 14 when the displacement reaches the limit value. In the present embodiment, an edge of the key 11 extends out of a key 11 enclosure portion towards the housing 14. The key 11 enclosure portions enclose each other to block a part of the housing 14. In the third direction, a distance between the enclosure portion of the key 11 and the housing 14 is greater than or equal to 1.2 mm, so that the limit value of the displacement of the key 11 is greater than or equal to 1.2 mm. The enclosure portion of the key 11 surrounds a part of the housing 14, so that the aesthetics of the key 11 can be improved. In the present embodiment, the gap between the enclosure portion of the key 11 and the housing 14 is controlled so that the limit stroke of the pressing of the key 11 is 1.6 mm. If the edge position of the key 11 is pressed, pressing the edge of the key 11 by 1.6 mm can make the abutting portion 113 press down by 0.8 mm according to the principle of lever. The detection member 12 adopts a microswitch. The theoretical trigger stroke is 0.3 mm. The detection member 12 can be triggered by pressing the abutting portion 113 by 0.4 mm in theory. In actual production, the accumulated tolerance of assembly and the deformation of the key 11 may increase the reserved 0.1 mm gap. Therefore, in theoretical design, the depression stroke of the abutting portion 113 at the edge of the pressing key 11 is designed to be 0.8 mm. There is an excessive depression stroke of 0.4 mm, which can ensure that the detection member 12 can still be triggered successfully when the edge position of the pressing key 11 is pressed.

Further, as shown in FIGS. 9 and 10, the abutting portion 113 is a cylinder extending from the key 11 towards the detection member 12, and a cross section perpendicular to the extending direction thereof is a first cross section. The shape of the first cross section is arranged to be composed of two rectangular shapes crossed with each other and perpendicular to each other. The first shape can be understood as a shape resembling a "cross", the function of which is to prevent the local thickness of the abutting portion 113 from causing shrinkage during injection molding, so that the detection member 12 cannot be triggered.

Figures 30, 31:
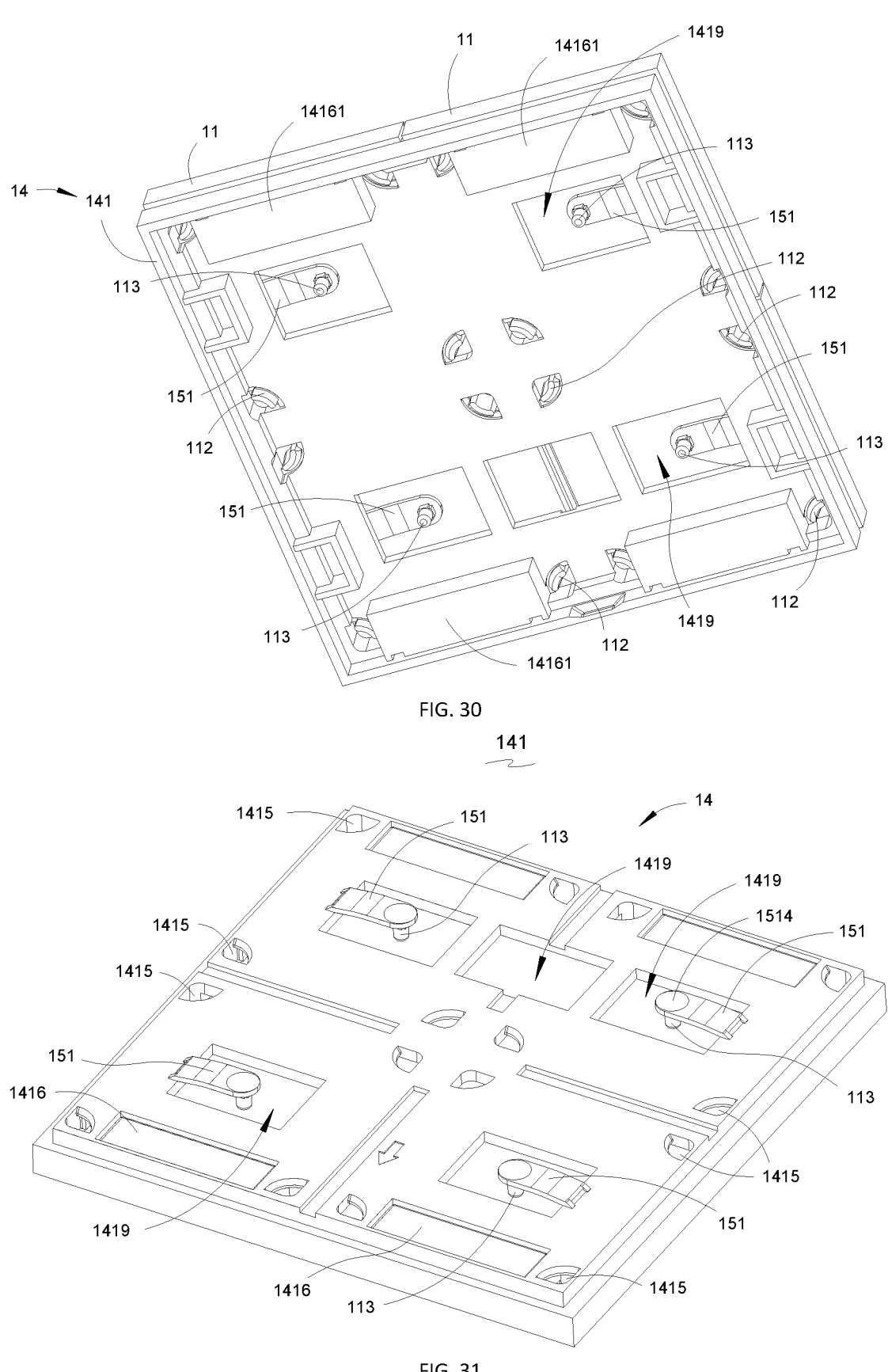
FIG. 30 is a structural diagram of a reset portion according to an embodiment of the present invention.
FIG. 31 is a structural diagram of an upper housing according to an embodiment of the present invention.
Figures 32, 33:
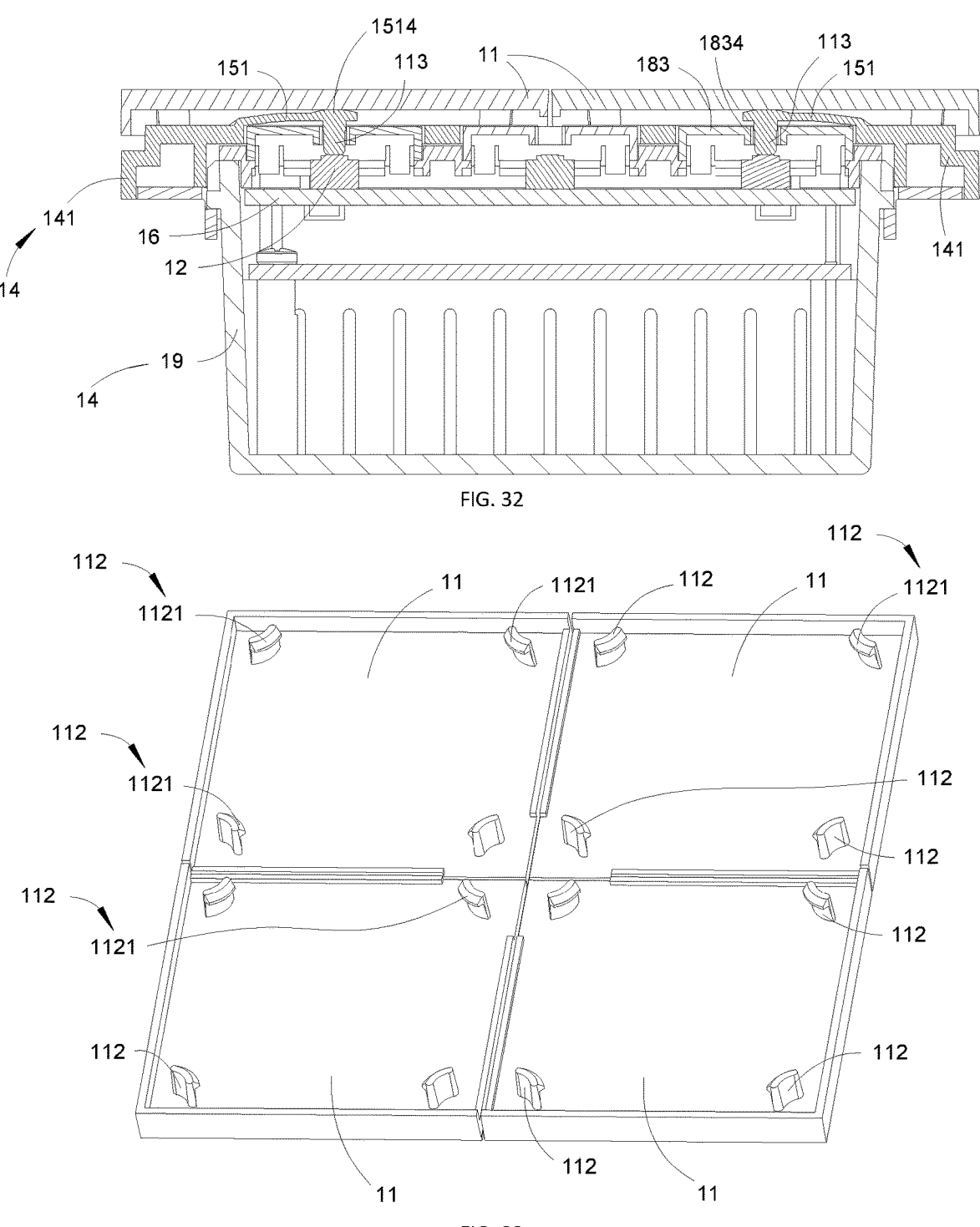
FIG. 32 is a cross-sectional view of an embodiment of the present invention.
FIG. 33 is a structural diagram of a key according to an embodiment of the present invention.

In another embodiment, as shown in FIGS. 30, 31 and 32, the free end 1512 of the resilient limiting member 151 extends out of the abutting portion 113 towards the detection member 12. When the key 11 generates the displacement in response to the operation and control force, the key 11 presses the resilient limiting member 151 to generate the deformation, and the resilient limiting member 151 drives the abutting portion 113 to trigger the detection member 12. In the present embodiment, there is one resilient limiting member 151 corresponding to each key 11. The resilient limiting member 151 is of a cantilever beam structure and tilts up towards one side of the key 11. The end portion of the resilient limiting member 151 extends and is provided with the abutting portion 113. As shown in FIGS. 31 and 32, the resilient limiting member 151 is provided with a bearing portion 1514 protruding towards the key 11 at a corresponding position of the abutting portion 113. The bearing portion 1514 is provided as a circular arc shape protrusion for abutting against the key 11 and driving the resilient limiting member 151 to generate the deformation. When the key 11 generates the displacement in response to the operation and control force, the lower surface of the key 11 presses against and brings the abutting portion 113 to trigger the detection member 12. The advantageous effect of the present embodiment is that the abutting portion 113, the resilient limiting member 151 and the housing 14 are integrally formed, so as to ensure the relative positional accuracy between the abutting portion 113 and the housing 14. Since the detection member 12 is mounted on the housing 14, the positional accuracy between the abutting portion 113 and the detection member 12 is guaranteed. Compared with the housing where the abutting portion 113 is arranged on the key 11, the present embodiment provides the abutting portion 113 on the resilient limiting member 151, shortens the error size chain between the abutting portion 113 and the detection member 12, and more easily ensures the positioning accuracy between the abutting portion 113 and the detection member 12, thereby reducing the manufacturing accuracy requirement. Furthermore, no positioning relationship is required between the key 11 and the detection member 12. The requirement for the positioning accuracy of the key 11 is reduced. No positioning structure is required between the key 11 and the resilient limiting member 151, thereby reducing the manufacturing cost of the key 11 and the resilient limiting member 151.

Meanwhile, since the accuracy of the relative position between the abutting portion 113 and the detection member 12 is controlled to be high in the above-described structure, and the reset acting force is provided by using a single resilient limiting member 151, the reset acting force is easily controlled and can be calculated. Since the resilient limiting member 151 is a cantilever beam structure, the calculation of the reset acting force is highly reliable. The applicant controls the reset acting force to cooperate with the elastic force of the detection member 12 through calculation and simulation by changing the tilting angle, thickness, width and length of the resilient limiting member 151. Therefore, when the key 11 moves to the first pressing position, the reaction force is F1. When the key 11 moves from the first pressing position to the second pressing position, the reaction force jumps from F1 to F2, where F2<F1<400 g. The displacement S1 of the key 11 at the first pressing position and the displacement S2 of the key 11 at the second pressing position satisfy the relationship: S2-S1≤2 mm.

Furthermore, the upper housing 141 is provided with a light uniforming shade light-transmitting through hole 1419 at a corresponding position of the detection member 12. The abutting portion 113 can abut against the detection member 12 after passing through the light uniforming shade light-transmitting through hole 1419. Here, the light uniforming shade light-transmitting through hole 1419 is also used for the light uniforming shade 183 to pass through. Technical details regarding the light uniforming shade 183 and the light uniforming shade light-transmitting through hole 1419 are described in detail below.

In the present embodiment, there is no positioning structure between the key 11 and the resilient limiting member 151, and the key 11 is positioned by the housing 14. Specifically, as shown in FIGS. 30 and 33, the key 11 is provided with four key snaps 112 facing towards the housing 14. An end portion of the key snap 112 is provided with a hook portion 1121. The housing 14 is provided with a snap-fit position 1415 adapted to the key snaps 112 at a corresponding position of the key snaps 112. When the key snaps 112 snap into the snap-fit positions 1415, the key snaps 112 hook the edge of the snap-fit positions 1415 via the hook portion 1121 so as to limit the limit position of the key 11 moving upwards. The arrangement directions of the hook portions 1121 of any two adjacent key snaps 112 are perpendicular to each other. The arrangement directions of the hook portions 1121 of any two adjacent key snaps 112 being perpendicular to each other can be understood that the arrangement directions of the corresponding hook portions 1121 of four key snaps 112 are opposite to each other. The arrangement directions of the corresponding hook portions 1121 of two adjacent key snaps 112 are perpendicular to each other. Specifically, the upper surface of the key 11 is square. Four key snaps 112 are arranged at four corners of the key 11. The hook portions 1121 corresponding to the four key snaps 112 are arranged from the four corners of the key 11 towards the center of the key 11. Thus, the four key snaps 112 restrict and cooperate with each other in the horizontal direction to restrict the horizontal displacement and rotation of the key 11, so that the housing 14 positions the key 11.

In another embodiment, as shown in FIGS. 34-37, the reset portion 15 is provided as at least one resilient reset member 152 arranged between the key 11 and the housing 14 and capable of being elastically deformed in response to the displacement of the key 11 and generating the reset acting force against the resilient deformation. Among other things, the resilient reset member 152 may be understood to be a resilient component including, but not limited to, a spring, a torsion spring, an elastic sheet, resilient foam, silicone, etc. The resilient reset member 152 is arranged between the key 11 and the housing 14. It can be understood that the resilient reset member 152 is mounted on the key 11 or the housing 14 and is clamped between the key 11 and the housing 14. The resilient reset member 152 simultaneously abuts against the lower surface of the key 11 and the upper surface of the housing 14. The resilient deformation occurs when the key 11 presses against the resilient reset member 152. The resilient reset member 152 generates a reset acting force against the resilient deformation for supporting the key 11 to restore the initial position.

Figures 34, 35:
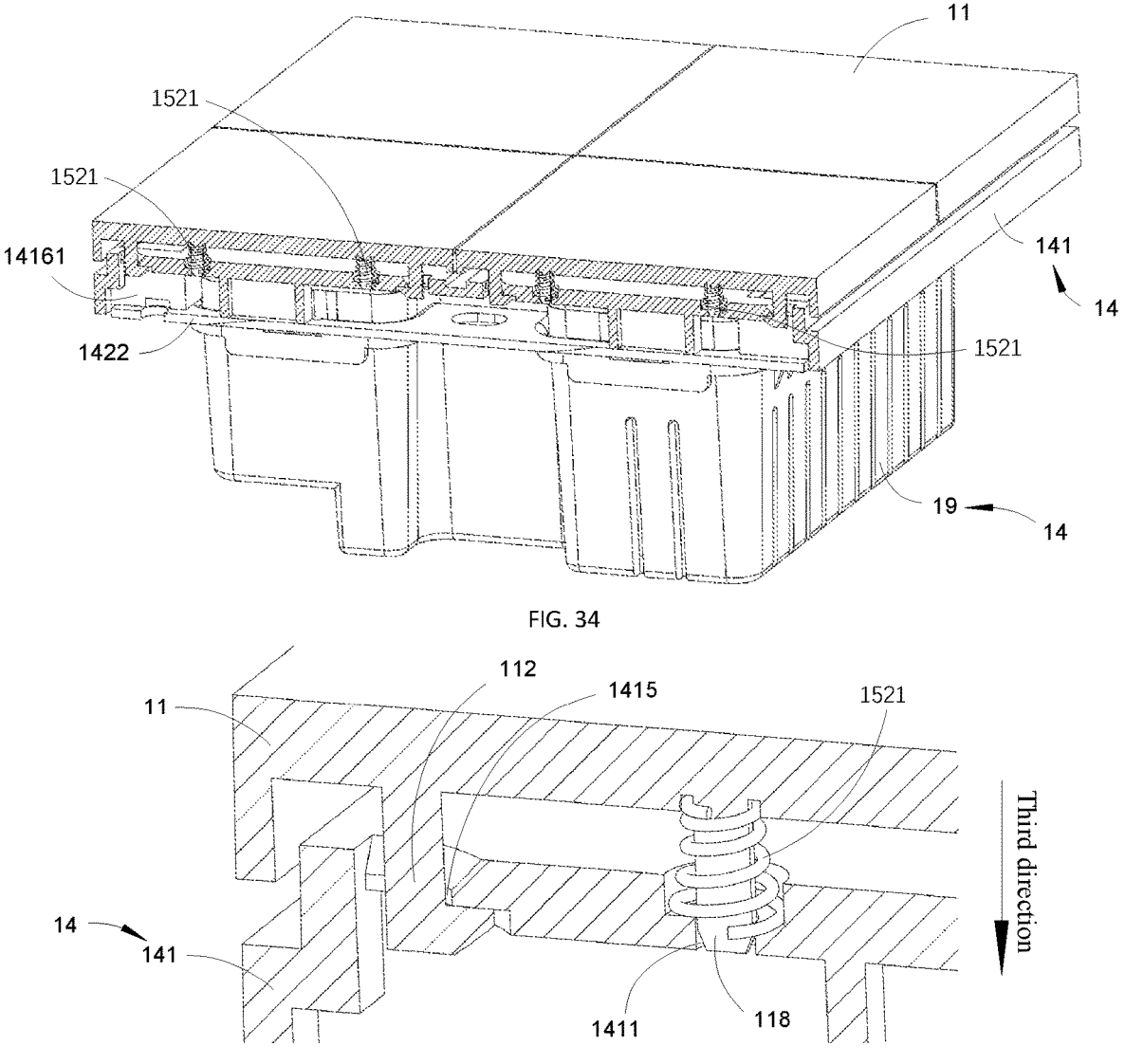
FIG. 34 is a structural diagram of an embodiment of the present invention.
FIG. 35 is an enlarged partial view of an embodiment of the present invention.
Figure 36:
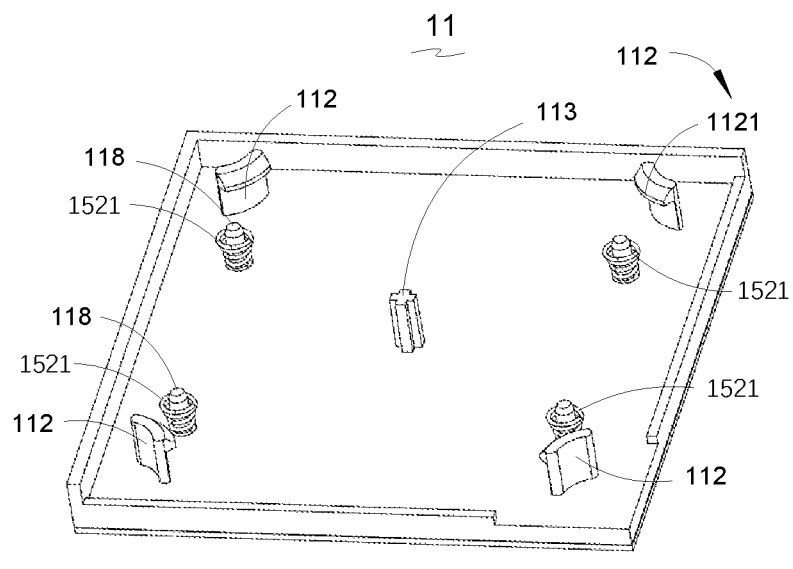
FIG. 36 is a structural diagram of a key according to an embodiment of the present invention.

Further, as shown in FIGS. 35 and 36, the resilient reset member 152 is a spring 1521. The key 11 extends a spring limiting portion 118 towards the housing 14 at a position opposite to the spring 1521. The spring 1521 is sleeved on the spring limiting portion 118, so that the spring 1521 is limited in a horizontal direction. The spring limiting portion 118 can be understood as a cylinder extending downwards of the key 11, with the size thereof being slightly smaller than the inner diameter of the spring 1521, so that the spring 1521 is sleeved on the spring limiting portion 118 and is limited.

Furthermore, as shown in FIG. 36, a face of the key 11 towards the housing 14 is rectangular. Four of the spring limiting portions 118 are distributed at four corners of the rectangular. Accordingly, four of the springs 1521 are respectively sleeved on the four spring limiting portions 118. The spring limiting portions 118 are distributed at the four corners of the rectangle and can support the key 11 in a balanced manner for adapting to the combined movement of displacement and rotation of the key 11. The key 11 can be inclined towards multiple directions, while the symmetrical reset acting force provided by the resilient reset member 152 can make the reset acting force received by the key 11 close when the key 11 is inclined towards any direction by an operation and control force.

At the same time, since the elastic force provided by the spring 1521 is proportional to the compression amount, and the symmetrical reset acting force provided by the four springs 1521 enables the reset acting force to be easily controlled and can be calculated, the applicant controls the elastic force of the spring 1521 by testing the elastic coefficient of various types of springs 1521. After calculation and simulation, the reset acting force is controlled to cooperate with the elastic force of the detection member 12. Therefore, when the key 11 moves to the first pressing position, the reaction force is F1. When the key 11 moves from the first pressing position to the second pressing position, the reaction force jumps from F1 to F2, where F2<F1<400 g. The displacement S1 of the key 11 at the first pressing position and the displacement S2 of the key 11 at the second pressing position satisfy the relationship: S2-S1≤2 mm.

Figure 37:
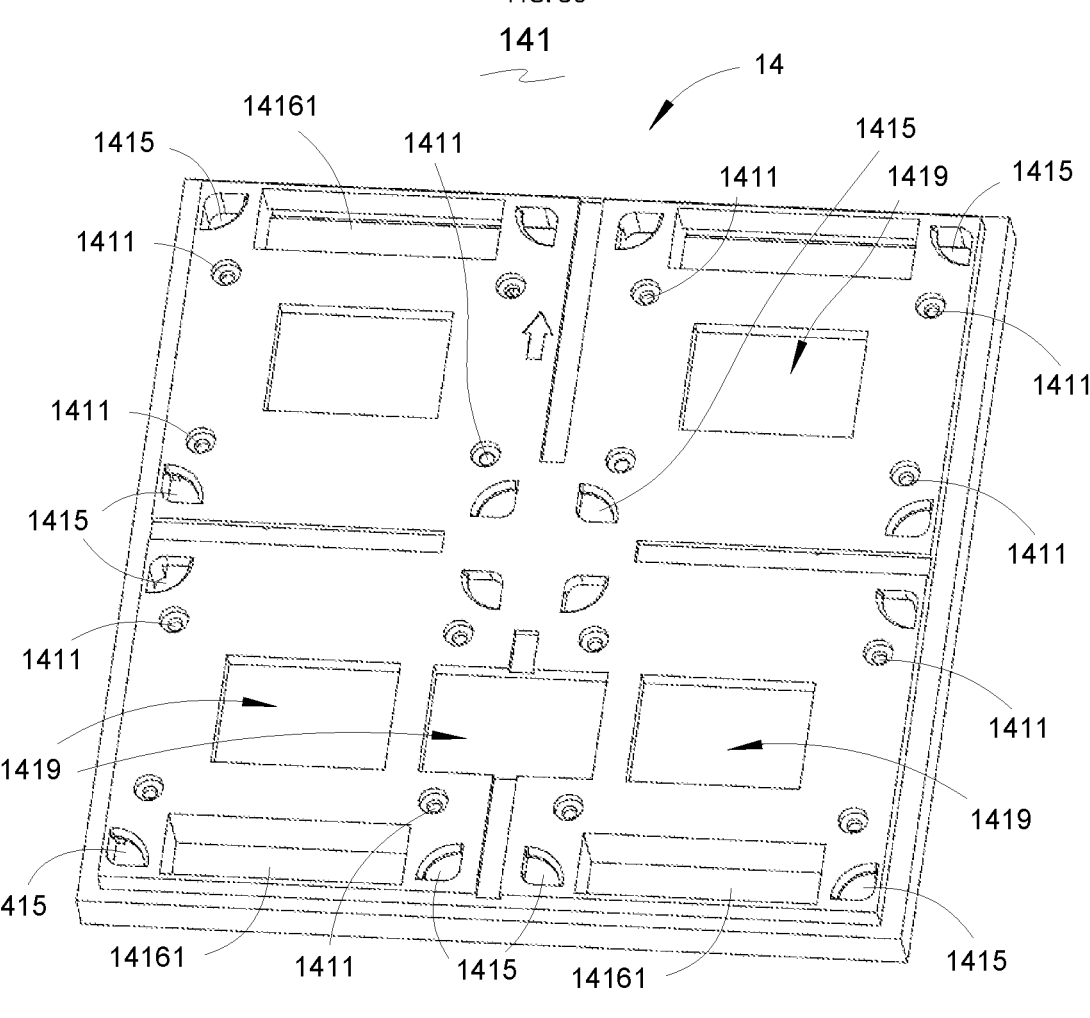
FIG. 37 is a structural diagram of an upper housing according to an embodiment of the present invention.

Furthermore, as shown in FIGS. 35 and 37, the housing 14 is provided with a relief space 143 at a corresponding position of the spring limiting portion 118. When the key 11 generates the displacement in response to the operation and control force, the key 11 drives the spring limiting portion 118 to move. The keep-space position 143 is provided with a relief space at a corresponding position of the spring limiting portion 118, so as to prevent the spring limiting portion 118 from interfering with the housing 14. The keep-space position 143 can be understood to be a through hole provided on the housing 14 and having a shape adapted to the spring limiting portion 118. The spring limiting portion 118 is inserted into the keep-space position 143 and can move in the keep-space position 143. Specifically, the spring limiting portion 118 is a cylinder. The keep-space position 143 is a cylindrical through hole. A certain gap is provided between the inner wall of the keep-space position 143 and the side wall of the spring limiting portion 118 for preventing the keep-space position 143 from interfering with the spring limiting portion 118 when the key 11 is pressed obliquely. However, the gap between the keep-space position 143 and the spring limiting portion 118 should not be too large, because the keep-space position 143 has a positioning function on the spring limiting portion 118. The key 11 is positioned by the keep-space position 143, so that the gap between the key 11 is uniform. In a specific embodiment, the gap between the inner wall of the keep-space position 143 and the side wall of the spring limiting portion 118 is set to 0.2 mm.

Further, as shown in FIGS. 35 and 36, an end of the spring limiting portion 118 facing towards the key 11 is in interference fit with the spring 1521, and an end of the spring limiting portion 118 away from the key 11 is in clearance fit with the spring 1521. The interference fit between one end of the spring limiting portion 118 facing towards the key 11 and the spring 1521 can enable the spring 1521 to be sleeved on the spring limiting portion 118, and then one end of the spring 1521 facing towards the key 11 is clamped at the root portion of the spring limiting portion 118, so as to prevent the spring 1521 from falling off during assembly. Thus, the key 11 is conveniently mounted on the housing 14. In addition, the clearance fit between an end portion of the spring limiting portion 118 away from the key 11 and the spring 1521 can ensure that the spring 1521 does not interfere with the spring limiting portion 118 when compressed, and ensure the smooth degree of compression and recovery of the spring 1521. In a specific embodiment, as shown in FIG. 35, the spring limiting portion 118 is cylindrical. The spring 1521 is truncated cone-shaped with an upper end diameter being less than a lower end diameter, the upper end thereof arranged towards one end of the key 11, and the lower end thereof arranged away from one end of the key 11. The diameter of the upper end of the spring 1521 is less than the axial diameter of the spring limiting portion 118, so that the upper end of the spring 1521 is in interference fit with the spring limiting portion 118. The diameter of the lower end of the spring 1521 is greater than the axial diameter of the spring limiting portion 118, so that the lower end of the spring 1521 is in clearance fit with the spring limiting portion 118.

In another specific embodiment, the spring 1521 has a cylindrical shape (not shown in the figure). The spring limiting portion 118 has a truncated cone shape with an upper end diameter being greater than a lower end diameter, an upper end thereof being arranged towards one end of the key 11, and a lower end thereof being arranged away from one end of the key 11. The diameter of the upper end of the spring limiting portion 118 is greater than the axial diameter of the spring limiting portion 118, so that the upper end of the spring limiting portion 118 is in interference fit with the spring 1521. The diameter of the lower end of the spring limiting portion 118 is less than the axial diameter of the spring 1521, so that the lower end of the spring limiting portion 118 is in clearance fit with the spring 1521.

Furthermore, as shown in FIGS. 37 and 35, the key 11 is provided with four key snaps 112 towards the housing 14. An end portion of the key snap 112 is provided with a hook portion 1121. The housing 14 is provided with a snap-fit position 1415 adapted to the key snaps 112 at a corresponding position of the key snaps 112. When the key snaps 112 snap into the snap-fit positions 1415, the key snaps 112 hook the edge of the snap-fit position 1415 via the hook portion 1121 so as to limit the limit position of the key 11 moving upwards. The arrangement directions of the hook portions 1121 of any two adjacent key snaps 112 are perpendicular to each other. The arrangement directions of the hook portions 1121 of any two adjacent key snaps 112 being perpendicular to each other can be understood that the arrangement directions of the corresponding hook portions 1121 of four key snaps 112 are opposite to each other. The arrangement directions of the corresponding hook portions 1121 of two adjacent key snaps 112 are perpendicular to each other. Specifically, the upper surface of the key 11 is square. Four key snaps 112 are arranged at four corners of the key 11. The hook portions 1121 corresponding to the four key snaps 112 are arranged from the four corners of the key 11 towards the center of the key 11. Thus, the four key snap 112 restrict and cooperate with each other in the horizontal direction to restrict the horizontal displacement and rotation of the key 11, so that the key 11 is positioned by the key snap 112. Although the keep-space position 143 on the housing 14 has a positioning effect on the key 11, since there is a large gap between the keep-space position 143 and the side wall of the spring limiting portion 118 and the positioning accuracy is not high, two positioning are superimposed by being matched with the positioning effect of the key snap 112 on the key 11, so as to improve the positioning accuracy of the housing 14 on the key 11.

Further, as shown in FIG. 34, the length of the spring 1521 matches the length of the key snap 112 such that the spring 1521 is in compression when the key 11 does not generate the displacement. The length of the spring 1521 matching with the length of the key snap 112 can be understood that the spring 1521 is clamped between the key 11 and the housing 14, and the length of the key snap 112 determines the distance between the key 11 and the housing 14. The length of the key snap 112 is controlled so that the distance between the key 11 and the housing 14 is less than the length of the spring 1521 in a natural state. Therefore, the spring 1521 is arranged between the key 11 and the housing 14 in a compressed state. The advantageous effect is that the spring 1521 has a pre-tightening force on the keys 11, so that the keys 11 are still supported by the spring 1521 when the keys 11 are not pressed, ensuring that the keys 11 are in the upper limit position when the keys 11 are not pressed, improving the flatness of the upper surface of each key 11, and improving the tightening degree of the keys 11, without loose collapse.

Further, as shown in FIG. 36, the key 11 is provided with an abutting portion 113 at a corresponding position of the detection member 12. When the key 11 generates the displacement in response to the operation and control force, the abutting portion 113 directly or indirectly abuts against and triggers the detection member 12. Further, in the third direction, the length of the key snap 112 is adapted to the length of the abutting portion 113, so that when the displacement of the key 11 is not generated, the gap between the abutting portion 113 and the detection member 12 is less than or equal to 1.5 mm. The third direction is a direction in which the key 11 points towards the housing 14, i.e. a direction indicated by the arrow in FIG. 35. The structural features and technical details of the abutting portion 113 have been previously described, and will not be described in detail here.

In another embodiment, as shown in FIGS. 38-41, the key 11 includes a functional cover 1191 and a surface cover 1192. The surface cover 1192 at least partially covers the functional cover 1191 and is fixedly connected to the functional cover 1191. The functional cover 1191 is movably connected to the housing 14 and can directly or indirectly press against and trigger the detection member 12. The surface cover 1192 can be understood as an outer cover of the key 11, which is covered on the outer surface of the functional cover 1191 for contacting with the finger of the user, improving the feel and aesthetics of the key 11. The functional cover 1191 can be understood as an inner cover of the key 11, which is movably connected to the housing 14 for realizing the functions of the key 11, such as the movement of the key 11, and triggering the detection member 12. Further, the surface cover 1192 is different from the functional cover 1191 in material. The surface cover 1192 is made of a material such as metal, glass, AG frosted panel, etc. capable of improving touch sense or beauty. The functional cover 1191 is made of injection molded hard plastic. The fixed connection of the surface cover 1192 and the functional cover 1191 includes the use of adhesive or double-sided adhesive bonding, the use of snap connection, the use of clamp connection with a slideway or other connection means that can be implemented by a person skilled in the art.

In some embodiments, as shown in FIGS. 38-41, the reset portion 15 is provided as a reed 153 including a gripping portion 1531 at a middle portion and deformation portions 1532 at both ends of the gripping portion 1531, the gripping portion 1531 being clamped between the functional cover 1191 and the surface cover 1192, the deformation portion 1532 being bent toward the housing 14. When the displacement of the key 11 occurs, the deformation portion 1532 is elastically deform by being pressed against the housing 14 and and generates the reset acting force against the resilient deformation. The gripping portion 1531 clamped between the functional cover 1191 and the surface cover 1192 can be understood that the surface cover 1192 fits the upper surface of the functional cover 1191 and the gripping portion 1531 is provided between the surface cover 1192 and the functional cover 1191. The deformation portion 1532 bent towards the housing 14 can be understood that the deformation portions 1532 at the both ends of the reed 153 are bent obliquely towards the housing 14, and the functional cover 1191 is provided with a through hole at a position corresponding to the deformation portion 1532, so that the deformation portion 1532 passes through the through hole of the functional cover 1191 and then abuts against the surface of the housing 14. When the deformation portion 1532 is elastically deformed by being pressed against the housing 14, it can be understood that the reed 153 is made of an elastic material. In the present embodiment, the reed 153 is made of a spring 1521 steel, and can be elastically deformed by being pressed and generate a reset acting force.

In the present embodiment, the deformation portion 1532 of the reed 153 provides a reset acting force by pressing and deforming, and the influence factor of the reset acting force is less, so that the reset acting force is easily controlled through structural design. The applicant controls the reset acting force to cooperate with the elastic force of the detection member 12 through calculation and simulation by changing the tilting angle, thickness, width and length of the reed 153, so that when the key 11 moves to the first pressing position, the reaction force is F1; and when the key 11 moves from the first pressing position to the second pressing position, the reaction force jumps from F1 to F2, where $F2 < F1 < 400$ g. The displacement S1 of the key 11 at the first pressing position and the displacement S2 of the key 11 at the second pressing position satisfy the relationship: $S2 - S1 \leq 2$ mm.

Figure 38:
FIG. 38 is a structurally exploded view of a key according to an embodiment of the present invention.
Figure 39:
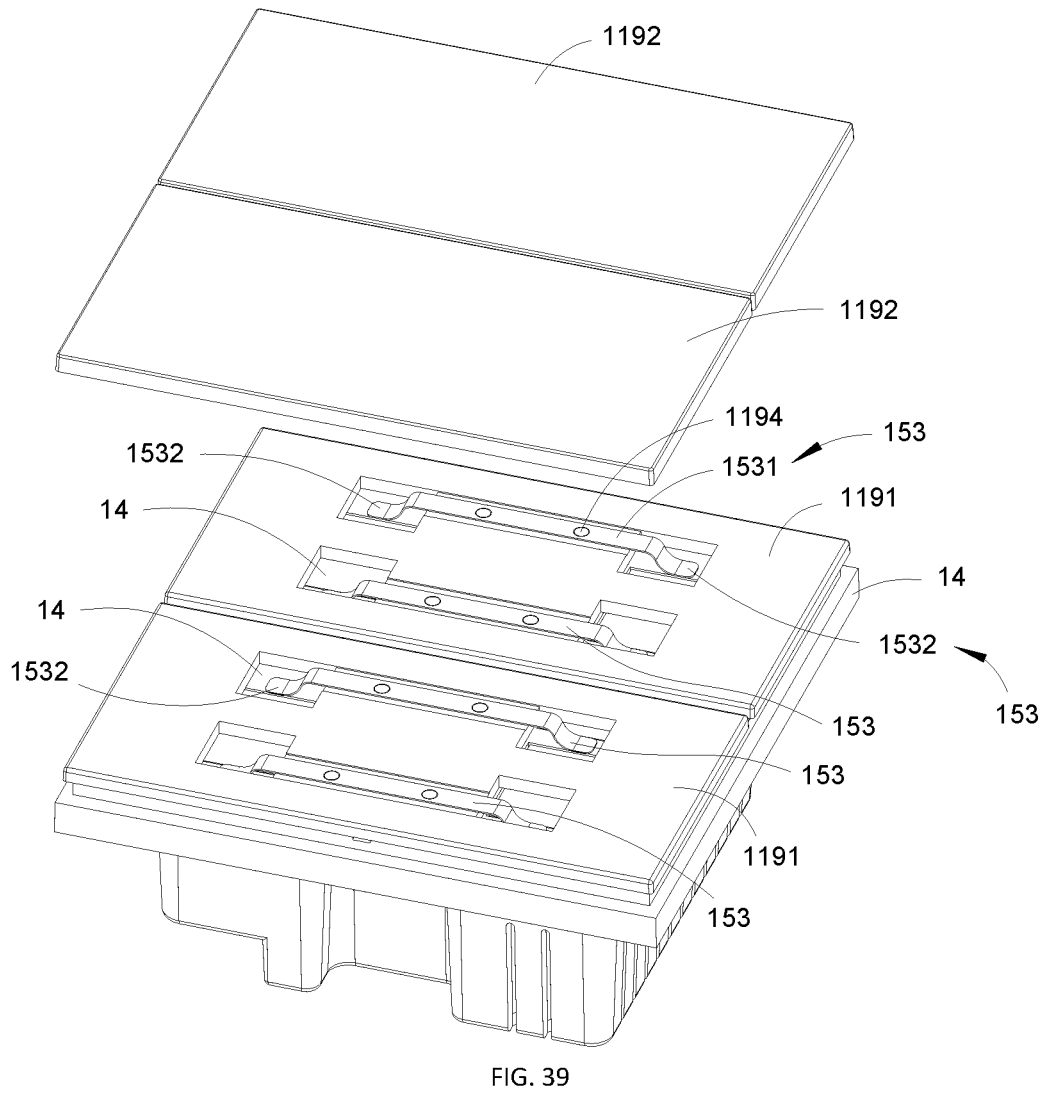
FIG. 39 is a structural diagram of a reset portion according to an embodiment of the present invention.

In a specific embodiment, as shown in FIGS. 38 and 39, the functional cover 1191 is concavely provided with a gripping portion placing groove 1193 towards the gripping portion 1531. The gripping portion placing groove 1193 has a shape capable of accommodating the gripping portion 1531. The depth of the gripping portion placing groove 1193 is greater than or equal to the thickness of the gripping portion 1531, so that when the surface cover 1192 is covered on the functional cover 1191, the surface cover 1192 is attached with the functional cover 1191. The surface cover 1192 being fit the functional cover 1191 can be understood that the surface cover 1192 is not pushed up by the gripping portion 1531 when the surface cover 1192 is covered on the functional cover 1191, and the lower surface of the surface cover 1192 can be fit the upper surface of the functional cover 1191.

Furthermore, as shown in FIGS. 38 and 39, the gripping portion 1531 of the reed 153 is provided with at least one positioning through hole 1533. The functional cover 1191 is provided with a positioning boss 1194 protruding at a corresponding position of the positioning through hole 1533. The size of the positioning boss 1194 is adapted to the positioning through hole 1533, so that the positioning boss 1194 is inserted into the positioning through hole 1533 to position the reed 153. The positioning boss 1194 can be understood as a cylindrical boss with the functional cover 1191 protruding towards the surface cover 1192. The aperture of the positioning through hole 1533 is adapted to the outer diameter of the positioning boss 1194, so that the positioning through hole 1533 is sleeved on the positioning boss 1194. Therefore, the reed 153 is positioned by the key 11 in the horizontal direction. The positioning through hole 1533 and the positioning boss 1194 adopt a transition fit or a small clearance fit, so as to improve the positioning accuracy. When there is only one positioning through hole 1533, only the degree of freedom of horizontal displacement of the reed 153 can be limited by the cooperation of the positioning through hole 1533 and the positioning boss 1194, and the degree of freedom of horizontal rotation of the reed 153 cannot be limited. The width of the gripping portion placing groove 1193 needs to be adapted to the width of the gripping portion 1531, and the degree of freedom of horizontal rotation of the reed 153 is limited by the gripping portion placing groove 1193. Since the reed 153 is sandwiched between the surface cover 1192 and the functional cover 1191, the degree of freedom of displacement and the degree of freedom of rotation in the vertical direction thereof are restricted.

Further, as shown in FIGS. 38 and 39, at least two of the positioning through holes 1533 are spaced apart along a long side of the gripping portion 1531. When there are two or three positioning through holes 1533, the degree of freedom of horizontal displacement and horizontal rotation of the reed 153 can be limited by the cooperation of the two positioning through holes 1533 and the corresponding two positioning bosses 1194. Since the reed 153 is sandwiched between the surface cover 1192 and the functional cover 1191, the degree of freedom of displacement and the degree of freedom of rotation in the vertical direction thereof are restricted, and thus all the degrees of freedom of the reed 153 are restricted by the surface cover 1192 and the functional cover 1191.

Figures 40, 41:
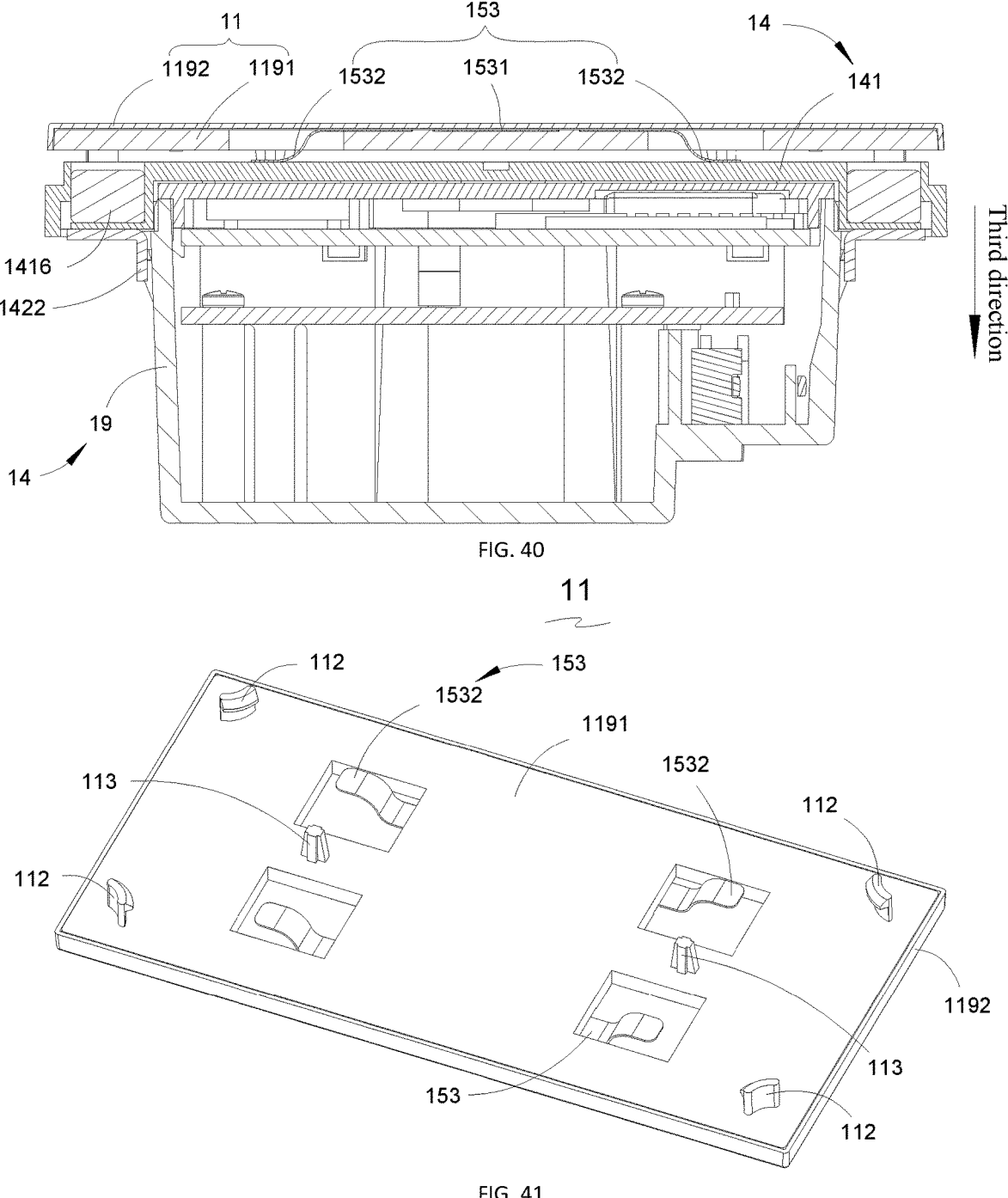
FIG. 40 is a cross-sectional view of an embodiment of the present invention.
FIG. 41 is a structural diagram of a key according to an embodiment of the present invention.

Further, as shown in FIGS. 39 and 40, a terminal of the deformation portion 1532 fits an upper surface of the housing 14, which is a surface of the housing 14 facing towards the key 11. The terminal of the deformation portion 1532 being fit the upper surface of the housing 14 can be understood that the terminal of the deformation portion 1532 is bent towards the horizontal direction, so that the terminal of the deformation portion 1532 is parallel to the upper surface of the housing 14. The beneficial effect is that since the reset acting force provided by the reed 153 is generated by pressing the reed 153 after being deformed, the terminal of the deformation portion 1532 will slide outwards relative to the housing 14 when the reed 153 is deformed. If the deformation portion 1532 is inclined towards the housing 14, the terminal of the deformation portion 1532 will scoop the upper surface of the housing 14, which would bring a greater sliding resistance, resulting in a greater resistance to press the key 11, and would cause greater wear on the upper surface of the housing 14. Thus, in the present embodiment, the terminal of the deformation portion 1532 is parallel to the upper surface of the housing 14, so that the terminal of the deformation portion 1532 conforms to the upper surface of the housing 14, which is changed from line contact to surface contact, so that the contact stress is reduced, and the resistance of the terminal of the deformation portion 1532 to slip is reduced. Therefore, the pressing of the key 11 becomes smoother, and the wear on the upper surface of the housing 14 is reduced.

Further, a part of the housing 14 in contact with the reed 153 is provided with a wear-resistant member (not shown). When the key 11 is moved, the terminal of the reed 153 presses against the wear-resistant member and relatively moves with the wear-resistant member. The part of the housing 14 in contact with the reed 153 being provided with a wear-resistant member can be understood that the wear-resistant member is fixedly attached to the upper surface of the housing 14, such as, bonded or clamped to the upper surface of the housing 14. The wear-resistant member is made of a material such as a metal sheet or a glass sheet or a wear-resistant plastic, and the surface of the wear-resistant member has a relatively high wear resistance. When the key 11 moves, the key 11 compresses the reed 153, so that the deformation portion 1532 is elastically deformed. The terminal of the deformation portion 1532 slides on the upper surface of the housing 14. Since the reed 153 is generally made of a hard metal and abrasion is caused to the upper surface of the housing 14, a wear-resistant member is provided at a portion where the reed 153 contacts the housing 14, and the reed 153 abuts against the surface of the wear-resistant member to prevent abrasion of the upper surface of the housing 14. At the same time, the surface of the wear-resistant member is smoother, and the smooth feeling of pressing the key 11 can be further improved.

Further, as shown in FIGS. 41 and 38, the key 11 is provided with a plurality of key snaps 112 towards the housing 14. The housing 14 is provided with snap-fit positions 1415 fitted to the key snap 112 at corresponding positions of the key snap 112, and the key snap 112 snap into the snap-fit positions 1415 so that the limit position of the upward movement of the key 11 is limited. Furthermore, a face of the key 11 towards the housing 14 is rectangular. Four of the key snap 112 are distributed at four corners of the rectangular and extend from the key towards the housing 14. The key snaps 112 cooperate with each other to limit two degrees of freedom of displacement and one degree of freedom of rotation in the horizontal direction of the key 11. The structural features and technical details of the key snap 112 have been previously described, and will not be repeated here.

Further, as shown in FIG. 40, the length of the key snap 112 is adapted to the height at which the deformation portion 1532 is bent towards the housing 14, so that the terminal of the deformation portion 1532 is pressed against the housing 14 when the key 11 does not generate the displacement. The length of the key snap 112 being adapted to the bending height of the deformation portion 1532 can be understood that the deformation portion 1532 of the reed 153 is bent towards the housing 14, the gripping portion 1531 of the reed 153 is fixed to the key 11, the terminal of the deformation portion 1532 abuts against the upper surface of the housing 14, and the deformation portion 1532 is clamped between the key 11 and the housing 14. The length of the key snap 112 determines the distance between the key 11 and the housing 14, and controls the length of the key snap 112. The distance between the key 11 and the housing 14 is made less than the height at which the deformation portion 1532 of the reed 153 is bent in a natural state, so that the deformation portion 1532 of the reed 153 is in a state of being deformed by being pressed when the key 11 is arranged on the housing 14. The advantageous effect is that the reed 153 has a pre-tightening force on the key 11, so that the key 11 is still supported by the reed 153 when it is not pressed, ensuring that the key 11 is at the upper limit position when it is not pressed, improving the flatness of the upper surface of each key 11, and improving the tightening degree of the key 11, without loose collapse.

Further, as shown in FIG. 41, the key 11 is provided with an abutting portion 113 at a corresponding position of the detection member 12. When the key 11 generates the displacement in response to the operation and control force, the abutting portion 113 directly or indirectly abuts against and triggers the detection member 12. Further, in the third direction, the length of the key snap 112 is adapted to the length of the abutting portion 113, so that when the displacement of the key 11 is not generated, the gap between the abutting portion 113 and the detection member 12 is less than or equal to 1.5 mm. The third direction is a direction in which the key 11 points towards the housing 14, i.e. a direction indicated by the arrow in FIG. 40. The structural features and technical details of the abutting portion 113 have been previously described, and will not be described in detail here.

Figures 42, 43:
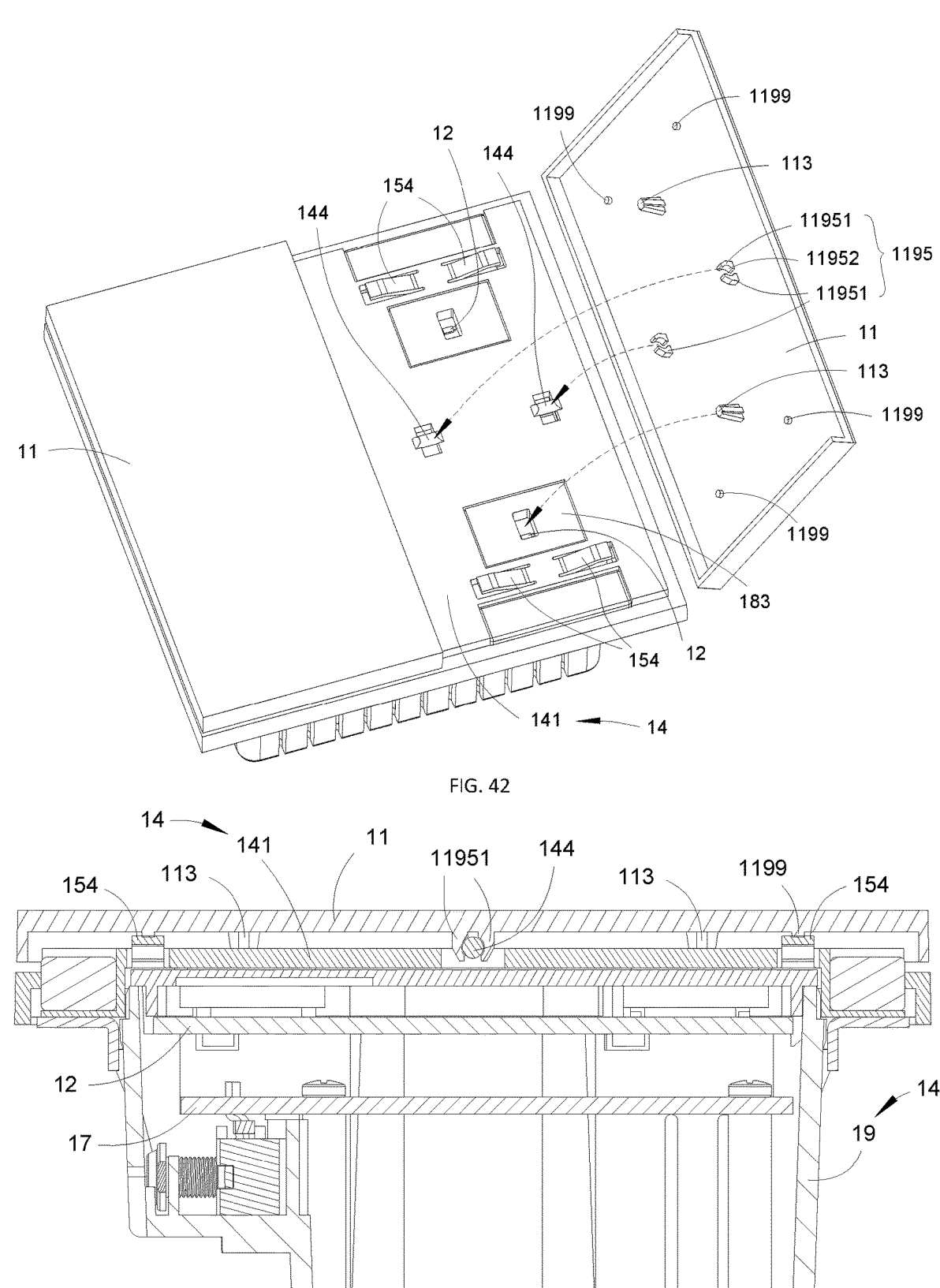
FIG. 42 is a structural diagram of an embodiment of the present invention.
FIG. 43 is a cross-sectional view of an embodiment of the present invention.

In some implementations, as shown in FIG. 43, the key 11 is pivotally connected to the housing 14 to limit three degrees of freedom of displacement and two degrees of freedom of rotation of the key 11. The key 11 makes a pivotal movement based on the housing 14 in response to the operation and control force and triggers the detection member 12 during the movement. The key 11 being pivotally connected to the housing 14 can be understood that the key 11 can rotate about a rotating shaft of the housing 14. The specific structure thereof includes an axial hole pivot connection, a snap type pivot connection, an abutting type pivot connection, etc. The specific structure thereof is described below. The housing 14 triggering the detection member 12 during movement can be understood that the detection member 12 is provided at a tracing point of pivotal movement of the housing 14 such that the housing 14 abuts against the detection member 12 during pivotal movement, thereby triggering the detection member 12.

In the present embodiment, the key 11 is pivotally connected to the housing 14. The key 11 is equivalent to a lever, and the force relationship thereof is relatively simple. The corresponding reaction force can be obtained by only calculating the reset acting force. However, the reset acting force provided by the resilient arm is easily controlled through structural design. The applicant can control the reaction force by controlling the reset acting force of the resilient arm. After calculation and simulation, the reset acting force is controlled to cooperate with the elastic force of the detection member 12, so that when the key 11 moves to the first pressing position, the reaction force is F1. When the key 11 moves from the first pressing position to the second pressing position, the reaction force jumps from F1 to F2, where F2<F1<400 g. The displacement S1 of the key 11 at the first pressing position and the displacement S2 of the key 11 at the second pressing position satisfy the relationship: S2-S1≤2 mm.

Further, as shown in FIGS. 42 and 43, the middle position of the key 11 is pivotally connected to the housing 14, and both ends of the key 11 can receive the operation and control force to generate the pivotal movement. The housing 14 is respectively provided with detection members 12 at the positions of two ends of the keys 11. Both ends of the keys 11 can be pressed to trigger the corresponding detection members 12. This design has the advantage that both ends of one key 11 correspond to two pressing functions, and some keys 11 can be saved, so that the switch realizes more pressing functions in a limited panel space of the keys 11.

In another embodiment, one end of the key 11 is pivotally connected to the housing 14 (not shown) and the other end is capable of receiving the operation and control force to produce the pivotal movement. Herein, a pivotal shaft is provided at one end of the key 11. The other end of the key 11 is pressed so that the key 11 performs a pivotal movement based on the pivotal shaft. This design has the advantage that the area where the key 11 is pressed increases and it is not easy to be touched by mistake. At the same time, the key 11 is equivalent to a force-saving lever, and the pivotal shaft is provided at the end portion of the key 11, so that the power arm becomes longer and the pressing feel is improved.

Further, as shown in FIG. 42, the key 11 is provided with an abutting portion 113 towards the detection member 12; and the key 11 performs a pivotal movement based on the housing 14 in response to the operation and control force, driving the abutting portion 113 to directly or indirectly abut against and trigger the detection member 12. The structural features and technical details of the abutting portion 113 have been previously described, and will not be described in detail here.

In some embodiments, as shown in FIGS. 42 and 43, a pivotal shaft and a rotating shaft hole (not shown in the figures) with a clearance fit are provided between the key 11 and the housing 14. One of the pivotal shaft and the rotating shaft hole is provided on the key 11, and the other is provided on the housing 14. The pivotal shaft is inserted into the rotating shaft hole, so that the key 11 can make a pivotal movement based on the pivotal shaft. In a specific embodiment, pivotal shafts are convexly arranged on both side edges of the key 11 respectively. The central axes of the two pivotal shafts are collinear. A rotating shaft hole is concavely provided on the inner side surface of the housing 14 at corresponding positions of the two pivotal shafts respectively. The rotating shaft hole is in clearance fit with the pivotal shaft. The pivotal shaft can rotate in the rotating shaft hole. A guide slope is provided at the lower end of the pivotal shaft, so that the pivotal shaft can be clamped into the rotating shaft hole from top to bottom.

In some embodiments, as shown in FIG. 42, a first clamping jaw 1195 and a first rotating shaft 144 are provided between the key 11 and the housing 14. One of the first clamping jaw 1195 and the first rotating shaft 144 is arranged on the key 11, and the other is arranged on the housing 14. The first clamping jaw 1195 is clamped to the first rotating shaft 144 and is in clearance fit with the first rotating shaft 144, so that the first clamping jaw 1195 and the first rotating shaft 144 can rotate relative to each other, thereby enabling the key 11 to perform a pivotal movement based on the first rotating shaft 144. In a preferred embodiment, two first clamping jaws 1195 are juxtaposed towards the housing 14 at an intermediate position of the key 11. The housing 14 is integrally convexly provided with a first rotating shaft 144 at the corresponding position of the first clamping jaws 1195. The first clamping jaw 1195 includes two first clamping jaw arms 11951 which are arranged opposite to each other and are not in contact. The first clamping jaw arms 11951 are integrally formed on the key 11. The two first clamping jaw arms 11951 wrap around each other so as to form a circular first clamping hole 11952 between the two first clamping jaw arms 11951. The aperture of the first clamping hole 11952 is greater than the axial diameter of the first rotating shaft 144, so that the first clamping hole 11952 is in clearance fit with the first rotating shaft 144. The two first clamping jaw arms 11951 are provided with a clamping opening towards the first rotating shaft 144. When the key 11 is mounted, the clamping opening is pressed from top to bottom against the first rotating shaft 144. The first clamping jaw arms 11951 are separated from each other under the action of their own elastic force, so that the first rotating shaft 144 is clamped into the first clamping hole 11952. The first rotating shaft 144 can rotate in the first clamping hole 11952 so as to realize the pivotal connection between the key 11 and the housing 14.

Further, as shown in FIGS. 42 and 43, the reset portion 15 is provided as at least a first resilient arm 154 extending from the housing 14 and abutting against at least a portion of the key 11 to provide the reset acting force for the key 11. The first resilient arm 154 abutting against the lower surface of the key 11 can be understood that the first resilient arm 154 is bent and extended from the housing 14 towards the key 11. Namely, the first resilient arm 154 is tilted upwards by a certain height, and the upper surface of the end portion of the first resilient arm 154 abuts against the lower surface of the key 11. In a preferred embodiment, the middle part of the key 11 is pivotally connected to the housing 14. Both ends of the key 11 can be pressed to generate a pivotal movement and trigger a corresponding detection member 12. The housing 14 is provided with two first resilient arms 154 respectively on the both ends of the key 11. The two first resilient arms 154 located at the same end respectively extend towards two sides of the key 11 and respectively abut against the lower surface of the key 11. The four first resilient arms 154 corresponding to the key 11 all abut against the lower surface of the key 11, and the heights of the first resilient arms 154 raised upwards are consistent, so that the key 11 is supported to reach a horizontal state, and the magnitude of the reset acting force received by the two ends of the key 11 is the same. Furthermore, the lower surface of the key 11 is provided with a cylindrical pressing boss 1199 protruding from the end portion of the first resilient arm 154. The key 11 presses the first resilient arm 154 via the cylindrical pressing boss 1199, so as to prevent the first resilient arm 154 from bending too high and reducing the strength. The cylindrical pressing boss 1199 is used to compensate for a part of the height, so that the first resilient arm 154 is not tilted too high.

Further, the edge of the key 11 is provided with a first hook (not shown) for hooking to the housing 14 to limit the limit position of the upward movement of the key 11. The edge of the key 11 being provided with a first hook can be understood that the first hook is be convexly provided at the both ends of the key 11 having the pivotal movement towards the side wall of the housing 14. The side wall of the housing 14 is provided with a limiting step at the corresponding position of the first hook. The first hook hooking to the housing 14 can be understood that when the key 11 is in a non-pressed state, the first hook hooks the edge of the limiting step so as to limit the limit position where the key

11 bounces upwards. The function thereof is as follows. Since there is a manufacturing error in the first resilient arms 154, there is a difference in the magnitude of the elasticity of the four first resilient arms 154 corresponding to the same key 11 and the height of the same key 11 being tilted upwards, resulting in that the upper surface of the key 11 is inclined. The upper surfaces of each key 11 are not in the same plane, thus affecting the aesthetics. Therefore, the present embodiment provides a first hook at the end portion of the key 11 to limit the limit position at which the end portion of the key 11 bounces upwards to ensure that the upper surface of the key 11 is horizontal.

Furthermore, the first resilient arm 154 is tilted towards the key 11 by a preset height, and the length of the first hook matches the preset height, so that the first resilient arm 154 is pressed by the key 11 when the key 11 does not not generate the displacement. The length of the first hook matching the preset height can be understood as that the first resilient arm 154 is arranged between the key 11 and the housing 14, and the length of the key snap 112 determines the spacing between the key 11 and the housing 14. The length of the key snap 112 is controlled so that the spacing between the key 11 and the housing 14 is less than the preset height of the first resilient arm 154. When the key 11 is not pressed, the first resilient arm 154 is also in a pressed and deformed state. Further, an abutment protrusion is formed at a portion where the key 11 is tilted towards the terminal of the first resilient arm 154 so as to raise the key 11 by a height, so that the key 11 has a sufficient press margin. The first resilient arm 154 is further deformed against the first resilient arm 154 so that the first resilient arm 154 is also in a pressed and deformed state when the key 11 is not pressed. The advantageous effect is that the first resilient arms 154 have a pre-tightening force on the keys 11, so that the keys 11 are still supported by the first resilient arms 154 when they are not pressed, ensuring that the keys 11 are at the upper limit position when they are not pressed, improving the flatness of the upper surface of each key 11, and improving the tightness of the keys 11, without loose collapse.

In another embodiment, the first resilient arm 154 is provided at least partially between the key 11 and the detection member 12 (not shown), the key 11 triggering the detection member 11 by the pressing from the first resilient arm 12. The first resilient arm 154 being at least partially provided between the key 11 and the detection member 12 can be understood that the first resilient arm 154 extends out from the housing 14, with the end thereof arranged above the detection member 12. The upper surface of the end portion of the first resilient arm 154 abuts against the lower surface of the key 11. The key 11 indirectly triggers the detection member 12 by pressing the end portion of the first resilient arm 154. The first resilient arm 154 provides a reset acting force for the key 11. Further, the terminal of the first resilient arm 154 protrudes towards the key 11 with a circular arc-shaped protrusion for abutting against the lower surface of the key 11. The advantage of using the circular arc-shaped protrusion is that the contact of the circular arc-shaped protrusion with the key 11 is a point contact, and the contact point is close to the central position of the circular arc-shaped protrusion. The contact position of the point contact is easily controlled compared with that of the surface contact. Accordingly, the contact position of the circular arc-shaped protrusion with the key 11 is relatively constant, and does not change much during the pressing process, so that the key 11 can vertically press against the detection member 12 via the first resilient arm 154. The advantage of the first resilient arm 154 pressing against and triggering the detection member 12 in the present embodiment is that the first resilient arm 154 is integrally formed with the housing 14, ensuring the relative position accuracy between the first resilient arm 154 and the housing 14. Since the detection member 12 is mounted on the housing 14, the positioning accuracy between the first resilient arm 154 and the detection member 12 is guaranteed. In this embodiment, the detection member 12 is directly triggered by the first resilient arm 154 as compared with the abutting portion 113 arranged on the key 11, which avoids the accumulation of an error size chain between the abutting portion 113 and the detection member 12, and more easily ensures the positioning accuracy between the first resilient arm 154 and the detection member 12, thereby reducing the manufacturing accuracy requirements. Furthermore, no positioning relationship is required between the key 11 and the detection member 12. The requirement for the positioning accuracy of the key 11 is reduced. No positioning structure is required between the key 11 and the resilient limiting member 151, thereby reducing the manufacturing cost of the key 11 and the resilient limiting member 151.

Figure 44:
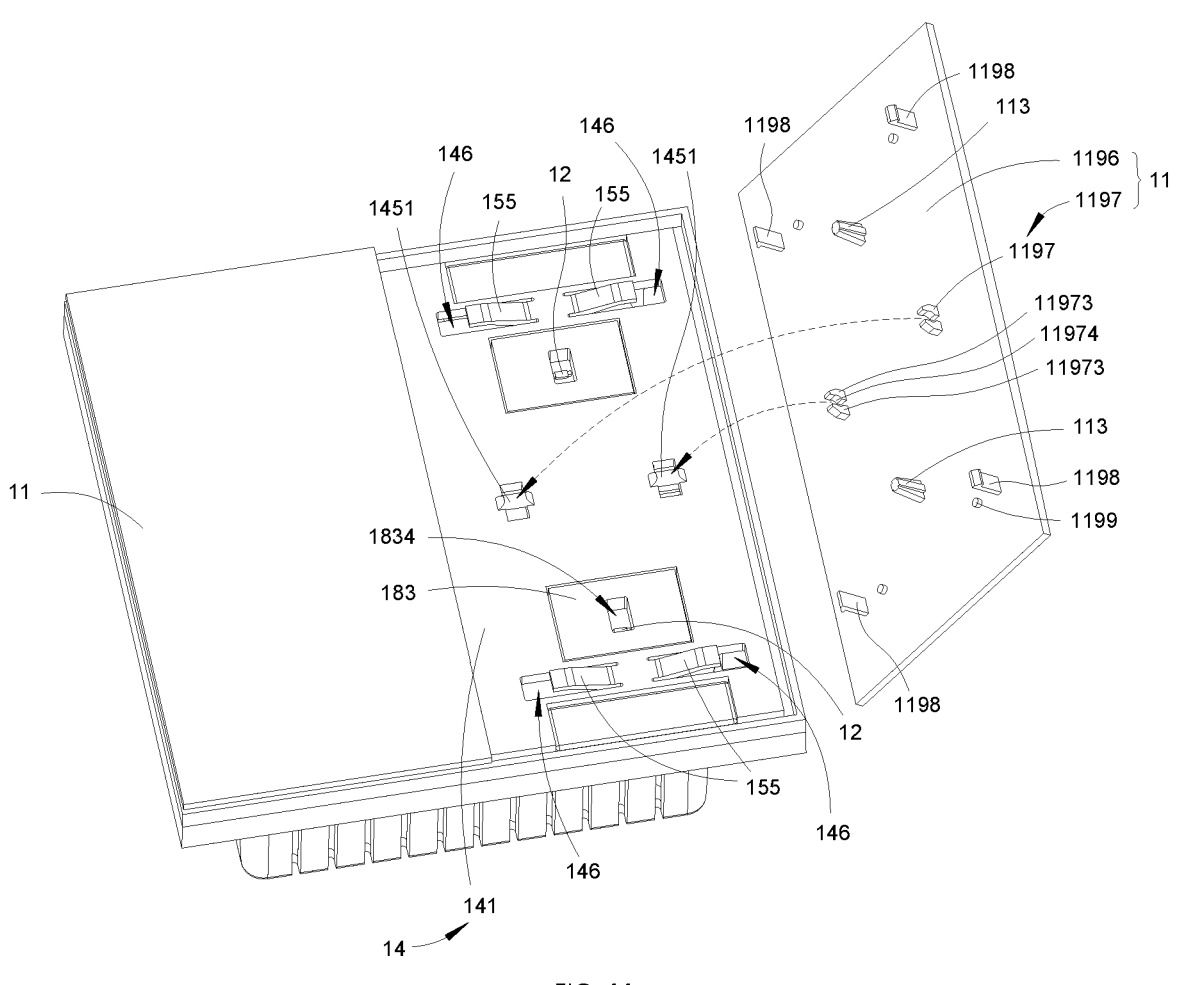
FIG. 44 is a structural diagram of an embodiment of the present invention.
Figures 45, 46:
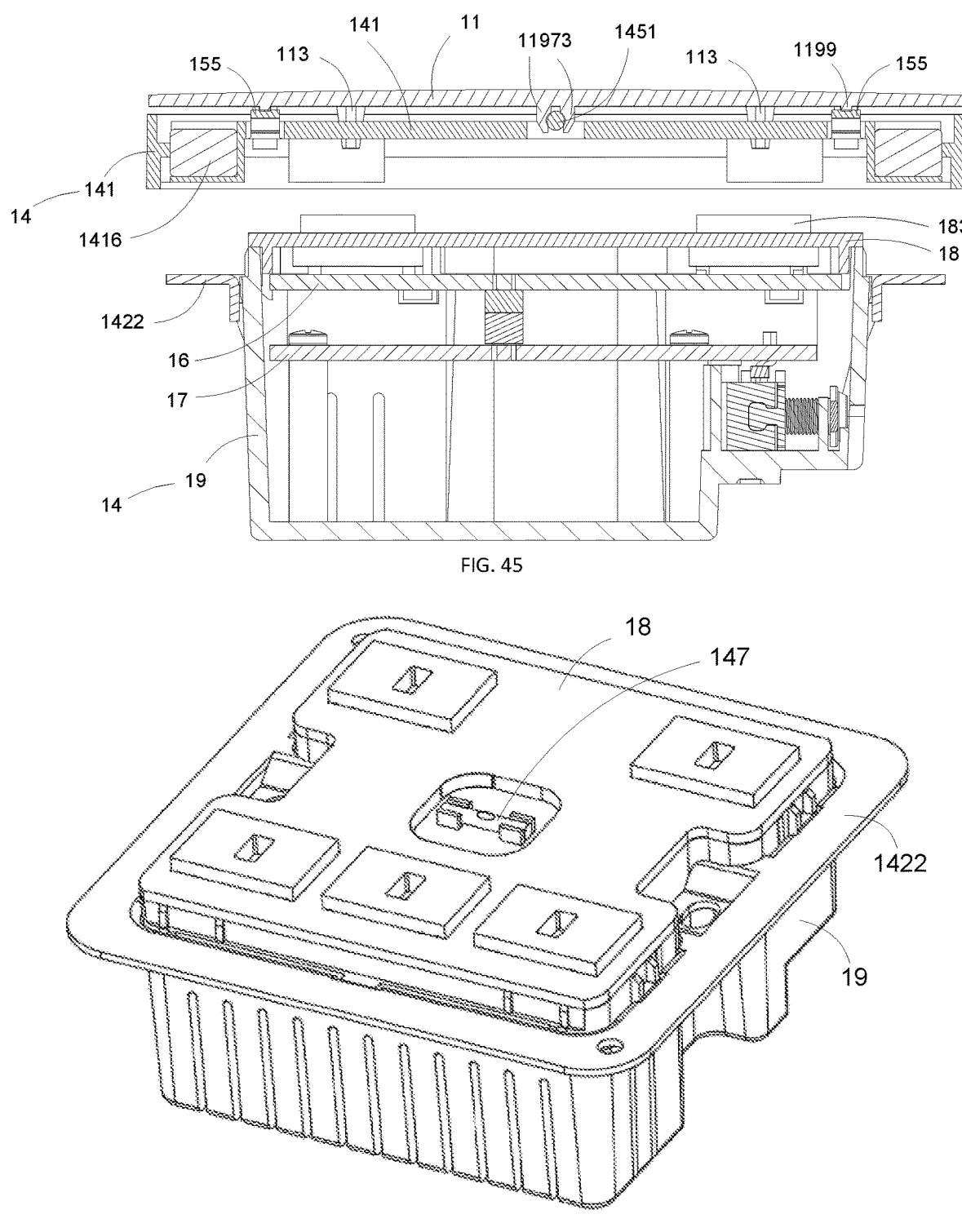
FIG. 45 is a cross-sectional view of an embodiment of the present invention.
FIG. 46 is a structural diagram of a gradienter according to an embodiment of the present invention.
Figure 47:
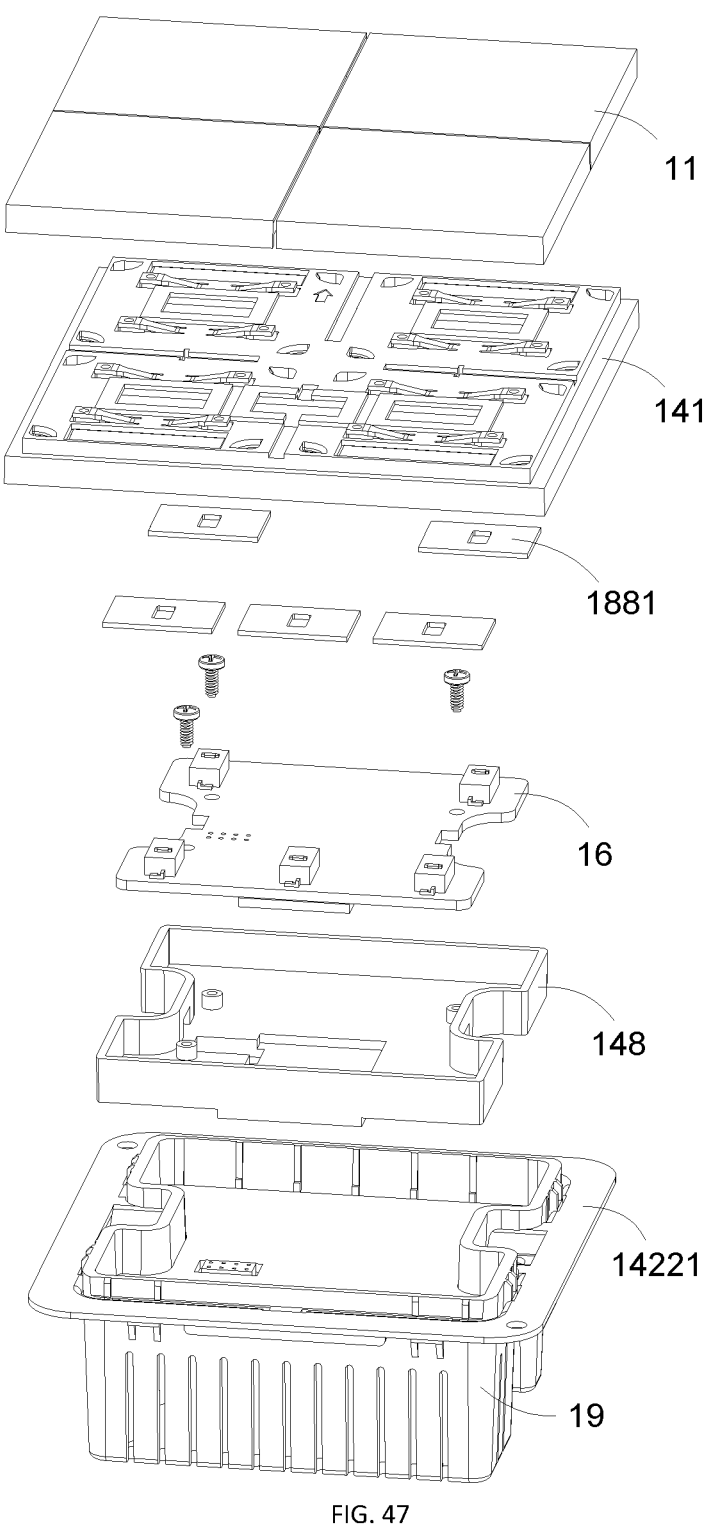
FIG. 47 is an exploded view according to an embodiment of the present invention.

In some embodiments, as shown in FIGS. 44 and 45, the key 11 includes a key body 1196 and a connecting portion 1197. The key 11 is fixed with the housing 14 via the connecting portion 1197. The key body 1196 may be elastically deformed in response to the operation and control force and generate the reset acting force against the deformation, and the key body 1196 forms the reset portion 15. The key body 1196 is provided with an abutting portion 113 facing towards the detection member 12. When the operation and control force acts on the key 11, the key body 1196 elastically deforms, driving the abutting portion 113 to directly or indirectly abut against and trigger the detection member 12. When the operation and control force is removed, the deformation of the key body 1196 is restored, driving the abutting portion 113 to return to the original position. The key body 1196 being formed with the reset portion 15 can be understood that the key 11 is provided with an elastic sheet structure, can be elastically deformed and generate the reset acting force, and one end thereof is fixedly connected to the housing 14, and the other end thereof can be pressed to elastically deform the key body 1196. Alternatively, the middle part of the key 11 is fixedly connected to the housing 14, and two ends thereof can be pressed to elastically deform the key body 1196. The key body 1196 is the reset portion 15. The key body 1196 is provided with an abutting portion 113 facing towards the detection member 12, which can be understood as that the key body 1196 is pressed and elastically deformed, and an end thereof generates the displacement downwards. The abutting portion 113 integrally extends from the key body 1196 towards the housing 14, and the abutting portion 113 is placed above the detection member 12. When the end portion of the key 11 moves downwards, the abutting portion 113 is brought downwards to press and trigger the detection member 12.

In the present embodiment, the deformation portion 1532 of the reed 153 provides a reset acting force by pressing and deforming, and the influence factor of the reset acting force is less, so that the reset acting force is easily controlled through structural design. The applicant controls the reset acting force to cooperate with the elastic force of the detection member 12 through calculation and simulation by changing the tilting angle, thickness, width and length of the reed 1196, so that when the key 11 moves to the first pressing position, the reaction force is F1; and when the key 11 moves from the first pressing position to the second pressing position, the reaction force jumps from F1 to F2, where F2<F1<400 g. The displacement S1 of the key 11 at the first pressing position and the displacement S2 of the key 11 at the second pressing position satisfy the relationship: S2-S1≤2 mm.

Further, the connecting portion 1197 is fixedly connected to the housing 14 by bolting, riveting or snapping. Here, the bolting connection means that the housing 14 is provided with a bolt hole, and the connecting portion 1197 is fixed to the bolt hole of the housing 14 by bolting. The riveting means that the connecting portion 1197 is fixed to the housing 14 by a rivet.

Furthermore, as shown in FIG. 44, the connecting portion 1197 is provided at the middle position of the key 11. The housing 14 is respectively provided with the abutting portion 113 at the both ends of the key 11. The both ends of the key 11 can respectively generate displacement in response to the operation and control force, thereby driving the abutting portion 113 to trigger the detection member 12. The detection members 12 are respectively provided below the abutting portion 113 at the both ends of the key 11. The middle position of the key 11 is fixedly connected to the housing 14 via the connecting portion 1197, and the both ends thereof respectively extend downwards out of the abutting portion 113 for triggering the detection members 12 below. The operation and control force can respectively act on the both ends of the key 11 to elastically deform the key 11. The both ends of the key 11 generate the displacement under the action of the operation and control force, driving the abutting portion 113 to trigger the detection member 12.

In another embodiment, the connecting portion 1197 is provided at one end (not shown in the figure) of the key 11. The housing 14 is provided with the abutting portion 113 at the other end of the key 11 away from the one end. The other end of the key 11 can be displaced in response to the operation and control force, thereby driving the abutting portion 113 to trigger the detection member 12. The one end of the key 11 is fixedly connected to the housing 14 via the connecting portion 1197, and the other end of the key 11 extends downwards out of the abutting portion 113 for triggering the detection member 12 below. The operation and control force acts on the other end of the key 11 to elastically deform the key 11, and the other end of the key 11 generates the displacement under the action of the operation and control force, driving the abutting portion 113 to trigger the detection member 12.

In a preferred embodiment, as shown in FIGS. 44 and 45, the connecting portion 1197 is snapped onto the housing 14. The connecting portion 1197 is provided with a first clamping portion 11971 facing towards the housing 14. The housing 14 is provided with a second clamping portion 145 at a position corresponding to the first clamping portion 11971. The second clamping portion 145 is adapted to the shape and size of the first clamping portion 11971, so that the first clamping portion 11971 is clamped to the second clamping portion 145, thereby achieving a fixed connection between the connecting portion 1197 and the housing 14. Furthermore, the first clamping portion 11971 includes at least one second clamping jaw 11972. The second clamping portion 145 includes at least one clamping shaft 1451. The second clamping jaw 11972 is clamped to the clamping shaft 1451 and is in interference fit with the clamping shaft 1451. An interference amount of the interference fit can prevent relative rotation between the second clamping jaw 11972 and the clamping shaft 1451 within a preset deformation range of the key 11, so as to achieve a fixed connection between the second clamping jaw 11972 and the clamping shaft 1451. A preset deformation range of the key 11 refers to a deformation range of the key 11 within a pressing stroke. In a specific embodiment, two second clamping jaw 11972 corresponding to each key 11 are juxtapositioned and spaced on the lower surface of the key 11. The second clamping jaw 11972 include two oppositely arranged and non-contact second clamping jaw arms 11973. The second clamping jaw arms 11973 are integrally formed on the key 11. The two second clamping jaw arms 11973 are in close contact with each other so as to form a circular second clamping hole 11974 between the two second clamping jaw arms 11973. The aperture of the second clamping hole 11974 is less than the axial diameter of the clamping shaft 1451, so that the second clamping hole 11974 is in interference fit with the clamping shaft 1451. Two second clamping jaw arms 11973 are provided with a guide opening towards the clamping shaft 1451. When the key 11 is mounted, the guide opening presses the clamping shaft 1451 from top to bottom. The second clamping jaw arms 11973 are separated from each other under the action of their own elastic force, so that the clamping shaft 1451 is clamped into the second clamping hole 11974, so as to realize the fixed connection between the connecting portion 1197 and the housing 14.

Further, as shown in FIGS. 44 and 45, the housing 14 is provided with a second resilient arm 155 which abuts against the key 11 for assisting the resetting of the key 11. The second resilient arm 155 abutting against the lower surface of the key 11 can be understood that the second resilient arm 155 is bent and extended from the housing 14 towards the key 11. Namely, the second resilient arm 155 is tilted upwards by a certain height. The upper surface of the terminal of the second resilient arm 155 abuts against the lower surface of the key 11. The second resilient arm 155 for assisting the resetting of the key 11 can be understood that since the key 11 is fixedly connected to the housing 14, the key 11 is pressed to generate an resilient deformation and generate a reset acting force. At the same time, the second resilient arm 155 also generates a reset acting force on the key 11. The purpose of the reset acting force of the second resilient arm 155 is to prevent the key 11 from losing its original elasticity during long-term use and thus being unable to return to an initial state, resulting in that the frequently used key 11 collapses downwards and cannot rebound. The detection member 12 cannot return to a non-triggered state, thus affecting normal use. Furthermore, the keys 11 which are not frequently used rebound normally, resulting in a long-term use of keys 11 with different upper surfaces. Therefore, a second resilient arm 155 is provided for assisting the key 11 to restore the initial position.

Furthermore, as shown in FIG. 44, the keys 11 are provided with at least one second hook 1198 facing towards the housing 14, and the second hook 1198 can be hooked on the housing 14, so that the height of the upper surface of each of the keys 11 is consistent. The upper surface of the key 11 is provided as a surface of the key 11 facing away from the housing 14. The second hook 1198 can be hooked on the housing 14, which can be understood that the housing 14 is provided with a hook through hole 146 at a corresponding position of the second hook 1198. When the key 11 is in an undepressed state, the second hook 1198 extends into the hook through hole 146 and hooks the lower edge of the hook through hole 146, so as to limit the limit position where the key 11 bounces upwards. In a preferred embodiment, there are four second hooks 1198 corresponding to each key 11, which are located at four corners of the key 11 and symmetrically provide a limiting force for the key 11. The function thereof is as follows. Since there is a manufacturing error in the second resilient arm 155, there is a difference in the magnitude of the elastic force of a plurality of second resilient arms 155 corresponding to the same key 11 and the height being tilted upwards, resulting in that the upper surface of the key 11 is inclined. The upper surfaces of each key 11 are not in the same plane, thus affecting aesthetics. Therefore, the keys 11 are restricted in the upturned height by the second hooks 1198, so that the upper surface of each key 11 is horizontal. In another preferred embodiment, the second hooks 1198 are provided at the end portions of the keys 11 (not shown in the drawings) to limit the limit position at which the end portions of the keys 11 bounces upwards, thereby more accurately ensuring the level of the upper surface of each key 11.

Furthermore, as shown in FIG. 11, the housing 14 includes an upper housing 141 and a lower housing 142. The upper housing 141 is covered on the lower housing 142 and is detachably connected to the lower housing 142. The upper housing 141 being covered on the lower housing 142 can be understood that the upper housing 141 is concavely provided with an accommodating groove capable of accommodating at least part of the lower housing 142 towards the lower housing 142. When the upper housing 141 is covered onto the lower housing 142, at least part of the lower housing 142 is accommodated in the accommodating groove. In a specific embodiment, the side edges of the upper housing 141 extend towards the lower housing 142 with four accommodating groove side walls that enclose one another to form the accommodating groove. The removable connection to the lower housing 142 includes magnet, bolt, or snap connections.

Figures 16, 17:
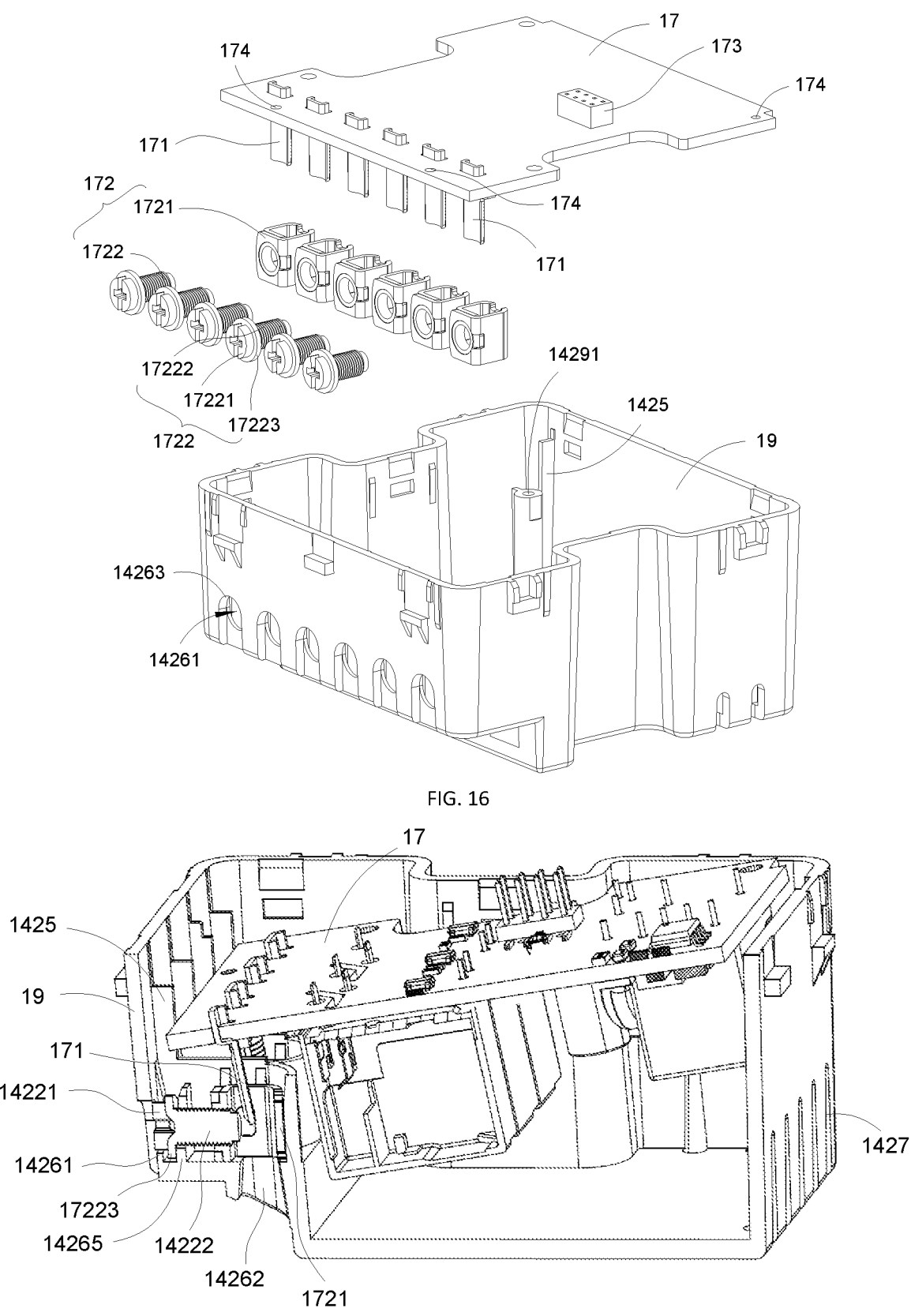
FIG. 16 is a structural diagram of a power supply board according to an embodiment of the present invention.
FIG. 17 is a schematic view showing the arrangement of a wiring module according to an embodiment of the present invention.

Further, as shown in FIGS. 3, 11 and 16, the key 11 is movably connected to the upper housing 141, so that the key 11 can be relatively moved based on the upper housing 141 and trigger the detection member 12 during the movement. The key 11 being movably connected to the upper housing 141 can be understood that it is stated above that the key 11 is movably connected to the housing 14, and a specific connection structure is stated in detail. It is specifically defined herein that the key 11 is movably connected to the upper housing 141 of the housing 14, and the connection structure thereof is the same as the above-mentioned connection structure, which will not be further described herein. The intelligent switch further includes a power supply board 17, which is arranged on the lower housing 142 and is used for connecting an external power supply line; and at least one PCB board 16 electrically connected to the power supply board 17, the PCB board 16 being provided with electric energy by means of the power supply board 17. The detection member 12 is arranged on the PCB board 16 and is electrically connected to the PCB board 16. The power supply board 17 being arranged on the lower housing 142 can be understood that the power supply board 17 is fixedly connected to the lower housing 142 by bolting, snapping, clamping, or other suitable means of connection. The power supply board 17 for connecting an external power supply line can be understood that the power supply board 17 is connected to an external 220V alternating current, and an electronic component is further arranged on the power supply board 17, which can convert the 220V alternating current into a direct current and supply power to other direct current electronic components. The PCB board 16 being electrically connected to the power supply board 17 can be understood that the PCB board 16 can be conductively connected to the power supply board 17 by means of a metal contact connection, a wire connection, a pin header 161 and a female header 173 connection, etc. The detection member 12 being arranged on the PCB board 16 and electrically connected to the PCB board 16 can be understood that the detection member 12 is welded to the PCB board 16, or clamped to the PCB board 16 and abuts against the PCB board 16 via a metal contact or via a conductive elastic sheet, etc. Additionally, in a preferred embodiment, the PCB board 16 is fixedly arranged on the lower housing 142. In the daily use of the switch, when the number of switch keys 11 is too large, the user easily forgets the corresponding relationship between the keys 11 and the lamp. When the intelligent switch is introduced, the switch may represent many scene modes besides a single lamp, such as off-home mode and full-on mode, so that the function represented by the switch is more complex and the user is more difficult to memorize it. Based on this, the prior art provides a certain custom-made laser carving technology, and can select the text or icon required by the client on the switch. However, this solution is difficult for the subsequent modification of the display content of the key 11. Therefore, in the present invention, the upper housing 141 is detachably connected with the lower housing 142. When the key 11 is damaged or it is desired to replace the display content of the key 11, it is not necessary to replace the entire switch, with only the upper housing 141 and the key 11 required to be replaced. Further, the key 11 and the upper housing 141 can be combined into the key 11 module for an integral replacement. The PCB board 16 and the power supply board 17 are arranged on the lower housing 142. Accordingly, the electronic components of the switch connected to the PCB board 16 and the power supply board 17 are also arranged on the lower housing 142. The upper housing 141 is only provided with the key 11. When the upper housing 141 is replaced, the circuit part is not involved, and the cost of replacing the upper housing 141 can be reduced.

Further, as shown in FIGS. 8 and 11, the upper housing 141 and the lower housing 142 are magnetically connected. The upper housing 141 is provided with at least one magnet 1416. The lower housing 142 is provided with at least one magnetic attraction member 1422. The magnetic attraction member 1422 can be attracted by the magnet 1416. The upper housing 141 fits the magnetic attraction member 1422 by the magnet 1416 to detachably connect the upper housing 141 and the lower housing 142. The upper housing 141 being provided with at least one magnet 1416 can be understood that the upper housing 141 is fixedly connected with a magnet 1416, and the manner of fixed connection includes bonding, clamping, bolting or clamping, etc. The lower housing 142 being provided with at least one magnetic attraction member 1422 can be understood that the lower housing 142 is fixedly connected to the at least one magnetic attraction member 1422 in a manner of clamping, bonding, bolting, etc. The magnetic attraction member 1422 is made of a ferrous material so that the magnetic attraction member 1422 can be attracted to the magnet 1416. Further, the magnetic attraction member 1422 is a sheet metal part 14221 which can be fixedly mounted on a mounting surface so that the lower housing 142 is fixedly connected to the mounting surface. The mounting surface may be understood as a wall surface. In a specific embodiment, the sheet metal part 14221 is provided with at least one screw hole 14222, and the hole diameter of the screw hole 14222 is adapted to a screw, so that the screw can pass through the screw hole 14222 and fix the sheet metal part to the mounting surface 14221. The screw fixing the sheet metal part 14221 to the mounting surface can be understood as that the diameter of the screw nut 17221 is greater than the hole diameter of the screw hole 14222, the screw rod 17222 of the screw passes through the screw hole 14222 and is screwed and fixed to the mounting surface, and the sheet metal part 14221 is pressed and fixed to the mounting surface. The advantageous effect of using the sheet metal part 14221 as the magnetic attraction member 1422 is that the sheet metal part 14221 is common in wall switches, and the wall switch needs to be arranged on a wall via the sheet metal part 14221. In addition, the sheet metal part 14221 of the present invention is also used as the magnetic attraction member 1422, so that the lower housing 142 does not need to be provided with a magnetic attraction member 1422 to complete a magnetic suction connection with the upper housing 141, simplifying the structure and saving costs.

The upper housing 141 is magnetically connected to the lower housing 142, which advantageously facilitates removal and replacement of the upper housing 141. When the surface of the key 11 is worn or damaged or the pattern or text on the surface of the key 11 needs to be replaced, the upper housing 141 and the key 11 as a whole can be quickly replaced, so that a completely new switch panel can be obtained and the display content is changed.

Figures 14, 15:
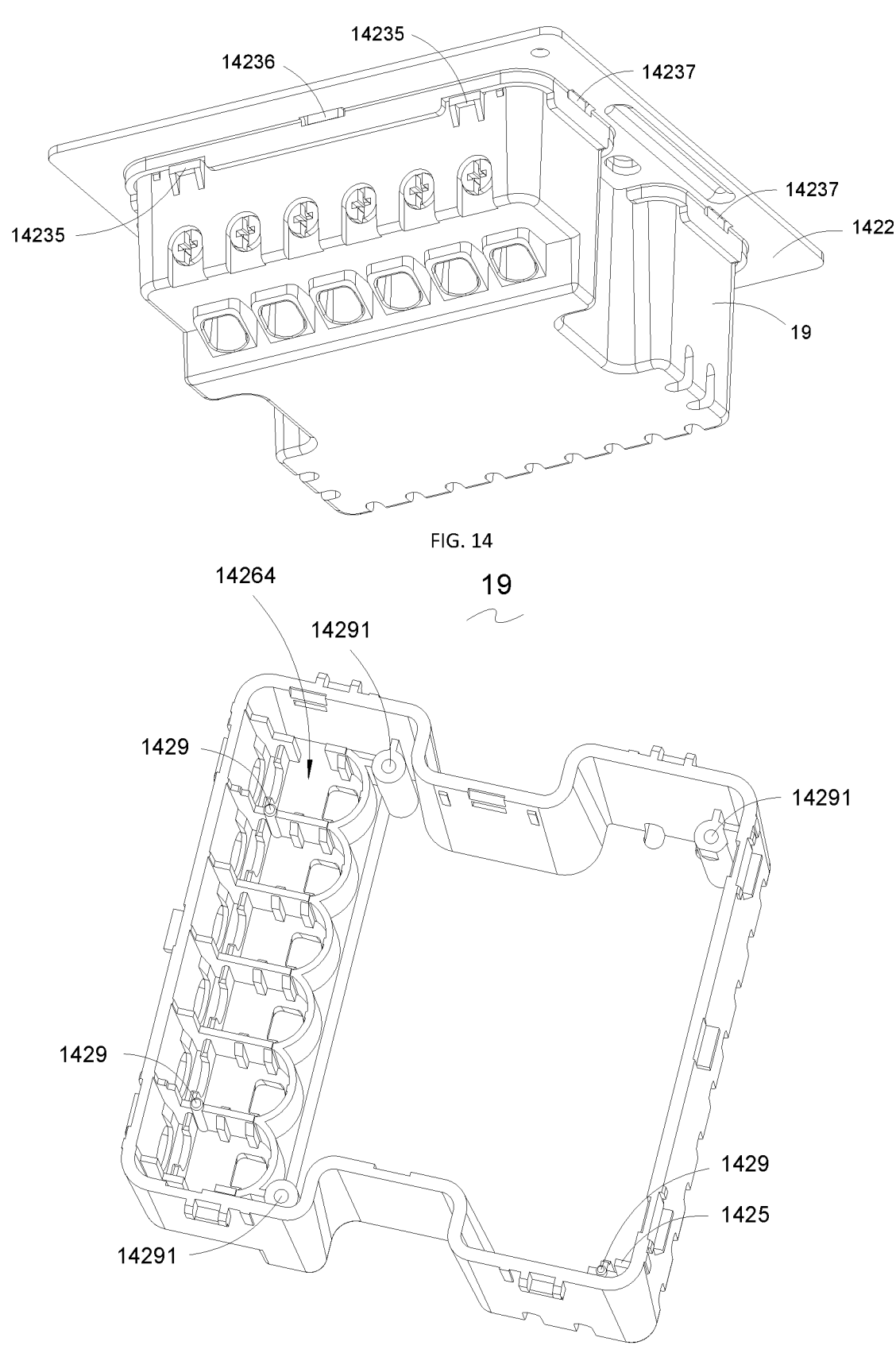
FIG. 14 is a schematic view showing the arrangement of a magnetic attraction member according to an embodiment of the present invention.
FIG. 15 is a schematic view showing an inner structure of a lower housing according to an embodiment of the present invention.

Furthermore, as shown in FIGS. 13 and 14, the sheet metal part 14221 is clamped with the lower housing 142. In a specific embodiment, the center of the sheet metal part 14221 is provided with a sheet metal part through hole adapted to the outer shape of the lower housing 142. The sheet metal part 14221 is sleeved under the lower housing 142 and clamped on the outer surface of the lower housing 142. A through hole with a shape matching the outer shape of the lower housing 142 being provided in the center of the sheet metal part 14221 can be understood that the through hole provided in the center of the sheet metal part 14221 is fitted with the outer side wall of the lower housing 142, so that the through hole of the sheet metal part 14221 is clamped with the outer side wall of the lower housing 142. In a specific embodiment, the outer surface of the lower housing 142 includes at least a first outer side wall 14231, a second outer side wall 14232, a third outer side wall 14233, and a fourth outer side wall 14234 that enclose each other. The first outer side wall 14231 is arranged opposite the second outer side wall 14232 and the third outer side wall 14233 is arranged opposite the fourth outer side wall 14234. The first outer side wall 14231 and the second outer side wall 14232 are respectively provided with two sheet metal part snaps 14235. The first outer side wall 14231 is provided with a first abutting portion 14236 between the two sheet metal part snaps 14235. The second outer side wall 14232 is provided with a second abutting portion 14237 between the two sheet metal part snaps. The third outer side wall 14233 is provided with two third abutting portion 14238. The fourth outer side wall 14234 is provided with two fourth abutting portion 14239. The first abutting portion 14236, the second abutting portion 14237, the third abutting portion 14238, and the fourth abutting portion 14239 are at the same level. When the sheet metal part 14221 is sleeved from below the lower housing 142, the upper surface of the sheet metal part 14221 abuts against the first abutting portion 14236, the second abutting portion 14237, the third abutting portion 14238 and the fourth abutting portion 14239, so as to limit the upward displacement of the sheet metal part 14221. At the same time, the lower surface of the sheet metal part 14221 is respectively clamped to the sheet metal part snap 14235, so as to limit the downward displacement of the sheet metal part 14221. The first abutting portion 14236, the second abutting portion 14237, the third abutting portion 14238, and the fourth abutting portion 14239 cooperate with the level of the sheet metal snap 14235, so that the sheet metal 14221 is clamped to the lower housing 142. The cooperating in the level can be understood that, in the vertical direction, the distance between the first abutting portion 14236, the second abutting portion 14237, the third abutting portion 14238 and the fourth abutting portion 14239 and the sheet metal part snap 14235 is equal to the thickness of the sheet metal part 14221, so that the sheet metal part 14221 can be clamped and fixed.

Figure 21:
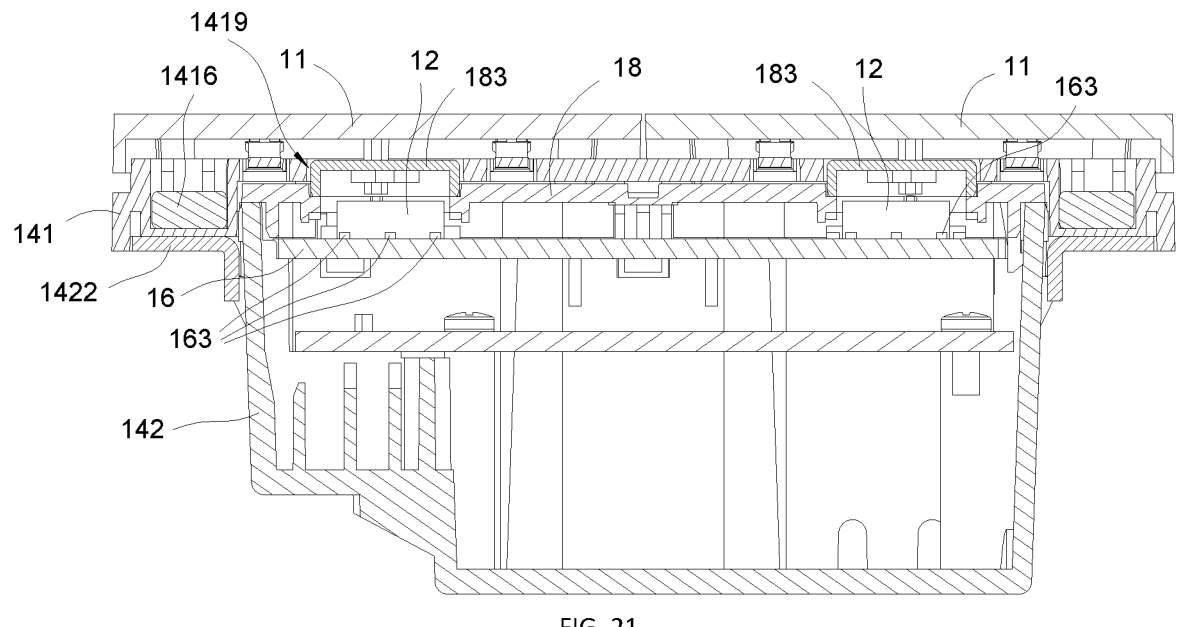
FIG. 21 is a cross-sectional view of an embodiment of the present invention.

Furthermore, as shown in FIGS. 8, 11 and 12, at least one magnet mounting groove 14161 is arranged on a side of the upper housing 141 facing towards the key 11. The shape of the magnet mounting groove 14161 is adapted to the magnet 1416. The side wall of the magnet mounting groove 14161 is convexly provided with a magnet limiting rib. The lower surface of the magnet 1416 is at least partially fit to the bottom wall of the magnet mounting groove 14161. The magnet limiting rib clamps the side surface of the magnet 1416 to limit the magnet 1416. Here, the shape of the magnet mounting groove 14161 being adapted to the magnet 1416 can be understood that the outer shape of the magnet mounting groove 14161 is slightly larger than the magnet 1416, and the magnet mounting groove 14161 is open towards the key 11 side. The groove depth of the magnet mounting groove 14161 is greater than or equal to the height of the magnet 1416, so that when the magnet 1416 is inserted from the magnet mounting groove 14161 towards the key 11 side, the upper surface of the magnet 1416 is flush with or lower than the upper surface of the upper housing 141. The lower surface of the magnet 1416 is at least partially fit to the bottom wall of the magnet mounting groove 14161 (as shown in FIG. 21). The surface of the bottom side of the magnet mounting groove 14161 facing towards the magnetic attraction member 1422 is at least partially fit to the magnetic attraction member 1422, so as to reduce the distance between the magnet 1416 and the magnetic attraction member 1422, thereby increasing the magnetic attraction force between the magnet 1416 and the magnetic attraction member 1422, thereby increasing the magnetic suction force between the upper housing 141 and the lower housing 142, and preventing the upper housing 141 from falling off. The magnet limiting rib clamping the side surface of the magnet 1416 to limit the magnet 1416 can be understood that the distance between each of the magnet limiting ribs matches the width of the magnet 1416, so that when the magnet 1416 is placed in the magnet mounting groove 14161, the magnet limiting rib is in interference or transition fit with the magnet 1416. The magnet mounting groove 14161 clamps the magnet 1416 in the middle, so as to prevent the magnet 1416 from shaking in the magnet mounting groove 14161. The function of the magnet limiting rib is as follows. Firstly, if there is no magnet limiting rib, only the side wall of the magnet mounting groove 14161 is used to clamp the magnet 1416. Due to manufacturing errors, the size of the magnet mounting groove 14161 would be too small to be fitted to the magnet 1416, or the size of the magnet mounting groove 14161 would be too large to clamp the magnet 1416. The magnet 1416 would shake in the magnet mounting groove 14161. However, in this embodiment, the magnet 1416 is clamped by the magnet limiting rib so as to well avoid the influence caused by the manufacturing error. The magnet limiting rib is in interference fit with the magnet 1416 in the dimension design. The interference amount is compensated by the deformation of the magnet limiting rib, so as to eliminate the influence caused by the manufacturing error. The magnet limiting rib is provided with a guide slope at the entrance of the magnet mounting groove 14161 to help where magnet 1416 to be arranged and prevent the situation where the interference amount of the magnet limiting rib is too large and the magnet 1416 cannot be arranged. The second function of the magnet limiting rib is to ensure that the lower surface of the magnet 1416 is fit to the bottom wall of the magnet mounting groove 14161, because if there is no magnet limiting rib, the magnet 1416 is clamped by the side wall of the magnet mounting groove 14161, and there is a fillet between the side wall and the bottom wall of the magnet mounting groove 14161. If the fillet is greater than the fillet of the magnet 1416, the lower surface of the magnet 1416 cannot be fit to the bottom wall of the magnet mounting groove 14161, thus weakening the attraction force of the magnet 1416 to the magnetic attraction member 1422. However, in this embodiment, the magnet 1416 pushed away from the side wall of the magnet mounting groove 14161 by the magnet limiting rib, so that the fillet of the magnet mounting groove 14161 has no effect on the magnet 1416. The lower surface of the magnet 1416 can be fit to the bottom wall of the magnet mounting groove 14161.

Furthermore, as shown in FIG. 8, the magnet 1416 is shaped as a rectangular parallelepiped. Four of the magnets 1416 are arranged by groups in pairs on both ends of the upper housing 141 respectively. Two of the magnets 1416 on the same end are connected head to tail and are arranged in a similar line shape at intervals. In a specific embodiment, the magnet 1416 is a long strip-shaped rectangular parallelepiped. Accordingly, the magnet mounting groove 14161 is a long strip rectangular parallelepiped groove. In other embodiments, the magnet 1416 may be square or in other shapes. Since the magnet 1416 is located at both ends of the upper housing 141, during the pressing process of the key 11, the magnetic attraction member force of the magnet 1416 attracts the upper housing 141 at the both ends of the upper housing 141 due to the principle of lever. The upper housing 141 is not easy to tilt during the pressing process of the key 11, so that the upper housing 141 is not easy to disengage from the upper housing 141. Since the two magnets 1416 located at the same end are connected head-to-tail and arranged in a similar "line" shape at intervals, the two magnets 1416 can cover the length of the upper housing 141 in the distribution direction of the magnets 1416 as far as possible, so as to improve the magnetic attraction member force between the magnet 1416 and the magnetic attraction member 1422.

Further, as shown in FIG. 11, the outer side wall of the lower housing 142 is provided with a first positioning portion 1424. The inner side wall of the upper housing 141 is provided with a second positioning portion 1418. The second positioning portion 1418 is sleeved on the first positioning portion 1424 when the upper housing 141 is covered on the lower housing 142, and the inner surface of the second positioning portion 1418 at least partially abuts against the outer surface of the first positioning portion 1424, so that the upper housing 141 is positioned horizontally by the lower housing 142. In a specific embodiment, as shown in FIG. 11, the inner side wall of the upper housing 141 includes two first inner side walls provided with the magnet mounting groove 14161, and two second inner side walls adjacent to the two first inner side walls. The two second inner side walls are respectively convexly provided with a square protrusion 14181. The square protrusion 14181 and the magnet mounting groove 14161 together form the second positioning portion 1418. The positioning rib 14241 protrudes outwards from the lower housing 142 at the first outer side wall 14231 and the second outer side wall 14232, respectively. The positioning rib 14241 forms the first positioning portion 1424 together with the third abutting portion 14238 and the fourth abutting portion 14239.

Further, as shown in FIG. 11, the first positioning portion 1424 is provided with a guide portion 14242 towards the second positioning portion 1418. The guide portion 14242 is provided as an inclined surface, so that the second positioning portion 1418 is sleeved into the first positioning portion 1424.

Further, as shown in FIG. 11, the magnetic attraction member 1422 is at least partially accommodated in the upper housing 141. A lower end surface of the magnetic attraction member 1422 is flush with or protrudes from a lower end surface of the upper housing 141. In a specific embodiment, a distance between a surface of a side of the magnet mounting groove 14161 facing towards the magnetic attraction member 1422 and a lower end surface of the upper housing 141 is less than or equal to a thickness of the magnetic attraction member 1422, so that the lower surface of the magnetic attraction member 1422 is flush with or protrudes from the lower end surface of the upper housing 141. Advantageously, the magnetic attraction member 1422 is a sheet metal part 14221. When the sheet metal part 14221 is screwed on the wall, the upper housing 141 does not abut against the wall surface, resulting in a situation where a face of a side of the magnet mounting groove 14161 towards the sheet metal part 14221 does not abut against the sheet metal part 14221, resulting in a reduction of the magnetic suction force.

As shown in FIGS. 16 and 15, the specific connection structure of the power supply board 17 being arranged on the lower housing 142 is that the inner wall of the lower housing 142 is provided with a power supply board limiting rib 1425 for abutting against a side surface of the power supply board 17 to pre-position the power supply board 17. The lower housing 142 is provided with a power supply board positioning post 1429 from bottom to top. The power supply board 17 is provided with a power supply board positioning hole 174 at a corresponding position of the power supply board positioning post 1429. The power supply board positioning post 1429 is inserted into the power supply board positioning hole 174 of the power supply board 17 so as to position the power supply board 17 in the horizontal direction. The lower housing 142 is provided with a power supply board mounting portion which is provided with a power supply board bolt hole 14291. The power supply board 17 is placed on the power supply board mounting portion so as to be supported by the power supply board mounting portion and is bolt-fastened to the power supply board bolt hole 14291 via the power supply board 17.

Figures 28, 29:
FIG. 28 is a structural diagram of an embodiment of the present invention.
FIG. 29 is a structural diagram of a power supply board according to an embodiment of the present invention.

Further, as shown in FIG. 29, the power supply board 17 is provided with at least three wiring posts 171 towards the bottom of the lower housing 142 for connecting the external power supply line and a controlled apparatus. The wiring post 171 is electrically connected to the power supply board 17. Specifically, the wiring post 171 is welded to the power supply board 17. The wiring post 171 is a metal conductive post extending from the power supply board 17 towards the bottom of the lower housing 142 for connecting a live wire, a neutral wire and a controlled electric appliance. In this embodiment, the power supply board 17 is welded with six wiring posts 171. Two of the wiring posts 171 are connected to the neutral wire and the live wire, and the other four wiring posts 171 are electrically connected to a live wire interface of four controlled apparatuses. The four wiring posts 171 connected to the controlled apparatuses are electrically connected to the power supply board 17 via a relay 175. The power supply board 17 can control the on-off of the four controlled apparatuses via the relay 175. The relay 175 is welded to the power supply board 17.

Furthermore, as shown in FIG. 17, the side surface of the lower housing 142 is provided with a plurality of strip-shaped heat dissipation holes 1427 in the vertical direction. Each of the heat dissipation holes 1427 is arranged side by side in the horizontal direction. The heat dissipation holes 1427 extend upwards from the bottom of the lower housing 142 by a height of less than 13 mm. Since an AC/DC conversion module 176 (as shown in FIG. 29), a relay 175 and other electronic components are arranged on the power supply board 17, the functions of the power supply board 17 at least include converting 220V alternating current into direct current via the AC/DC conversion module 176 and controlling the on/off of each controlled apparatus via the relay 175. The power of the controlled apparatus originates from the power supply board 17, so the power supply board 17 will generate more heat. In order to prevent the power supply board 17 from overheating to damage a circuit, a heat dissipation hole 1427 is provided on the side surface of the lower housing 142 from the bottom to the top. The positions of the heat dissipation holes 1427 correspond to the electronic components on the power supply board 17 for assisting the power supply board 17 to dissipate heat. In addition, the heat dissipation hole 1427 extends upwards by less than 13 mm in height to prevent the user from seeing the internal electronic components through the heat dissipation hole 1427 to affect the aesthetic appearance.

Furthermore, as shown in FIG. 16, the lower housing 142 places a wiring module 172 at a position corresponding to the end portion of the wiring post 171. The wiring module 172 includes a wiring sleeve 1721 and a wiring bolt 1722. The wiring sleeve 1721 is sleeved on the wiring post 171. The side wall of the wiring sleeve 1721 is provided with a threaded hole adapted to the wiring bolt 1722. The wiring bolt 1722 can be screwed into the threaded hole and presses the wiring post 171 against the inner wall of the wiring sleeve 1721. The wiring bolt 1722 pressing the wiring post 171 against the inner wall of the wiring sleeve 1721 can be understood that a wire passes through the wiring sleeve 1721 and is placed between the wiring post 171 and the inner wall of the wiring sleeve 1721. The wiring post 171 is pressed against the inner wall of the wiring sleeve 1721 by the wiring bolt 1722, so that the wiring post 171 and the wiring sleeve 1721 clamp and fix the wire, and the wiring post 171 contact and conduct electricity with the wire. It should be noted that the width of the wiring sleeve 1721 in the axial direction of the wiring bolt 1722 is at least 3 times greater than the width of the wiring post 171, so that a gap is left between the wiring sleeve 1721 and the wiring post 171 to allow a wire to pass through. The wiring post 171 has an arc shape sheet-like structure. A face of the wiring sleeve 1721 abutting against the wiring post 171 has an arc-shape adapted to the shape of the wiring post 171, so that the wiring post 171 and the wiring sleeve 1721 clamp the wire more tightly. At the same time, a face of the wiring post 171 abutting against the wiring sleeve 1721 is processed with transverse stripes, so that the wiring post 171 presses the wire more firmly and prevents the wire from falling off.

Further, as shown in FIGS. 16 and 17, the wiring bolt 1722 includes a nut 17221 and a screw rod 17222 which are integrally formed. A side surface of the lower housing 142 is provided with a plurality of first wiring through holes 14261 at corresponding positions of the wiring module 172. The diameter of the first wiring through holes 14261 is greater than the diameter of the nut 17221, so that the nut 17221 is inserted into the first wiring through holes 14261 from the inside of the lower housing 142 and is at least partially exposed to the outside of the lower housing 142. The lower housing 142 exposed at least partially to the outside can be understood that an end portion of the nut 17221 of the wiring bolt 1722 away from the screw rod 17222 is exposed to the outside of the lower housing 142, the nut 17221 end being provided with a "cross"-shaped or "line"-shaped screwing opening to facilitate the screwing of the screwdriver. A plurality of second wiring through holes 14262 are provided on the bottom surface of the lower housing 142 at corresponding positions of the wiring post 171. A wire is inserted from the second wiring through holes 14262 at least through between the wiring post 171 and the wiring sleeve 1721. When the wiring bolt 1722 is screwed towards the inside of the wiring sleeve 1721 to abut against the wiring post 171, the wiring bolt 1722 continues to be screwed to drive the wiring sleeve 1721 to move left. The wire is clamped between the wiring post 171 and the inner wall of the wiring sleeve 1721, so that the wire and the wiring post 171 are pressed together to realize electrical conduction.

Furthermore, as shown in FIGS. 17 and 15, a stopper portion 17223 is provided between the nut 17221 and the screw rod 17222. The stopper portion 17223 is a circular ring structure provided along the circumference of the nut 17221. The outer diameter of the stopper portion 17223 is greater than the diameter of the nut 17221 and the aperture of the first wiring through hole 14261, so that the stopper portion 17223 cannot pass through the first wiring through hole 14261. An inner wall of the lower housing 142 provided with the first wiring through hole 14261 is provided as a first inner wall. The wiring bolt 1722 is placed downwards from above the lower housing 142. The nut 17221 is placed into the first wiring through hole 14261. The vertical displacement of the wiring bolt 1722 is limited by the first wiring through hole 14261. An end of the screw rod 17222 away from the nut 17221 is abutted by the wiring post 171, which, together with the first inner wall, sandwiches the stopper portion 17223 and the screw rod 17222 to limit the horizontal displacement of the wiring bolt 1722.

Specifically, the wiring bolt 1722 is inserted downwards from above the lower housing 142, pressed by the wiring post 171 and pushed into the first wiring through hole 14261. The vertical displacement of the wiring bolt 1722 is limited by the first wiring through hole 14261, while the wiring post 171 and the inner wall of the lower housing 142 sandwich the wiring bolt 1722 to limit the horizontal displacement of the wiring bolt 1722. In a specific embodiment, the lower housing 142 is provided with a wiring module placing groove 14264 shaped to fit the wiring module 172 to limit displacement of the wiring module 172 in a horizontal direction perpendicular to the axial direction of the wiring bolt 1722. The wiring module placing groove 14264 is provided with a bolt limiting rib 14265 from the upper portion of the lower housing 142 towards the bottom of the lower housing 142. The nut 17221 of the wiring bolt 1722 is limited between the bolt limiting rib 14265 and the inner wall of the lower housing 142 so as to limit the movement of the wiring bolt 1722 towards the inner side of the lower housing 142. The side edge of the power supply board 17 is firstly pre-positioned against the power supply board limiting rib 1425 and placed obliquely downwards into the lower housing 142, so that the wiring post 171 is placed obliquely into the lower housing 142, and then turns to a vertical state. When the wiring post 171 turns from oblique to vertical, the wiring bolt 1722 is pressed by the wiring post 171 and pushed into the first wiring through hole 14261. The distance between the bolt limiting rib 14265 and the first inner wall of the lower housing 142 is greater than the height of the nut 17221 of the wiring post 171 bolt, so that the wiring post 171 bolt can be lowered into the wiring module placing groove 14264 from the upper portion of the wiring module placing groove 14264. The wiring bolt 1722 is placed downwards from above the lower housing 142. The nut 17221 is pushed into the first wiring through hole 14261 to limit the vertical displacement of the wiring bolt 1722 by the first wiring through hole 14261. When the power supply board 17 is arranged on the lower housing 142, an end of the screw rod 17222 away from the nut 17221 is pressed by the wiring post 171, so that the wiring post 171 and the first inner wall sandwich the stopper portion 17223 of the wiring bolt 1722 and the screw rod 17222 to limit the horizontal displacement of the wiring bolt 1722.

Further, as shown in FIG. 17, the distance between the portion where the wiring post 171 abuts against the screw rod 17222 and the first inner wall is less than the total length of the wiring bolt 1722. Therefore, after the wiring module 172 is placed into the wiring module placing groove 14264 from above the lower housing 142, when the power supply board 17 is put into the lower housing 142, the wiring post 171 bears against the tail end of the screw rod 17222 of the wiring bolt 1722, pushes the wiring bolt 1722 towards the first side wall, and the nut 17221 is pushed into the first wiring through hole 14261, so that the wiring module 172 is limited in the vertical direction, preventing the wiring module 172 from moving up and down or tilting during transportation.

The spacing between the bolt limiting rib 14265 and the first side wall is greater than the sum of the thicknesses of the nut 17221 and the stopper portion 17223 of the wiring bolt 1722, so that the wiring bolt 1722 can be put into the wiring module placing groove 14264 without interference. The first inner wall is convexly provided with a stop limiting portion 14266 at a corresponding position of the stopper portion 17223. The stop limiting portion 14266 can limit the displacement of the stopper portion 17223 to the left, so that the wiring bolt 1722 is limited between the wiring post 171 and the stop limiting portion in the axial direction, further limiting the displacement of the wiring bolt 1722, and preventing the wiring bolt 1722 from shaking. The height of the stop limiting portion 14266 protruding from the first inner wall is less than the height of the nut 17221 of the wiring bolt 1722, so that the nut 17221 can partially protrude into the first wiring through hole 14261. The spacing between the wiring post 171 and the catching stopper is greater than the sum of the length of the screw rod 17222 of the wiring bolt 1722 and the thickness of the stopper portion 17223, so that the wiring post 171 does not interfere with the wiring bolt 1722, and the wiring bolt 1722 does not bend the wiring post 171.

Furthermore, as shown in FIG. 19, the PCB board 16 and the power supply board 17 are provided with a pin header 161 and a female header 173 capable of cooperating with each other. One of the pin header 161 and the female header 173 is arranged on the PCB board 16 and the other is arranged on the power supply board 17. The pin header 161 is inserted to the female header 173 so as to realize the electrical connection between the PCB board 16 and the power supply board 17. In a specific embodiment, the PCB board 16 is arranged above the power supply board 17. The PCB board 16 is welded with a pin header 161 towards the power supply board 17. The power supply board 17 is welded with a female header 173 capable of cooperating with the pin header 161 at the corresponding position of the pin header 161. The pin header 161 is inserted to the female header 173 so as to realize the electrical connection between the PCB board 16 and the power supply board 17.

In addition, the PCB board 16 and the power supply board 17 can also be connected via a metal contact. Specifically, the PCB board 16 is provided with a plurality of metal contacts (not shown in the figure) facing towards the power supply board 17. The power supply board 17 is provided with an abutting post having a conductive capability at a corresponding position of the metal contacts. The abutting post is electrically connected to the power supply board 17, and the metal contact abuts the abutting post so as to realize the electrical connection between the PCB board 16 and the power supply board 17. A resilient connection member is provided between the abutment post and the power supply board 17. The abutment post compresses the resilient connection member in response to the abutting force of the metal contact. The resilient connection member generates an resilient deformation and a reaction force against the resilient deformation, so that the abutment post generates a compression displacement and a rebound force against the compression displacement. The function of the resilient connection member is that since there are machining errors and different lengths of the plurality of abutment posts, the resilient connection member provides an elastic force for the abutment posts, so that the plurality of abutment posts can all abut against the metal contact, ensuring good conduction.

Figure 20:
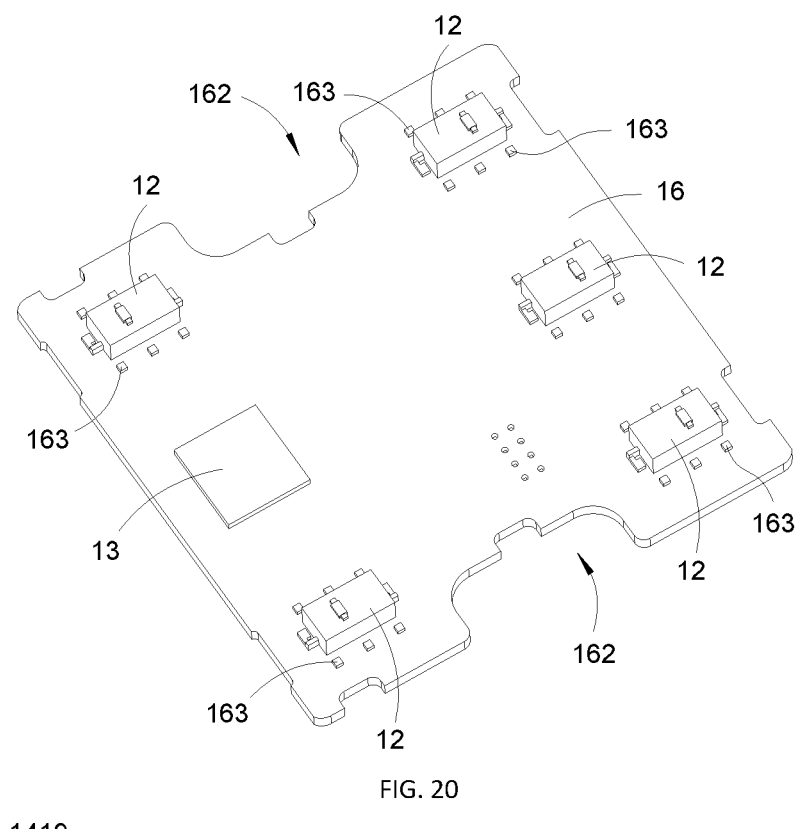
FIG. 20 is a structural diagram of a PCB board according to an embodiment of the present invention.

Further, as shown in FIGS. 19 and 20, the PCB board 16 is arranged in the lower housing 142. Two opposing side walls of the lower housing 142 are recessed inwardly to form two opposing U-shaped recesses 1428. The PCB board 16 is provided with a U-shaped notch 162 penetrating at a position opposite the U-shaped recess 1428, with the position and shape of the U-shaped notch 162 matched with the U-shaped recess 1428 to position the PCB board 16 in a horizontal direction. The position and shape of the U-shaped notch 162 matched with the U-shaped recess 1428 can be understood that the width of the U-shaped notch 162 is matched with the width of the U-shaped recess 1428, and the distance between two U-shaped notches 162 is matched with the distance between two U-shaped recesses 1428, so that the outer wall of the U-shaped notch 162 abuts against the inner wall of the U-shaped recess 1428, and the PCB board 16 is limited by the lower housing 142 in the horizontal direction.

The lower housing 142 is provided with a PCB board 16 support portion for abutting against a lower surface of the PCB board 16 to support the PCB board 16. The lower housing 142 is provided at an upper end thereof with an isolation cover 18 extending downward out of a PCB board abutment portion 181 for abutting against the upper surface of the PCB board 16 to vertically limit the PCB board 16. The PCB board 16 support portion can be understood as a support rib extending from the inner side wall of the lower housing 142. The PCB board abutment portion 181 is an abutting rib extending from and along the circumference of the edge of the isolation cover 18 towards the lower housing 142. In addition, as shown in FIG. 13, the sheet metal part 14221 is provided with the screw holes 14222 at the opposite positions of two the U-shaped recesses 1428 of the lower housing 142, so as to save the space occupied by the screw holes 14222.

In some embodiments, as shown in FIG. 46, a gradienter 147 is arranged on a side of the lower housing 142 facing towards the key 11 for indicating a levelness when the intelligent switch is mounted on a mounting surface. The gradienter 147 is provided as a cylindrical bubble level 147.

In a specific embodiment, a gradienter 147 snap is arranged on the isolation cover 18. The bubble gradienter 147 is snap-fitted and fixed to the isolation cover 18. When a user installs a switch to a mounting surface such as a wall, a cabinet or a desktop, it can be seen through the bubble gradienter 147 whether the switch is arranged askew, so as to facilitate wall positioning and drilling.

In another embodiment, as shown in FIGS. 47-50, the upper housing 141 is provided with a PCB board mounting housing 148 towards the lower housing 142. The upper housing 141 is covered on the PCB board mounting housing 148 and forms a cavity with the PCB board mounting housing 148. The PCB board 16 is provided inside the cavity and is fixedly connected to the PCB board mounting housing 148. The upper housing 141 being covered on the PCB board mounting housing 148 can be understood that the PCB board mounting housing 148 is a trough-shaped structure with an open top, which is fixedly mounted below the upper housing 141, and the upper housing 141 is covered at the open top of the PCB board mounting housing 148. The PCB board 16 being provided in the cavity can be understood that the PCB board 16 is fixedly mounted in the trough-shaped structure of the PCB board mounting housing 148 and is covered under the upper housing 141. The advantage of arranging the PCB board 16 on the upper housing 141 is that the chain of error sizes between the detection member 12 and the abutting portion 113 is shortened, so that it is easy to control the positioning accuracy between the abutting portion 113 and the detection member 12. Specifically, since the key 11 is connected to the upper housing 141, and the PCB board 16 is fixedly connected to the upper housing 141 via the PCB board mounting housing 148, the positioning reference of the key 11 and the PCB board 16 is both the upper housing 141. The positioning accuracy between the two is high, and the detection member 12 is welded to the PCB board 16. As the abutting portion 113 protrudes from the key 11, the positioning error between the detection member 12 and the abutting portion 113 is small. The requirement for machining accuracy is reduced, and the manufacturing cost is reduced. In comparison with the above embodiment in which the PCB board 16 is fixedly arranged on the lower housing 142, the key 11 is provided to the upper housing 141. The lower housing 142 is detachably connected to the upper housing 141, so that the positioning reference between the detection member 12 and the abutting portion 113 is changed a plurality of times, resulting in the accumulation of size chains. The accumulation of errors in each size results in a larger error. It is necessary to control the machining accuracy of parts to reduce the error, resulting in an increase in manufacturing cost. Mounting the PCB board 16 to the upper housing 141 does not have this problem, so that the dimensional tolerance design is simplified.

Figure 48:
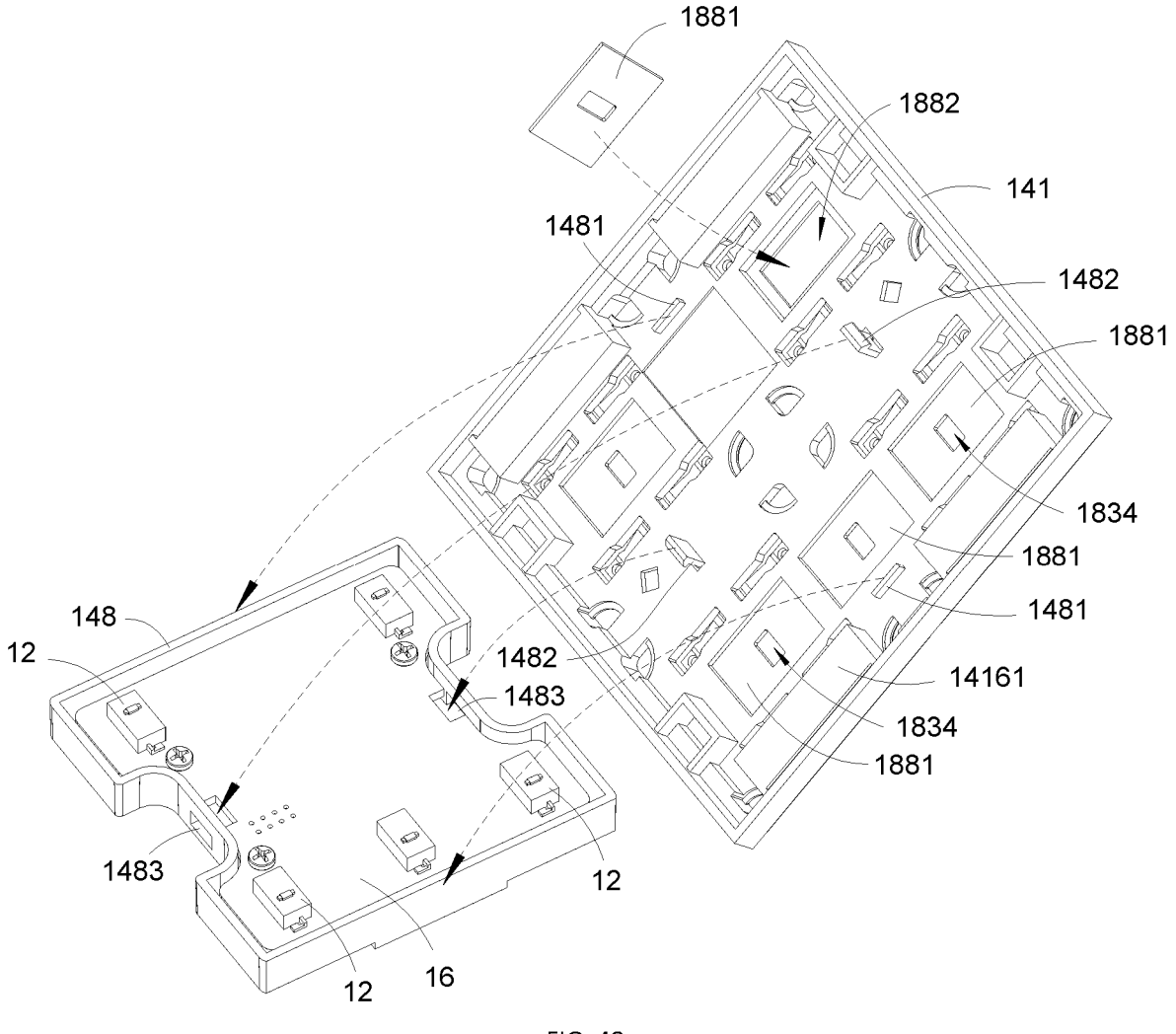
FIG. 48 is a structural diagram of a PCB board mounting housing according to an embodiment of the present invention.
Figure 49:
FIG. 49 is a structural diagram of an embodiment of the present invention.

Further, as shown in FIG. 48, the internal shape of the PCB board mounting housing 148 matches the shape of the PCB board 16. The PCB board mounting housing 148 is sleeved on the PCB board 16 and positions the PCB board 16 in a horizontal direction. The PCB board 16 is fixedly arranged on the PCB board mounting housing 148 by screws. The internal shape of the PCB board mounting housing 148 matching the shape of the PCB board 16 can be understood that the inner wall of the PCB board mounting housing 148 at least partially abuts against the side wall of the PCB board 16, so that the PCB board mounting housing 148 positions the PCB board 16 in a horizontal direction. As shown in FIGS. 49 and 48, in order to enable the PCB board mounting housing 148 to be fitted into the bottom housing 19, the outer shape of the PCB board mounting housing 148 conforms to the shape of the inner wall of the bottom housing 19. Since bolt mounting holes are reserved on both side surfaces of the bottom housing 19, both side surfaces of the bottom housing 19 are inwardly recessed and both side walls of the PCB board mounting housing 148 are inwardly recessed. Furthermore, both sides of the PCB board 16 are also inwardly recessed. The PCB board 16 being fixedly arranged on the PCB board mounting housing 148 by means of screws can be understood that the PCB board mounting housing 148 is provided with at least two threaded connecting posts protruding towards the PCB board 16 and supported on the lower surface of the PCB board 16. The threaded connecting posts are threaded. The PCB board 16 is fixed to the threaded connecting posts by means of screws. In the present embodiment, the PCB board 16 is fixed to the threaded connecting posts by means of three screws.

Furthermore, as shown in FIG. 48, the detection member 12 is welded to the PCB board 16. The PCB board 16 is welded with a LED lamp 163 (not shown in the figure) around the detection member 12. A light uniforming piece 1881 is provided between the detection member 12 and the upper housing 141. The light emitted by the LED lamp 163 is uniformed by the light uniforming piece 1881 and then projected onto the lower surface of the key 11. The upper housing 141 is concavely provided with a light uniforming piece mounting groove 1882 adapted to the outer shape of the light uniforming piece 1881 towards the light uniforming piece 1881. When the upper housing 141 is covered on the PCB board mounting housing 148, the light uniforming piece 1881 is limited by the light uniforming piece mounting groove 1882. The lower surface of the light uniforming piece 1881 abuts against the detection member 12 and is supported by the detection member 12.

Furthermore, as shown in FIGS. 48 and 49, the upper housing 141 is provided with a PCB housing positioning portion 1481 and a PCB housing snap 1482 towards the PCB board mounting housing 148. The PCB board mounting housing 148 is provided with a second snap-fit position 1483 adapted to the PCB housing snap 1482 at a corresponding position of the PCB housing snap 1482. When the upper housing 141 is covered on the PCB board mounting housing 148, the PCB housing positioning portion 1481 abuts against an outer side wall of the PCB mounting housing so as to position the PCB mounting housing. The PCB housing snap 1482 snaps into the second snap-fit position 1483 such that the PCB mounting housing is fixedly arranged on the upper housing 141.

Furthermore, as shown in FIG. 49, an insulation plate 149 is provided between the power supply board 17 and the PCB board mounting housing 148. The insulation plate 149 is fixedly connected to the lower housing 142. The insulation plate 149 is provided with a pin header passing hole 1491 at a corresponding position of the pin header 161. The size of the pin header passing hole 1491 is adapted to the size of the pin header 161 and the female header 173, so that the pin header 161 passes through the pin header passing hole 1491 and is inserted into the female header 173. The insulation plate 149 is fixed to the lower housing 142 by screws, and an abutment portion of the power supply board 17 protrudes downward of the insulation plate 149 for press-fixing the power supply board 17 to the lower housing 142. The function of the insulation plate 149 is to isolate the power supply plate 17. Since the PCB is connected to the upper housing 141, and the PCB board 16 is electrically connected to the power supply board 17 via the pin headers 161 and the female header 173, the PCB board 16 is separated from the power supply board 17 when the upper housing 141 is opened. In order to prevent the power supply board 17 from being exposed to the outside, resulting in the risk of electric shock to the user, an insulation plate 149 is provided between the PCB board 16 and the power supply board 17, which also meets the requirements of safety regulations.

Further, the outer side wall of the lower housing 142 is provided with a first positioning portion 1424. The inner side wall of the upper housing 141 is provided with a second positioning portion 1418. The second positioning portion 1418 is sleeved on the first positioning portion 1424 when the upper housing 141 is covered on the lower housing 142, and the inner surface of the second positioning portion 1418 at least partially abuts against the outer surface of the first positioning portion 1424, so that the upper housing 141 is positioned horizontally by the lower housing 142. Detailed technical details regarding the first positioning portion 1424 and the second positioning portion 1418 are set forth above and will not be described in detail herein.

Figures 50, 51:
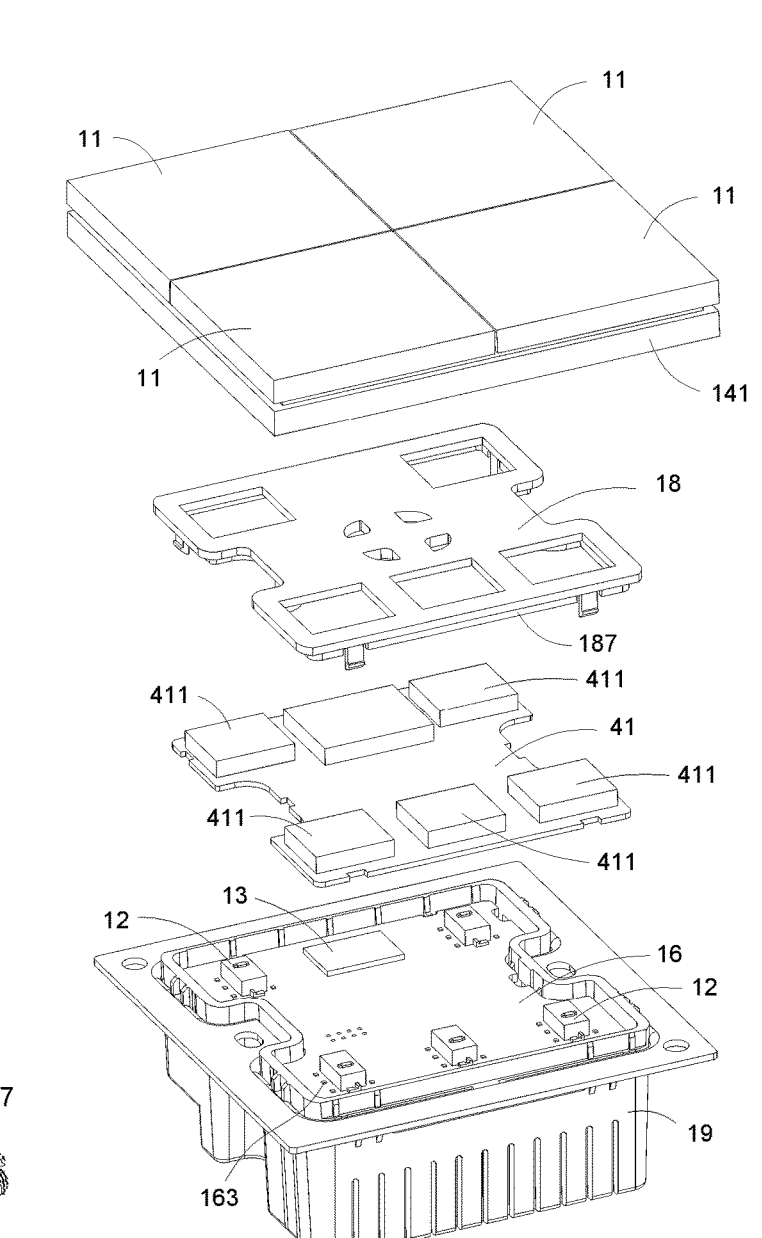
FIG. 50 is a schematic diagram of an on-off switch according to an embodiment of the present invention.
FIG. 51 is a structural diagram of an embodiment of the present invention.

In some embodiments, as shown in FIG. 50, the power supply board 17 is provided with an on-off switch 177 for controlling the on-off of the AC power of the power supply board 17. The on-off switch 177 is provided as a mechanical switch. It is welded to the power supply board 17, which can cut off the alternating current power supply, can play the role of power-off protection when the switch is arranged, can limit the use of the intelligent switch, and can also realize the power-off restart of the intelligent switch system.

Furthermore, as shown in FIG. 50, the PCB board 16 is provided with a first keep-space hole 1771 penetrating at a corresponding position of the on-off switch 177. A surface of the lower housing 142 facing towards one side of the key 11 is provided with a second keep-space hole 1772 penetrating at a corresponding position of the on-off switch 177. The shapes of the first keep-space hole 1771 and the second keep-space hole 1772 are adapted to the on-off switch 177, so that the on-off switch 177 at least partially protrudes from the lower housing 142 after passing through the first keep-space hole 1771 and the second keep-space hole 1772. The surface of a side of the lower housing 142 towards the key 11 can be understood as the upper surface of the lower housing 142, i.e. the upper surface of the isolation cover 18. A power-on switch is arranged on the power supply board 17 and passes through the upper PCB board 16 and the isolation cover 18 to expose the isolation cover 18, so that the upper housing 141 is uncovered and the on-off switch 177 is pressed. The on-off of the power supply board 17 and the PCB board 16 are controlled by the on-off switch 177.

Furthermore, as shown in FIGS. 20 and 21, the PCB board 16 is respectively provided with at least one LED lamp 163 at the corresponding position of each of the keys 11. The light emitted by the LED lamp 163 is projected onto the first surface of the keys 11. The first surface is provided as a face of the key 11 towards the housing 14. The first surface is the lower surface of the key 11. There are a plurality of LED lamps 163 corresponding to each key 11. The LED lamps 163 are arranged symmetrically around the corresponding detection members 12 of the keys 11. In a specific embodiment, the PCB board 16 is symmetrically welded with four or six LED lamps 163 on both sides of each detection member 12.

Figures 22, 23:
FIG. 22 is a structural diagram of a key according to an embodiment of the present invention.
FIG. 23 is a structural diagram of an embodiment of the present invention.

Furthermore, as shown in FIG. 22, the key 11 is provided with a light guide portion 114. The light emitted by the LED lamp 163 is guided out to a third surface of the key 11 by the light guide portion 114. The third surface is provided as a face of the key 11 away from the housing 14. The shape of the light guide 114 is set to a predetermined shape such that the light guide 114 displays a predetermined pattern 1141 corresponding to the predetermined shape on the third surface of the key 11. The light guide portion 114 is integrally formed or fixedly connected to the key 11, and can guide the light on the inner side of the key 11 to the outer side of the key 11. Specifically, the key 11 is formed by injection molding of a light-transmitting material. The outer surface of the key 11 is coated with an opaque coating 117. The predetermined pattern 1141 is laser-carved on the outer surface of the key 11, so that the opaque coating 117 is laser-carved and removed to form the light guide portion 114. The light of LED penetrates out at the laser-carved part of the key 11, and the predetermined pattern 1141 is displayed on the outer surface of the key 11. The predetermined pattern 1141 includes graphics or text. The scheme of using the upper housing 141 to magnetically cooperate with the laser carving of the key 11 enables a user to freely select a predetermined pattern 1141, or to select a combination of multiple patterns. The upper housing 141 can be rapidly switched in cooperation with the magnetic attraction member structure, thereby rapidly switching the display content of the key 11.

Further, as shown in FIG. 21, the PCB board 16 is provided in the lower housing 142. The lower housing 142 includes a bottom housing 19 and an isolation cover 18 which is covered on the bottom housing 19 and forms an accommodating cavity with the bottom housing 19. The PCB board 16 is received inside the accommodating cavity. Specifically, the isolation cover 18 is clamped to the bottom housing 19 via an isolation cover snap 186. At least one isolation cover snap 186 is provided along the edge of the isolation cover 18 towards the bottom housing 19. The isolation cover 18 is clamped to the bottom housing 19 via the isolation cover snap 186. The bottom housing 19 is a trough-shaped housing 14 with an upper end opening. The shape of the isolation cover 18 is adapted to the shape of the upper end opening of the bottom housing 19. The circumference of the isolation cover 18 extends outwards to form a snap-fit brim 182 in a circumferential direction. The isolation cover 18 is covered at the upper end opening of the bottom housing 19. The snap-fit brim 182 is fitted on the upper end face of the bottom housing 19. The isolation cover 18 has an electrical isolation function. Since the power supply board 17 is loaded with strong electric power, the power supply board 17 and the PCB board 16 cannot be exposed to the outside, so as to prevent the user from having a risk of electric shock after the upper housing 141 is opened.

Furthermore, as shown in FIGS. 8 and 11, a first forward mark 14171 is arranged on a face of the upper housing 141 facing towards the key 11 for indicating a positive direction of the upper housing 141. A second forward mark 14172 is arranged on a face of the upper housing 141 towards the isolation cover 18. A third forward mark 185 is arranged on a face of the isolation cover 18 towards the upper housing 141. The second forward mark 14172 corresponds to the indication direction of the third forward mark 185, so as to make mistake defense when the upper housing 141 is covered on the lower housing 142. The first forward mark 14171 can be an arrow, a text or a shape indication for making mistake defense when the key 11 is arranged.

As shown in FIGS. 21 and 19, the isolation cover 18 is arranged between the keys 11 and the PCB board 16. The isolation cover 18 is respectively provided with a light uniforming shade 183 at corresponding positions of each of the keys 11. The light uniforming shade 183 is covered on the LED lamp 163 corresponding to each of the keys 11. The light emitted by the LED lamp 163 is uniformed by the light uniforming shade 183 and then projected onto the keys 11. The isolation cover 18 being respectively provided with a light uniforming shade 183 at the corresponding position of each of the keys 11 can be understood that the light uniforming shade 183 is provided below the central position of the keys 11, the light uniforming shade 183 is located above the LED lamp 163, and the light emitted by the LED lamp 163 is uniformed by the light uniforming shade 183 and then projected to the keys 11. Specifically, four light uniforming shade snap 1831 extend towards the isolation plate. The isolation plate is provided with an isolation cover through hole 1832 with a shape matching the light uniforming shade 183. The side wall of the isolation cover through hole 1832 is provided with a light uniforming shade snap-fit position 1833. The four light uniforming shade snaps 1831 are fastened to the light uniforming shade snap-fit position 1833, so that the light uniforming shade 183 is clamped to the isolation plate. In a preferred embodiment, the light uniforming shade 183 is made of a transparent material, which is atomized, or made of an opaque material, such as a white light-transmitting plastic, which has light-transmitting properties and light-uniform properties. In a preferred embodiment, the light uniforming shade 183 is injection molded from PC plastic.

Further, as shown in FIGS. 19 and 21, the projection of the light uniforming shade 183 onto the third surface of the key 11 overlays the predetermined pattern 1141. The third surface is the upper surface of the key 11. Since the function of the light uniforming shade 183 is to uniformly distribute the light emitted by the LED and then project same to the light guide portion 114 and then the light guide portion 114 transmits the light so as to make the brightness of the light transmitted by the light guide portion 114 uniform, the surface of the light uniforming shade 183 facing towards the key 11 needs to cover the predetermined pattern 1141 of the light guide portion 114, so that the brightness of the predetermined pattern 1141 is uniform.

Further, as shown in FIGS. 19 and 21, the surface of a side of the light uniforming shade 183 facing towards the key 11 is rectangular. The light uniforming shade 183 is a rectangular parallelepiped cover opened at the bottom. The surface of a side of the light uniforming shade 183 towards the key 11 is the upper surface of the light uniforming shade 183. The surface of a side of the light uniforming shade 183 facing towards the key 11 is rectangular, square, circular or other shapes. In a preferred embodiment, the surface of a side of the light uniforming shade 183 facing towards the key 11 is rectangular. The light uniforming shade 183 is a rectangular parallelepiped cover opened at the bottom. The beneficial effect is that the predetermined pattern 1141 of the key 11 is generally text, including Chinese or English. The text is generally arranged in a transverse direction. It is beneficial to cover all the text by using the rectangular light uniforming shade 183, so that the text transmit uniformly. Furthermore, in some preferred embodiments, the intelligent switch has four keys 11 corresponding to four light uniforming shades 183. The use of rectangular light uniforming shade 183 has the function of making mistake defense.

Furthermore, as shown in FIGS. 19 and 21, the detection member 12 is covered on the light uniforming shade 183. The light uniforming shade 183 is provided with a contact-pressure through hole 1834 at a corresponding position of the detection member 12. The key 11 is provided with an abutting portion 113 at the corresponding position of the detection member 12. The abutting portion 113 passes through the contact-pressure through hole 1834 and is placed above the detection member 12. When the key 11 generates the displacement in response to the operation and control force, the abutting portion 113 abuts against and triggers the detection member 12. The light uniforming shade 183 being provided with a contact-pressure through hole 1834 at a corresponding position of the detection member 12 can be understood that the light uniforming shade 183 is covered above the detection member 12, and the contact-pressure through hole 1834 is provided directly above the detection member 12, so that the abutting portion 113 is placed directly above the detection member 12, thereby improving the reliability of triggering the detection member 12. As shown in FIGS. 9 and 6, the abutting portion 113 is a cylinder extending from the key 11 towards the detection member 12, with a cross section perpendicular to the extending direction thereof being a first cross section. The size of the contact-pressure through hole 1834 is greater than that of the first cross section. A certain gap exists between the abutting portion 113 and the contact-pressure through hole 1834. The first shape being composed of two rectangular shapes crossed with each other and perpendicular to each other can be understood that the first shape is a shape similar to a "cross", with the function thereof to prevent the local glue thickness of the abutting portion 113 from causing shrinkage during injection molding, thus affecting the triggering of the detection member 12. Since the movement generated when the key 11 is pressed is a combined movement of displacement and rotation, and the key 11 can be inclined in multiple directions, providing a certain gap between the abutting portion 113 and the contact-pressure through hole 1834 can prevent the abutting portion 113 from interfering with the contact-pressure through hole 1834 when the key 11 moves.

Further, as shown in FIGS. 19 and 21, the light uniforming shade 183 protrudes from the isolation cover 18. The height of the light uniforming shade 183 protruding from the isolation cover 18 is adapted to the distance between the isolation cover 18 and the PCB board 16, so that the distance between the surface of a side of the light uniforming shade 183 facing towards the key 11 and the PCB board 16 is greater than 3 mm. Since the light uniforming shade 183 is provided with a contact-pressure through hole 1834, a sufficient electric clearance and creepage distance between the light uniforming shade 183 and the PCB board 16 should be provided in order to prevent a user from touching the contact-pressure through hole 1834. The height of the light uniforming shade 183 protruding from the isolation cover 18 is designed so that the distance between the upper surface of the light uniforming shade 183 and the PCB board 16 is greater than 3 mm, ensuring the safety of the user.

Furthermore, as shown in FIGS. 8 and 11, the upper housing 141 is provided with a light-transmitting through hole 1419 having a shape matching that of the light uniforming shade 183 at a corresponding position of the light uniforming shade 183. When the upper housing 141 is covered on the lower housing 142, the light uniforming shade 183 is accommodated in the light uniforming shade light-transmitting through hole 1419. Specifically, the light uniforming shade 183 has a rectangular shape. Accordingly, the light uniforming shade light-transmitting through hole 1419 also has a rectangular through hole. The light uniforming shade light-transmitting through hole 1419 functions in that, firstly, light can be transmitted so that the light of the light uniforming shade 183 can be projected to the lower surface of the key 11. Secondly, the light uniforming shade 183 passes through the light uniforming shade light-transmitting through hole 1419 of the and is placed below the key 11, further shortening the distance between the light uniforming shade 183 and the key 11, and reducing the light attenuation.

In a preferred embodiment, as shown in FIG. 23, the number of the light uniforming shade 183 is one more than the number of the keys 11. Accordingly, the number of the light uniforming shade light-transmitting through holes 1419 is one more than the number of the keys 11. Specifically, there are four keys 11, five light uniforming shades 183, and five corresponding light uniforming shade light-transmitting through holes 1419 which are arranged corresponding to the light uniforming shades 183. The use of five light uniforming shades 183 facilitates the switching of key 11 between single and multiple keys, as described below. In addition, since the four keys 11 are arranged symmetrically and the four light uniforming shades 183 corresponding to the keys 11 are also arranged symmetrically, it is difficult to distinguish the corresponding relationship between the light uniforming shade light-transmitting through hole 1419 and the light uniforming shade 183 when the upper housing 141 is mounted. Thus, the light uniforming shade 183 is set to be five, which has a fool-proofing function, so that the corresponding relationship between the light uniforming shade light-transmitting through hole 1419 and the light uniforming shade 183 can be quickly found, and then the upper housing 141 is quickly mounted. In other embodiments, the number of light uniforming shades 183 is the same as the number of keys 11. As shown in FIG. 11, the light uniforming shades 183 correspond to the keys 11 by one to one, so that the use of the light uniforming shades 183 can be reduced to save costs.

In another embodiment, as shown in FIGS. 51-54, a waterproof light-transmitting member 41 is provided between the isolation cover 18 and the bottom housing 19. The waterproof light-transmitting member 41 is sealingly connected to the bottom housing 19 to form a sealed cavity with the bottom housing 19. The sealed cavity houses the detection member 12, the wireless communication module 13, the PCB board 16 and the LED lamp 163. The waterproof light-transmitting member 41 can be understood as a housing 14 with a waterproof function, which is made of soft materials such as silicone and rubber, and can also be made of plastic. It has the function of being sealingly connected to the bottom housing 19 to form a waterproof sealed cavity, which protects electronic components, has functions of being waterproof and moisture-proof, and at the same time has the function of electrical isolation.

Figure 52:
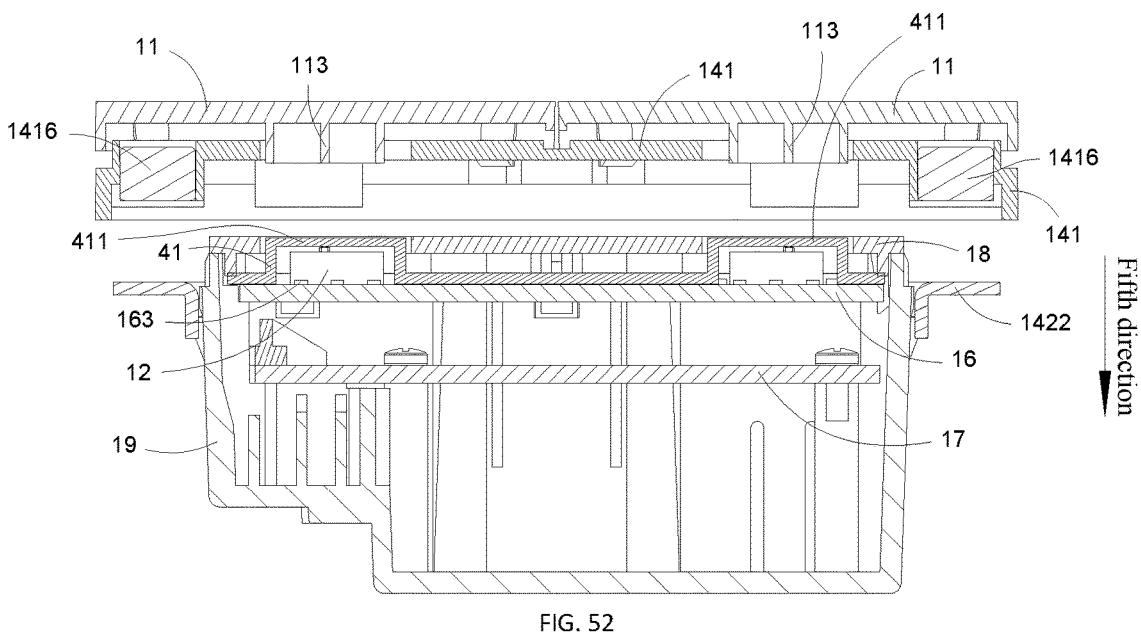
FIG. 52 is a cross-sectional view of an embodiment of the present invention.
Figure 53:
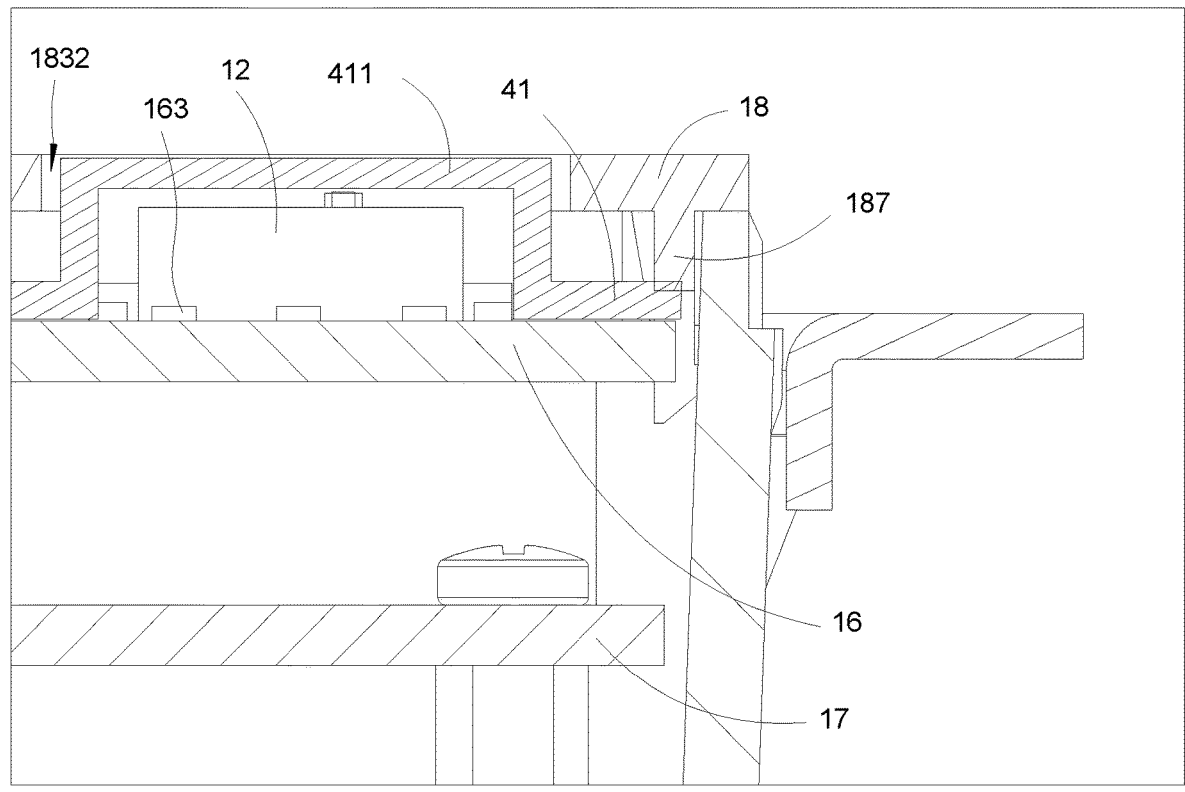
FIG. 53 is an enlarged partial view of an embodiment of the present invention.

Furthermore, as shown in FIGS. 52 and 53, a sealing portion 187 extends from a circumference of the isolation cover 18 towards the waterproof light-transmitting member 41. The sealing portion 187 presses the edge of the waterproof light-transmitting member 41 against the bottom housing 19 so as to achieve a sealed connection between the waterproof light-transmitting member 41 and the bottom housing 19. A direction in which the isolation cover 18 points towards the bottom of the bottom housing 19 is a fifth direction. A gap between the sealing portion 187 and the bottom housing 19 is less than a thickness of an edge of the waterproof and transparent member 41 in the fifth direction. The sealing portion 187 can be understood as an abutting rib around a circumference of the isolation cover 18. The sealing portion 187 pressing the edge of the waterproof light-transmitting member 41 against the bottom housing 19 can be understood that the sealing portion 187 and the bottom housing 19 sandwich the edge of the waterproof light-transmitting member 41 so as to achieve a sealing connection between the waterproof light-transmitting member 41 and the bottom housing 19. The gap between the sealing portion 187 and the bottom housing 19 being less than the thickness of the edge of the waterproof light-transmitting member 41 can be understood that the sealing portion 187 and the bottom housing 19 sandwich the edge of the waterproof light-transmitting member 41 in the middle in an interference fit manner to improve the sealing performance. The fifth direction is a direction indicated by the arrow in FIG. 52. In this embodiment, the fifth direction is the same as the third direction.

Furthermore, as shown in FIG. 52, the waterproof light-transmitting member 41 is provided with a light-transmitting portion 411 at a corresponding position of the LED lamp 163. The light-transmitting portion 411 is integrally formed or sealed with the waterproof light-transmitting member 41. The light-transmitting portion 411 is configured for transmitting light from one side to the other side. The light-transmitting portion 411 is arranged between the key 11 and the LED lamp 163. The light-transmitting portion 411 is made of a light-transmitting material and is used for transmitting the light emitted by the LED lamp 163 to the lower surface of the key 11. In addition, the light-transmitting portion 411 has a light-equalizing function, and can evenly distribute the light emitted by the LED lamp 163 and then project same to the light guide portion 114 of the key 11, so that the text or patterns displayed on the upper surface of the key 11 emit light uniformly. The sealed connection can be understood to mean a sealed connection, including gluing with a sealant or split injection molding or other connection that can be implemented. In a specific embodiment, the light-transmitting portion 411 and the waterproof light-transmitting member 41 are integrally injection-molded with white silicone so as to have the function of light transmission and light evenness.

Further, the light-transmitting portion 411 is provided between the light guide portion 114 and the LED lamp 163. The projection of the light-transmitting portion 411 onto the third surface of the key 11 covers the predetermined pattern 1141. The third surface is the upper surface of the key 11. The function of the light-transmitting portion 411 is to uniformly emit the light emitted by the LED lamp 163 and then project same to the light guide portion 114 of the key 11, so that the predetermined pattern 1141 on the upper surface of the key 11 emits light. Therefore, the light-transmitting portion 411 needs to cover the predetermined pattern 1141, so that all parts of the predetermined pattern 1141 can emit light and emit light uniformly.

Figure 54:
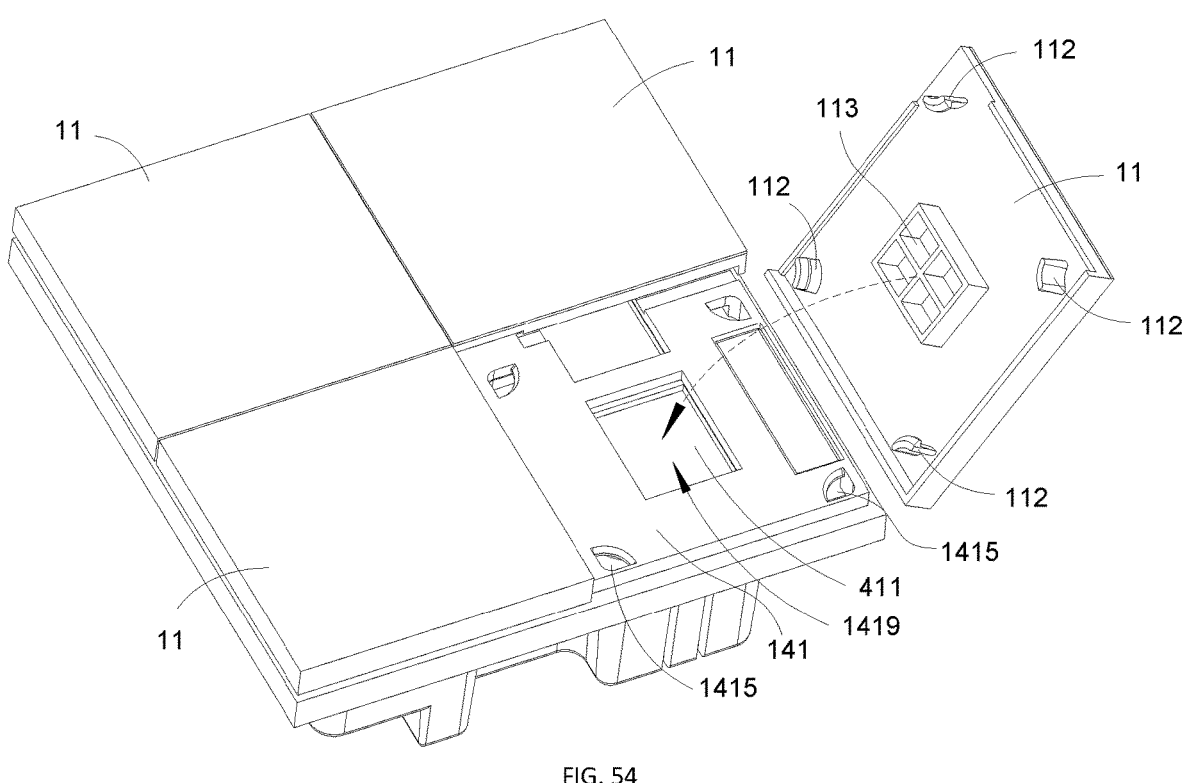
FIG. 54 is a structural diagram of a key according to an embodiment of the present invention.

Further, as shown in FIGS. 52 and 54, the light-transmitting portion 411 is provided between the key 11 and the detection member 12. The key 11 abuts against the light-transmitting portion 411 and the detection member 12 is triggered by the light-transmitting portion 411. The key 11 triggering the detection member 12 via the light-transmitting portion 411 can be understood that the key 11 abuts against the upper surface of the light-transmitting portion 411. Since the light-transmitting portion 411 is provided between the key 11 and the detection member 12, when the key 11 generates the displacement in response to the operation and control force, the key 11 presses and drives a part of the light-transmitting portion 411 to be displaced, and the light-transmitting portion 411 presses and triggers the detection member 12. The advantage of pressing the key 11 indirectly against the detection member 12 by the light-transmitting portion 411 is that since the light-transmitting portion 411 is made of a soft material, it has a cushioning effect on the pressing of the key 11, preventing the detection member 12 from being damaged when the pressing force of the key 11 is large.

Further, as shown in FIG. 53, the isolation cover 18 is provided with an isolation cover through hole 1832 at a corresponding position of the light-transmitting portion 411. The light-transmitting portion 411 passes through the isolation cover through hole 1832 and is at least partially exposed on the upper surface of the isolation cover 18. Since the isolation cover 18 presses and fixes the waterproof light-transmitting member 41 to the bottom housing 19, and the light-transmitting portion 411 needs to pass through the isolation cover 18 to project the light of the LED lamp 163 to the lower surface of the key 11, the isolation cover 18 is provided with an isolation cover through hole 1832 for the light-transmitting portion 411 to pass through the isolation cover 18. The light-transmitting portion 411 being at least partially exposed on the upper surface of the isolation cover 18 can be understood that the light-transmitting portion 411 can protrude from the upper surface of the isolation cover 18, or can be flush with or lower than the upper surface of the isolation cover 18, so that the abutting portion 113 of the key 11 can contact the light-transmitting portion 411. Since the key 11 presses and triggers the detection member 12 below via the light-transmitting portion 411, in a preferred embodiment, the light-transmitting portion 411 protrudes from the isolation cover 18, so that the key 11 presses against the light-transmitting portion 411. At the same time, the light-transmitting portion 411 reserves a placing space for the detection member 12 below.

Furthermore, when the key 11 generates the displacement in response to the operation and control force, the key 11 is elastically deformed against the light-transmitting portion 411. When the operation and control force is removed, the light-transmitting portion 411 returns to an initial state under the action of its own elastic force, and drives the key 11 to return to an initial position. The light-transmitting portion 411 driving the key 11 to return to an initial position can be understood that the light-transmitting portion 411 has elasticity, can generate resilient deformation, and generate a reset acting force overcoming the resilient deformation to act on the key 11. Furthermore, as shown in FIG. 54, the key 11 is provided with an abutting portion 113 protruding towards the light-transmitting portion 411. The abutting portion 113 is formed by splicing four square contact pressure units, so that the abutting portion 113 occupies most of the upper surface of the light-transmitting portion 411, and the abutting portion 113 uniformly presses the upper surface of the light-transmitting portion 411, so as to prevent the light-transmitting portion 411 from slipping and failed triggering due to single point contact. In summary, the waterproof light-transmitting member 41 of the present embodiment has at least four functions: 1, sealing and waterproofing to protect internal electronic components; 2, uniform light transmission, and projecting the light emitted by the LED to the key 11 after the light is uniform; 3, buffering an abutting force between the key 11 and the detection member 12 to prevent the detection member 12 from being damaged when the pressing force of the key 11 is large; 4, providing a reset acting force to assist in restoring the initial position of key 11. Compared with the conventional waterproofing member, the waterproof light-transmitting member 41 of the present embodiment is multi-purpose, simplifies the internal structure of the switch, reduces the number of parts, simplifies the assembly steps, and reduces the manufacturing cost.

Figure 55:
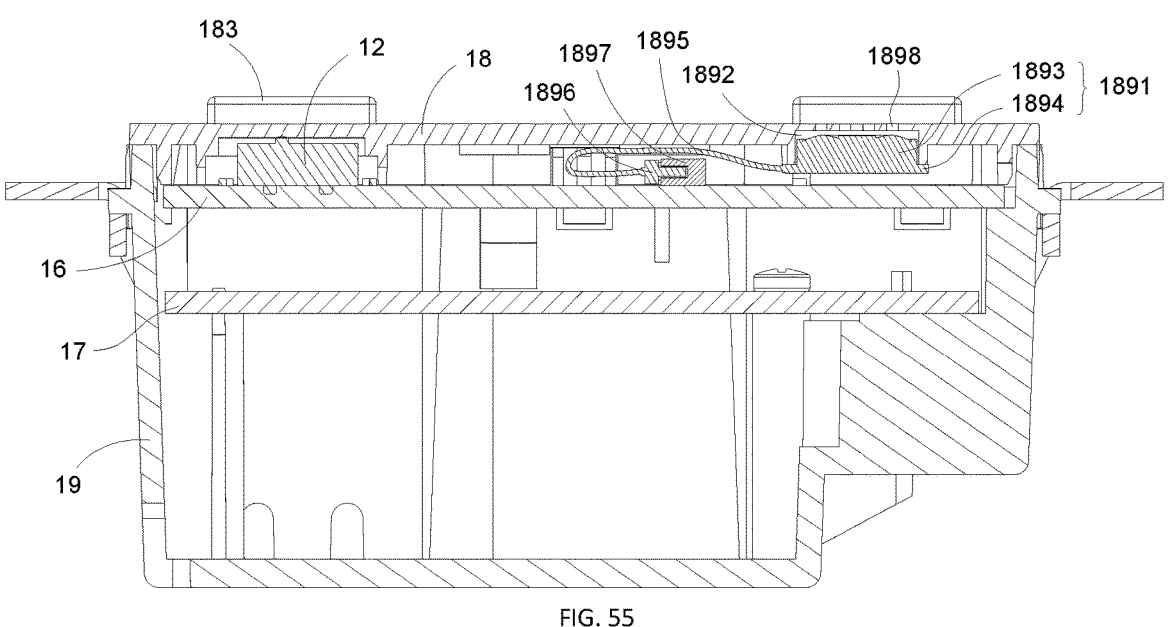
FIG. 55 is a cross-sectional view of an embodiment of the present invention.

In another embodiment, as shown in FIGS. 55 and 56, the lower housing 142 is provided with at least one sound generator 189 electrically connected to the PCB board 16 for emitting a sound in response to the triggering of the detection member 12. The sound generator 189 emitting a sound in response to the triggering of the detection member 12 will be understood that the sound generator 189 is used as a feedback to the key 11 to indicate to the user that the detection member 12 has been the triggered by emitting a sound. In general, the switch uses the sense of falling of the detection member 12 by pressing itself as the trigger feedback. During the pressing process of the detection member 12, the elastic force jumps. The user judges whether the detection member 12 is easily triggered from the touch of the hand. However, this design has at least two drawbacks. 1, When the detection member 12 is insensitive or damaged, a tactile feedback is generated by pressing the detection member 12. However, the switch cannot detect the signal of the detection member 12, and cannot control the on/off of the controlled apparatus. At this time, the feedback of the key 11 does not correspond to the operation of the controlled apparatus, which may lead to a user's misjudgment that the controlled apparatus is mistakenly believed to be on or off. The user's misjudgment may be more obvious when the controlled apparatus is an electric appliance with delayed effect. 2, When the feedback of the detection member 12 is not obvious or the user's feeling is not sensitive, the user may not feel that the detection member 12 is triggered, which is inconvenient to use. In the present embodiment, a sound generator 189 is used as the trigger feedback. The sound generator 189 is welded to the PCB board 16, with the feedback thereof being synchronized with the control of the controlled apparatus. When the detection member 12 is damaged, pressing the detection member 12 will not trigger the feedback, and the user will not have a misjudgment. Furthermore, the sound volume of the sound generator 189 is adjustable. The user who is not sensitive to the senses can still feel the feedback of the key 11, which is easy to use.

Further, as shown in FIG. 56, the sound generator 189 is provided as a speaker 1891. The lower housing 142 is provided with a speaker mounting position 1892 to which the speaker 1891 is fixedly connected. The sound generator 189 may also be a device capable of sounding such as a buzzer. The speaker mounting position 1892 can be understood as a groove recessed in the surface of the lower housing 142, and the shape thereof is adapted to the outer shape of the speaker 1891, so that when the speaker 1891 is mounted in the speaker mounting position 1892, the upper surface of the speaker 1891 does not protrude too far out of the surface of the lower housing 142. The upper housing 141 is not lifted by the speaker 1891 when being covered at the lower housing 142. Alternatively, the speaker mounting position 1892 is provided inside the lower housing 142. The sound-emitting surface of the speaker 1891 is placed into the speaker mounting position 1892 towards the outside of the lower housing 142. The speaker 1891 may be arranged on the upper surface of the lower housing 142 or may be arranged on a side surface of the lower housing 142. When the speaker 1891 is arranged on the upper surface of the lower housing 142, the upper housing 141 is covered on the lower housing 142, hiding the speaker 1891 below the upper housing 141, and improving the aesthetics of the switch. The fixed connection between the speaker 1891 and the speaker mounting position 1892 includes a snap connection, a screw connection, an adhesive connection, or other connection means.

In a specific embodiment, as shown in FIG. 56, the speaker mounting position 1892 is a cylindrical structure extending downwards from the isolation cover 18. The inner diameter of the speaker mounting position 1892 is in clearance fit with the speaker 1891 which includes a speaker main body 1893 and a speaker base 1894 arranged at the bottom of the speaker main body 1893. The speaker base 1894 protrudes from the outer side wall of the speaker main body 1893. The speaker 1891 is loaded from below the speaker mounting position 1892. An upper surface of the speaker base 1894 abuts against a lower surface of the speaker mounting position 1892. An adhesive is pasted on the upper surface of the speaker base 1894, or an adhesive is pasted on a side surface of the speaker main body 1893, so that the speaker 1891 is fixedly connected to the speaker mounting position 1892 by the adhesive. The speaker base 1894 is electrically connected to a speaker wire 1895. A speaker connector 1896 is provided at the end portion of the speaker wire 1895. A speaker plug-in interface 1897 adapted to the speaker connector 1896 is welded to the PCB board 16. The speaker connector 1896 is plugged into the speaker plug-in interface 1897 so as to realize the electrical connection between the speaker 1891 and the PCB board 16. When the isolation cover 18 is mounted, the speaker 1891 is now fixed at the speaker mounting position 1892, then the speaker connector 1896 is inserted at the speaker plug-in interface 1897, and finally the isolation cover 18 is clamped at the bottom housing 19. Furthermore, the isolation cover 18 is provided with at least one sound-emitting hole 1898 at a corresponding position of the speaker 1891. The sound-emitting hole 1898 is a through hole penetrating the isolation cover 18 for the sound emitted by the speaker 1891 to pass through the isolation cover 18.

Figure 24:
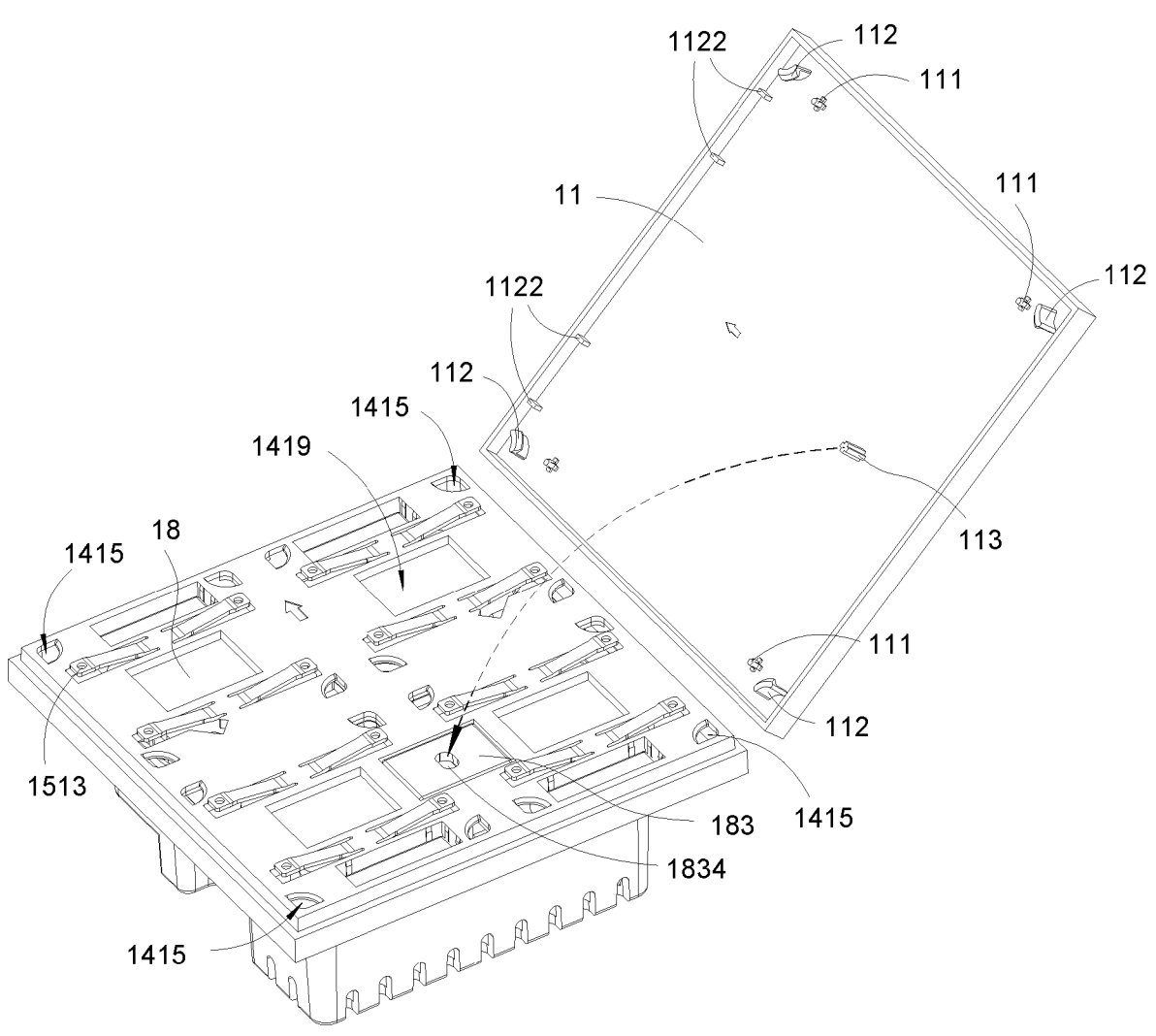
FIG. 24 is a structural diagram of a key according to an embodiment of the present invention.
Figures 25, 26:
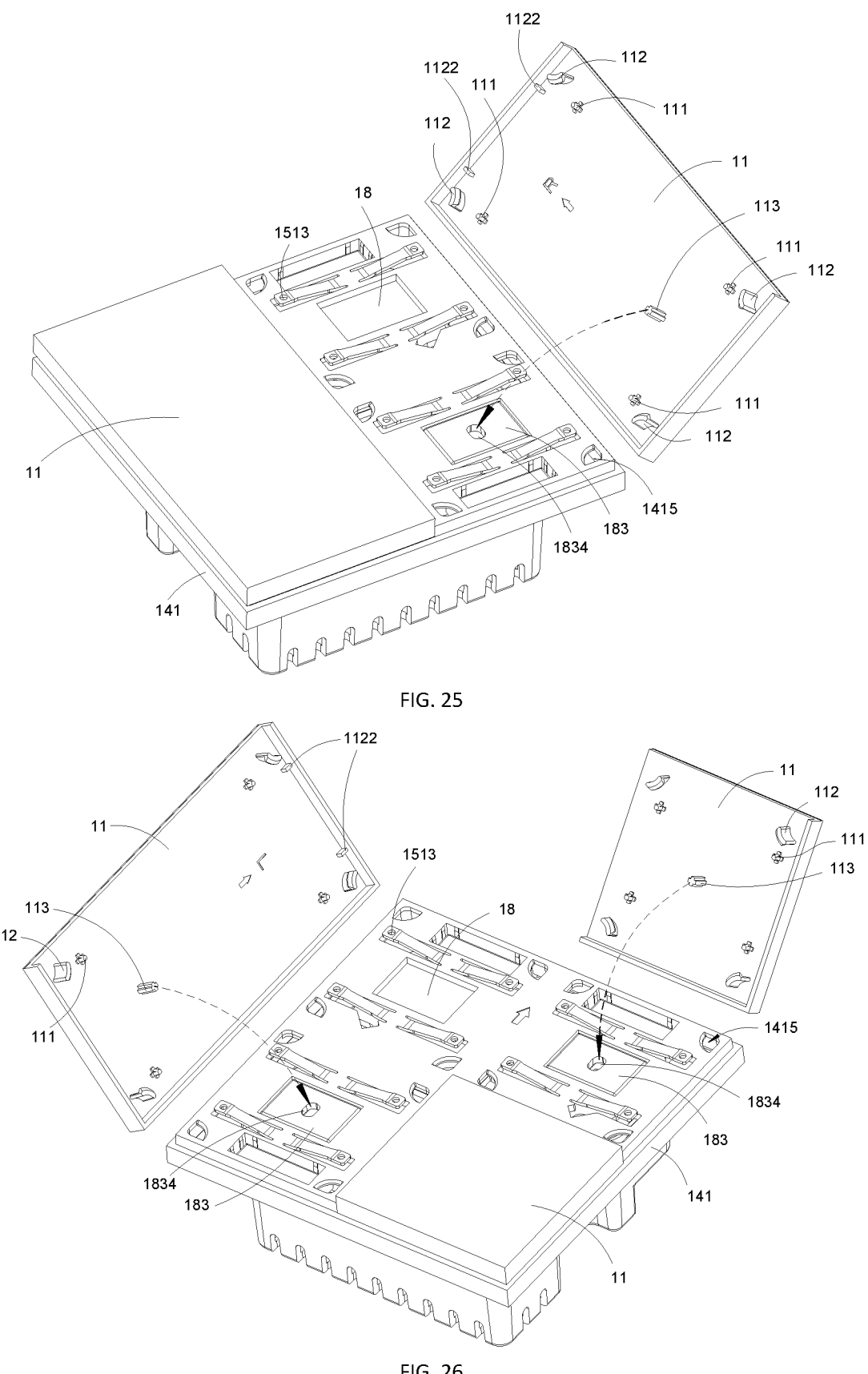
FIG. 25 is a structural diagram of a key according to an embodiment of the present invention.
FIG. 26 is a structural diagram of a key according to an embodiment of the present invention.

In some embodiments, as shown in FIGS. 24-26, the key 11 may switch the number of configurations between a single key and multiple keys, and at the same time, change the corresponding configuration size according to the number of configurations, thereby enabling one-way or multi-way control function switching of the switch. Specifically, as shown in FIG. 24, it is a schematic diagram of a switch structure of a single key 11. At this moment, the size of the key 11 increases so as to cover the whole upper surface of the upper housing 141. The key snaps 112 are provided at four corners of the key 11. The positions of the key snaps 112 correspond to the snap-fit positions 1415 at the four corners of the upper housing 141. A key positioning pin 111 is respectively provided at four corners of the key 11 and corresponds to the position of the first positioning hole 1513. The key positioning pin 111 is inserted and positioned in the first positioning hole 1513. The key positioning pins 111 provided at the four corners of the keys 11 has an advantageous effect in that the distance between the key positioning pins 111 can be widened as much as possible to make the positioning more accurate. It should be noted that the detection member 12 and the light uniforming shade 183 in this embodiment are both one, but there are five light uniforming shade light-transmitting through holes 1419, which are juxtapositioned at both ends of the upper housing 141. Three light uniforming shade light-transmitting through holes 1419 are arranged at one end. The detection member 12 is arranged below the light uniforming shade 183 corresponding to the light uniforming shade light-transmitting through holes 1419 located in the middle position of the three light uniforming shade light-transmitting through holes 1419. The key 11 extends out of the contact abutting portion 113 at the corresponding position of the detection member 12. When the key 11 is pressed, the contact abutting portion 113 triggers the detection member 12. The isolation cover 18 is not provided with a light uniforming shade snap-fit position 1833 and an isolation cover through hole 1832 at the corresponding position of the other light uniforming shade light-transmitting through hole 1419, further saving costs.

In addition, the key 11 is provided with at least one bracing portion 1122 protruding towards the housing 14 at an end away from the abutting portion 113, for abutting against the housing 14, thereby supporting an end of the key 11 away from the abutting portion 113 and preventing the end of the key 11 from being depressed. The bracing portion 1122 functions to support the key 11 to provide a support point for the key 11 such that when the key 11 as a whole is pressed. The key 11 pivots based on the bracing portion 1122 to move downwards near one end of the abutting portion 113 so that the abutting portion 113 triggers the detection member 12. At the same time, it can be prevented that the detection member 12 cannot be triggered when the user presses the end portion of the key 11 away from the abutting portion 113, while the user still feels that the key 11 has been pressed, making the user to take for having triggered the detection member 12.

As shown in FIG. 25, it is a structural schematic diagram of a switch with two keys 11. At this moment, the keys 11 are rectangular. The two keys 11 are juxtapositioned. The four corners of the keys 11 are provided with the key snaps 112, which are snap-fitted to the snap-fit positions 1415 of the middle cover. The four corners of the keys 11 are respectively provided with key positioning pins 111 corresponding to the positions of the first positioning holes 1513. The key positioning pins 111 are inserted and positioned in the first positioning holes 1513. In this embodiment, there are two detection members 12 and a light uniforming shade 183, but there are five light uniforming shade light-transmitting through holes 1419. An abutting portion 113 is extended from each each of two ends of a face of the key 11 facing towards the lower housing 142. The position of the abutting portion 113 corresponds to the position of a contact-pressure through hole 1834 of the light uniforming shade 183. The abutting portion 113 passes through the contact-pressure through hole 1834 and is placed above the detection members 12. As shown in FIG. 26, it is a structural schematic diagram of a three-key 11 switch, and at this time, the key 11 includes a rectangular key 11 and two square keys 11, the three keys 11 are arranged in a spliced manner on the upper housing 141, and the key snap 112 is respectively provided at four corners of each key 11 so as to be fastened to the snap-fit position 1415 of the middle cover; the detection member 12 and the light uniforming shade 183 in this embodiment are both three, but there are five light uniforming shade light-transmitting through holes 1419; and two ends of one face of the rectangular key 11 facing towards the lower housing 142 each extend an abutting portion 113. An abutting portion 113 extends respectively from the middle part of the two square keys 11. The position of each abutting portion 113 corresponds to the position of the contact-pressing through hole 1834 of the light uniforming shade 183. The abutting portion 113 passes through the contact-pressing through hole 1834 and is then placed above the detection member 12. The isolation cover 18 is not provided with a light uniforming shade snap-fit position 1833 and an isolation cover through hole 1832 at the corresponding position of the other light uniforming shade light-transmitting through hole 1419, further saving costs. It should be noted that in comparison with the switch structure of the single key 11 and the multiple keys 11, only the structures of the key 11 and the isolation cover 18 are different, and other parts are common to each other. Such a design saves the cost of grinding tools, the cost of design and the cost of manufacturing. Furthermore, users can flexibly switch between a single key and multiple keys, and the replacement cost is low.

In addition, as shown in FIGS. 25 and 26, when the key 11 has an elongated shape and the key 11 covers the two light uniforming shade light-transmitting through holes 1419, the key 11 is provided with at least one bracing portion 1122 protruding towards the housing 14 at an end away from the abutting portion 113, for abutting against the housing 14, thereby supporting an end of the key 11 away from the abutting portion 113 and preventing the end of the key 11 from being depressed. The bracing portion 1122 functions to support the key 11 to provide a support point for the key 11 such that when the key 11 as a whole is pressed. The key 11 pivots based on the bracing portion 1122 to move downwards near one end of the abutting portion 113 so that the abutting portion 113 triggers the detection member 12. At the same time, it can be prevented that the detection member 12 cannot be triggered when the user presses the end portion of the key 11 away from the abutting portion 113, while the user still feels that the key 11 has been pressed, making the user to take for having triggered the detection member 12.

The present embodiment proposes an intelligent switching system including: a cloud end, a gateway, an intelligent terminal and at least one intelligent switch. The intelligent switch can be any switching device configured with a wireless communication module 13. The wireless communication module 13 can be, for example, at least one of a Bluetooth wireless communication module 13, a wifi wireless communication module 13 and a radio frequency wireless communication module 13. In the present embodiment, the intelligent switch is a wall switch. The intelligent terminal can be, for example, a mobile phone, a tablet computer, a computer, a smart car, a smart home appliance, etc. The intelligent terminal can interact with the cloud by a WIFI network (router), and can also interact with the cloud by a Bluetooth gateway. The gateway therein can be any device capable of respectively communicating with the cloud and the intelligent switch, for example, can be a wall switch having a WIFI wireless communication module 13 and a radio frequency wireless communication module 13, or can be a network device dedicated to data interaction and processing, for example, a WIFI gateway, a router, etc. In this embodiment, the gateway is configured with a separate voice module, being a voice gateway. The cloud may be any device or combination of devices having data storage and processing capabilities and capable of interacting with a gateway and may be, for example, a server in which a desired program may be deployed.

Figure 27:
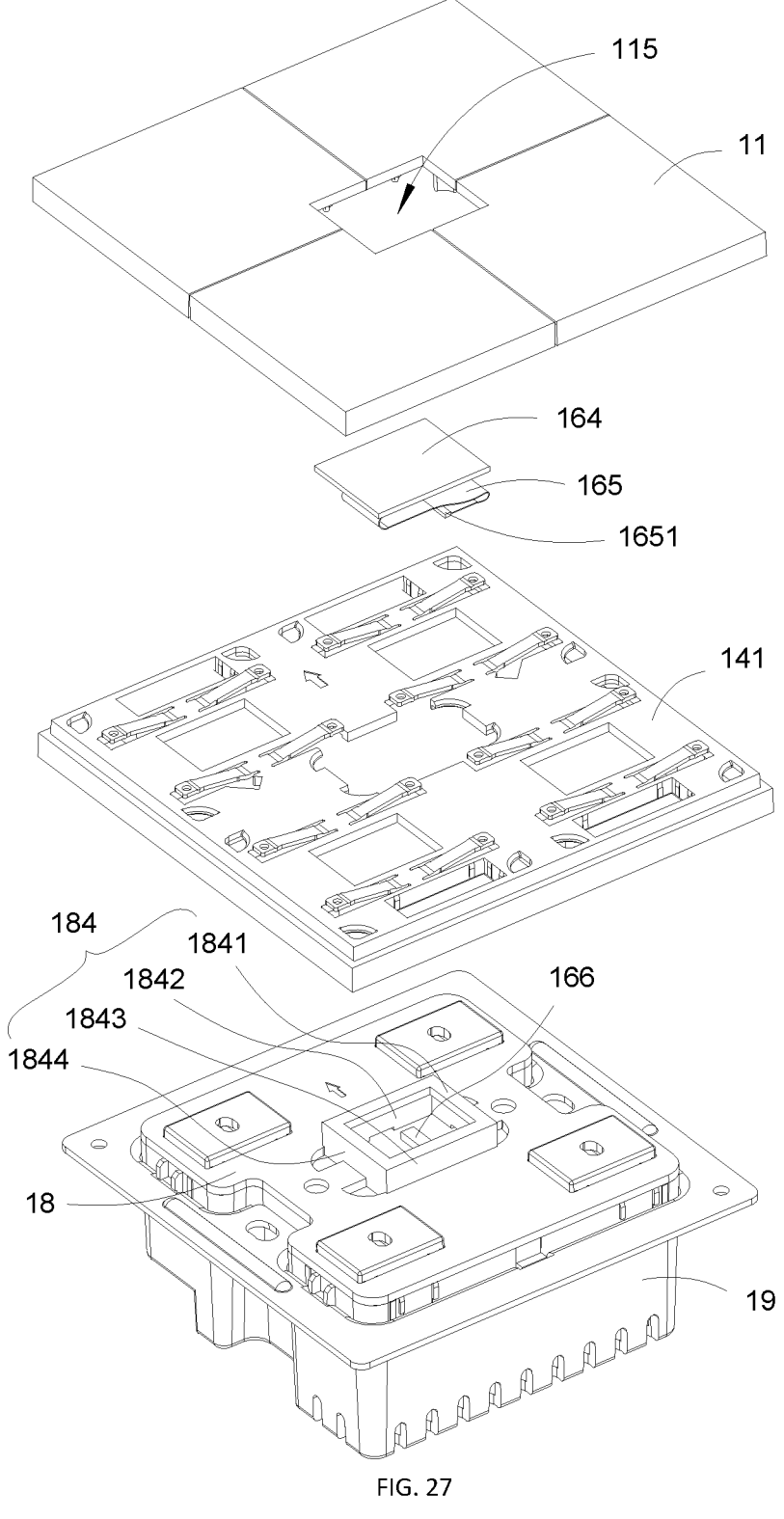
FIG. 27 is a structural diagram of an embodiment of the present invention.

In a preferred embodiment, as shown in FIGS. 27 and 28, the wall intelligent switch 101 further includes a display screen 164. The display screen 164 is electrically connected to the wireless communication module 13. The key 11 matches the position of the display screen 164.

The wireless communication module 13 is used for:

controlling the display screen 164 to display a function identifier of the key 11, the function identifier being used for characterizing the current function of the key 11;

directly or indirectly acquiring a trigger signal that the key 11 is triggered, and controlling a trigger result corresponding to the current function to be executed;

The wireless communication module 13 is further used for:

when the function of the key 11 changes, directly or indirectly receiving and storing an identifier update instruction sent by an intelligent terminal, and updating a function identifier corresponding to the key 11 displayed on the display screen 164 based on the identifier update instruction, so that the function identifier can characterize the current function of the key 11, the flag update instruction carrying current function information about the key 11.

When the number of switch keys 11 is too large, the user easily forgets the corresponding relationship between the keys 11 and the lamp. When the intelligent switch is introduced, the switch may represent many scene modes besides a single lamp, such as off-home mode and full-on mode, so that the function represented by the switch is more complex and the user is more difficult to memorize it. Based on this, the prior art provides a certain custom-made laser carving technology, and can select the text or icon required by the client on the switch. However, this solution has difficulties in subsequent modification and the custom service flow is complicated. On the other hand, although the center screen of many smart homes provides the control for the full-house intelligent lighting, or the scene mode key 11 is arranged on the center screen, the full-sized touch screen is expensive, and the complicated interface and operation of the touch screen are very unfriendly to the elderly. In view of this, there is a need for a compact and low cost switch that dynamically configures the names or icons of the functions of the display keys 11. In addition, the intelligent switch provided in the technical solution of the present invention carries a display screen 164 capable of displaying the functions of the physical keys 11 of the switch. The functional representation of each key 11 displayed on the display screen 164 can be dynamically configured. With regard to intelligent switches with more keys 11, a user can conveniently change the functional representation of a corresponding area on the display screen 164 based on the current functions of each key 11, so that the functions of the keys 11 of the intelligent switch can be changed flexibly and can be marked flexibly.

Further, the directly or indirectly acquiring a trigger signal that the key 11 is triggered, and controlling a trigger result corresponding to the current function to be executed includes:

acquiring a trigger signal that the key 11 is triggered, determining key value information about the triggered key 11 based on the trigger signal, and then matching a target function in a stored function mapping table based on the key value information, and controlling a trigger result indicated by the target function to be executed; where the key 11 function mapping table defines a triggering relationship between at least one key value information and at least one triggering result, which is directly or indirectly issued by a user after being freely determined by an intelligent terminal and stored in a local memory of the wireless communication module 13.

In this embodiment, the intelligent switch can control the trigger result corresponding to the trigger signal to be executed based on a locally stored function mapping table, without cloud-based or gateway-based control, achieving the purpose that the network interruption can also be controlled.

Further, the directly or indirectly acquiring a trigger signal that the key 11 is triggered, and controlling a trigger result corresponding to the current function to be executed further including:

acquiring a trigger signal that the key 11 is triggered, and determining key value information about the triggered key 11 based on the trigger signal;

uploading the key value information to a cloud end, so that the cloud end matches a target function in a stored function mapping table based on the key value information; the function mapping table is defined by a user via an intelligent terminal and pre-stored in a cloud end; and the key 11 function mapping table defines a triggering relationship between at least one key value information and at least one triggering result.

The above triggering result can be understood as at least one executable function of at least one controlled apparatus. The function involved in the triggering result may include the opening or closing of an apparatus, and may also include the switching of a specific function of the apparatus. For example, a certain controlled entertainment device plays a specific music or video, and may for example be a certain curtain control device closing a curtain. In the present embodiment, the intelligent switch is a wall switch having a plurality of relay 175 control channels. The triggering result includes the opening or closing of the relay 175 of at least one control channel of the intelligent switch.

In this embodiment, the intelligent switch uploads a trigger signal to a cloud end, and then the cloud end judges and issues a corresponding control instruction, so that a richer and diverse control requirements can be achieved.

Furthermore, in some embodiments, the current control instruction may also be a voice control instruction uploaded by a user via a gateway. Furthermore, the wireless communication module 13 is also used for:

according to a control instruction issued by a cloud end received directly or indirectly, controlling a triggering result indicated by the control instruction to be executed; where the control instruction is generated based on a target function after the cloud parses a voice control information and matches the target function in a stored function mapping table based on the parsing result; the voice control information is generated by a gateway in response to external voice manipulation information; the parsing result at least includes corresponding key value information; the function mapping table is defined by the user via the intelligent terminal and pre-stored in the cloud end; the key 11 function mapping table defines a triggering relationship between at least one key value information and at least one triggering result.

In this embodiment, voice control is introduced, users can upload voice control information based on voice gateway, and then the cloud end issues control instructions based on the analysis of voice control information, freeing users' hands and achieving a more intelligent linkage control.

Further, when the function of the key 11 changes, directly or indirectly receiving and storing an identifier update instruction sent by an intelligent terminal, and updating a function identifier corresponding to the key 11 displayed on the display screen 164 based on the identifier update instruction includes:

directly or indirectly receiving and storing an identifier update instruction sent by an intelligent terminal, and updating a function identification corresponding to the key 11 displayed on the display screen 164 based on the identification update instruction; where the identification update instruction is also used for triggering the intelligent terminal to upload the identification update instruction to the cloud end, so that the cloud end updates the stored function mapping table according to the corresponding relationship information between the key value information and the function identification carried in the identification update instruction.

In this embodiment, when a function of an intelligent switch or a certain key 11 is changed, a user may update a function mapping table stored in a cloud end and an intelligent switch in real time via an intelligent terminal (such as a mobile phone), so that key value information about each intelligent switch in the function mapping table and a corresponding function identifier becomes changed corresponding relationships, so as to prevent the problem that the key 11 does not correspond to the triggering result of actual control after the function is changed.

The above triggering result can be understood as at least one executable function of at least one controlled apparatus. The function involved in the triggering result may include the opening or closing of an apparatus, and may also include the switching of a specific function of the apparatus. For example, a certain controlled entertainment device plays a specific music or video, and may for example be a certain curtain control device closing a curtain. In the present embodiment, the intelligent switch is a wall switch having a plurality of relay 175 control channels. The triggering result includes the opening or closing of the relay 175 of at least one control channel of the intelligent switch.

In the present embodiment, the intelligent switch is a wall switch. If the wall switch has a plurality of keys 11, the above-mentioned key value information can characterize different keys 11 in the intelligent switch. Different keys 11 can correspond to different relay 175 channels in the wall switch. If the wall switch has only one key 11, the key value information may also represent switch information about the intelligent switch. The switch information may be, for example, an ID of the intelligent switch. The function identifier may correspond to switch information, and may also correspond to certain key 11 information.

In a specific embodiment, as shown in FIGS. 27 and 28, the display screen 164 includes a flat cable 165, and the display screen 164 is electrically connected to the PCB board 16 via the flat cable 165. The key 11 is adapted to the position of the display screen 164, and the display screen 164 is configured to display a corresponding function of the key 11. The display screen 164 transmits data via the flat cable 165 which is provided with a flat cable connecting head 1651 at an end portion away from the display screen 164. A flat cable connector 166 is welded on the PCB board 16. The flat cable connecting head 1651 is clamped to the flat cable connector 166 so as to realize the electrical connection between the display screen 164 and the PCB board 16. In another embodiment, a data transmission contact (not shown in the figure) is arranged on the PCB board 16. The flat cable 165 is pasted to the data transmission contact via an adhesive so as to achieve an electrical connection between the display screen 164 and the PCB board 16. Alternatively, the flex 165 may be soldered to the PCB board 16 (not shown) to provide an electrical connection between the display screen 164 and the PCB board 16. The key 11 being adapted to the position of the display screen 164 can be understood as that the positions of the display screen 164 can correspond to the keys 11, so that the positions displayed by the display screen 164 can correspond to the corresponding keys 11. For example, the keys 11 are arranged laterally and side by side on the upper surface of the housing 14. The screen is provided in a long strip shape and is arranged laterally at the end portions of the keys 11. The direction of the long side of the screen is the same as the direction in which the keys 11 are arranged. The screen can display the functions corresponding to the keys 11 at the positions corresponding to the end portion of each key 11. Alternatively, as shown in the figure, there are four keys 11, and the keys 11 are juxtapositioned in pairs on the upper surface of the housing 14. The four keys 11 are located at four corners of the upper surface of the housing 14. The display screen 164 is rectangular and is arranged at the intersection of the four keys 11. The screen is divided into four regions which respectively correspond to corresponding positions of the four keys 11. Each region of the screen can respectively display functions corresponding to the keys 11. The wireless communication module 13 is welded to the PCB board 16 so as to realize the electrical connection between the display screen 164 and the wireless communication module 13. The wireless communication module 13 controls the display content of the display screen 164 according to the function of the key 11.

Furthermore, as shown in FIG. 27, the lower housing 142 includes a bottom housing 19 and an isolation cover 18. The isolation cover 18 is covered on the bottom housing 19 and forms an accommodating cavity with the bottom housing 19. The PCB board 16 is accommodated inside the accommodating cavity. A display screen mounting position 184 protrudes towards the key 11 at the central position of the isolation cover 18. The display screen mounting position 184 is a channel-shaped structure penetrating up and down. The display screen 164 is fixedly mounted on an upper end face of the display screen mounting position 184. The flat cable 165 passes through the display screen mounting position 184 and is electrically connected to the PCB board 16. The display screen 164 is fixedly mounted on the display screen mounting position 184. Specifically, a first side portion 1841, a second side portion 1842, a third side portion 1843 and a fourth side portion 1844 which are enclosed with each other extend upwards at the middle part of the isolation cover 18 so as to form the display screen mounting position 184. The upper end of the display screen mounting position 184 has an opening. The display screen 164 is covered on and adhered to the upper surface of the display screen mounting position 184. The flat cable 165 of the display screen 164 passes through the display screen mounting position 184 and is connected to the PCB board 16.

As shown in FIGS. 27 and 28, the key 11 is provided with a display screen keep-space position 115 at a corresponding position of the display screen 164. The display screen 164 is enclosed in the display screen keep-space position 115. The upper surface of the display screen 164 is flush with the upper surface of the key 11. The key 11 being provided with a display screen keep-space position 115 at the corresponding position of the display screen 164 can be understood that the display screen keep-space position 115 is a through hole. Each key 11 is arranged in a spliced manner on the upper housing 141. Each key 11 is provided with a through hole at the corresponding position of the display screen 164 for the display screen 164 to pass through. A gap exists between the display screen keep-space position 115 and the display screen 164 so as to prevent the key 11 from interfering with the display screen 164 during movement. The upper surface of the display screen 164 being flush with the upper surface of the key 11 can be understood that the height of the display screen mounting position 184 matches the height of the key 11, so that the upper surface of the display screen 164 is in the same plane as the upper surface of the key 11, thereby improving the aesthetics.

Furthermore, as shown in FIG. 27, the upper housing 141 is provided with a display screen 164 passing hole at a corresponding position of the display screen 164. The shape of the display screen 164 passing hole is adapted to the display screen 164. The display screen 164 passes through the display screen 164 passing hole and is then placed in the display screen keep-space position 115. Since the display screen mounting position 184 protrudes upwards from the isolation cover 18, the upper housing 141 located above the isolation cover 18 needs to be opened with the display screen 164 passing hole for the display screen mounting position 184 to pass through.

Further, as shown in FIG. 28, the key 11 extends out of the key snap 112 towards the upper housing 141 at the corresponding positions of the first side portion 1841 and the third side portion 1843 of the display screen mounting position 184, the first side portion 1841 being arranged opposite to the third side portion 1843. Specifically, taking the switch structure of the version of four keys 11 as an example, each key 11 is respectively provided with four key snaps 112. Each key 11 is provided with the key snaps 112 at three corners away from the display screen 164. A corner near to the display screen 164 is provided with a display screen keep-space position 115, resulting in that the key 11 has a rectangular notch. The key 11 is provided with the key snaps 112 near the rectangular notch, so that the four key snaps 112 are located at the corner positions of the key 11 as far as possible to provide a smooth limit for the key 11.

According to another aspect of the present invention, there is also provided a wireless intelligent switch 102 which, unlike the wall intelligent switch 101 described above, is battery powered and communicatively coupled to a receiver through which the controlled apparatus is indirectly controlled for operation. In a specific embodiment, the receiver is the wall intelligent switch 101 described above. When in use, the wireless intelligent switch 102 triggers the detection member 12 in response to the manipulation by a user, and then sends a wireless message to the receiver. The receiver controls the operation of the controlled apparatus according to the content of the wireless message, thereby achieving indirect control of the controlled apparatus by the wireless intelligent switch 102. The controlled apparatus can be a conventional electric appliance such as a lamp and a fan, and can be controlled to be switched on and off by controlling switching on and off. It may also be an intelligent device such as an air conditioner, a television, a floor sweeping robot or an intelligent curtain motor. The receiver applies a control instruction to the controlled apparatus so as to control the operation of the same.

Figure 57:
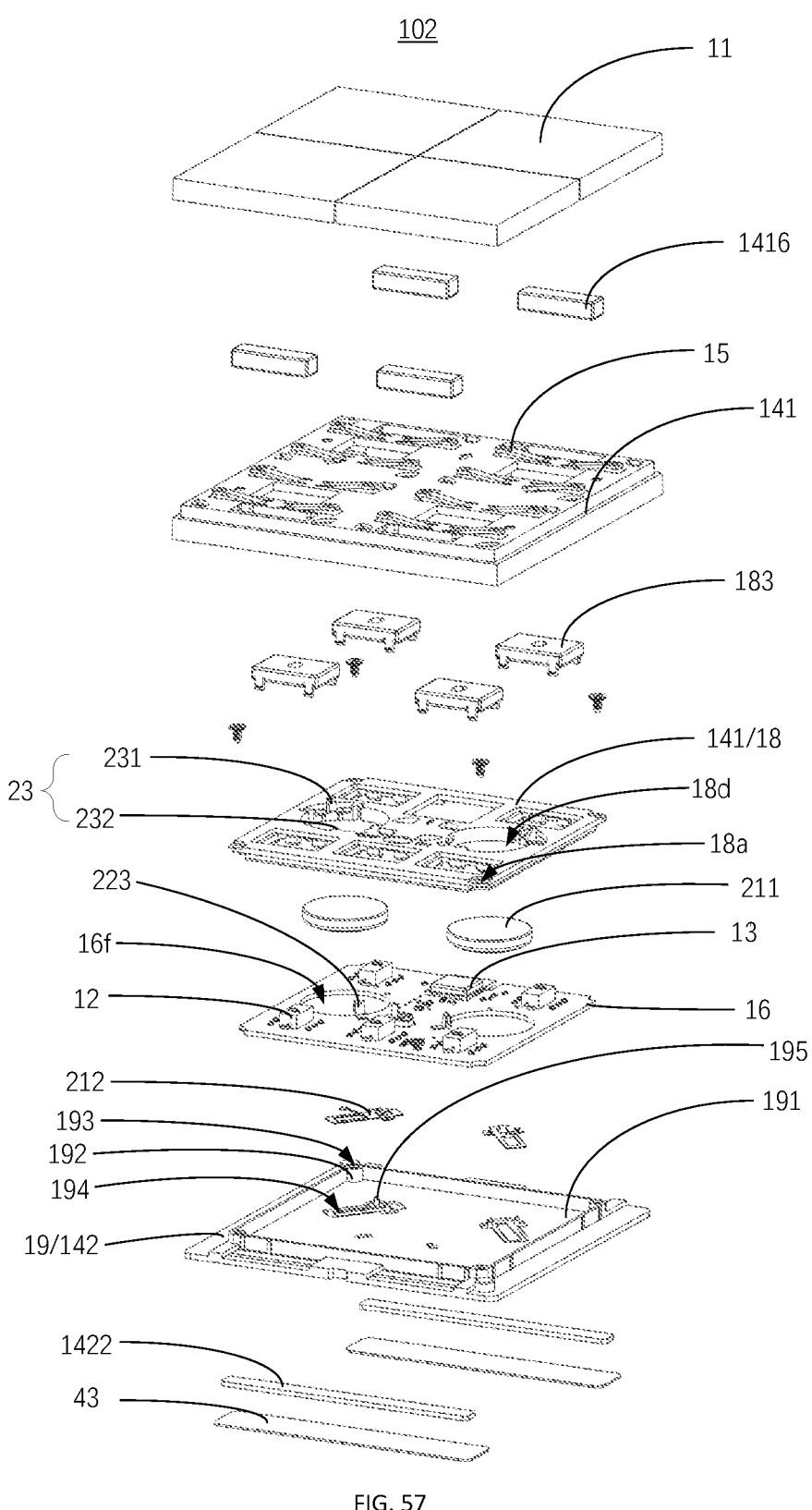
FIG. 57 is an exploded view according to an embodiment of the present invention.
Figures 58, 59:
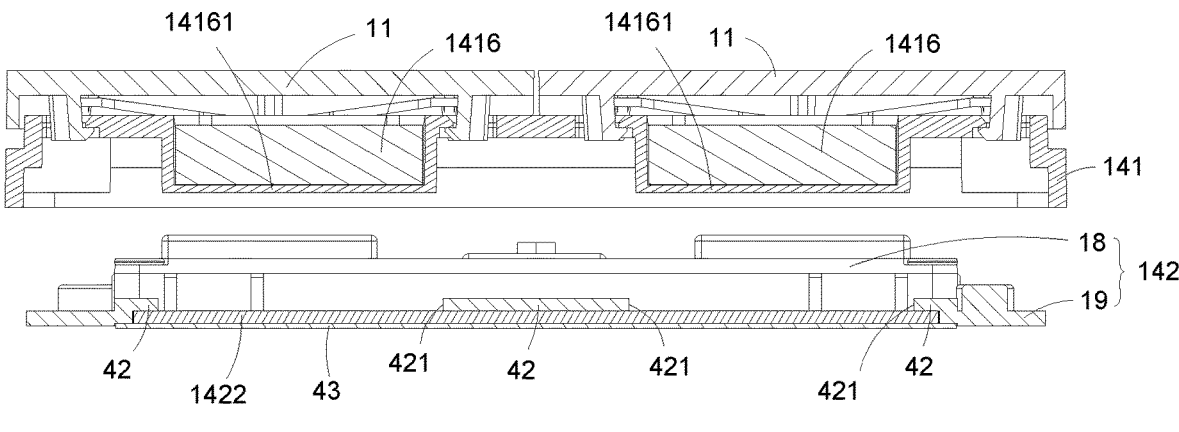
FIG. 58 is a structural diagram of an embodiment of the present invention.
FIG. 59 is a cross-sectional view of an embodiment of the present invention.

Specifically, as shown in FIGS. 57 and 58, the wireless intelligent switch 102 provided by the present invention includes: a housing 14, at least one key 11, a detection member 12, a reset portion 15 and a wireless communication module 13. The key 11 is arranged in the housing 14. At least part of the key 11 can generate a pressing movement in response to an operation and control force so as to generate a displacement, so that the key 11 passes at least a first pressing position and a second pressing position in sequence and generates a reaction force. The detection member 12 may be triggered based on the displacement and generate a first rebound force against the displacement. The reset portion 15 is configured to support the key 11 to be deformed directly or indirectly in response to the pressing movement, and generate a reset acting force overcoming the deformation. The wireless communication module 13 is communicatively connected to the detection member 12 so as to receive a corresponding trigger signal and send a wireless message to the outside based on the trigger signal.

The the detection member 12 and the reset portion 15 cooperate so that when the key 11 moves to the first pressing position, the reaction force is F1; when the key 11 moves from the first pressing position to the second pressing position, the reaction force jumps from F1 to F2, where F2<F1<400 g; the displacement S1 of the key 11 at the first pressing position and the displacement S2 of the key 11 at the second pressing position satisfy a relationship: S2-S1≤2 mm.

The wireless communication module 13 sending a wireless message to the outside based on the trigger signal can be understood as that the wireless communication module 13 is electrically connected to the detection member 12. When the detection member 12 is triggered, a corresponding trigger signal is generated. When the wireless communication module 13 detects the trigger signal, a corresponding wireless message is sent to the outside. Other technical details and principles have been described in detail above and will not be repeated here.

As shown in FIGS. 57 and 58, the wireless intelligent switch 102 according to the present invention has the same structure as the wall intelligent switch 101 described above. For example, the key 11, the reset portion 15, the upper housing 141 and the light uniforming shade 183 have the same structure as the wall intelligent switch 101. The technical details and principles thereof have been described in detail above and will not be described in detail herein. They differ in that, 1, the wireless intelligent switch 102 does not have a power supply board 17 and electronic components related to the power supply board 17, and the PCB board 16 is powered by a battery; 2, the structure of the bottom housing 19 of the wireless intelligent switch 102 is different from that of the wall intelligent switch 101, specifically including that the connection structure of the PCB board 16 and the bottom housing 19 is different; the structure of the magnetic attraction member 1422 is different, the connection structure of the magnetic attraction member 1422 and the bottom housing 19 is different, and the bottom housing 19 does not have a heat dissipation hole 1427, etc.; 3, the isolation cover 18 is provided with a through hole for mounting and dismounting the battery, and the structure is different. Hereinafter, the technical features distinguishing the wireless intelligent switch 102 from the wall intelligent switch 101 will be described in detail.

Firstly, the structure of the magnetic attraction member of the wireless intelligent switch 102 is different from that of the magnetic attraction member of the wall intelligent switch 101. In particular, as shown in FIGS. 58 and 59, in some embodiments, the lower housing 142 is provided with a magnetic attraction member fixing portion 42 at a corresponding position of the magnet mounting groove 14161. The magnetic attraction member fixing portion 42 is fixedly connected to the magnetic attraction member 1422. The magnetic attraction member fixing portion 42 can be understood as a structure capable of fixedly mounting the magnetic attraction member 1422, which is fixedly connected or integrally formed to the lower housing 142. The magnetic attraction member 1422 and the magnetic attraction member fixing portion 42 can be fixedly connected by clamping, bonding, clamping and fixing, screw fastening and other practical means. The magnet 1416 is fixedly arranged in the magnet mounting groove 14161 of the upper housing 141. The details of the structure thereof are described in detail above. The upper housing 141 is attracted to the magnetic attraction member part 1422 of the lower housing 142 via the magnet 1416 so as to achieve the magnetic attraction member type detachable connection between the upper housing 141 and the lower housing 142. The lower housing 142 is provided with a first positioning portion 1424 that cooperates with a second positioning portion 1418 of the upper housing 141 to enable the upper housing 141 to be located by the lower housing 142. The technical details are described in detail above and will not be described in detail herein. In a specific embodiment, the fixing portion of the magnet 1416 corresponds to the position of the magnet 1416 as stated above. The lower housing 142 includes a bottom housing 19 and an isolation cover 18 (the technical details are described above). The magnetic attraction member fixing portion 42 has two parts, located at the left and right ends of the bottom housing 19, so as to increase the stability of the magnetic suction connection.

Furthermore, as shown in FIGS. 58 and 59, the magnetic attraction member fixing portion 42 is provided with a magnetic attraction member through hole 421. The shape of the magnetic attraction member through hole 421 is adapted to the magnet mounting groove 14161, so that the lower surface of the magnet mounting groove 14161 passes through the magnetic attraction member through hole 421 and then fits the upper surface of the magnetic attraction member 1422. Here, the shape of the magnetic attraction member through hole 421 being adapted to the magnet mounting groove 14161 can be understood that the magnetic attraction member through hole 421 is slightly greater than the lower surface of the magnet mounting groove 14161, so that the magnet mounting groove 14161 can pass through the magnetic attraction member through hole 421. The advantage of this design is that the spacing between the magnet 1416 and the magnetic attraction member 1422 is reduced. Furthermore, the wireless intelligent switch 102 of the present invention can be attracted to a ferrous surface to increase the magnetic attraction member between the magnet 1416 and the magnetic attraction member 1422, so that the magnet 1416 can attract the ferrous mounting surface through the magnetic attraction member 1422 to prevent the switch from falling off due to too weak magnetic attraction. Further, as shown in FIGS. 57 and 59, the lower surface of the magnetic attraction member fixing portion 42 is pasted with an anti-slip sticker 43 at the corresponding position of the magnetic attraction member 1422. The anti-slip upper surface has an adhesive property and the lower surface has an anti-slip property, which not only prevents the magnetic attraction member 1422 from falling downwards out of the magnetic attraction member fixing portion 42, but also plays an anti-slip function. When the switch is magnetically attracted to a ferrous mounting surface, the anti-slip sticker 43 can prevent the switch from sliding.

Figure 60:
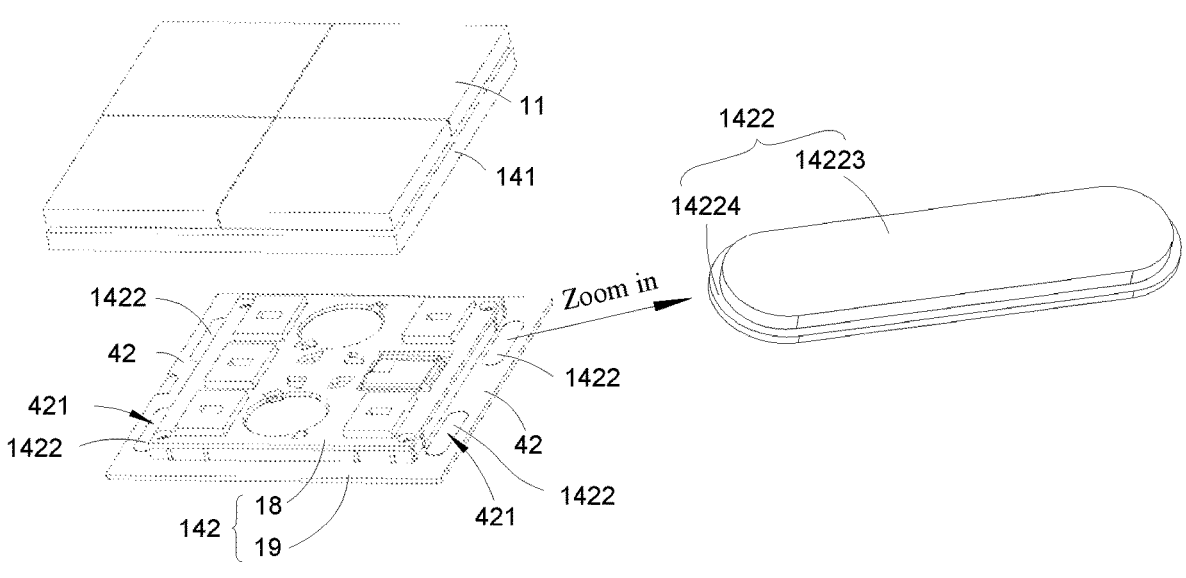
FIG. 60 is a structural diagram of a magnetic attraction member according to an embodiment of the present invention.

In another embodiment, as shown in FIG. 60, the magnetic attraction member fixing portion 42 is provided with a magnetic attraction member through hole 421. At least part of the upper surface of the magnetic attraction member 1422 passes through the magnetic attraction member through hole 421 and is flush with the upper surface of the magnetic attraction member fixing portion 42. When the upper housing 141 is covered on the lower housing 142, at least part of the upper surface of the magnetic attraction member 1422 fits the lower surface of the magnet mounting groove 14161. At least part of the upper surface of the magnetic attraction member 1422 being flush with the upper surface of the magnetic attraction member fixing portion 42 can be understood that, as shown in FIG. 60, taking the direction of the bottom housing 19 pointing to the key 11 as an upper direction, the shape of the magnetic attraction member through hole 421 is consistent with the shape of the upper portion of the magnetic attraction member 1422. After the upper portion of the magnetic attraction member 1422 passes through the magnetic attraction member through hole 421, the upper surface and the upper surface of the magnetic attraction member fixing portion 42 are in the same plane, so that the lower surface of the magnet mounting groove 14161 can be fit the magnetic attraction member 1422 and the magnetic attraction member fixing portion 42 at the same time. The distance between the magnet 1416 and the magnetic attraction member 1422 can be shortened to enhance the magnetic attraction member force. The magnet mounting groove 14161 can be supported by the magnetic attraction member fixing portion 42, so that the upper housing 141 does not tilt when the key 11 is pressed. In other embodiments, the upper surface of the magnetic attraction member 1422 can slightly sink against the upper surface of the magnetic attraction member fixing portion 42 to ensure that the magnet mounting groove 14161 is supported by the bottom housing 19.

Furthermore, as shown in FIG. 60, the magnetic attraction member 1422 includes an attaching portion 14223 and a base portion 14224 integrally formed with the attaching portion 14223. The attaching portion 14223 passes through the magnetic attraction member through hole 421 and is attached with the lower surface of the magnet mounting groove 14161. The size of the base portion 14224 is greater than the size of the attaching portion 14223, so that a first step is formed between the attaching portion 14223 and the base portion 14224. The magnetic attraction member through hole 421 includes a first through hole cooperating with the fitting part 14223 and a second through hole cooperating with the base portion 14224. The size of the second through hole is greater than the size of the first through hole, so that a second step is formed between the first through hole and the second through hole. The second step abuts against the first step, and the vertical upward displacement of the magnetic attraction member 1422 is limited by the second step. The attaching portion 14223 is in interference fit with the first through hole, so that the attaching portion 14223 passes through the first through hole and is clamped to the first through hole.

Further, the magnetic attraction member fixing portion 42 is provided as a groove with a downward opening, and the magnetic attraction member fixing portion 42 is in interference fit with the magnetic attraction member 1422, so that the magnetic attraction member 1422 is placed on the magnetic attraction member fixing portion 42 from below the magnetic attraction member fixing portion 42 and is clamped to the magnetic attraction member fixing portion 42. Further, the lower surface of the magnetic attraction member fixing portion 42 is pasted with an anti-slip sticker 43 (not shown in the figure) at the corresponding position of the magnetic attraction member 1422. The anti-slip upper surface has an adhesive property, and the lower surface has an anti-slip property, which can not only prevent the magnetic attraction member 1422 from falling downwards out of the magnetic attraction member fixing portion 42, but also plays an anti-slip function. Both the attaching portion 14223 and the base portion 14224 of the magnetic attraction member 1422 have a racetrack circular shape, which has the advantage of facilitating the insertion of the magnetic attraction member 1422 into the magnetic attraction member fixing portion 42.

Figure 61:
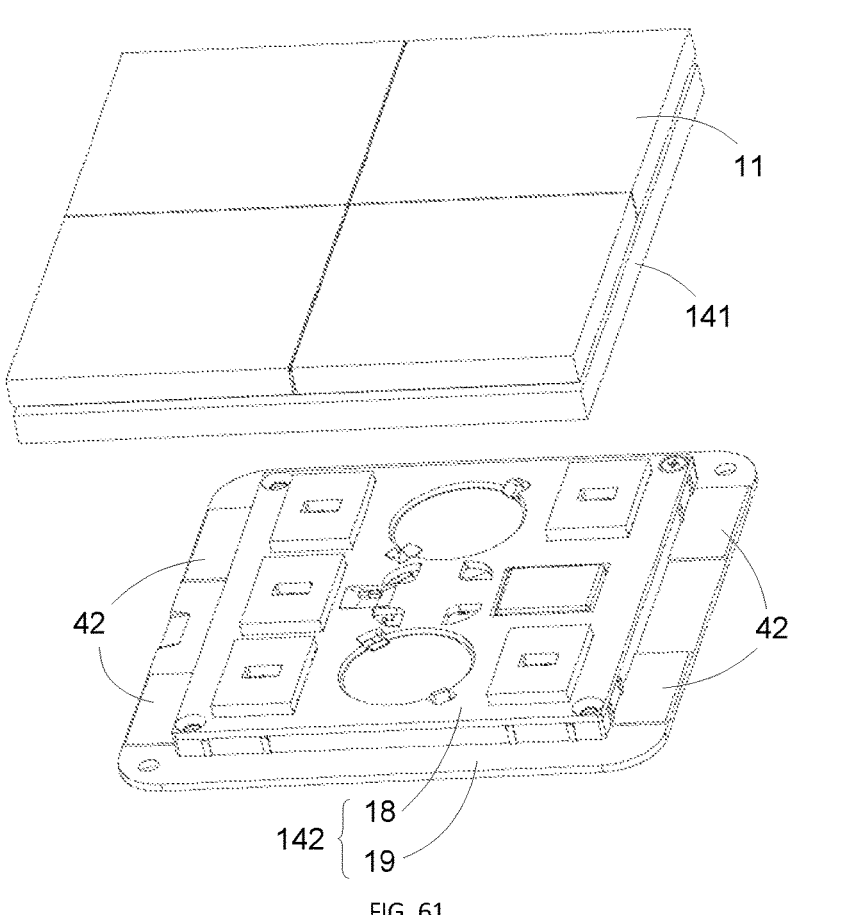
FIG. 61 is a structural diagram of a magnetic attraction member according to an embodiment of the present invention.
Figure 62:
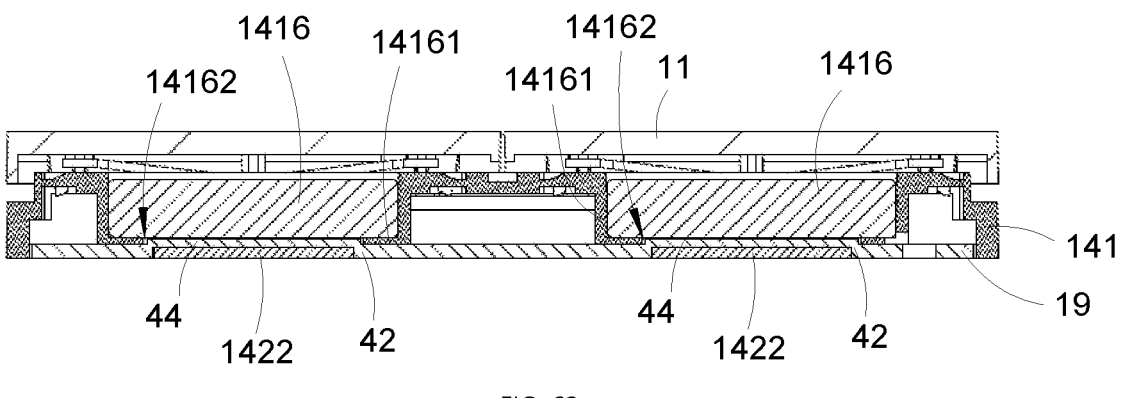
FIG. 62 is a cross-sectional view of an embodiment of the present invention.

In some embodiments, as shown in FIGS. 61-62, a projection pattern of the magnetic attraction member fixing portion 42 on the bottom surface of the lower housing 142 is a first projection pattern. The magnetic attraction member fixing portion 42 protrudes to form a magnetic attraction member protrusion towards the magnet mounting groove 14161. A projection pattern of the magnetic attraction member protrusion 44 on the bottom surface of the lower housing 142 is a second projection pattern. The second projection pattern covers the first projection pattern. A hollowed-out through hole 14162 is provided at the bottom of the magnet mounting groove 14161 towards the magnetic attraction member protrusion 44. A projection pattern of the hollowed-out through hole 14162 at the bottom of the lower housing 142 is provided as a third projection pattern. The third projection pattern covers the second projection pattern. The height of the magnetic attraction member protrusion 44 is greater than or equal to the thickness of the bottom of the magnet mounting groove 14161. The magnetic attraction member protrusion 44 fits the lower surface of the magnet 1416 after passing through the hollowed-out through hole 14162. As shown in FIG. 62, the magnetic attraction member protrusion 44 can be understood as that since the thickness of the bottom housing 19 is relatively thin and is similar to the thickness of the magnetic attraction member 1422, a groove is arranged on the lower surface of the magnetic attraction member fixing portion 42 for mounting and accommodating the magnetic attraction member 1422; and accordingly, the magnetic attraction member fixing portion 42 is provided with the magnetic attraction member protrusion 44 above the magnetic attraction member 1422, so as to enhance the wall thickness of the magnetic attraction member fixing portion 42 above the magnetic attraction member 1422 and increase the strength of the magnetic attraction member fixing portion 42. In addition, since the protrusion area of the hollowed-out through hole 14162 is greater than the protrusion area of the magnetic attraction member protrusion 44, the magnetic attraction member protrusion 44 can pass through the hollowed-out through hole 14162. The thickness of the magnetic attraction member protrusion 44 is consistent with the thickness of the bottom wall of the magnet mounting groove 14161, so that the lower surface of the magnet 1416 can be adhered to the upper surface of the magnetic attraction member protrusion 44.

Figure 63:
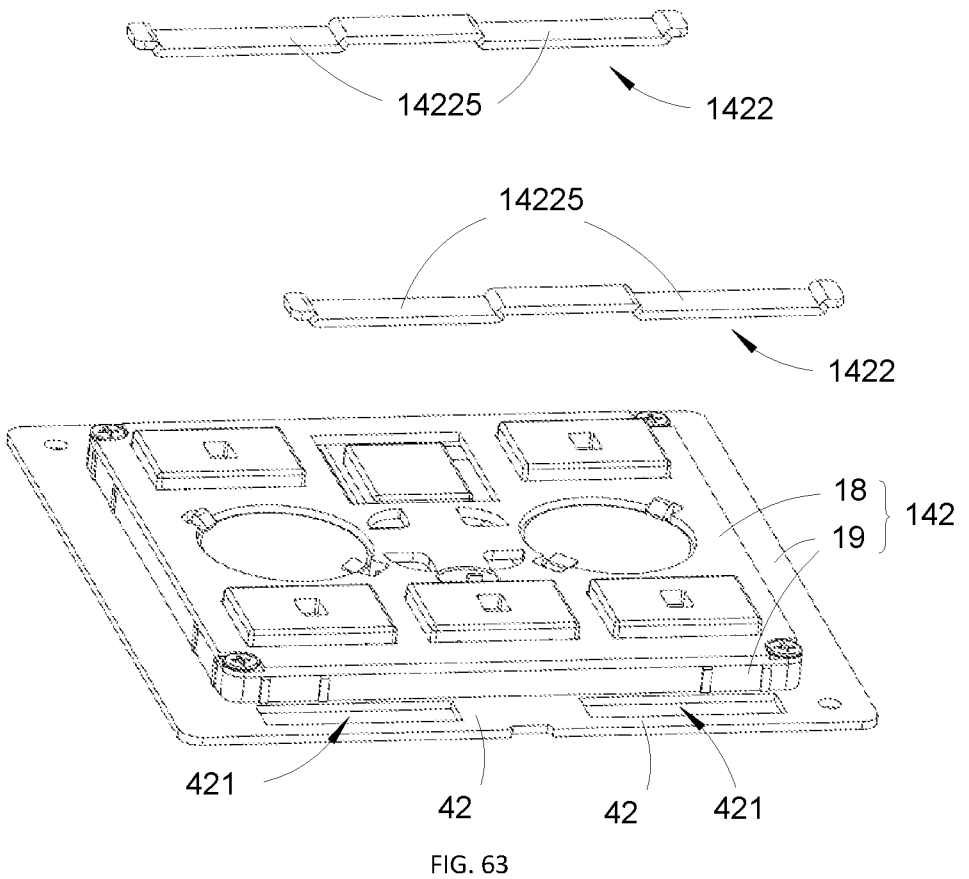
FIG. 63 is a structural diagram of a magnetic attraction member according to an embodiment of the present invention.
Figure 64:
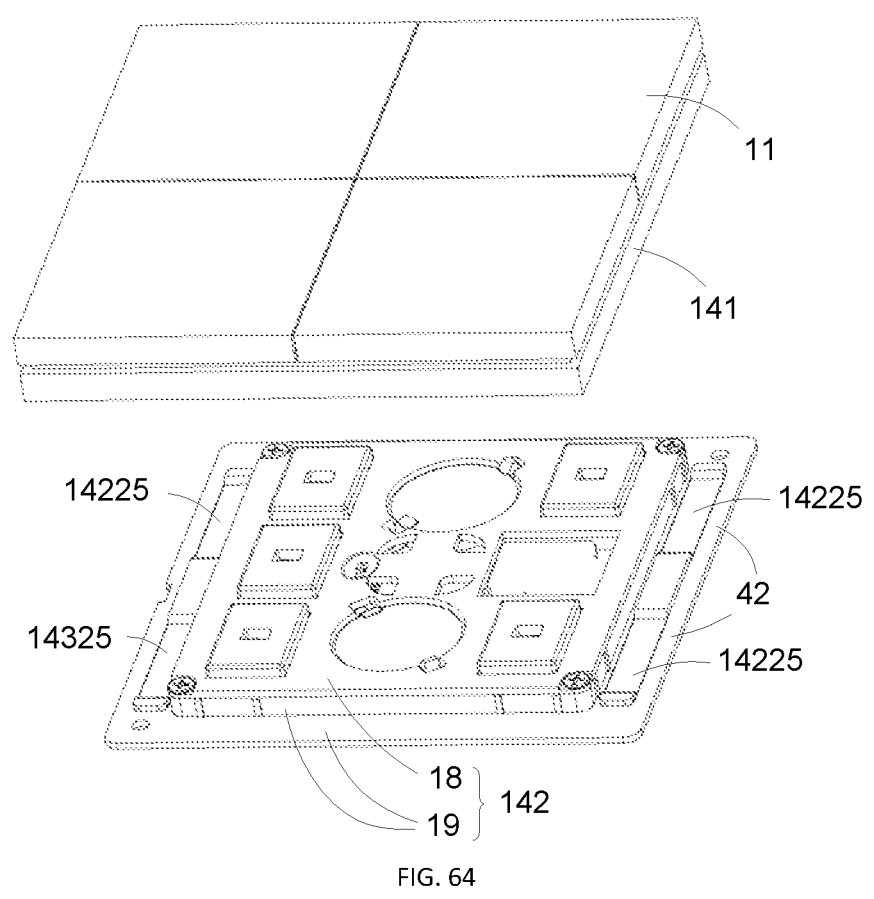
FIG. 64 is a structural diagram of a magnetic attraction member according to an embodiment of the present invention.

In another embodiment, as shown in FIGS. 63 and 64, the magnetic attraction member fixing portion 42 is provided with at least one magnetic attraction member fixing through hole 422. At a part part of the magnetic attraction member 1422 is downwards and concavely provided with at least one magnetic attraction member recess portion 14225. The size of the magnetic attraction member recess portion 14225 is adapted to the size of the magnetic attraction member fixing through hole 422, so that the magnetic attraction member recess portion 14225 is placed in the magnetic attraction member through hole 421, and other parts of the magnetic attraction member 1422 except the magnetic attraction member recess portion 14225 are overlapped on the upper surface of the magnetic attraction member fixing portion 42. The magnetic attraction member 1422 is adhesively fixed with the magnetic attraction member fixing portion 42. The size of the magnetic attraction member recess portion 14225 being adapted to the size of the magnetic attraction member fixing through hole 422 can be understood that the size of the magnetic attraction member fixing through hole 422 is greater than the size of the magnetic attraction member recess portion 14225, so that the magnetic attraction member recess portion 14225 can sink into the magnetic attraction member fixing through hole 422. In a specific embodiment, two magnetic attraction member fixing through holes 422 are respectively provided at the two ends of the bottom housing 19. A magnetic attraction member 1422 is respectively provided at the two ends of the bottom housing 19. Each magnetic attraction member 1422 includes two magnetic attraction member recess portion 14225. The magnetic attraction members 1422 are respectively placed in the magnetic attraction member fixing through holes 422. The parts of the magnetic attraction members 1422 other than the magnetic attraction member recess portion 14225 are overlapped on the upper surface of the magnetic attraction member fixing portion 42, namely, a part of the lower surface of the magnetic attraction members 1422 fits a part of the upper surface of the bottom housing 19, and is fixed by adhesive bonding.

As shown in FIG. 64, the depth of the magnetic attraction member recess portion 14225 is adapted to the thickness of the magnetic attraction member 1422, so that the upper surface of the magnetic attraction member recess portion 14225 is flush with the upper surface of the magnetic attraction member fixing portion 42. The position of the magnetic attraction member recess portion 14225 corresponds to the position of the magnet mounting groove 14161. The length of the magnetic attraction member recess portion 14225 is greater than the length of the lower surface of the magnet mounting groove 14161, so that the lower surface of the magnet mounting groove 14161 fits the upper surface of the magnetic attraction member recess portion 14225.

In a preferred embodiment, the magnetic attraction members 1422 are stamped parts, saving manufacturing costs.

In another embodiment, a light uniforming piece 1881 (not shown in the figure) is laid on a side of the key 11 facing towards the housing 14. The light uniforming piece 1881 is provided between the LED lamp 163 and the light guide portion 114. The light emitted by the LED lamp 163 is uniformed by the light uniforming piece 1881 and then projected to the light guide portion 114. Here, the light uniforming piece 1881 is understood to be a sheet piece having a light uniforming piece function, such as an opaque plastic sheet, a frosted glass sheet, etc. In this embodiment, the light uniforming piece 1881 is made of a transparent white plastic sheet. The light uniforming piece 1881 is directly adhered to the lower surface of the key 11, eliminating the structure of the light uniforming shade 183, saving costs, and making the switch thinner.

Furthermore, a face of the key 11 towards the housing 14 is provided as a first surface. The first surface is provided with a light-transmitting piece 1883 (not shown) at the corresponding position of the light guide portion 114. The light-transmitting piece 1883 is provided as a rainbow film and can reflect natural light into color light. The projection of the light-transmitting piece 1883 on the first surface covers the projection of the light guide portion 114 on the first surface. The iridescent film, also referred to as a seven-color film, a colorful film, is a plastic composite film in which two or more resins of different refractive indices are melt-extruded and sequentially laminated at intervals of up to 100 layers each having a thickness of only a few hundred nanometers. The rainbow film is a transparent thin film, and the surface thereof reflects seven-color luster under illumination. In this embodiment, the rainbow film is adhered to the first surface of the key 11, namely, the rainbow film is arranged below the light guide portion 114 of the key 11, so that the light guide portion 114 of the key 11 reflects seven-color luster when viewed from the upper surface of the key 11, thereby improving the aesthetics of the key 11.

Note that, in the present invention, the wireless communication module may be electrically connected to the detection member through a self-power generation module, or may be electrically connected through a battery.

Specifically, referring to FIG. 57, in an embodiment of the present invention, the wireless intelligent switch 102 further includes a power supply module 21 which includes at least one button battery 211 and a PCB board 16. The PCB board 16 is electrically connected to the button battery 211. The PCB board 16 is provided with the wireless communication module 13 and the detection member 12 for electrically connecting the wireless communication module 13 to the detection member 12. Thus, the wireless communication module 13 and the detection member 12 are integrated on the PCB board 16. The button battery 211 supplies electric energy to the PCB board 16, thereby completing the process of the detection member 12 sending a trigger signal to the wireless communication module 13 and the wireless communication module 13 receiving the trigger signal of the detection member 12 and sending a wireless message to the outside based on the trigger signal. More specifically, in an embodiment of the present invention, the button battery 211 is of type CR2032. The button battery 211 of CR2032 has a high specific energy, a long storage life, a small self-discharge, a long discharge time and a smooth discharge voltage, and the use temperature range is −20° C. to 70° C., which is very suitable for a wireless intelligent switch 102 product. In addition, the button battery 211 of CR2032 has a high energy and is environmentally friendly. It does not contain lead, cadmium and mercury, and complies with European Union environmental protection regulations and satisfies modern green environmental protection concepts.

Note that the number of the button battery 211 is not limited, and the button battery 211 may be provided in one, two, etc. Specifically, referring to FIGS. 57 and 58, in an embodiment of the present invention, two button batteries 211 are provided.

Furthermore, based on the above-mentioned the embodiment where "the housing 14 includes an upper housing 141 and a lower housing 142; the upper housing 141 is covered on the lower housing 142 and is detachably connected to the lower housing 142; the key 11 is arranged on the upper housing 141; and the PCB board 16 is arranged on the lower housing 142", at least one battery accommodating cavity 22 is arranged on the lower housing 142, the battery accommodating cavity 22 has an opening provided towards the upper housing 141, and the battery accommodating cavity 22 is used for accommodating the button battery 211. That is to say, the power supply module 21, the detection member 12 and the wireless communication module 13 are all arranged on the lower housing 142, thereby reducing the cost of replacing the upper housing 141.

Note that the number of the battery accommodating cavity 22 corresponds to the number of the button battery 211. Specifically, referring to FIGS. 57 and 58, in an embodiment of the present invention, two button battery 211 are provided. Correspondingly, two battery accommodating cavities 22 are provided.

Furthermore, on the basis of the above-mentioned embodiment that "the lower housing 142 includes a bottom housing 19 and an isolation cover 18; the isolation cover 18 is covered on the bottom housing 19 and forms an accommodating cavity 191 with the bottom housing 19; and the PCB board 16 is accommodated inside the accommodating cavity 191", namely, the button battery 211 is also arranged in the accommodating cavity 191; in this way, the battery accommodating cavity 22 is formed on the bottom housing 19 and/or the isolation cover 18, that is to say, the battery accommodating cavity 22 can be formed on the bottom housing 19 or the isolation cover 18. Of course, a part of the battery accommodating cavity 22 can be formed on the bottom housing 19 and another part of the battery accommodating cavity 22 can be formed on the isolation cover 18, so that the thickness of the lower housing 142 can be reduced, and the wireless intelligent switch 102 is designed to be lighter and thinner for easy transport. More specifically, a portion of the battery accommodating cavity 22 formed in the bottom housing 19 may be a bottom wall formed in the bottom housing 19, i.e., a side wall formed in the bottom housing 19 away from the upper housing 141, or a PCB board 16 formed in the bottom housing 19, thereby reducing the thickness of the lower housing 142. Specifically, referring to FIG. 57, in an embodiment of the present invention, a portion of the battery accommodating cavity 22 is formed in the isolation cover 18 and another portion is formed in the PCB board 16.

It should be noted that the connection mode of the isolation cover 18 and the bottom housing 19 is not limited. Specifically, in some embodiments of the present invention, the isolation cover 18 and the bottom housing 19 are detachably connected. When a problem arises in a component in the accommodating cavity 191, compared with the non-detachable connection mode, a maintenance person can directly separate the isolation cover 18 and the bottom housing 19. Therefore, it is very convenient to repair or replace the component with a problem, and the product is economically efficient. Further, in some embodiments of the present invention, the isolation cover 18 is snap-fit with the bottom housing 19. In other embodiments of the present invention, the isolation cover 18 is threadedly connected to the bottom housing 19 in a manner that ensures a stable connection of the isolation cover 18 to the bottom housing 19, which is simple and quick for operation, and is inexpensive.

Of course, the connection manner of the PCB board 16 and the bottom housing 19 is also not limited. In particular, the detachable connection of the PCB board 16 and the bottom housing 19 is very convenient compared with some non-detachable connection manners. Further, in some embodiments of the present invention, the PCB board 16 is snap-fit to the bottom housing 19 in a manner that is simple to operate. It does not require tool-assisted installation or removal, with high assembly efficiency.

It should be noted that in the present invention, the above-mentioned two technical features may be provided alternatively or simultaneously. Specifically, referring to FIGS. 57, 58 and 79, in some embodiments of the present invention, the above-mentioned two technical features are provided at the same time, namely, the isolation cover 18 is threadedly connected to the bottom housing 19, and the PCB board 16 is clamped to the bottom housing 19. That is to say, the bottom housing 19 is respectively connected to the isolation cover 18 and the PCB board 16 in a detachable manner, so as to facilitate installation and disassembly and improve product use economy.

Furthermore, with reference to FIGS. 58 and 77 to 80, in an embodiment of the present invention, a plurality of mounting posts 192 are arranged on the bottom wall of the accommodating cavity 191 of the bottom housing 19 and are distributed at intervals along the circumference thereof. Each of the mounting posts 192 is provided with a first mounting hole 193 opening away from the bottom housing 19. The isolation cover 18 is provided with a plurality of second mounting holes 18a corresponding to the plurality of first mounting holes 193. Each of the second mounting holes 18a and the corresponding first mounting hole 193 are successively used for inserting a screw, so that the isolation cover 18 is in threaded connection with the bottom housing

19. The PCB board 16 is provided with a plurality of clamping holes corresponding to a plurality of the mounting posts 192. Each of the clamping holes is used for inserting the corresponding mounting post 192, so that the PCB board 16 and the bottom housing 19 are clamped via the plurality of the mounting posts 192. In this way, the bottom housing 19 provides both a threaded connection with the isolation cover 18 and a clamping connection with the PCB board 16 through the provision of the plurality of mounting posts 192, greatly simplifying construction and saving space. More specifically, a plurality of the mounting posts 192 abut against the side wall of the accommodating cavity 191. In this regard, a plurality of the clamping holes are formed at the periphery of the PCB board 16. Each of the snap holes is formed as a semi-circular hole, so that when the PCB board 16 is mounted, the inner side wall of each clamping hole is adapted to abut against a portion of the peripheral wall of the corresponding mounting post 192.

Furthermore, referring to FIGS. 57, 58, 77 and 78, in an embodiment of the present invention, the isolation cover 18 includes an isolation cover main body, and a plurality of mounting portions arranged on the periphery of the isolation cover main body. The plurality of mounting portions are used for threaded connection with a plurality of the mounting posts 192 in one-to-one correspondence. Each of the mounting portions protrudes from the periphery of an end portion of the isolation cover main body away from the bottom housing 19, and are dimensioned such that after the isolation cover 18 is threadedly connected with the plurality of the mounting posts 192, a part of the isolation cover main body is located in the accommodating cavity 191 of the bottom housing 19 and is pressed onto the PCB board 16, so as to fix the PCB board 16 together with the bottom housing 19, improving the installation stability of the PCB board 16, and also reducing the thickness of the lower housing 142.

Specifically, in order to stably mount the button battery 211, a battery fixing structure 23 is arranged on the lower housing 142 for detachably mounting the button battery 211 in the battery accommodating cavity 22. The arrangement of the battery fixing structure 23 is not only used for fixing the button battery 211, but also convenient for mounting or dismounting a battery so as to facilitate the replacement of a new or old battery, extend the service life of the wireless intelligent switch 102 and improve the practicality.

It should be noted that in some embodiments of the present invention, the button battery 211 may be directly clamped in the battery accommodating cavity 22. However, in order to avoid the button battery 211 moving with the wireless intelligent switch 102 which affects the power supply effect, even falling out from the battery accommodating cavity 22, and in addition, since the side wall of the battery accommodating cavity 22 defines the button battery 211 in a direction parallel to the bottom wall of the battery accommodating cavity 22, further, the battery fixing structure 23 includes a movable snap 231. The movable snap 231 includes a connecting portion 2311 connected to the lower housing 142, and a snap-fit portion 2312 connected to the connecting portion 2311. The snap-fit portion 2312 is provided at one end of the connecting portion 2311 close to the battery accommodating cavity 22. The snap-fit portion 2312 can be close to or away from the battery accommodating cavity 22, and when close to the battery accommodating cavity 22, is used for fixing the button battery 211 together with the bottom wall of the battery accommodating cavity 22. In this way, the button battery 211 can be fixed in a limiting manner together with the bottom wall of the battery accommodating cavity 22 in a direction perpendicular to the bottom wall of the battery accommodating cavity 22 by providing the movable snap 231 so as to prevent the button battery 211 from falling out of the battery accommodating cavity 22, thereby improving the installation stability of the button battery 211. Specifically, when the button battery 211 is arranged or removed, the snap-fit portion 2312 of the movable snap 231 moves away from the battery accommodating cavity 22 and moves outside the installation and removal range of the button battery 211, so as to ensure that the snap-fit portion 2312 of the movable snap 231 does not interfere with the button battery 211 during the installation or removal of the button battery 211. Therefore, the button battery 211 is smoothly placed or taken out in the battery accommodating cavity 22. In the process of installing the button battery 211, after the button battery 211 is placed in the battery accommodating cavity 22, the snap-fit portion 2312 of the movable snap 231 moves in a direction close to the battery accommodating cavity 22 until abutting against the upper wall of the button battery 211, thereby fixing the button battery 211 together with the bottom wall of the battery accommodating cavity 22, completing the installation and fixing of the button battery 211, and preventing the button battery 211 from falling out of the battery accommodating cavity 22 when the wireless intelligent switch 102 is active.

It should also be noted that in the present invention, the manner of movement of the snap-fit portion 2312 of the movable snap 231 close to or away from the battery accommodating cavity 22 is not limited. The movable snap 231 may move relative to the lower housing 142, or the snap-fit portion 2312 of the movable snap 231 may rotate relative to the connecting portion 2311. However, the above-mentioned two manners may also be adopted simultaneously. Namely, when the movable snap 231 moves relative to the battery accommodating cavity 22, the snap-fit portion 2312 thereof is also forced to rotate relative to the connecting portion 2311 thereof, thereby quickly completing the installation or removal of the button battery 211.

Figures 75, 76, 77:
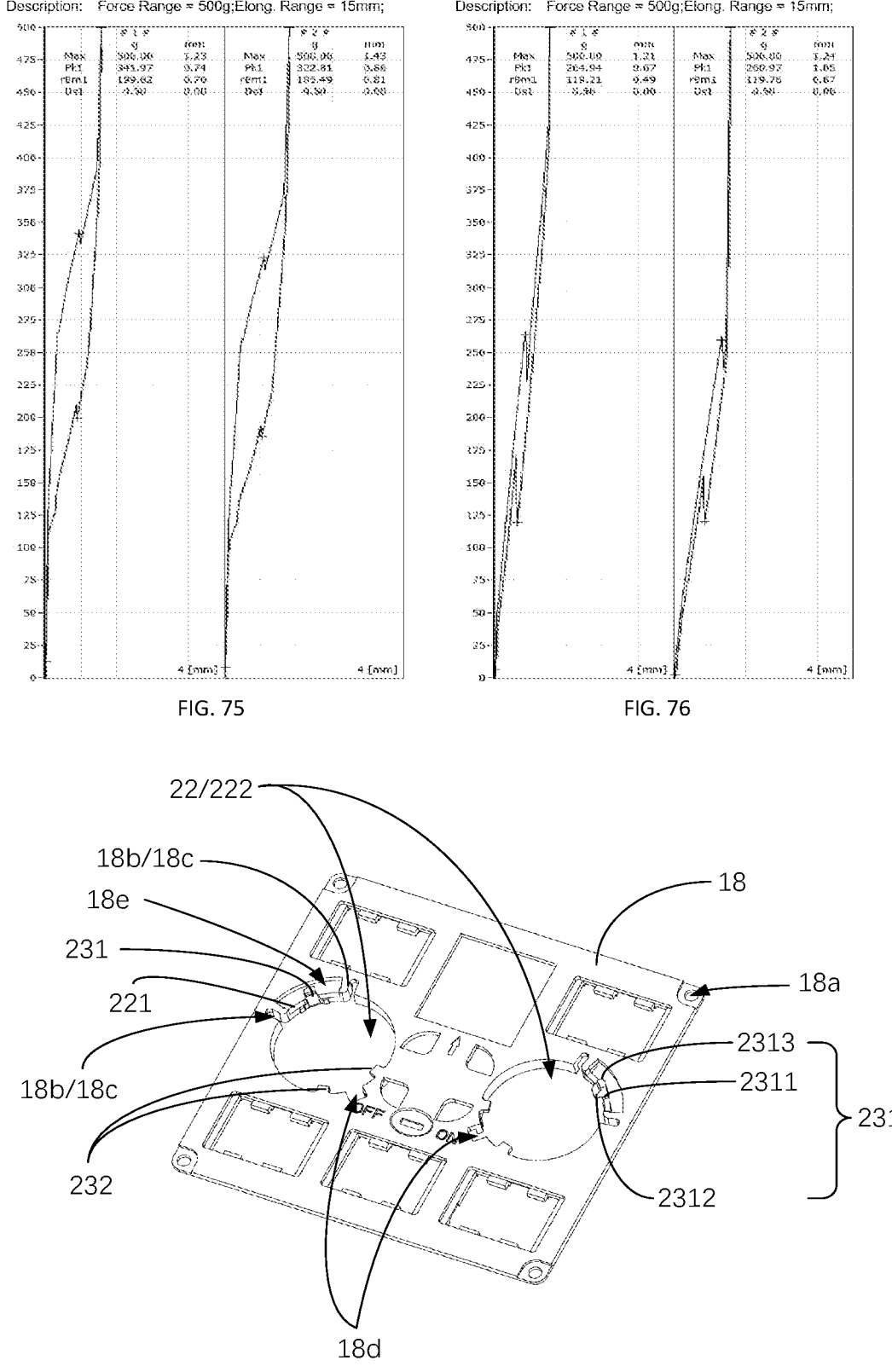
FIG. 75 is a curve graph of pressing force versus displacement of a key according to an embodiment of the present invention.
FIG. 76 is a curve graph of pressing force versus displacement of a key according to an embodiment of the present invention.
FIG. 77 is a perspective view of an embodiment of an isolation cover of FIG. 57.
Figure 78:
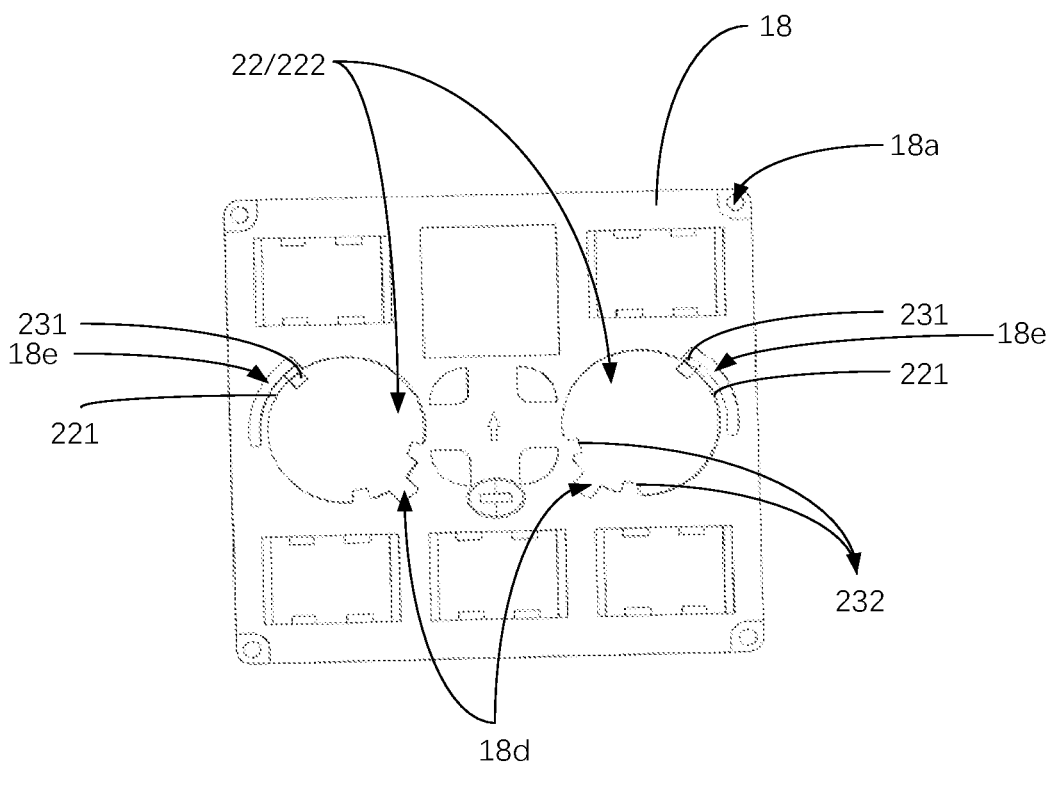
FIG. 78 is a plan diagram of FIG. 77.

Furthermore, with reference to FIGS. 77 and 78, in some embodiments of the present invention, by arranging the material of the connecting portion 2311 of the movable snap 231 and the lower housing 142, the movable snap 231 can move relative to the lower housing 142. Specifically, the lower housing 142 is provided with a first relief hole 18e along a direction perpendicular to the bottom wall of the battery accommodating cavity 22. An resilient wall 221 is provided between the first relief hole 18e and the battery accommodating cavity 22. The resilient wall 221 can be forced to elastically deform in a direction towards or away from the first relief hole 18e. The movable snap 231 is arranged on the resilient wall 221 so as to be close to or away from the battery accommodating cavity 22 during the resilient deformation of the resilient wall 221. The side wall of the battery accommodating cavity 22 includes the resilient wall 221. That is to say, through the movable space provided by the first relief hole 18e, the resilient arm can be elastically deformed in a direction towards or away from the first relief hole 18e due to the material properties of the resilient arm, so that when the movable snap 231 is stressed, the resilient arm is elastically deformed under the action of the acting force transmitted from the movable snap 231. Therefore, the movable snap 231 moves as a whole so as to move away from or close to the battery accommodating cavity 22. Namely, the snap-fit portion 2312 is moved away from or close to the battery accommodating cavity 22, so as to realize the installation or removal of the button battery 211.

More specifically, the material of the resilient wall 221 is plastic, etc. which is low in cost and simple in processing.

It should be noted that, in the present invention, the extension direction of the first relief hole 18*e* is not limited. Specifically, referring to FIGS. 177 and 78, in some embodiments of the present invention, the first relief hole 18*e* is provided along the circumferential extension of the battery accommodating cavity 22 so that the resilient wall 221 has a uniform distribution of deformation stress.

Furthermore, referring to FIG. 77, in an embodiment of the present invention, the lower housing 142 is provided with two compensation holes 18*b* penetrating in a direction perpendicular to the bottom wall of the battery accommodating cavity 22. Two of the compensation holes 18*b* are provided on both sides of the resilient wall 221. Each of the compensation holes 18*b* is in communication with the battery accommodating cavity 22, so that when the movable snap 231 is forced away from the battery accommodating cavity 22, a side wall of each of the compensation holes 18*b* close to the resilient wall 221 is elastically deformed in a direction towards the movable snap 231 so as to compensate for the resilient deformation of the portion of the resilient wall 221 used for connecting the movable snap 231. In this way, when the movable snap 231 moves in a direction away from the battery accommodating cavity 22, and the resilient wall 221 is stressed as a whole, avoiding that the deformation stress of the resilient wall 221 is concentrated on the portion of the resilient wall 221 connected to the movable snap 231, which may break the connection between the resilient wall 221 and the movable snap 231. The arrangement of the compensation hole 18*b* makes the resilient arm more easily deformed. This further facilitates the installation or removal of the button battery 211.

Specifically, in order to further reduce the thickness of the lower housing 142, referring to FIG. 77, in an embodiment of the present invention, the resilient wall 221 is recessed to a certain preset depth in a direction towards the bottom wall of the battery accommodating cavity 22. The first relief hole 18*e* is in communication with the battery accommodating cavity 22, reducing the height of the movable snap 231 protruding from the lower housing 142, facilitating the light and thin design of the wireless intelligent switch 102. At the same time, the resilient wall 221 has a reduced thickness due to its depression, and thus is more easily elastically deformed when subjected to a force, thereby facilitating handling.

Specifically, referring to FIG. 78, in some embodiments of the present invention, one end of the first relief hole 18*e* is provided as a communication end, and the communication end is in communication with the battery accommodating cavity 22. That is to say, the communication end is located between one end of the resilient wall 221 and the side wall of the battery accommodating cavity 22. Thus, during the movement of the movable snap 231 close to or away from the battery accommodating cavity 22, the force exerted on the resilient wall 221 by the side wall of the battery accommodating cavity 22 is reduced, and the resilient wall 221 is more easily elastically deformed for easy operation.

Furthermore, the position of the movable snap 231 arranged on the resilient wall 221 is not limited. However, since the force exerted on the side wall of the battery accommodating cavity 22 by the resilient wall 221 gradually decreases from an end portion of the resilient wall 221 away from the communication end to an end portion of the resilient wall 221 close to the communication end, namely, an end portion of the resilient wall 221 close to the communication end can move relative to the side wall of the battery accommodating cavity 22, with reference to FIG. 78, in some embodiments of the present invention, the movable snap 231 is provided close to the communication end. The movable snap 231 is provided closer to the communication end with a larger range of movement and is more easily movable by force than if it is provided farther away from the communication end, thereby facilitating the installation and removal of the button battery 211. More specifically, the movable snap 231 is provided at one end of the resilient wall 221 close to the communication end to improve the installation and removal efficiency of the button battery 211.

With reference to FIGS. 77 and 78, in some embodiments of the present invention, when the movable snap 231 moves, the snap-fit portion 2312 thereof can be forced to rotate relative to the connecting portion 2311 thereof. Specifically, the movable snap 231 is provided as an elastic snap. According to the material properties of the movable snap 231, when forced, the snap-fit portion 2312 thereof is elastically deformed to rotate relative to the connecting portion 2311 thereof. More specifically, the material of the movable snap 231 is plastic or rubber, etc. with low cost and convenient processing.

Of course, in other embodiments of the present invention, merely by means of the snap-fit portion 2312 of the movable snap 231 being rotatable relative to the connecting portion 2311, the snap-fit portion 2312 can be close to or away from the battery accommodating cavity 22. Specifically, a portion of the battery accommodating cavity 22 away from the opening end face of the bottom housing 19 is recessed to form a relief groove. The movable snap 231 is provided at the bottom wall of the relief groove. The movable snap 231 is spaced apart from the side wall of the relief groove away from the battery accommodating cavity 22 so as to form a first relief space. The first relief space is used for the movement of the snap-fit portion 2312 when the snap-fit portion 2312 of the movable snap 231 is away from the battery accommodating cavity 22. The arrangement of the first relief space provides a rotation space for the snap-fit portion 2312 of the movable snap 231, so as to ensure that during the installation or removal of the button battery 211, the snap-fit portion 2312 can rotate with sufficient space to avoid the button battery 211 from interfering with the button battery 211, thereby ensuring the smooth installation and removal of the button battery 211. In addition, the movable snap 231 is provided in the relief groove, so that the movable snap 231 is flush with or lower than or slightly higher than the opening end face of the battery accommodating cavity 22. Compared with the movable snap 231 being directly provided at the opening end of the battery accommodating cavity 22, the space can be saved, which is beneficial to the light and thin design of the wireless intelligent switch 102.

Specifically, on the basis of the above-mentioned embodiment that "the lower housing 142 includes a bottom housing 19 and an isolation cover 18; the isolation cover 18 is covered on the bottom housing 19 and forms an accommodating cavity 191 with the bottom housing 19; and the PCB board 16 is received inside the accommodating cavity 191", the movable snap 231 is arranged on the bottom housing 19 or the isolation cover 18, and the arrangement position of the movable snap 231 is determined according to the arrangement position of the battery accommodating cavity 22.

Specifically, when the battery accommodating cavity 22 is only formed on the isolation cover 18, the isolation cover 18 is provided with a first accommodating through hole 222. The battery accommodating cavity 22 includes the first accommodating through hole 222. The movable snap 231 is arranged on the isolation cover 18 or the PCB board 16.

When the battery accommodating cavity 22 is only formed on the PCB board 16, the PCB board 16 is provided with a second accommodating through hole 223, the battery accommodating cavity 22 includes the second accommodating through hole 223. The movable snap 231 is arranged on the bottom housing 19, the PCB board 16 or the isolation cover 18. When a part of the battery accommodating cavity 22 is formed on the isolation cover 18, and another part is formed on the PCB board 16, the isolation cover 18 is provided with a first accommodating through hole 222. The PCB board 16 is provided with a second accommodating through hole 223. The first accommodating through hole 222 and the second accommodating through hole 223 are in communication. The battery accommodating cavity 22 includes the first accommodating through hole 222 and the second accommodating through hole 223. The movable snap 231 is arranged on the bottom housing 19 or the isolation cover 18.

More specifically, referring to FIGS. 1-3, in an embodiment of the present invention, in order to further reduce the thickness of the lower housing 142 and achieve a light and thin design of the wireless intelligent switch 102, a part of the battery accommodating cavity 22 is formed on the isolation cover 18, and another part is formed on the bottom housing 19. Namely, the isolation cover 18 is provided with a first accommodating through hole 222. The PCB board 16 is provided with a second accommodating through hole 223. The first accommodating through hole 222 and the second accommodating through hole 223 are in communication. The battery accommodating cavity 22 includes the first accommodating through hole 222 and the second accommodating through hole 223. The movable snap 231 is arranged on the bottom housing 19 or the isolation cover 18. In this regard, the volume of the movable snap 231 is also different according to the different arrangement positions of the movable snap 231. When the movable snap 231 is arranged on the isolation cover 18, the length of the movable snap 231 is set to be shorter than that when the movable snap 231 is arranged on the bottom housing 19, so that the snap-fit portion 2312 of the movable snap 231 is not easily broken when the snap-fit portion 2312 is rotated, and the space occupied by the movable snap 231 is also smaller. More specifically, with reference to FIGS. 57 and 77, in an embodiment of the present invention, the movable snap 231 is arranged on the isolation cover 18 and is arranged on the side wall of the first accommodating through hole 222. The movable snap 231 can move relative to the lower housing 142. The snap-fit portion 2312 of the movable snap 231 can rotate relative to the connecting portion 2311. The side wall of the first accommodating through hole 222 includes the resilient wall 221, and the resilient wall 221 is the bottom wall of the relief groove.

In order to further improve the installation stability of the button battery 211, the battery fixing structure 23 further includes a limiting button 232. The limiting button 232 is arranged on a side wall or an opening end of the battery accommodating cavity 22 and is arranged opposite to the movable snap 231 so as to limit the button battery 211 in a direction perpendicular to the bottom wall of the battery accommodating cavity 22. In this way, the button battery 211 is fixed together by arranging the limiting button 232 and the movable snap 231 to prevent the button battery 211 from falling out of the battery accommodating cavity 22 during the movement of the wireless intelligent switch 102.

It should be noted that in the present invention, the number of the movable snaps 231 is not limited, and may be one, two, three, etc. Specifically, with reference to FIGS.

1-3, in an embodiment of the present invention, based on the above-mentioned embodiment that "the battery fixing structure 23 further includes a limiting button 232; the limiting button 232 is arranged on a side wall or an open end of the battery accommodating cavity 22 and is arranged opposite to the movable snap 231 so as to limit the position of the button battery 211 in a direction perpendicular to the bottom wall of the battery accommodating cavity 22", it is sufficient that one movable snap 231 is provided, which can ensure the installation stability of the button battery 211. In addition, an operator only needs to operate one movable snap 231 to realize the installation or removal of the button battery 211, which is simple and convenient.

Specifically, in order to facilitate the operation of the movable snap 231, the movable snap 231 also has a holding portion 2313. The holding portion 2313 is arranged on a side of the connecting portion 2311 away from the battery accommodating cavity 22 in a direction perpendicular to the bottom wall of the battery accommodating cavity 22. A second guide slope is provided between the holding portion 2313 and the snap-fit portion 2312. The arrangement of the holding portion 2313 greatly facilitates the operator applying a force to the movable snap 231, while the arrangement of the second guide slope has a guiding effect on the button battery 211. The button battery 211 can slide directly into the battery accommodating cavity 22 along the second guide slope, so that the installation of the button battery 211 is more simple and convenient.

Specifically, in general, in order to make the installation of the button battery 211 stable, the gap between the button battery 211 and the battery accommodating cavity 22 is small, so that there is not enough space for an operator to operate. The button battery 211 can be directly and quickly removed from the battery accommodating cavity 22, thereby affecting the removal efficiency of the button battery 211. Therefore, in some embodiments of the present invention, an resilient member 24 is provided in the battery accommodating cavity 22. The resilient member 24 has a natural state and a pressed state pressed by the button battery 211. When the snap-fit portion 2312 of the movable snap 231 is away from the button battery 211, the elastic sheet 24 returns from the pressed state to the natural state and acts on the button battery 211 so as to eject a part of the button battery 211 out of the battery accommodating cavity 22. In this way, by providing the resilient member 24, when the button battery 211 is not restricted by the movable snap 231, a part of the button battery 211 subjected to the elastic force of the resilient member 24 pops out of the battery accommodating cavity 22, improving the convenience of taking out the button battery 211.

It should be noted that based on the above-mentioned embodiment that "the battery fixing structure 23 further includes a limiting button 232; the limiting button 232 is arranged on a side wall or an opening end of the battery accommodating cavity 22 and is arranged opposite to the movable snap 231 so as to limit the position of the button battery 211 in a direction perpendicular to the bottom wall of the battery accommodating cavity 22", the resilient member 24 is arranged close to the movable snap 231. Thus when the snap-fit portion 2312 of the movable snap 231 is away from the button battery 211, a part of the button battery 211 close to the movable snap 231 is subjected to a small force of the limiting button 232, and is less than the elastic force of the resilient member 24 to ensure that a part of the button battery 211 smoothly pops out of the battery accommodating cavity 22.

It should also be noted that the form of the resilient member 24 is not limited and may be a elastic sheet or spring or the like.

Furthermore, the power supply module 21 also includes a battery elastic sheet. The battery elastic sheet includes a positive electrode elastic sheet 213 and a negative electrode elastic sheet 212. The positive electrode elastic sheet 213 and the negative electrode elastic sheet 212 are respectively electrically connected to the positive and negative electrodes of the button battery 211, and are respectively electrically connected to the PCB board 16. The negative electrode elastic sheet 212 is arranged at the bottom wall of the battery accommodating cavity 22 for contacting and conducting electricity with the bottom wall of the button battery 211. The elastic sheet 24 includes the negative electrode elastic sheet 212. Since the negative electrode elastic sheet 212 has elasticity and is provided at the bottom wall of the battery accommodating cavity 22, the negative electrode elastic sheet 212 not only has the function of electrically connecting the button battery 211 and the PCB board 16, but also can provide a certain elasticity to the button battery 211 when the button battery 211 is disassembled, so that a part of the button battery 211 is ejected from the battery accommodating cavity 22, improving the convenience of removing the button battery 211, namely, having the function of the resilient member 24, and thus not needing to provide another the resilient member 24. In this way, the structure is simplified, the internal space is saved and the production cost is reduced.

Specifically, a tool can also be used to take out the button battery 211 to facilitate disassembly. However, generally, the installation of the button battery 211 is stable, the gap between the button battery 211 and the battery accommodating cavity 22 is small, and there is not enough space for the tool to extend into the battery accommodating cavity 22 to take out the button battery 211. Therefore, in some embodiments of the present invention, a battery disassembly groove 18c is arranged on the lower housing 142. The battery disassembly groove 18c is in communication with the button battery 211 accommodating cavity and is arranged close to the movable snap 231. When the snap-fit portion 2312 of the movable snap 231 is away from the battery accommodating cavity 22, namely, away from the button battery 211, a part of the button battery 211 close to the movable snap 231 is no longer fixed by the snap-fit portion 2312. At this moment, a withdrawal tool can be used to abut against the button battery 211 by inserting the battery removal slot 18c so as to exert a force on the button battery 211 to pry the part of the button battery 211 close to the movable snap 231 out of the battery accommodating cavity 22 so as to facilitate the removal of the button battery 211. It should be noted that the type of the removal tool is not limited as long as it can be inserted into the battery removal slot 18c to remove the button battery 211. Specifically, the removal tool may be a screwdriver or the like.

It should be noted on the basis of the above-mentioned embodiment that "the lower housing 142 is provided with two compensation holes 18b through in a direction perpendicular to the bottom wall of the battery accommodating cavity 22; the two compensation holes 18b are arranged on both sides of the resilient wall 221, and each compensation hole 18b is in communication with the battery accommodating cavity 22, so that when the movable snap 231 is forced away from the battery accommodating cavity 22, a side wall of each compensation hole 18b close to the resilient wall 221 is elastically deformed in a direction towards the movable snap 231 so as to compensate for the resilient deformation of the portion of the resilient wall 221 connecting the movable snap 231", when the compensating hole 18b is dimensioned to fit with a withdrawal tool, the compensating hole 18b may be the battery removal slot 18c, that is, a withdrawal tool may be directly inserted into the compensating hole 18b to achieve dismounting of the button battery 211.

Specifically, in order to improve the installation stability of the button battery 211, the side wall of the battery accommodating cavity 22 is adapted to the outer peripheral wall of the button battery 211. In this way, the limiting effect of the side wall of the battery accommodating cavity 22 on the button battery 211 can be enhanced, and the installation stability of the button battery 211 can be improved.

Specifically, referring to FIGS. 57 and 79 to 95, in some embodiments of the present invention, the power supply module 21 further includes a battery elastic sheet. The battery elastic sheet includes a positive electrode elastic sheet 213 and a negative electrode elastic sheet 212. The positive electrode elastic sheet 213 and the negative electrode elastic sheet 212 are respectively electrically connected to the positive and negative electrodes of the button battery 211, and are respectively electrically connected to the PCB board 16. The electrical connection between the button battery 211 and the PCB board 16 is realized via the positive electrode elastic sheet 213 and the negative electrode elastic sheet 212, and then power is supplied to the wireless communication module 13 and the detection member 12, so that the detection member 12 can send a trigger signal. The wireless communication module 13 can receive the trigger signal and send a message to the outside.

It should be noted that the negative electrode elastic sheet 212 and the positive electrode elastic sheet 213 may be of an integral structure or a separate structure. Specifically, referring to FIGS. 79 to 95, in some embodiments of the present invention, the negative electrode elastic sheet 212 and the positive electrode elastic sheet 213 are both of an integral structure, and are both formed from a base material sheet by cutting, stamping, bending and other processes, thereby increasing the reliability of the battery elastic sheet and facilitating the processing.

Furthermore, generally, a negative electrode arrangement region of the button battery 211 includes a bottom wall of the button battery 211. However, in the present invention, the bottom wall of the button battery 211 is a side wall of the button battery 211 facing towards the bottom housing 19. Correspondingly, the negative electrode elastic sheet 212 includes a negative electrode current-carrying piece 2121 and a negative electrode resilient contact arm 2122 connected to the negative electrode current-carrying piece 2121. The negative electrode current-carrying piece 2121 contacts and conducts electricity with the negative electrode of the PCB board 16. The negative electrode resilient contact arm 2122 is arranged corresponding to the battery accommodating cavity 22 so as to be in contact with and conductive to the bottom wall of the button battery 211. The negative electrode of the PCB board 16 is electrically connected to the negative electrode of the button battery 211.

Furthermore, the position of the battery elastic sheet is set according to the position of the battery accommodating cavity 22. According to the above-mentioned embodiment that "the lower housing 142 includes a bottom housing 19 and an isolation cover 18; the isolation cover 18 is covered on the bottom housing 19 and forms an accommodating cavity 191 with the bottom housing 19, and the PCB board 16 is accommodated inside the accommodating cavity 191; the isolation cover 18 is provided with a first accommodating through hole 222; the PCB board 16 is provided with a second accommodating through hole 223; the battery accommodating cavity 22 includes the first accommodating through hole 222; the first accommodating through hole 222 is in communication with the second accommodating through hole 223; the battery accommodating cavity 22 includes the first accommodating through hole 222 and the second accommodating through hole 223", when the button battery 211 is mounted in the battery accommodating cavity 22, the bottom wall of the button battery 211 is located in the second accommodating through hole 223. Therefore, the negative electrode elastic sheet 212 is arranged between the bottom housing 19 and the PCB board 16. The negative electrode resilient contact arm 2122 is arranged corresponding to the second accommodating through hole 223 so as to contact and conduct electricity with the bottom wall of the button battery 211, and realize the negative electrode contact and conduction between the negative electrode elastic sheet 212 and the PCB board 16.

Figure 84:
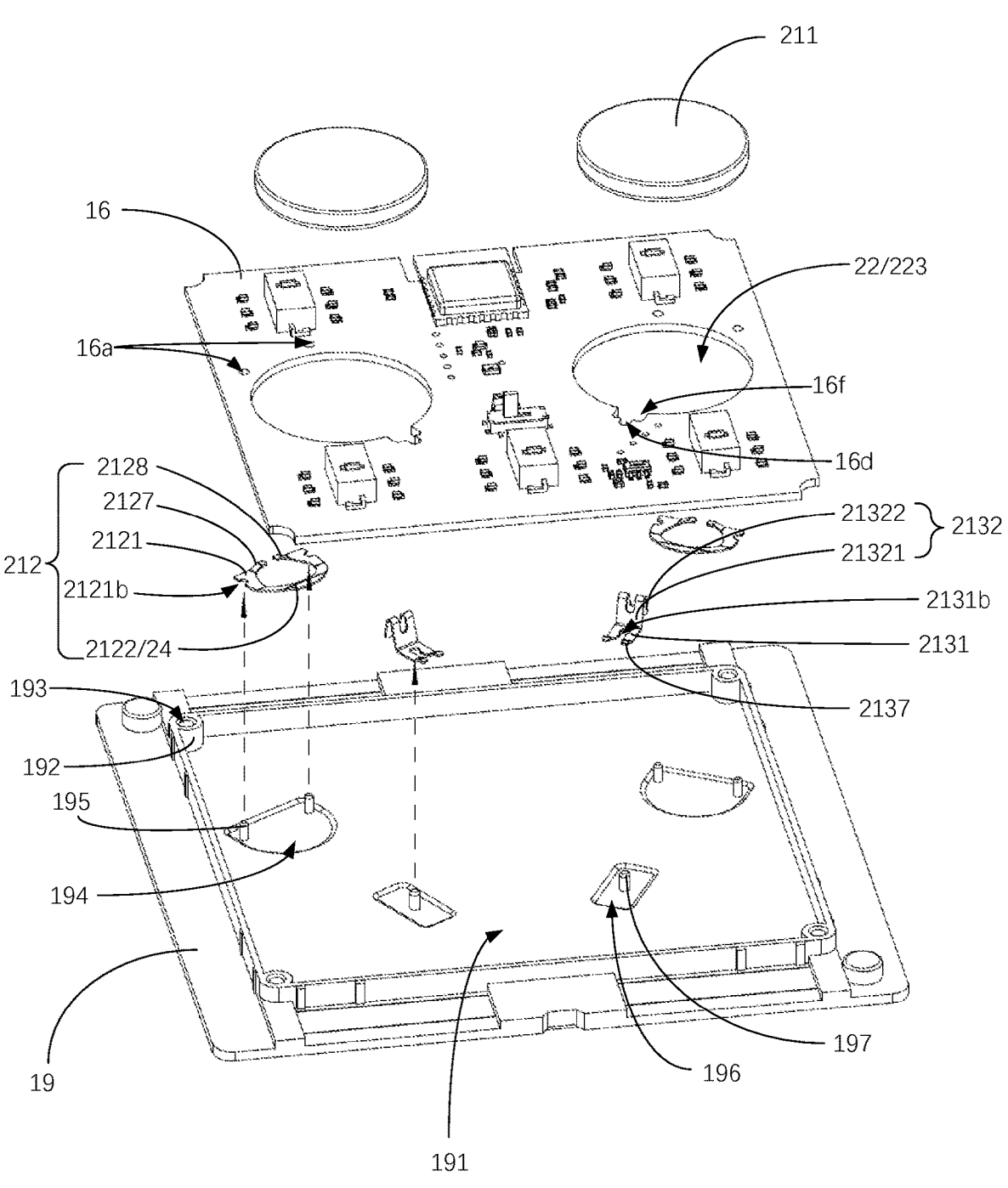
FIG. 84 is a structurally perspective view of a part of an embodiment of a wireless intelligent switch.
Figure 85:
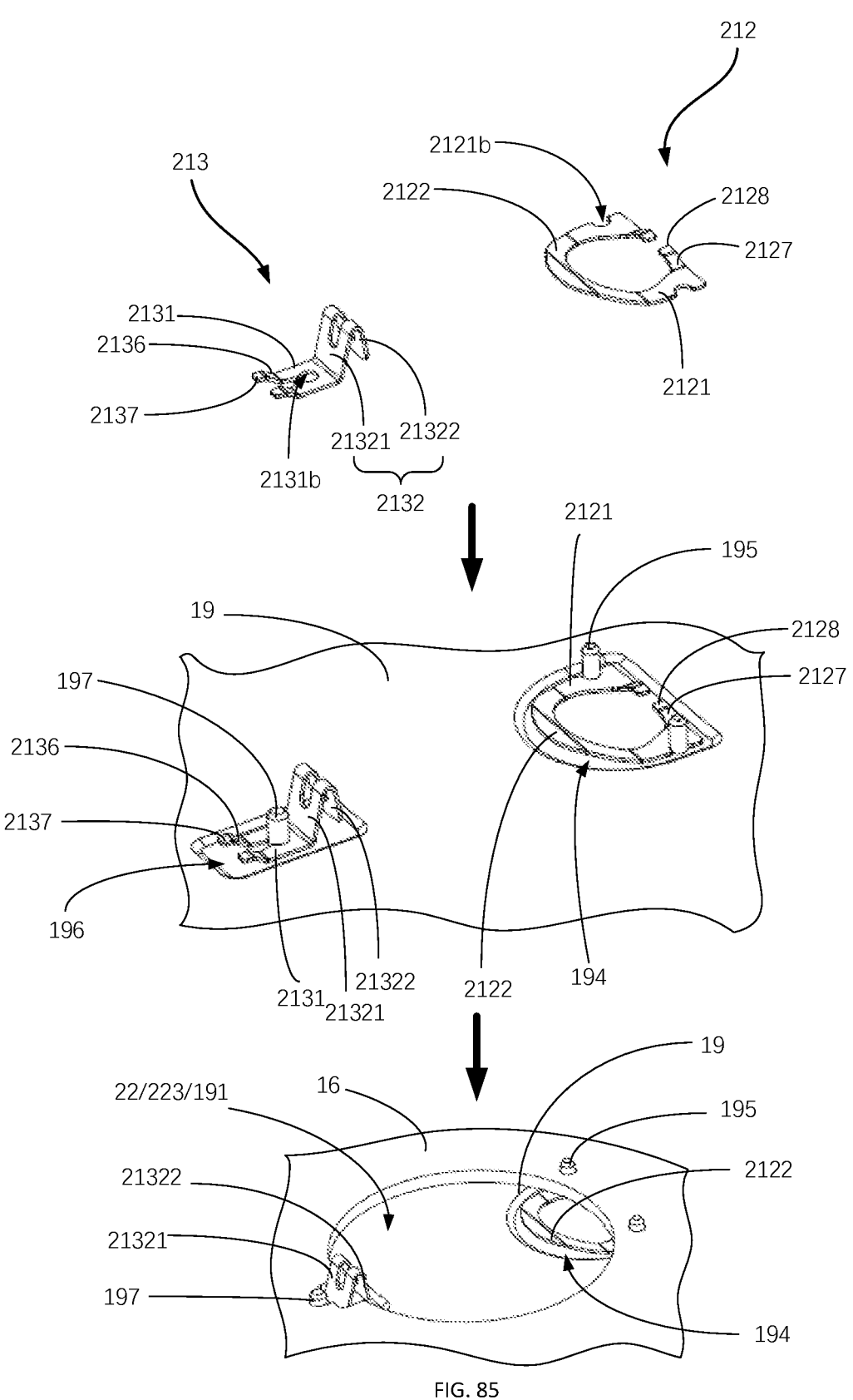
FIG. 85 is an assembly diagram of a battery elastic sheet of FIG. 84.
Figure 86:
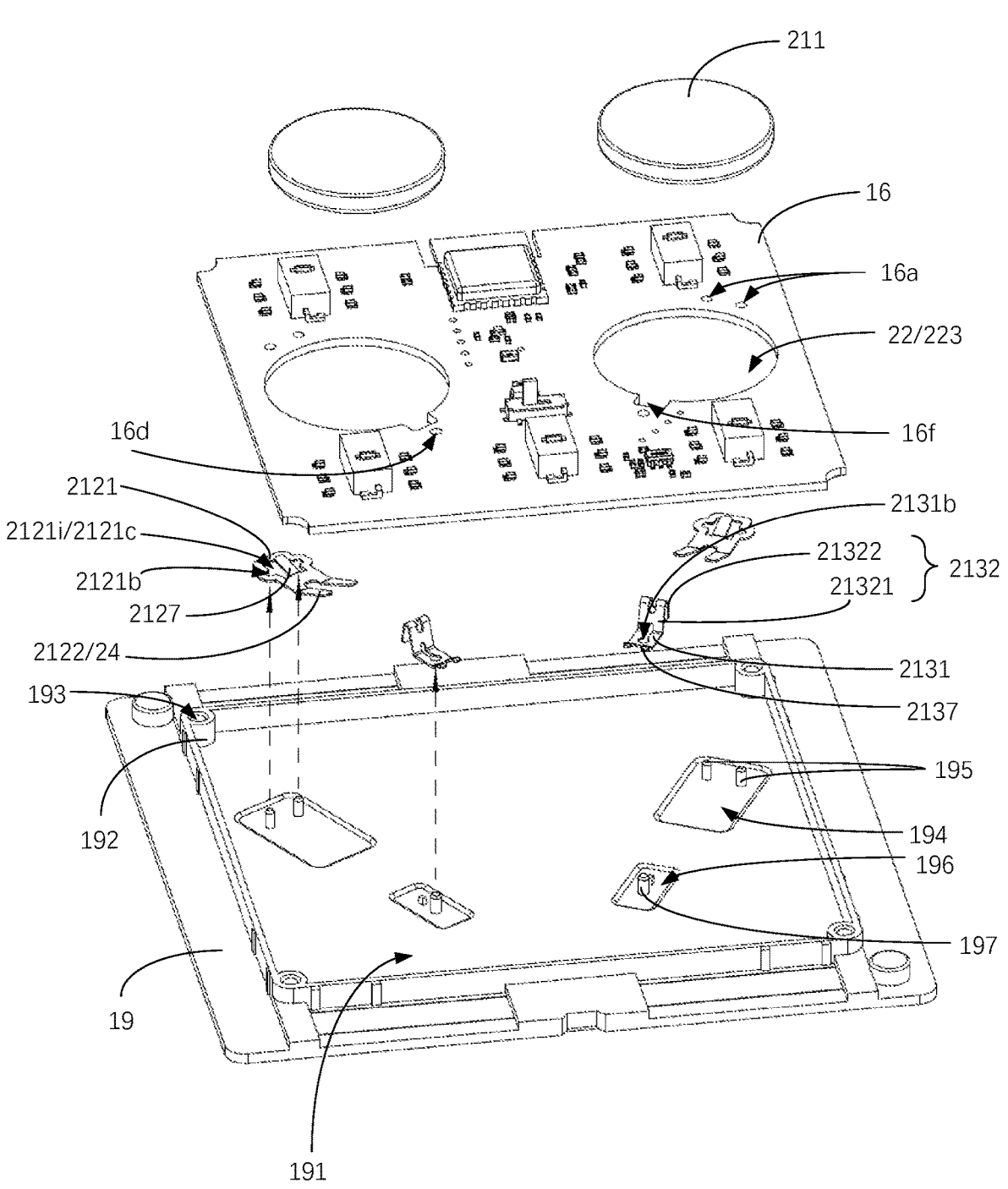
FIG. 86 is a structurally perspective view of a part of an embodiment of a wireless intelligent switch.

Specifically, in the present invention, the shape of the negative electrode resilient contact arm 2122 is not limited. Referring to FIGS. 79 to 83, FIGS. 86, FIG. 87, and FIGS. 92 to 95, in some embodiments of the present invention, the negative electrode resilient contact arm 2122 is provided in the shape of a bar. Referring to FIGS. 84 and 85, in some embodiments of the present invention, the negative electrode resilient contact arm 2122 is provided in the shape of a semicircle. Referring to FIGS. 88 to 91, in some embodiments of the present invention, the negative electrode resilient contact arm 2122 is provided in the shape of U, which is easy and convenient to manufacture.

Specifically, the negative electrode resilient contact arm 2122 extends obliquely from one end thereof connected to the negative electrode current-carrying piece 2121 in a direction towards the battery accommodating cavity 22. Compared with the horizontal arrangement of the negative electrode resilient contact arm 2122, the negative electrode resilient contact arm 2122 is arranged in an inclined manner, so that the negative electrode resilient contact arm 2122 can abut against the button battery 211 more tightly, and can maintain good contact with the button battery 211 within a certain range of motion through resilient deformation, thereby improving the reliability of the negative electrode elastic sheet 212.

It should be noted that the above-mentioned two technical features can be provided alternatively or at the same time. Specifically, with reference to FIGS. 79 to 95, in some embodiments of the present invention, the above-mentioned two technical features are provided at the same time. Namely, the negative electrode resilient contact arm 2122 is provided in a strip shape, a semi-circle shape or a U-shape. The negative electrode resilient contact arm 2122 extends from one end of the negative electrode resilient contact arm 2122 connected to the negative electrode current-carrying piece 2121 in an inclined direction towards the battery accommodating cavity 22, so as to ensure that the negative electrode resilient contact arm 2122 has good contact with the button battery 211.

Figure 79:
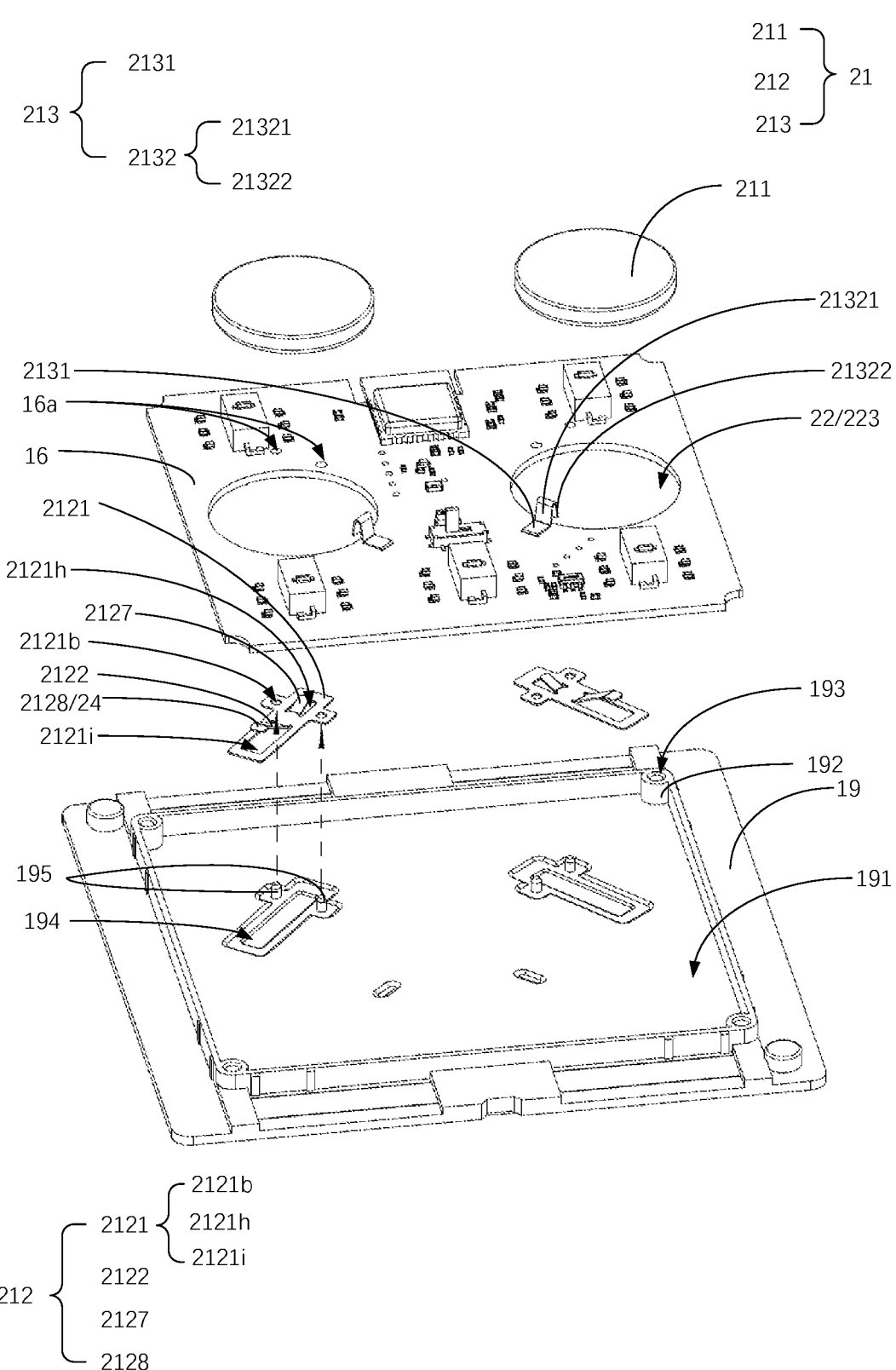
FIG. 79 is a structurally perspective view showing a part of the wireless intelligent switch of FIG. 77.
Figure 83:
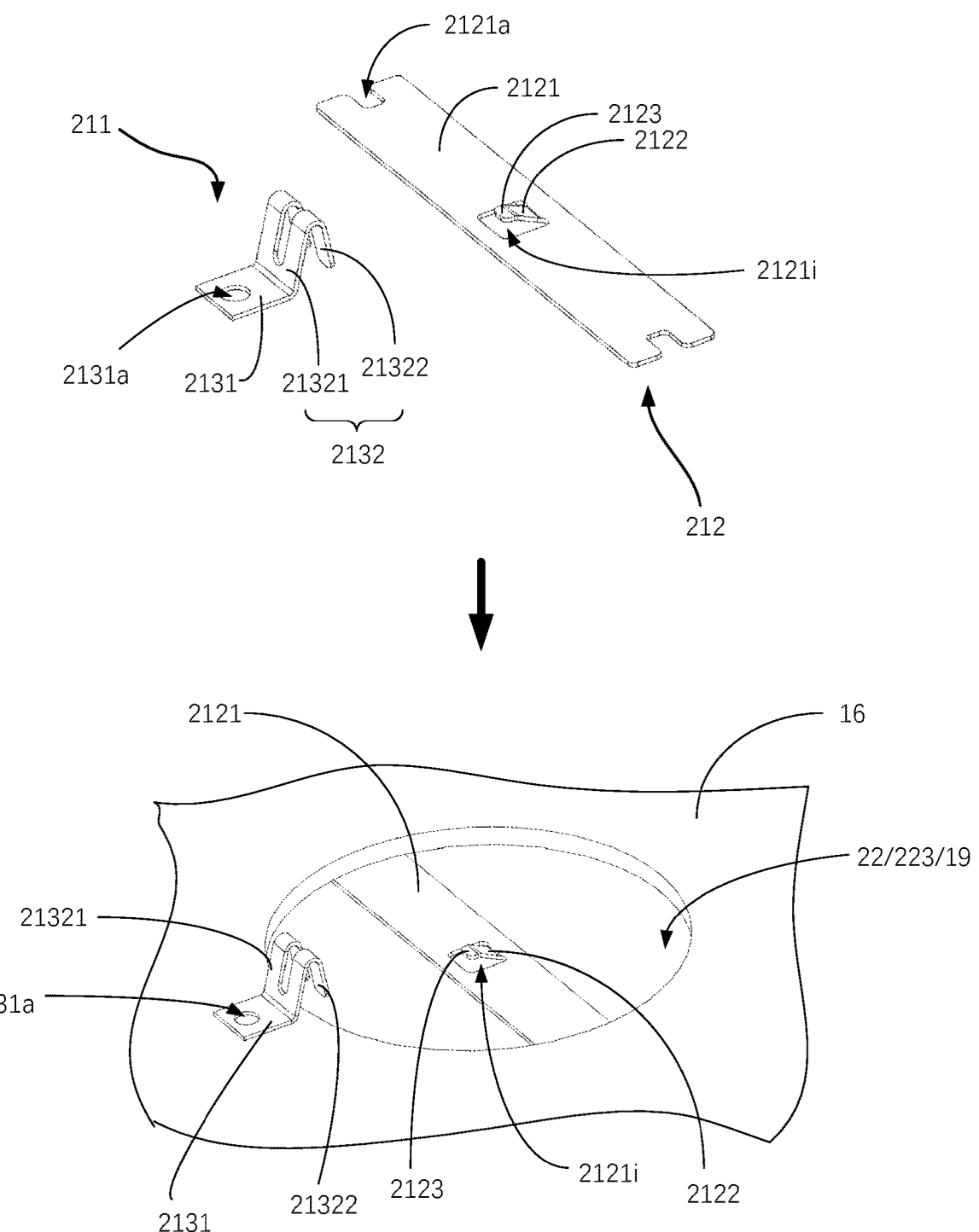
FIG. 83 is an assembly diagram of a battery elastic sheet of FIG. 82.

Furthermore, with reference to FIGS. 79 and 83, in some embodiments of the present invention, the negative electrode resilient contact arm 2122 is provided in a strip shape. The negative electrode resilient contact arm 2122 extends obliquely from an end thereof connected to the negative electrode current-carrying piece 2121 in a direction towards the battery accommodating cavity 22, and an end thereof away from the negative electrode current-carrying piece 2121 is bent in a direction towards the negative electrode current-carrying piece 2121 to form a first contact terminal 2123. The first contact terminal 2123 is parallel to the negative electrode current-carrying piece 2121. In this way, the contact area between the negative electrode resilient contact arm 2122 and the button battery 211 is increased to improve the contact reliability, thereby ensuring that the negative electrode resilient contact arm 2122 and the button battery 211 conduct electricity smoothly.

In the present invention, the relative positions of the negative electrode resilient contact arm 2122 and the negative electrode current-carrying piece 2121 are not limited. Specifically, referring to FIGS. 84 to 91, in some embodiments of the present invention, the negative electrode resilient contact arm 2122 is provided at the periphery of the negative electrode current-carrying piece 2121. More specifically, with reference to FIGS. 87 to 86, based on the above-mentioned embodiment that "the negative electrode resilient contact arm 2122 extends obliquely from an end thereof connected to the negative electrode current-carrying piece 2121 in a direction towards the battery accommodating cavity 22", the negative electrode resilient contact arm 2122 is provided with a plurality of negative electrode resilient contact arms 2122. The plurality of the negative electrode resilient contact arms 2122 are arranged at intervals so as to achieve multi-point contact with the button battery 211. Only one of the plurality of negative electrode resilient contact arms 2122 has good contact with the negative electrode of the button battery 211, so as to realize the electrical connection with the button battery 211. It avoids the occurrence of problems such as disconnection, has a good conductive effect, and further improves the contact reliability and contact stability of the negative electrode elastic sheet 212 and the button battery 211.

Referring also to FIGS. 79 to 83, and FIGS. 92 to 95, in other embodiments of the present invention, a portion of the negative electrode current-carrying piece 2121 is cut to form a placing hole 2121i, and the negative electrode resilient contact arm 2122 connected to one inner side wall of the placing hole 2121i. A gap exists between the negative electrode resilient contact arm 2122 and the other inner side wall of the placing hole 2121i. The negative electrode resilient contact arm 2122 extends obliquely from an end thereof connected to the negative electrode current-carrying piece 2121 in a direction towards the battery accommodating cavity 22. Thus, when the negative electrode resilient contact arm 2122 is forced to move elastically with respect to the negative electrode current-carrying piece 2121, it does not interfere with the inner side wall of the placing hole 2121i, so that it can maintain good contact with the negative electrode of the button battery 211 within its elastic movement range, thereby improving contact stability.

Figure 93:
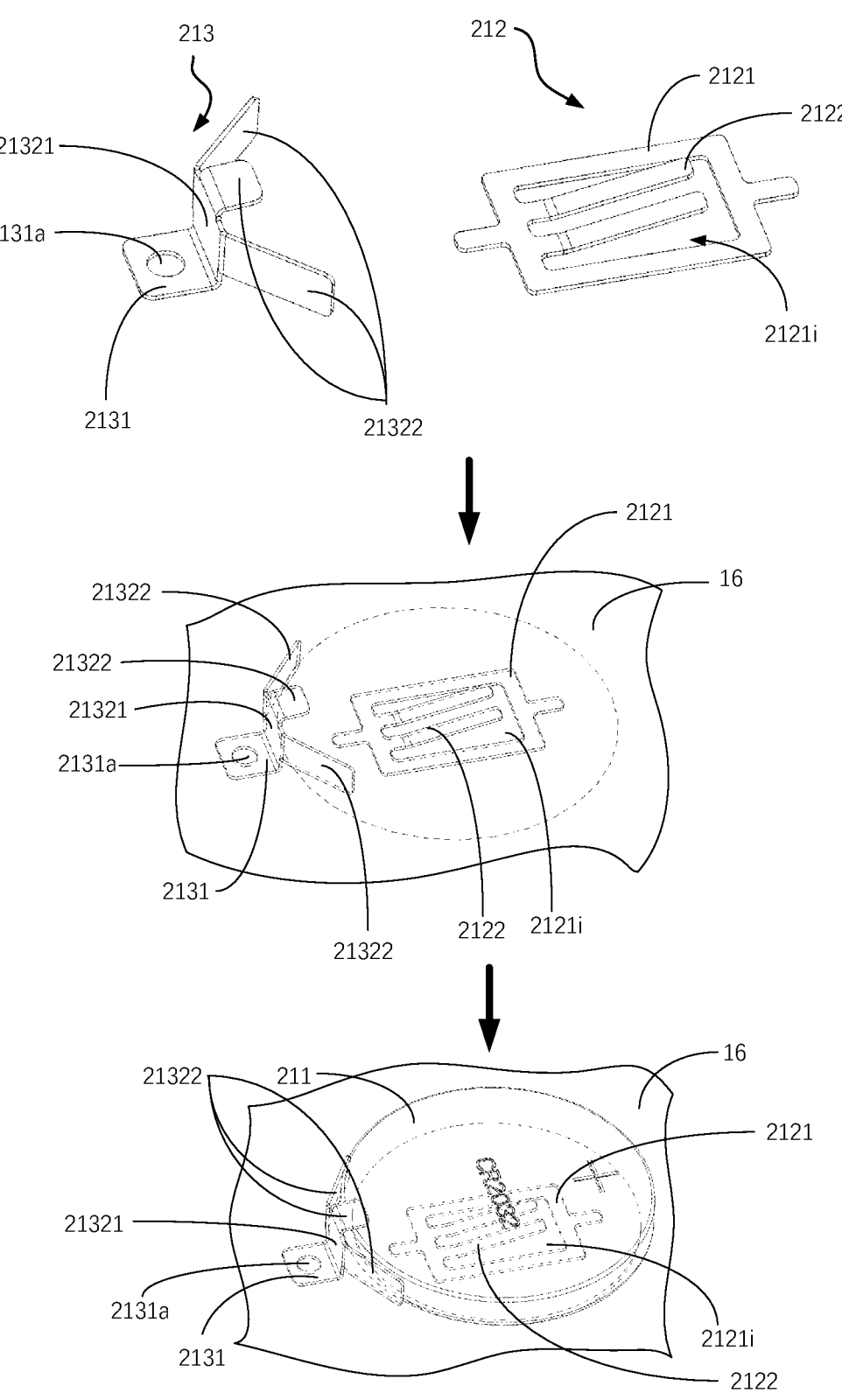
FIG. 93 is an assembly diagram of a battery elastic sheet of FIG. 92.
Figure 94:
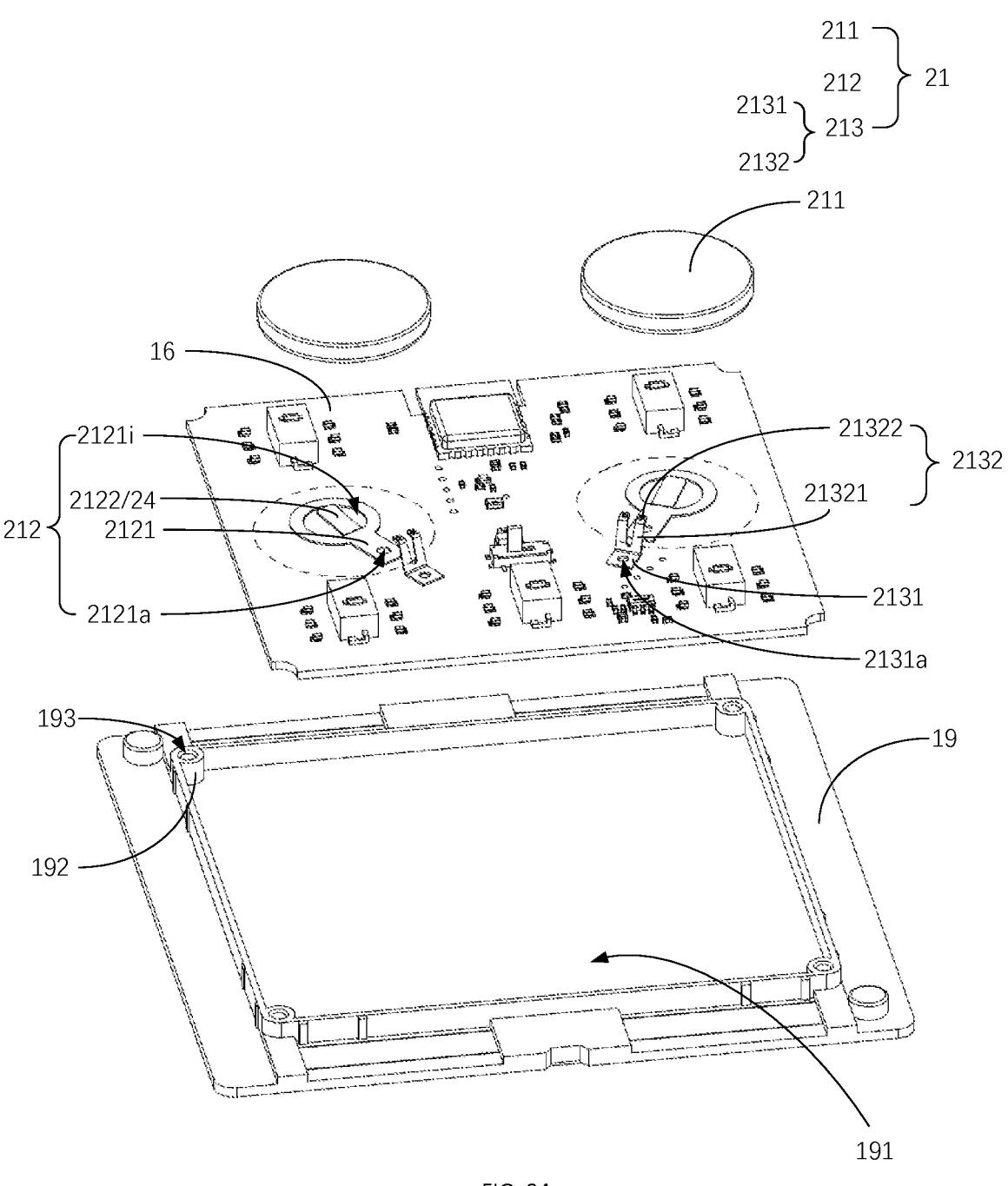
FIG. 94 is a structurally perspective view of a part of an embodiment of a wireless intelligent switch.
Figure 95:
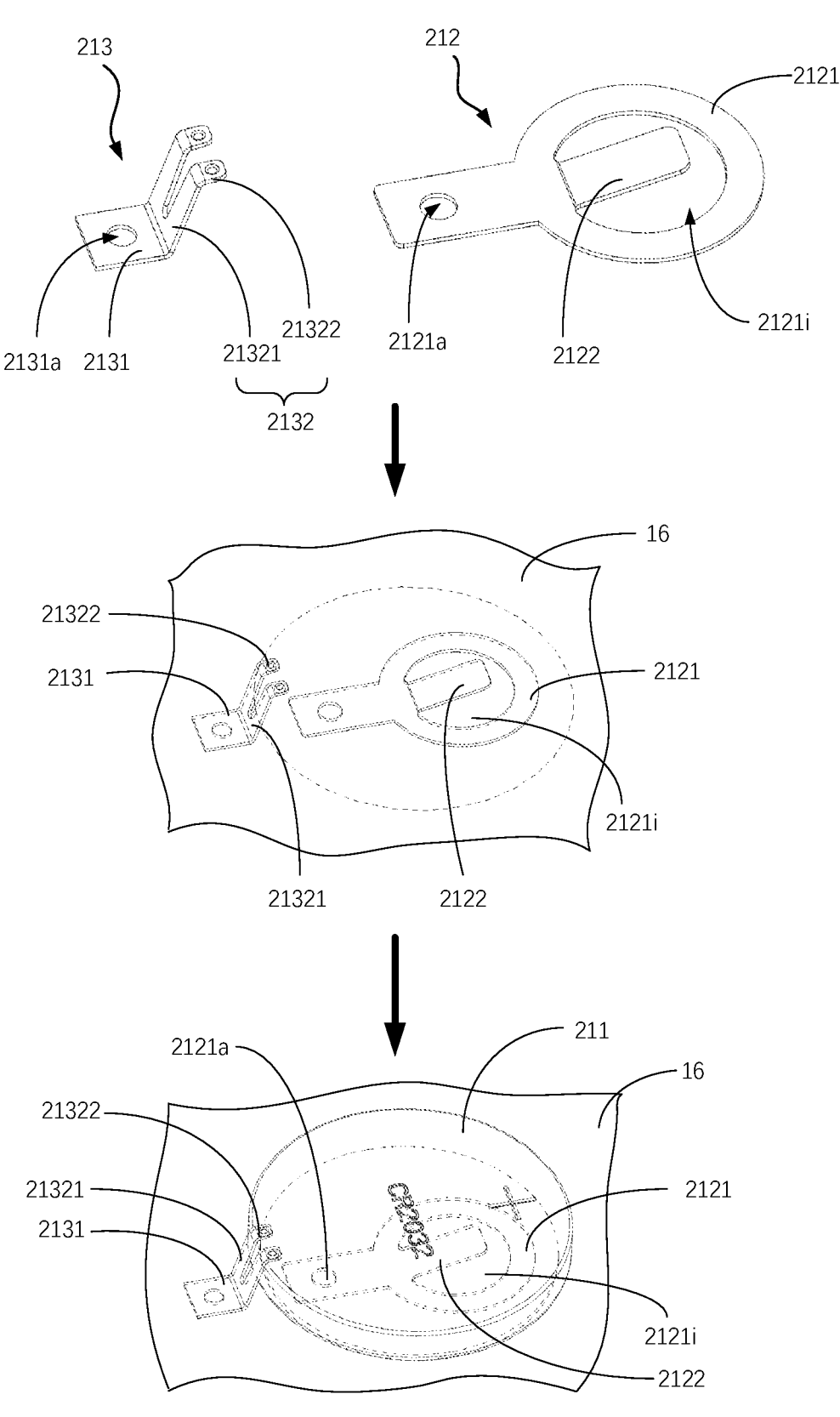
FIG. 95 is an assembly diagram of the battery elastic sheet of FIG. 94.

It should be noted that the shape of the placing hole 2121i is not limited. Specifically, in order to make the manufacturing simple and the manufacturing cost low, referring to FIGS. 80 to 83 and FIGS. 88 to 93, in some embodiments of the present invention, the placing hole 2121i is a square hole. Referring to FIGS. 79, 94 and 95, in some embodiments of the present invention, the placing hole 2121i is a circular hole.

It should also be noted that the number of the negative electrode resilient contact arms 2122 is not limited. In some embodiments of the present invention, a plurality of the negative electrode resilient contact arms 2122 are provided, and a plurality of the negative electrode resilient contact arms 2122 are arranged at intervals. The arrangement of a plurality of the negative electrode resilient contact arms 2122 achieves multi-point contact with the button battery

211. Only one of the plurality of negative electrode resilient contact arms 2122 has good contact with the negative electrode of the button battery 211, so as to realize the electrical connection with the button battery 211. It avoids the occurrence of problems such as disconnection, has a good conductive effect, and further improves the contact reliability and contact stability of the negative electrode elastic sheet 212 and the button battery 211.

Furthermore, the above-mentioned two technical features can be provided alternatively or at the same time. Specifically, in some embodiments of the present invention, the above-mentioned two technical features are provided at the same time. Namely, the placing hole 2121*i* is a square hole or a circular hole. The negative electrode resilient contact arm 2122 is provided with a plurality of negative electrode resilient contact arms 2122. The plurality of negative electrode resilient contact arms 2122 are provided at intervals. More specifically, referring to FIGS. 1 to 3, in some embodiments of the present invention, the placing hole 2121*i* is a square hole. A plurality of the negative electrode resilient contact arms 2122 are provided, and a plurality of the negative electrode resilient contact arms 2122 are arranged at intervals along an inner side wall of the placing hole 2121*i*. The processing is facilitated, the production cost is reduced, and the contact stability and reliability between the negative electrode elastic sheet 212 and the button battery 211 can be improved.

Specifically, in the present invention, the connection mode of the negative electrode elastic sheet 212 and the PCB board 16 is also not limited, and may be a fixed connection mode. With reference to FIGS. 92-95, in some embodiments of the present invention, the negative electrode current-carrying piece 2121 is welded to the PCB board 16 to realize the fixed connection of the negative electrode elastic sheet 212 and the PCB board 16, so as to ensure good contact between the two and prevent a disconnection problem.

Figure 80:
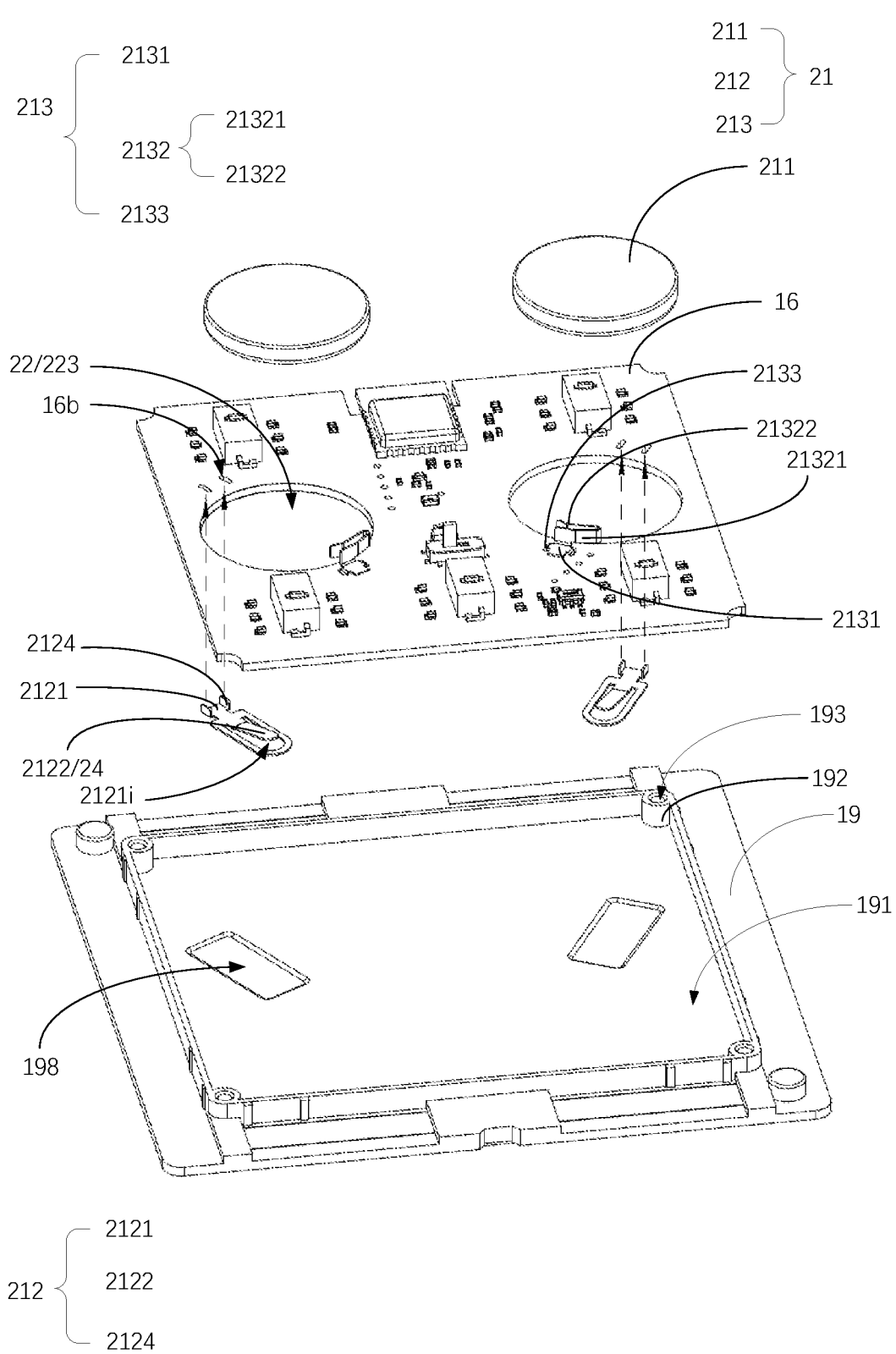
FIG. 80 is a structurally perspective view of a part of an embodiment of a wireless intelligent switch.
Figure 81:
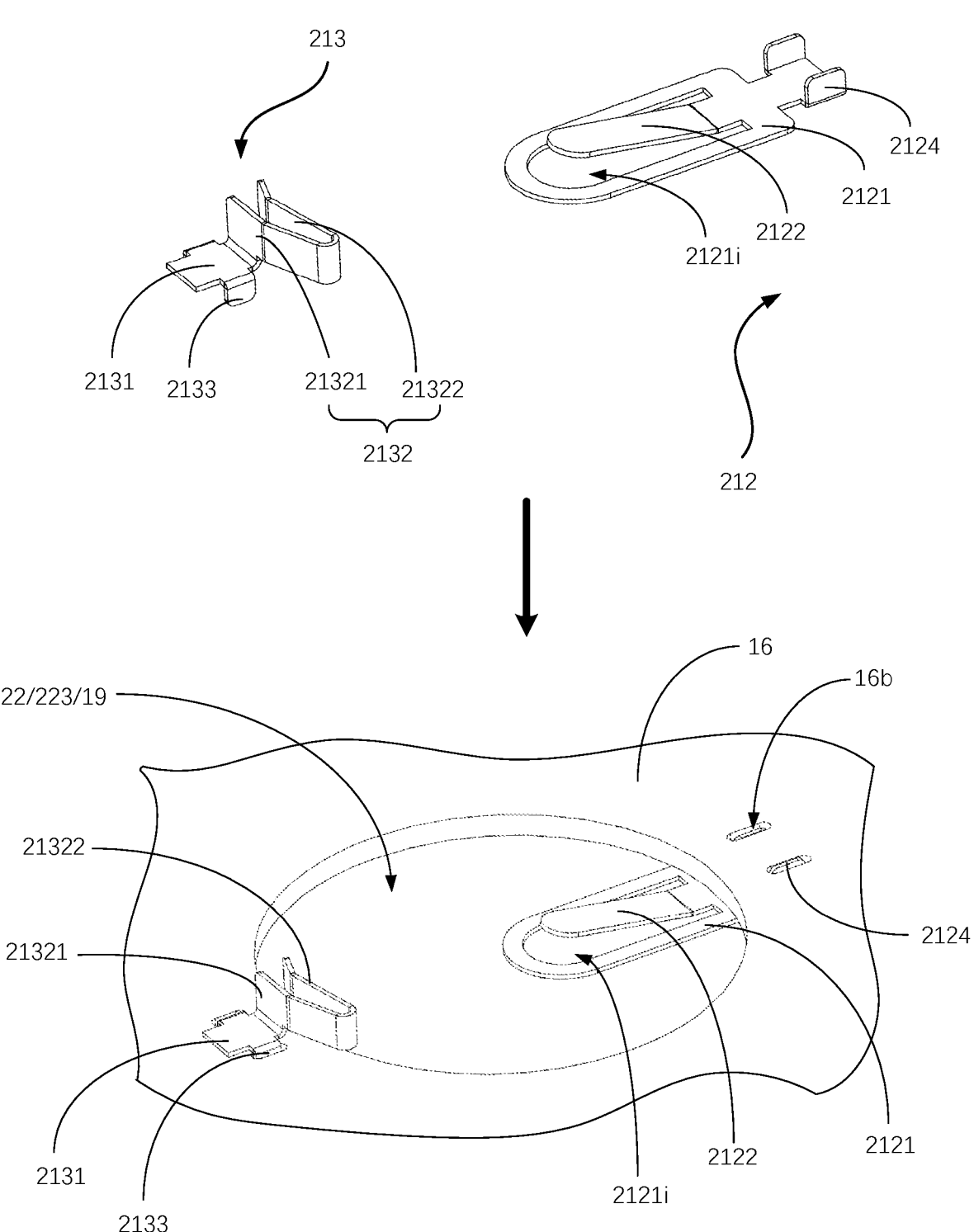
FIG. 81 is an assembly diagram of a battery elastic sheet of FIG. 80.
Figure 82:
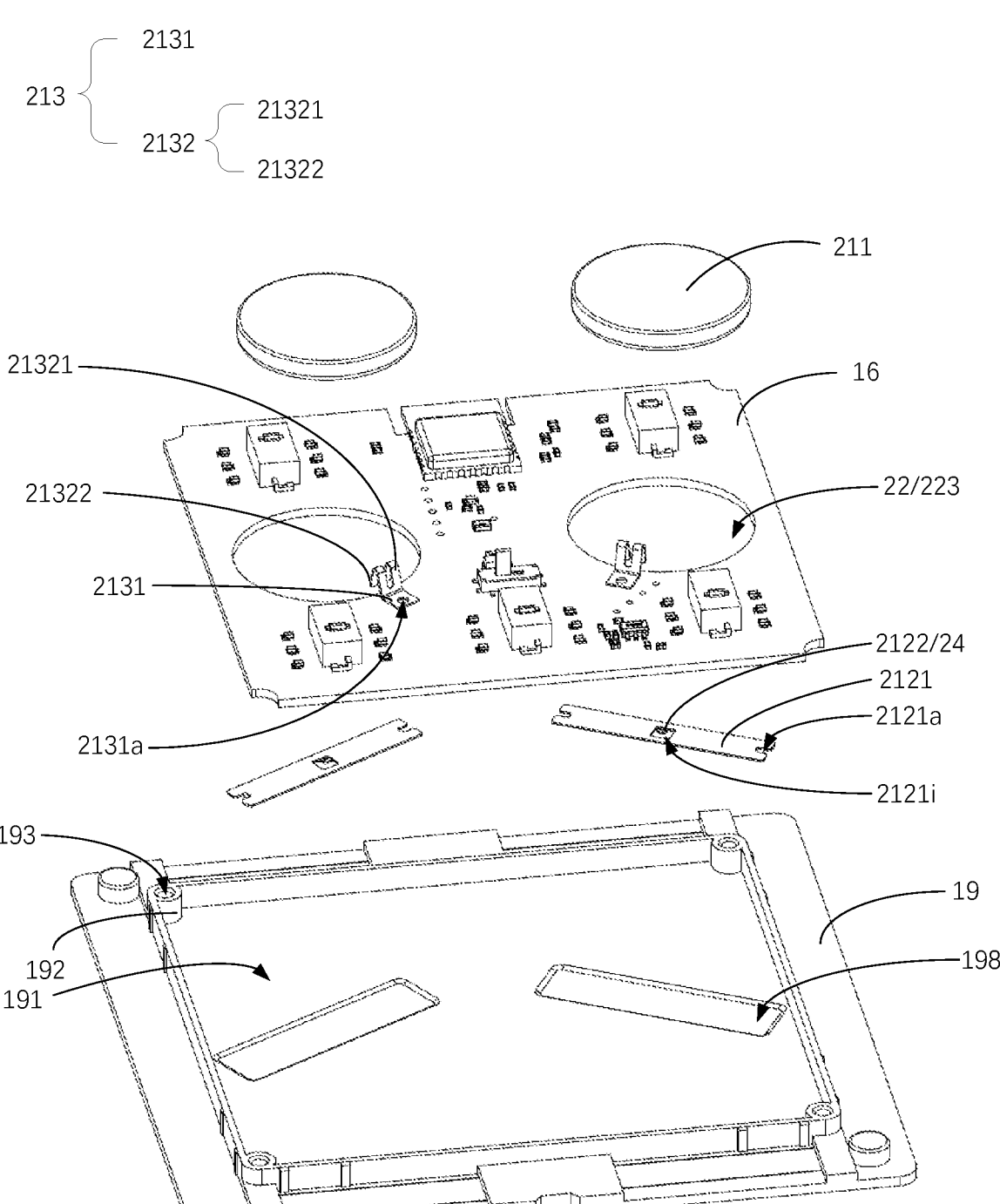
FIG. 82 is a structurally perspective view of a part of an embodiment of a wireless intelligent switch.

It should be noted that, referring to FIGS. 80-82, in an embodiment of the present invention, in combination with the embodiment that "the lower housing 142 includes a bottom housing 19 and an isolation cover 18; the isolation cover 18 is covered on the bottom housing 19 and forms an accommodating cavity 191 with the bottom housing 19; the PCB board 16 is accommodated inside the accommodating cavity 191; the isolation cover 18 is provided with a first accommodating through hole 222; the PCB board 16 is provided with a second accommodating through hole 223; the first accommodating through hole 222 and the second accommodating through hole 223 are in communication; the battery accommodating cavity 22 includes the first accommodating through hole 222 and the second accommodating through hole 223; the negative electrode elastic sheet 212 is arranged between the bottom housing 19 and the PCB board 16; the negative electrode resilient contact arm 2122 is arranged corresponding to the second accommodating through hole 223 so as to contact and conduct electricity with the bottom wall of the button battery 211", the bottom wall of the bottom housing 19 is provided with a first relief accommodating groove 198 corresponding to the negative electrode elastic sheet 212. The first relief accommodating groove 198 is used for accommodating the negative electrode elastic sheet 212, so that the PCB board 16 fits the bottom wall of the bottom housing 19, and thus the thickness of the lower housing 142 can be reduced, which is beneficial to the thin and light design of the wireless intelligent switch 102.

In the present invention, the arrangement of the welding structure between the negative electrode current-carrying piece 2121 and the PCB board 16 is also not limited. With reference to FIGS. 80 and 81, in FIGS. 80 and 81, in an embodiment of the present invention, at least one first welding leg 2124 protrudes from the negative electrode current-carrying piece 2121. The PCB board 16 is provided with a first welding hole 16*b* corresponding to the first welding leg 2124. The first welding hole 16*b* is used for inserting and welding the corresponding first welding leg 2124. Thus, the negative electrode current-carrying piece 2121 and the PCB board 16 are both welded and inserted, further improving the contact reliability and contact stability of the negative electrode current-carrying piece 2121 and the PCB board 16.

However, other welding structures can also be used. With reference to FIGS. 82 and 83, in an embodiment of the present invention, a first solder-climbing hole 2121*a* is provided on the negative electrode current-carrying piece 2121, so that solder can be directly poured into the first solder-climbing hole 2121*a*, which is very simple and convenient.

In addition, in the present invention, the negative electrode elastic sheet 212 and the PCB board 16 can also be detachably connected. When a problem occurs in the negative electrode elastic sheet 212 or the PCB board 16, compared with a non-detachable connection method such as welding, the problematic components can be directly detached and replaced without replacing all of them, thereby reducing maintenance costs. Specifically, referring to FIG. 79, and FIGS. 84 to 87, in other embodiments of the present invention, based on the above-mentioned embodiment "the lower housing 142 includes a bottom housing 19 and an isolation cover 18; the isolation cover 18 is covered on the bottom housing 19 and forms an accommodating cavity 191 with the bottom housing 19; the PCB board 16 is accommodated inside the accommodating cavity 191; the isolation cover 18 is provided with a first accommodating through hole 222; the PCB board 16 is provided with a second accommodating through hole 223; the first accommodating through hole 222 and the second accommodating through hole 223 are in communication; the battery accommodating cavity 22 includes the first accommodating through hole 222 and the second accommodating through hole 223", the negative electrode current-carrying piece 2121 is clamped and fixedly arranged by the bottom wall of the bottom housing 19 and the PCB board 16, thereby fixing the negative electrode current-carrying piece 2121, ensuring that the negative electrode current-carrying piece 2121 is in stable contact with the PCB board 16, and the assembly thereof is simple.

Furthermore, the bottom wall of the bottom housing 19 is provided with a first limiting groove 194 towards the isolation cover 18. The first limiting groove is used for accommodating the negative electrode elastic sheet. The PCB board 16 is pressed on the bottom wall of the bottom housing 19, and a second accommodating through hole 223 of the PCB board 16 is in corresponding communication with a part of the first limiting groove 194, so that the negative electrode resilient contact arm 2122 is in contact with the negative electrode of the button battery 211. In this way, in the horizontal direction parallel to the bottom wall of the bottom housing 19, the negative electrode elastic sheet 212 is limited to move by the inner side wall of the first limiting groove 194. In the direction perpendicular to the bottom wall of the bottom housing 19, the negative electrode current-carrying piece 2121 is pressed and limited to move by the PCB board 16, thereby ensuring that the negative electrode current-carrying piece 2121 is stable in contact with the PCB board 16, and the negative electrode resilient contact arm 2122 is stable in contact with the button battery 211. The structure design thereof is simple and convenient for disassembly. In addition, the arrangement of the first limiting groove 194 is advantageous to reduce the thickness of the lower housing 142, so as to achieve a light and thin design of the wireless intelligent switch 102.

Of course, in the horizontal direction parallel to the bottom wall of the bottom housing 19, in addition to limiting the negative electrode elastic sheet 212 by providing a limiting groove, the limiting can also be achieved by providing a positioning post. Specifically, in other embodiments of the present invention, at least one first positioning post 195 is arranged on the bottom housing 19. The negative electrode current-carrying piece 2121 passes through a first limiting hole 2121*b* corresponding to the first positioning post 195. The first limiting hole 2121*b* is adapted to the first positioning post 195 for inserting the first positioning post 195 so as to limit the negative electrode current-carrying piece 2121. The PCB board 16 is provided through a second relief hole 16*a* for inserting the first positioning post 195 so that the PCB board 16 avoids the first positioning post 195. In this way, the movement of the negative electrode current-carrying piece 2121 in a horizontal direction parallel to the bottom wall of the bottom housing 19 is defined by the first positioning post 195. The movement of the negative electrode current-carrying piece 2121 in a direction perpendicular to the bottom wall of the bottom housing 19 is defined by the pressing of the PCB board 16, thereby ensuring that the negative electrode current-carrying piece 2121 is in stable contact with the PCB board 16. In addition, the PCB board 16 avoids interference with the first positioning post 195 during installation by providing the second relief hole 16*a*, ensuring that the PCB board 16 is arranged smoothly.

It should be noted that, due to machining errors and other factors in the production process, there is a problem that the position of the second relief hole 16*a* does not correspond to or the size of the first positioning post 195 does not match, so that the PCB board 16 interferes with the first positioning post 195 when the PCB board 16 is mounted and positioned in the accommodating cavity 191 of the bottom housing 19, thereby causing the bottom housing 19 and the first positioning post 195 to fail to be assembled. Therefore, further, in some embodiments of the present invention, the diameter of the second relief hole 16*a* is greater than the diameter of the first positioning post 195. It is ensured that the first positioning post 195 can be sufficiently inserted into the second relief hole 16*a* to prevent the PCB board 16 from interfering with the first positioning post 195, thereby improving the assembly success rate.

It should also be noted that in the present invention, the number of the first positioning posts 195 is not limited, and may be one, two, three, etc. Specifically, referring to FIG. 79 and FIGS. 84-87, in some embodiments of the present invention, two of the first positioning posts 195 are arranged on the bottom housing 19. The negative electrode current-carrying piece 2121 is correspondingly provided with two of the first limiting holes 2121*b*. In this way, it is possible to improve the contact stability between the negative electrode current-carrying piece 2121 and the PCB board 16, with low production cost, which improves the product performance-price ratio.

Furthermore, referring to FIGS. 84 and 85, in an embodiment of the present invention, two opposite ends of the negative electrode current-carrying piece 2121 are respectively recessed to form the first limiting hole 2121*b*, so that the negative electrode current-carrying piece 2121 is sandwiched between the two first positioning posts 195. Alternatively, with reference to FIGS. 84 and 87, in an embodiment of the present invention, the negative electrode current-carrying piece 2121 is provided with a limited-position accommodating hole 2121*c*. The first limiting hole 2121*b* is respectively formed concavely in two opposite side walls of the limiting accommodating hole 2121*c*, so that the negative electrode current-carrying plate is provided at the periphery of two of the first positioning posts 195. In the above-mentioned two arrangements, the first limiting hole 2121*b* is arranged as a half hole. Since the negative electrode elastic sheet 212 has elasticity, the first limiting hole 2121*b* can be adapted to the first positioning post 195 within a certain size range, so as to reduce the influence of machining errors and ensure that the negative electrode current-carrying piece 2121 is in stable contact with the PCB board 16.

Furthermore, it should be noted that the first limiting groove 194 and the first positioning post 195 may be alternatively or simultaneously provided. Specifically, referring to FIG. 79 and FIGS. 84-87, in an embodiment of the present invention, the first limiting groove 194 and the first positioning post 195 are simultaneously provided so as to jointly define the movement of the negative electrode current-carrying piece 2121, improve the installation stability, and reduce the thickness of the lower housing 142, facilitating the light and thin design of the wireless intelligent switch 102.

Specifically, referring to FIGS. 88-91, in still other embodiments of the present invention, the negative electrode current-carrying piece 2121 may be easily clamped into, mounted on or removed from the PCB board 16.

Furthermore, the bottom wall of the bottom housing 19 is also provided with the first relief accommodating groove 198 corresponding to the negative electrode elastic sheet 212. The first relief accommodating groove 198 is used for accommodating the negative electrode elastic sheet 212, so that the PCB board 16 fits the bottom wall of the bottom housing 19, and the thickness of the lower housing 142 is reduced, which is beneficial to the light and thin design of the wireless intelligent switch 102.

Note that, in the present invention, the arrangement of the clamping structure between the negative electrode current-carrying piece 2121 and the PCB board 16 is not limited. For example, a clamping structure is provided. Specifically, referring to FIGS. 90 and 91, in an embodiment of the present invention, the negative electrode current-carrying piece 2121 includes a negative electrode current-carrying piece body 2121*d*. One end of the negative electrode current-carrying piece body 2121*d* is connected to the negative electrode resilient contact arm 2122, and the other end of the negative electrode current-carrying piece body 2121*d* is bent in a direction away from the negative electrode current-carrying piece body 2121*d* to form a first bent connecting arm 2121*e*. One end of the first bent connecting arm 2121*e* away from the negative electrode current-carrying piece main body 2121*d* is bent in a direction away from the negative electrode resilient contact arm 2122 to form a first clamp arm 2121*f*. The first clamp arm 2121*f* is arranged at an included angle with the first bent connecting arm 2121*e*. The negative electrode current-carrying piece main body 2121*d*, the first bent connecting arm 2121*e* and the first clamp arm 2121*f* together form a first clamping structure for clamping on a side wall of the second accommodating through hole 223 of the PCB board 16. The arrangement of the first clamping structure achieves the clamping connection between the negative electrode elastic sheet 212 and the PCB board 16, which is simple to process, convenient to operate and easy to disassemble and replace.

It should be noted that the negative electrode elastic sheet 212 can be stressed and elastically deformed, so that the included angle between the first clamp arm 2121*f* and the first bent connecting arm 2121*e* can be adaptively adjusted. Namely, the clamping distance between the first clamp arm 2121*f* and the negative electrode current-carrying piece main body 2121*d* can be adjusted and adapted to the thickness of PCB boards 16 with different models and sizes, ensuring that the first clamping structure is stably engaged with the side wall of the second accommodating through hole 223, preventing the problem that the first clamping structure cannot be engaged and fixed to the PCB boards 16 due to machining errors, and improving the practicality of the negative electrode elastic sheet 212.

Figure 91:
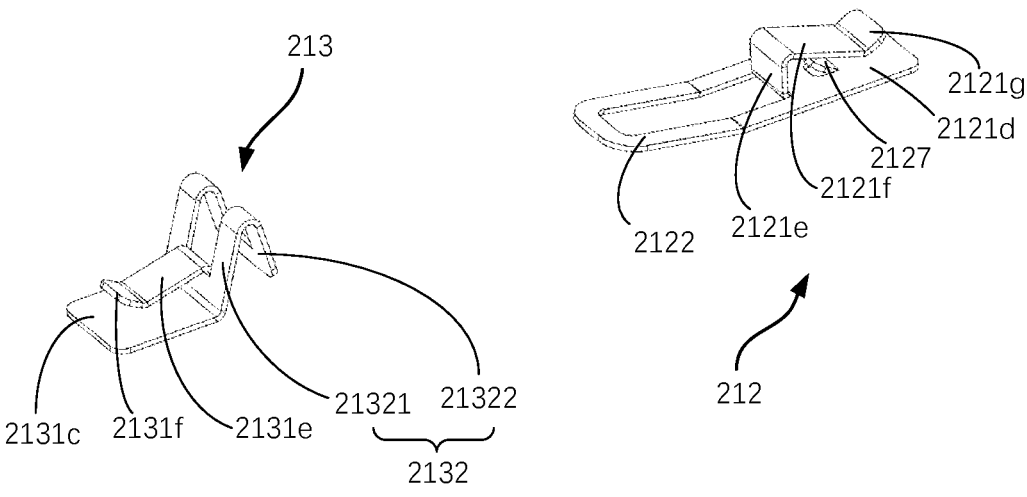
FIG. 91 is an assembly diagram of a battery elastic sheet of FIG. 90.
Figure 91:
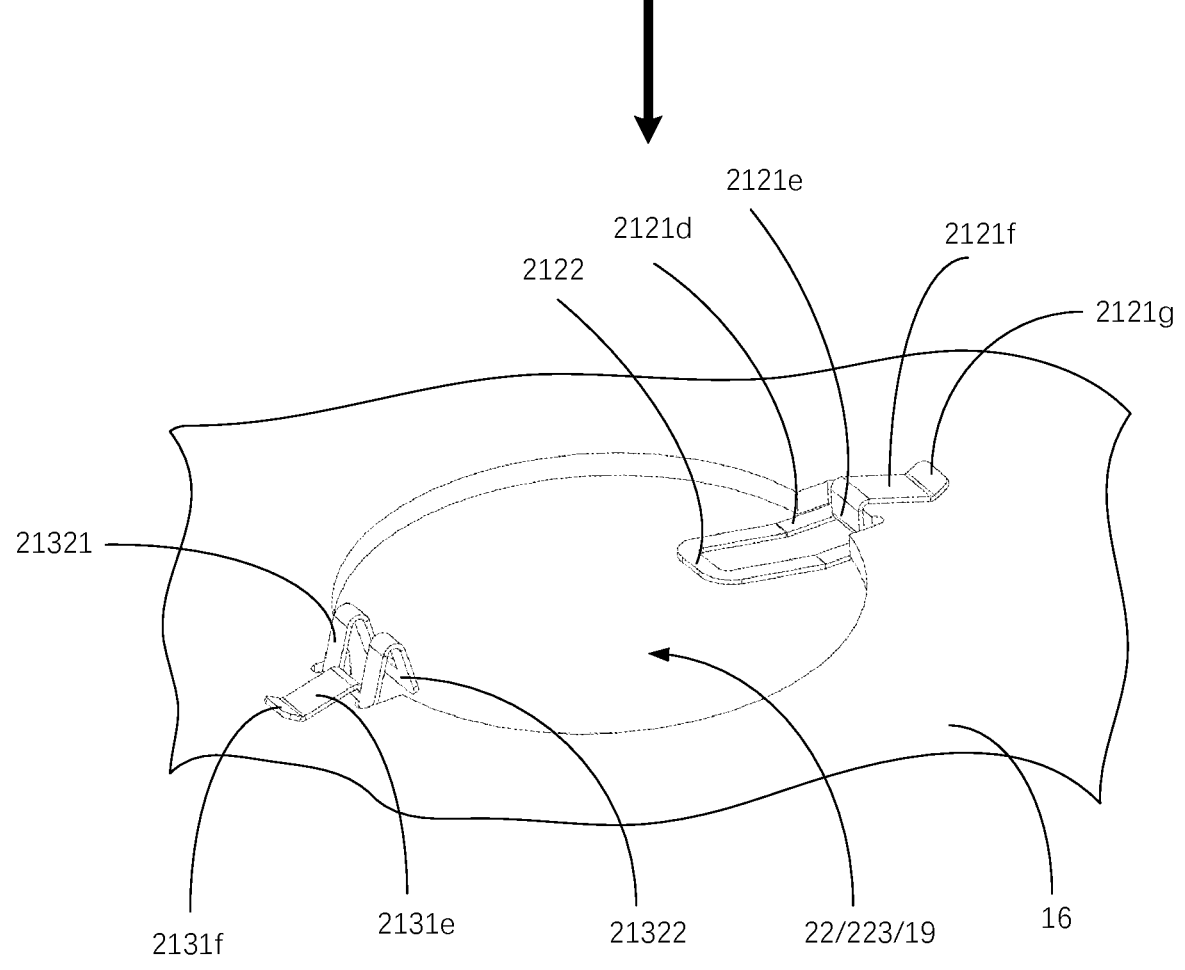
Figure 92:
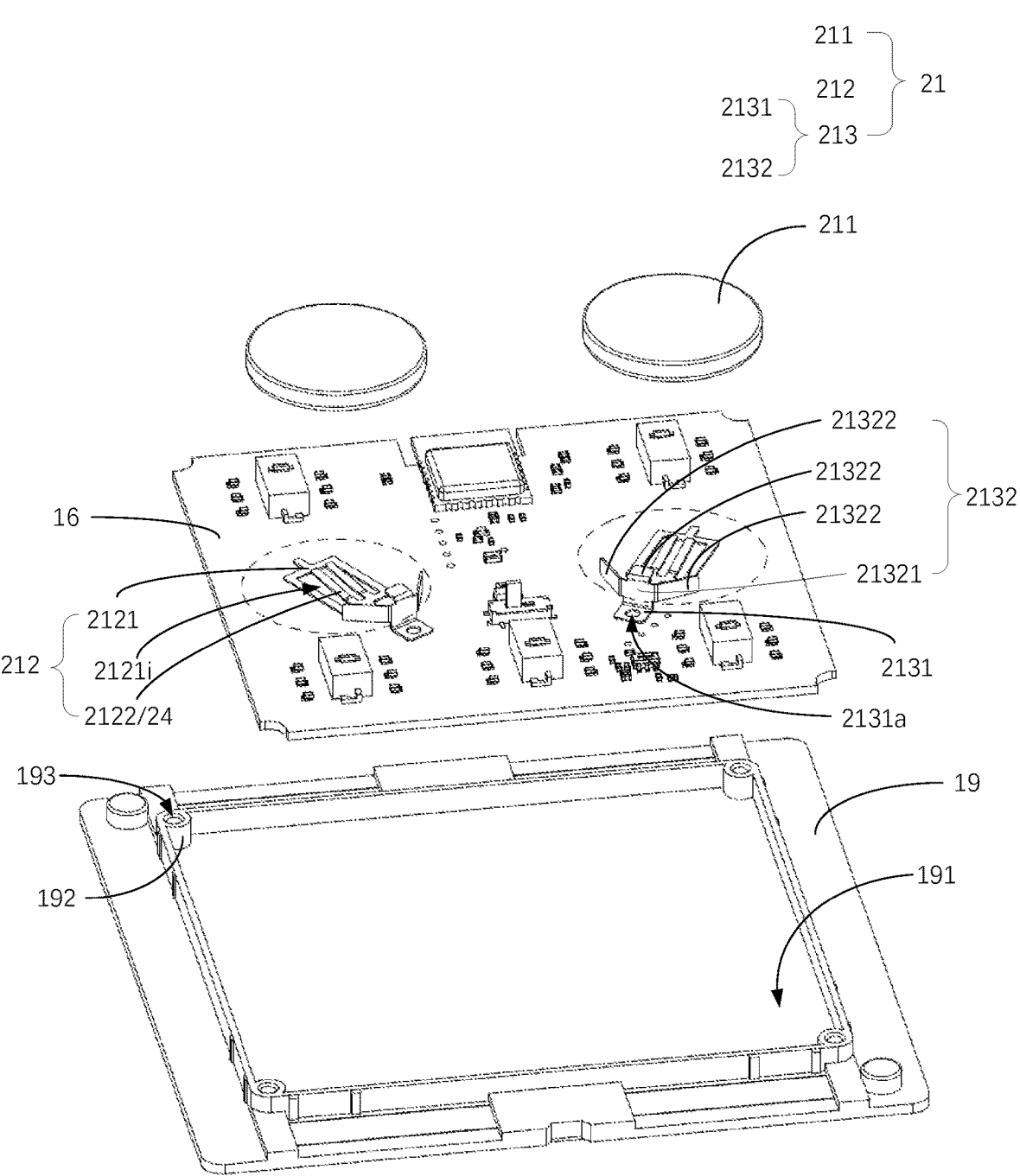
FIG. 92 is a structurally perspective view of a part of an embodiment of a wireless intelligent switch.

Further, referring to FIG. 91, in an embodiment of the present invention, a first operating arm 2121*g* is provided at an end of the first clamp arm 2121*f* away from the first bent connecting arm 2121*e*. The first operating arm 2121*g* is inclined from an end thereof connected to the first clamp arm 2121*f* in a direction away from the negative electrode current-carrying piece body 2121*d*. The first operating arm 2121*g* is used for a person to hold and apply force to the first clamp arm 2121*f*, so as to facilitate adjusting the included angle between the first clamp arm 2121*f* and the first bent connecting arm 2121*e*.

Of course, the negative electrode current-carrying piece 2121 can also be clamped with the PCB board 16 by providing a clamping structure. Specifically, with reference to FIGS. 88 and 89, in an embodiment of the present invention, a plurality of first clamping arms 2125 are convexly arranged on the negative electrode current-carrying piece 2121. At least two of the first clamping arms 2125 in the plurality of the first clamping arms 2125 are arranged opposite to each other. One end of each of the first clamping arms 2125 away from the negative electrode current-carrying piece 2121 is provided with two first snaps 2126. The two first clamps 2126 are arranged opposite to each other. The PCB board 16 is provided with a first snap-fit hole 16*c* corresponding to the first clamping arm 2125. Each of the first snap-fit holes 16*c* is used for snap-fitting with two first snap-fits 2126 of the first clamping arm 2125 corresponding thereto. In this manner, the snap fit between the negative electrode current-carrying piece 2121 and the PCB board 16 is realized by the first snaps 2126 being snap-fit to the first snap-fit holes 16*c*. Two of the first snaps 2126 being arranged on each of the first clamping arms 2125 improves the snap-fit strength between the negative electrode current-carrying piece 2121 and the PCB board 16, while the opposite arrangement of at least two of the first clamping arms 2125 in the plurality of the first snaps 2126 improves the fastening stability between the negative electrode current-carrying piece 2121 and the PCB board 16.

When the negative electrode current-carrying piece 2121 is detachably connected to the PCB board 16, a gap may occur between the negative electrode current-carrying piece 2121 and the PCB board 16 and thus poor contact may occur based on factors such as machining errors or when the wireless intelligent switch 102 is active, especially when the wireless intelligent switch 102 is vibrated. Therefore, with reference to FIGS. 79 and 84-91, in some embodiments of the present invention, the negative electrode current-carrying piece 2121 is provided with a first resilient contact pin 2127 for contacting and conducting the negative electrode of the PCB board 16. The first resilient contact pin 2127 extends obliquely from an end thereof connected to the negative electrode current-carrying piece 2121 in a direction towards the PCB board 16. In this way, when the negative electrode elastic sheet 212 and the PCB board 16 are mounted, the first resilient contact pin 2127 is stressed and elastically compressed to the PCB board 16. When the wireless intelligent switch 102 is active, especially when vibrated, a gap is generated between the stressed activity of the PCB board 16 and the negative electrode current-carrying piece 2121. However, the first resilient contact pins 2127 are resiliently movable within a certain range due to their resiliency so as to maintain stable contact with the PCB board 16, thereby ensuring continuous conduction.

It should be noted that in some cases, the first resilient contact pins 2127 fail in resilient deformation due to factors such as overload or large deformation, i.e. the elastic function is lost, which may cause poor contact with the PCB board 16. Therefore, further referring to FIGS. 88 and 89, in an embodiment of the present invention, a plurality of first resilient contact pins 2127 are provided, and a plurality of first resilient contact pins 2127 are provided at intervals. Thus, as long as one of the plurality of first resilient contact pins 2127 can make good contact with the PCB board 16, the power supply can be ensured to be normal and the stability can be improved.

Furthermore, in order to satisfy different structural design requirements and facilitate mold opening, the position of the first resilient contact pin 2127 is not limited. Specifically, referring to FIGS. 84 and 85, in some embodiments of the present invention, the first resilient contact pin 2127 is formed at the periphery of the negative electrode current-carrying piece sheet 2121. Of course, the first resilient contact pin 2127 can also be provided in the middle of the negative electrode current-carrying piece sheet 2121. Specifically, referring to FIGS. 79 and 86-91, in some embodiments of the present invention, the negative electrode current-carrying piece sheet 2121 is cut to form a first placing through hole 2121*h*. The first resilient contact pin 2127 is connected to an inner side wall of the first placing through hole 2121*h*. There is a gap between the first resilient contact pin 2127 and the other inner side wall of the first placing through hole 2121*h*. In this manner, interference with the inner side wall of the first placing through hole 2121*h* is avoided when the first resilient contact pin 2127 is forced to move elastically, thereby ensuring good contact between the first resilient contact pin 2127 and the PCB board 16.

It should be noted that in the above-mentioned embodiment "the negative electrode current-carrying piece 2121 is provided with a limited-position accommodating hole 2121*c*, and two opposite side walls of the limiting accommodating hole 2121*c* are respectively recessed to form the first limiting hole 2121*b*, so that the negative electrode current-carrying plate is provided at the outer periphery of two the first positioning posts 195", the first placing through hole 2121*h* can be the limiting accommodating hole 2121*c*, thereby simplifying the structure and simplifying the processing technique.

Figure 89:
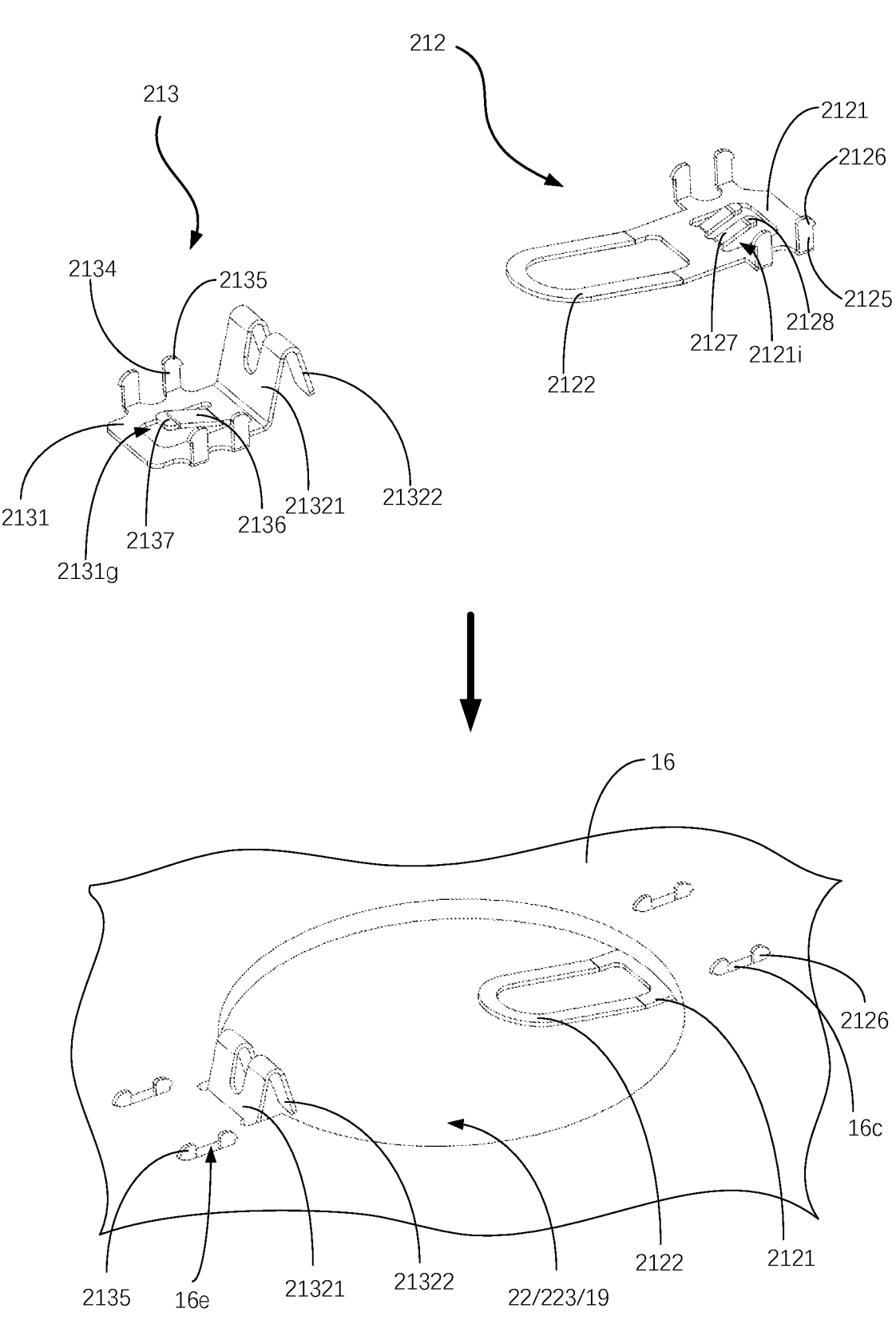
FIG. 89 is an assembly diagram of a battery elastic sheet of FIG. 88.
Figure 90:
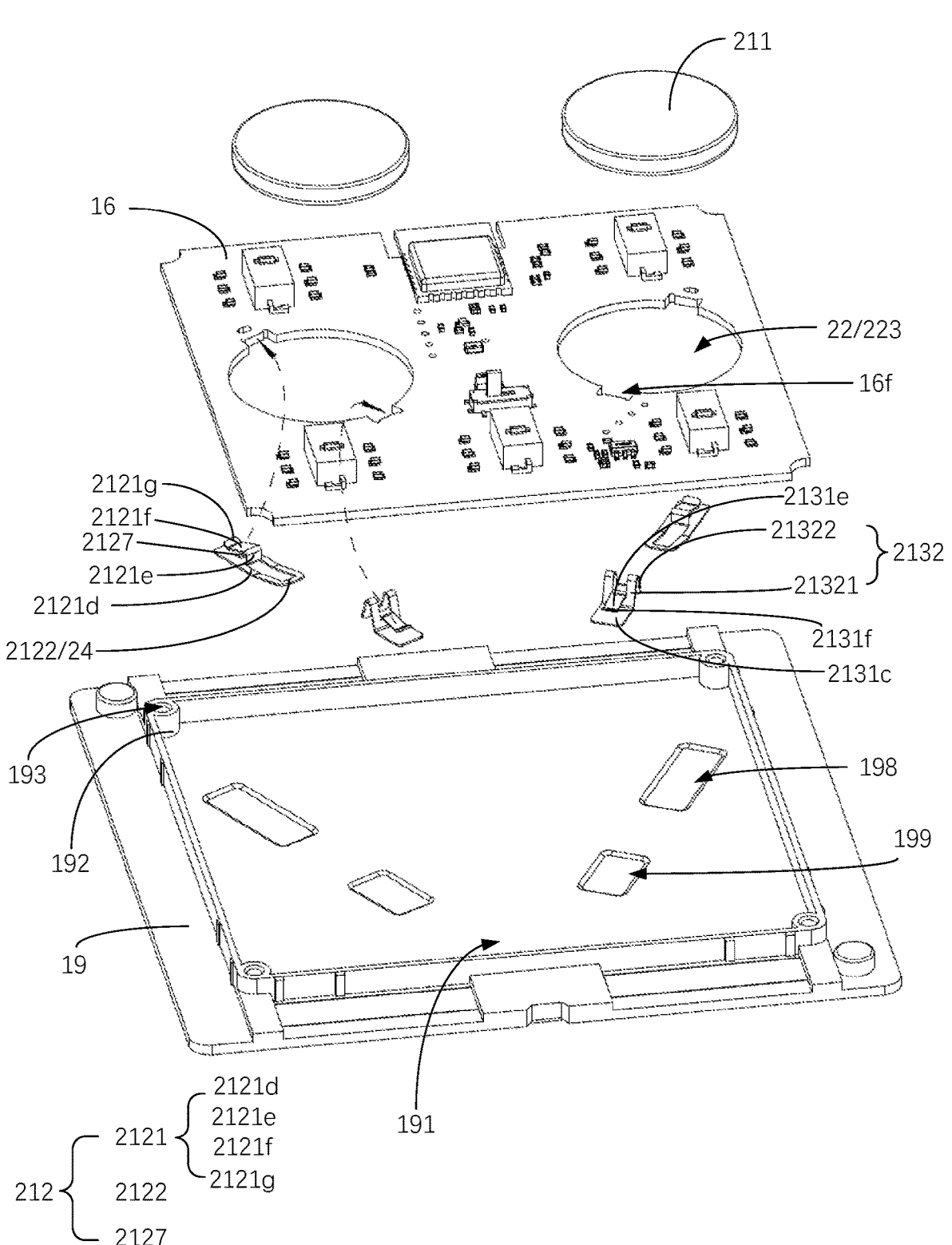
FIG. 90 is a structurally perspective view of a part of an embodiment of a wireless intelligent switch.

Specifically, referring to FIGS. 85 and 89, in some embodiments of the present invention, an end of the first resilient contact pin 2127 away from the negative electrode current-carrying piece 2121 is bent to form a second contact terminal 2128. The second contact terminal 2128 is arranged in parallel with the PCB board 16 so as to contact and conduct electricity with the negative electrode of the PCB board 16. The second contact terminal 2128 is arranged so that the contact between the negative electrode elastic sheet 212 and the negative electrode of the PCB board 16 is a surface contact. The negative electrode elastic sheet 212 is in closer contact with the PCB board 16, thereby further improving the contact stability and the conduction effect.

Specifically, according to the above-mentioned embodiment that "the bottom wall of the bottom housing 19 is provided with a first limiting groove 194 towards the isolation cover 18; the first limiting groove 194 is used for accommodating the negative electrode elastic sheet 212; the PCB board 16 is pressed on the bottom wall of the bottom housing 19, and a second accommodating through hole 223 of the PCB board 16 is in corresponding communication with a part of the first limiting groove 194, so that the negative electrode resilient contact arm 2122 is in contact with the negative electrode of the button battery 211", generally in order to ensure that the negative electrode current-carrying piece 2121 contacts and conducts electricity with the PCB board 16, the groove depth of the first limiting groove 194 is the same as or slightly less than the thickness of the negative electrode current-carrying piece 2121, namely, a side surface of the negative electrode current-carrying piece 2121 facing away from the bottom housing 19 is flush with or slightly higher than the opening end face of the first limiting groove 194. However, in combination with the arrangement that "the negative electrode current-carrying piece 2121 is provided with a first resilient contact pin 2127 for contacting and conducting the negative electrode of the PCB board 16; the first resilient contact pin 2127 extends obliquely from one end thereof connected to the negative electrode current-carrying piece 2121 and extends obliquely in the direction towards the PCB board 16", in an embodiment of the present invention, a side surface of the negative electrode current-carrying piece 2121 facing away from the bottom housing 19 is flush with or lower than an opening end face of the first limiting groove 194, and at least part of the first resilient contact pins 2127 are arranged to protrude out of the first limiting groove 194, so that the inclined arrangement of the first resilient contact pins 2127 and the elastic property thereof can ensure that the negative electrode current-carrying piece 2121 is in good contact with the PCB board 16. At the same time, since the negative electrode current-carrying piece 2121 is completely located in the first limiting groove 194, the thickness of the lower housing 142 can be further reduced.

In addition, generally, the positive electrode arrangement region of the button battery 211 includes an upper wall and/or a peripheral wall of the button battery 211. However, in the present invention, the upper wall of the button battery 211 is a side wall of the button battery 211 facing away from the bottom housing 19. Correspondingly, the positive electrode elastic sheet 213 includes a positive electrode current-carrying piece 2131 and a positive electrode resilient contact arm 2132 connected to the positive electrode current-carrying piece 2131. The positive electrode current-carrying piece 2131 contacts and conducts electricity with the positive electrode of the PCB board 16. The positive electrode resilient contact arm 2132 is arranged corresponding to the battery accommodating cavity 22 so as to be in contact with and conductive to the upper wall and/or the peripheral wall of the button battery 211. The positive electrode of the PCB board 16 is electrically connected to the positive electrode of the button battery 211.

Furthermore, based on the above-mentioned embodiment that "the lower housing 142 includes a bottom housing 19 and an isolation cover 18; the isolation cover 18 is covered on the bottom housing 19, and forms an accommodating cavity 191 with the bottom housing 19; the PCB board 16 is accommodated inside the accommodating cavity 191", the battery accommodating cavity 22 can be arranged through the isolation cover 18, can also be arranged through the PCB board 16, and can of course also be arranged through the isolation cover 18 and the PCB board 16 successively. Specifically, in some embodiments of the present invention, the isolation cover 18 is provided with a first accommodating through hole 222 corresponding to the button battery 211, and is provided with a second placing through hole 18d corresponding to the positive electrode elastic sheet 213, and the first accommodating through hole 222 and the second placing through hole 18d are in communication. The PCB board 16 is provided with a second accommodating through hole 223. The second accommodating through hole 223 is in communication with the first accommodating through hole 222. The battery accommodating cavity 22 includes the first accommodating through hole 222 and the second accommodating through hole 223. Thus, at least part of the positive electrode elastic sheet 213 is located in the second placing through hole 18d, so that the thickness of the lower housing 142 can be reduced, thereby realizing a light and thin design of the wireless intelligent switch 102. When the positive electrode elastic sheet 213 is lower than or flush with the opening end face of the second placing through hole 18d away from the PCB board 16, the aesthetic appearance is improved.

In the present invention, the connection mode between the positive electrode elastic sheet 213 and the PCB board 16 is not limited, and may be a fixed connection mode. Specifically, referring to FIGS. 79 to 83 and 92 to 95, in some embodiments of the present invention, the positive electrode current-carrying piece 2131 is welded to the PCB board 16, and the fixed connection between the positive electrode elastic sheet 213 and the PCB board 16 is realized by welding, so as to ensure good contact between the two and prevent a disconnection problem.

It should be noted that in the present invention, the welding structure form between the positive electrode current-carrying piece 2131 and the PCB board 16 is also not limited. Specifically, with reference to FIGS. 80 and 81, in an embodiment of the present invention, at least one second welding leg 2133 is convexly arranged on the positive electrode current-carrying piece 2131. The PCB board 16 is provided with a second welding hole corresponding to the second welding leg 2133. The second welding hole is used for inserting and welding the first welding leg 2124 corresponding thereto. Thus, the positive electrode current-carrying piece 2131 and the PCB board 16 are both welded and inserted, further improving the contact reliability and contact stability of the positive electrode current-carrying piece 2131 and the PCB board 16.

However, other welding structures can also be used. With reference to FIGS. 92-95, in an embodiment of the present invention, a second solder-climbing hole 2131a is provided on the positive electrode current-carrying piece 2131, so that solder can be directly poured into the second solder-climbing hole 2131a, which is very simple and convenient.

In addition, in the present invention, the positive electrode elastic sheet 213 and the PCB board 16 can also be detachably connected. Specifically, with reference to FIGS. 84-87, in other embodiments of the present invention, based on the above-mentioned embodiment that "the isolation cover 18 is provided with a first accommodating through hole 222 corresponding to the button battery 211, and is provided with a second placing through hole 18d corresponding to the positive electrode elastic sheet 213, and the first accommodating through hole 222 and the second placing through hole 18d are in communication; the PCB board 16 is provided with a second accommodating through hole 223, and the second accommodating through hole 223 is in communication with the first accommodating through hole 222; the battery accommodating cavity 22 includes the first accommodating through hole 222 and the second accommodating through hole 223", the positive electrode current-carrying piece 2131 is clamped and fixedly arranged by the bottom housing 19 and the PCB board 16, thereby fixing the positive electrode current-carrying piece 2131, ensuring that the positive electrode current-carrying piece 2131 is in stable contact with the PCB board 16 and is simple to assemble.

It should be noted that an abutting rib protrudes from an end of the first accommodating through hole 222 facing towards the bottom housing 19. The abutting rib abuts against the PCB board 16 to press the PCB board 16, thereby improving the clamping stability of the PCB board 16 and the bottom housing 19 on the battery elastic sheet.

Furthermore, the bottom wall of the bottom housing 19 is provided with a second limiting groove 196 opening towards the isolation cover 18. The positive electrode current-carrying piece 2131 is provided in the second limiting groove 196. The PCB board 16 is provided with a third placing through hole 16*f* corresponding to the positive electrode elastic sheet 213. The third placing through hole 16*f* is in communication with the second placing through hole 18*d* and the battery accommodating cavity 2. The PCB board 16 is pressed on the bottom housing 19. The battery accommodating cavity 22 is in corresponding communication with part of the second limiting groove 196, so that the positive electrode resilient contact arm 2132 can contact the positive electrode of the button battery 211. In this way, the arrangement of the second placing through hole 18*d* and the third placing through hole 16*f* enables the positive electrode elastic sheet 213 to be arranged in the second limiting groove 196 and to penetrate through the isolation cover 18 and the PCB board 16 so as to realize the positive electrode contact and conduction with the button battery 211. In addition, in a horizontal direction parallel to the bottom wall of the bottom housing 19, the positive electrode elastic sheet 213 is limited to move by the inner side wall of the second limiting groove 196. In a direction perpendicular to the bottom wall of the bottom housing 19, the positive electrode current-carrying piece 2131 is pressed and limited to move by the PCB board 16, thereby ensuring that the positive electrode current-carrying piece 2131 is stable in contact with the PCB board 16, and the positive electrode resilient contact arm 2132 is stable in contact with the button battery 211. The structure design thereof is simple and convenient for disassembly. In addition, the provision of the second limiting groove 196 is advantageous to reduce the thickness of the lower housing 142, so as to achieve the light and thin design of the wireless intelligent switch 102.

Of course, in addition to limiting the positive electrode elastic sheet 213 by providing a limiting groove, the limiting can also be achieved by providing a positioning post. Specifically, in other embodiments of the present invention, at least one second positioning post 197 is arranged on the bottom housing 19. The positive electrode current-carrying piece 2131 passes through a second limiting hole 2131*b* corresponding to the second positioning post 197. The second limiting hole 2131*b* is adapted to the second positioning post 197 for inserting the second positioning post 197 so as to limit the positive electrode current-carrying piece 2131. The PCB board 16 is penetratingly provided with a third relief hole 16*d* for inserting the second positioning post 197 so that the PCB board 16 avoids the second positioning post 197. In this way, the movement of the positive electrode current-carrying piece 2131 in a horizontal direction parallel to the bottom wall of the bottom housing 19 is defined by the second positioning post 197. The movement of the positive electrode current-carrying piece 2131 in a direction perpendicular to the bottom wall of the bottom housing 19 is defined by the pressing of the PCB board 16, thereby ensuring that the positive electrode current-carrying piece 2131 is in stable contact with the PCB board 16. In addition, the PCB board 16 avoids interference with the second positioning post 197 during installation by providing the third relief hole 16*d*, ensuring that the PCB board 16 is arranged smoothly.

It should be noted that in general, due to machining errors and other factors in the production process, there is a problem that the position of the third relief hole 16*d* does not correspond to or the size of the second positioning post 197 does not match, so that the PCB board 16 interferes with the second positioning post 197 when the PCB board 16 is mounted and positioned in the accommodating cavity 191 of the bottom housing 19, thereby causing the bottom housing 19 to fail to be assembled with the second positioning post 197. Therefore, further, in some embodiments of the present invention, the diameter of the third relief hole 16*d* is greater than the diameter of the second positioning post 197. It is ensured that the second positioning post 197 can be sufficiently inserted into the third relief hole 16*d* to prevent the PCB board 16 from interfering with the second positioning post 197, thereby improving the assembly success rate.

It should also be noted that in the present invention, the number of the second positioning posts 197 is not limited, and may be one, two, three, etc. Specifically, referring to FIG. 87, in an embodiment of the present invention, one of the second positioning posts 197 is arranged on the bottom housing 19. The positive electrode current-carrying piece 2131 is correspondingly provided with one of the second limiting holes 2131*b*. More specifically, the second limiting hole 2131*b* is provided in the middle of the positive electrode current-carrying piece sheet 2131.

Furthermore, it should be noted that the second limiting groove 196 and the second positioning post 197 may be alternatively or simultaneously provided. Specifically, referring to FIGS. 84 to 87, in an embodiment of the present invention, the second limiting groove 196 and the second positioning post 197 are simultaneously provided so as to jointly define the movement of the positive electrode current-carrying piece 2131, improve the installation stability, and reduce the thickness of the lower housing 142, facilitating the light and thin design of the wireless intelligent switch 102.

Specifically, referring to FIGS. 88-91, in other embodiments of the present invention, the positive electrode current-carrying piece 2131 is easily clamped into, mounted on or removed from the PCB board 16.

Further, referring to FIGS. 88 to 91, in an embodiment of the present invention, in combination with the above the embodiment that "the lower housing 142 includes a bottom housing 19 and an isolation cover 18; the isolation cover 18 is covered on the bottom housing 19 and forms an accommodating cavity 191 with the bottom housing 19; the PCB board 16 is accommodated inside the accommodating cavity 191; the isolation cover 18 is provided with a first accommodating through hole 222 corresponding to the button battery 211, and is provided with a second placing through hole 18*d* corresponding to the positive electrode elastic sheet 213; the first accommodating through hole 222 and the second placing through hole 18*d* are in communication; the PCB board 16 is provided with a second accommodating through hole 223; the second accommodating through hole 223 is in communication with the first accommodating through hole 222; the battery accommodating cavity 22 includes the first accommodating through hole 222 and the second accommodating through hole 223", the bottom wall of the bottom housing 19 is provided with a second relief accommodating groove 199 corresponding to the negative electrode elastic sheet 212, and the second relief accommodating groove 199 is used for accommodating the positive electrode elastic sheet 213, so that the PCB board 16 fits the bottom wall of the bottom housing 19, which can reduce the thickness of the lower housing 142 and facilitate the light and thin design of the wireless intelligent switch 102.

In the present invention, the arrangement of the clamping structure between the positive electrode current-carrying piece 2131 and the PCB board 16 is not limited. For example, a clamping structure is provided. Specifically, referring to FIGS. 90 and 91, in an embodiment of the present invention, the positive electrode current-carrying piece 2131 includes a positive electrode current-carrying piece main body 2131c. One end of the positive electrode current-carrying piece main body 2131c is connected to the positive electrode resilient contact arm 2132, and the other end of the positive electrode current-carrying piece main body 2131c is bent away from the positive electrode connecting plate to form a second bent connecting arm 2131d. One end of the second bent connecting arm 2131d away from the main plate of the positive electrode connection plate is bent in a direction away from the positive electrode resilient contact arm 2132 to form a second clamp arm 2131e. The positive electrode current-carrying piece main body 2131c, the second bent connecting arm 2131d and the second clamp arm 2131e together form a second clamping structure for clamping a side wall of the second accommodating through hole 223. The arrangement of the second clamping structure achieves the clamping connection between the positive electrode elastic sheet 213 and the PCB board 16, which is simple to process, convenient to operate and easy to disassemble and replace.

It should be noted that the positive electrode elastic sheet 213 can be elastically deformed under a force due to its elasticity, so that the included angle between the second clamp arm 2131e and the second bent connecting arm 2131d can be adaptively adjusted, so that the clamping distance between the second clamp arm 2131e and the positive electrode current-carrying piece main body 2131c is adapted to the thickness of the second accommodating through hole 223, avoiding that the second clamping structure is stably engaged with the side wall of the second accommodating through hole 223, avoiding the problem that the second clamping structure cannot be clamped and fixed to the PCB board 16 due to machining errors. At the same time, the adjustability of the included angle between the second clamp arm 2131e and the second bent connecting arm 2131d enables the positive electrode elastic sheet 213 to be applied to PCB boards 16 with different models and sizes, thereby improving the practicality of the negative electrode elastic sheet 212.

Further, referring to FIG. 91, in an embodiment of the present invention, a second operating arm 2131f is provided at an end of the second clamp arm 2131e away from the second bent connecting arm 2131d. The second operating arm 2131f is inclined from an end thereof connected to the second clamp arm 2131e in a direction away from the positive electrode current-carrying piece body 2131c. The second operating arm 2131f is used for a person to hold and apply force to the second clamp arm 2131e, so as to facilitate the adjustment of the included angle between the second clamp arm 2131e and the second bent connecting arm 2131d.

Of course, the negative electrode current-carrying piece 2121 can also be clamped with the PCB board 16 by providing a snap-fitting structure. Specifically, with reference to FIGS. 88 and 89, in an embodiment of the present invention, a plurality of second snap-fitting arms 2134 are convexly arranged on the positive electrode current-carrying piece 2131. At least two of the plurality of second snap-fitting arms 2134 are arranged opposite to each other. One end of each of the second snap-fitting arms 2134 away from the positive electrode current-carrying piece 2131 is provided with two second snap-fittings 2135. The two second snap-fittings 2135 are arranged facing away from each other. The PCB board 16 is provided with a plurality of second snap-fit holes 16e corresponding to a plurality of the second clamping arms 2134. Each of the second snap-fit holes 16e is used for snap-fitting with two second snaps 2135 of the second clamping arms 2134 corresponding thereto. In this way, the fastening connection between the positive electrode current-carrying piece 2131 and the PCB board 16 is realized by the fastening of the second snaps 2135 and the second snap-fit holes 16e. Two of the second snaps 2135 arranged on each of the second clamping arms 2134 improves the fastening strength between the positive electrode current-carrying piece 2131 and the PCB board 16, while at least two of the second snaps 2135 provided opposite each other improves the fastening stability between the positive electrode current-carrying piece 2131 and the PCB board 16.

When the positive electrode current-carrying piece 2131 is detachably connected to the PCB board 16, a gap may occur between the negative electrode current-carrying piece 2131 and the PCB board 16 and thus poor contact may occur based on factors such as machining errors or when the wireless intelligent switch 102 is active, especially when the wireless intelligent switch 102 is vibrated. Therefore, with reference to FIGS. 84-89, in some embodiments of the present invention, the positive electrode current-carrying piece 2131 is provided with a second resilient contact pin 2136 for making contact and conduction with the positive electrode of the PCB board 16. The second resilient contact pin 2136 extends obliquely from an end thereof connected to the positive electrode current-carrying piece 2131 in a direction towards the PCB board 16. In this way, when the positive electrode elastic sheet 213 and the PCB board 16 are arranged, the second resilient contact pin 2136 is elastically compressed to the PCB board 16 by force. When the wireless intelligent switch 102 is activated, especially when vibrated, a gap is generated between the PCB board 16 and the positive electrode current-carrying piece 2131 when the PCB board 16 is activated by force, but the second resilient contact pin 2136 can be elastically activated within a certain range due to its elasticity, so as to stably contact with the PCB board 16, thereby ensuring continuous conduction.

It should be noted that in some cases, the second resilient contact pins 2136 fail in resilient deformation due to factors such as overload or large deformation, i.e. the elastic function is lost, which may cause poor contact with the PCB board 16. Therefore, with the reference to FIGS. 84-87, in an embodiment of the present invention, a plurality of the second resilient contact pins 2136 are provided, and a plurality of the second resilient contact pins 2136 are provided at intervals. Thus, as long as one of the plurality of the second resilient contact pins 2136 can make good contact with the PCB board 16, the power supply can be ensured to be normal and the stability can be improved.

It should also be noted that the position of the second resilient contact pin 2136 is not limited. In order to meet different structural design requirements and facilitate mold opening, with reference to FIGS. 84-87, in some embodiments of the present invention, the second resilient contact pin 2136 is provided at the periphery of the positive electrode current-carrying piece 2131. Of course, the second resilient contact pin 2136 can also be provided in the middle of the positive electrode current-carrying piece 2131. Specifically, referring to FIGS. 88 and 89, in some embodiments of the present invention, the positive electrode current-carrying piece 2131 is cut to form a fourth placing through hole 2131*g*, and the second resilient contact pin 2136 connected to an inner side wall of the fourth placing through hole 2131*g*. A gap exists between the second resilient contact pin 2136 and the other inner side wall of the fourth placing through hole 2131*g*. In this manner, interference with the inner side wall of the fourth placing through hole 2131*g* is avoided when the second resilient contact pin 2136 is elastically moved by force, thereby ensuring good contact between the second resilient contact pin 2136 and the PCB board 16.

Figure 87:
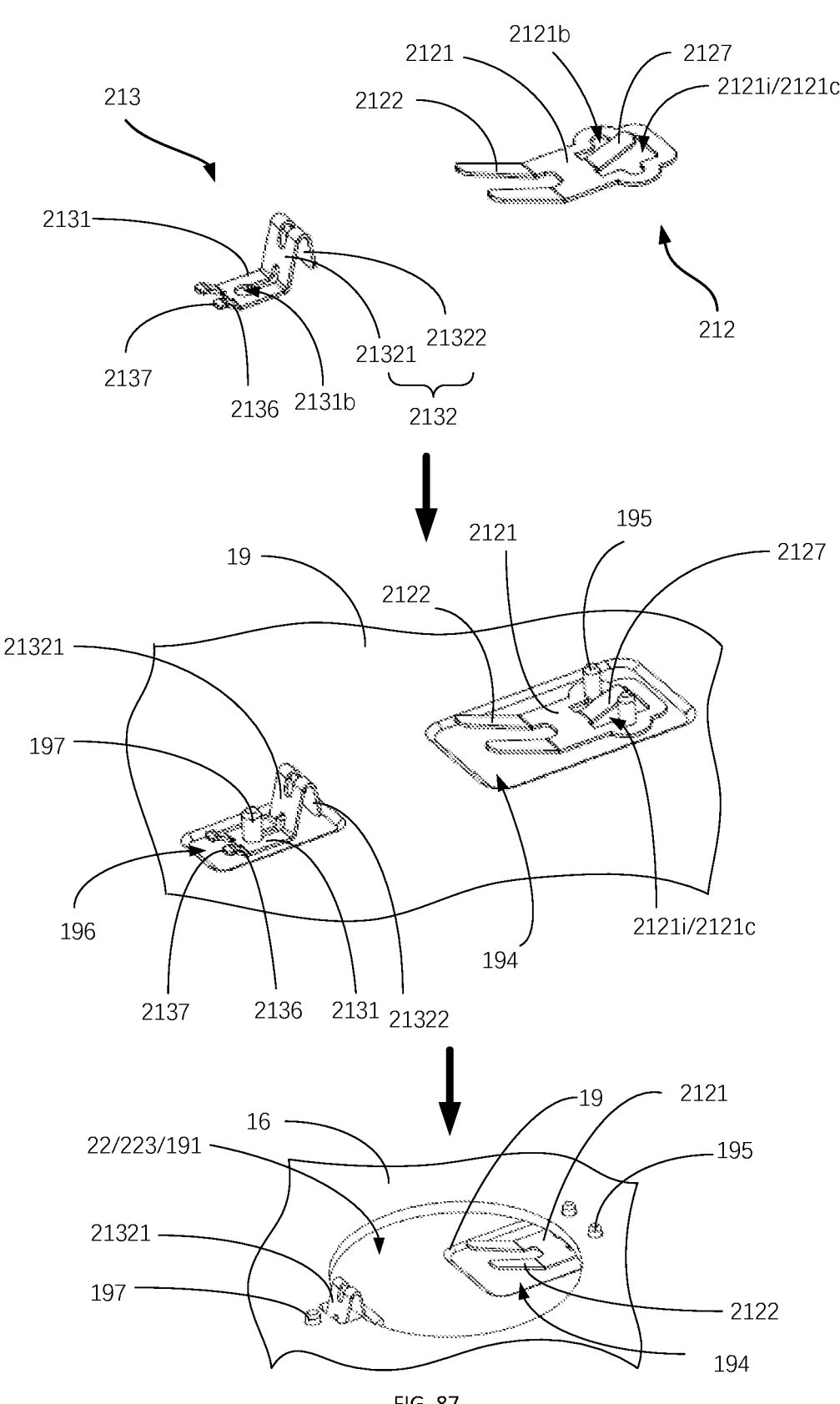
FIG. 87 is an assembly diagram of a battery elastic sheet of FIG. 86.
Figure 88:
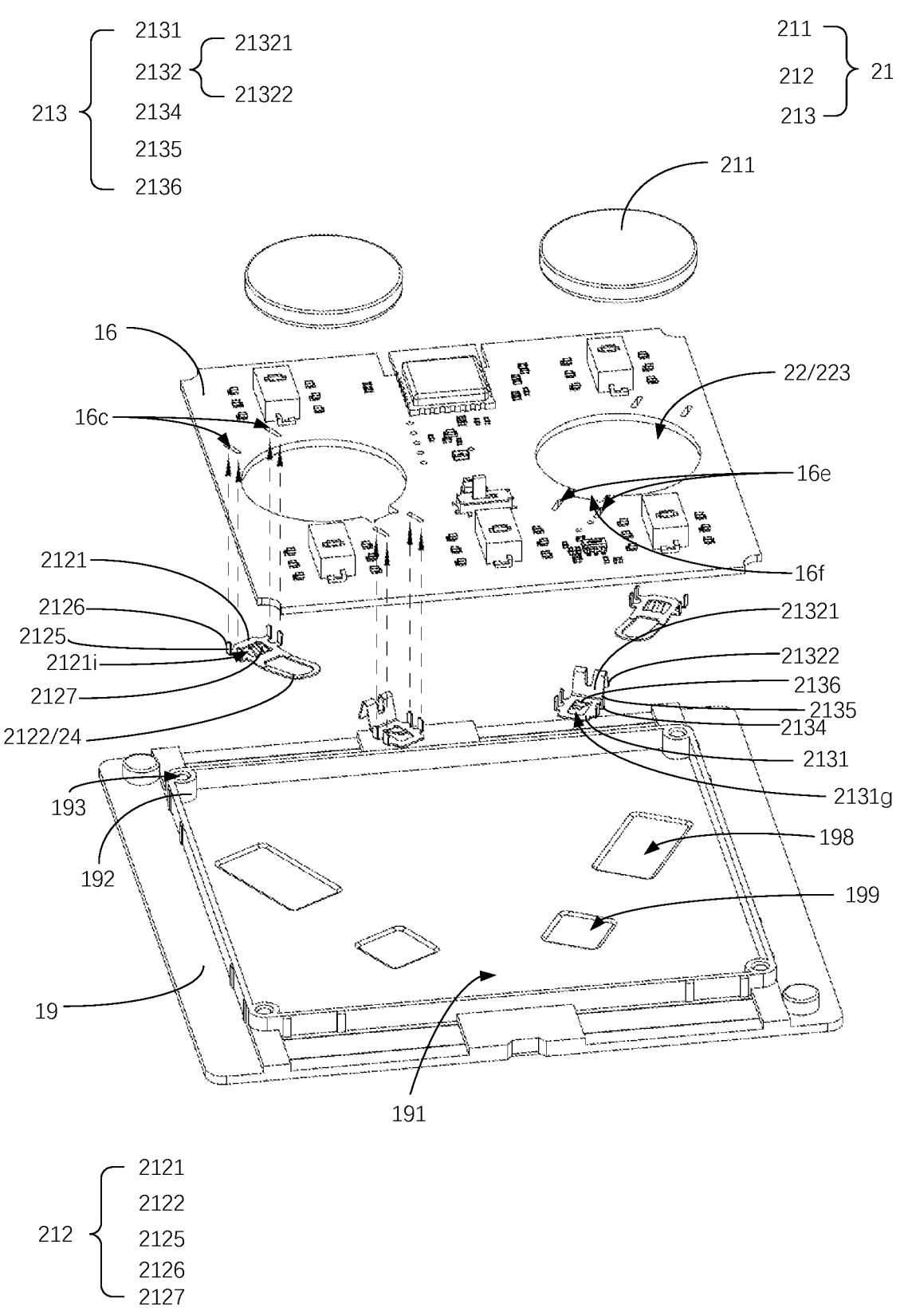
FIG. 88 is a structurally perspective view of a part of an embodiment of a wireless intelligent switch.

Specifically, referring to FIGS. 85, 87 and 89, in some embodiments of the present invention, one end of the second resilient contact pin 2136 away from the positive electrode current-carrying piece 2131 is bent to form a third contact terminal 2137. The third contact terminal 2137 is arranged in parallel with the PCB board 16 so as to be in contact with the positive electrode of the PCB board 16 and conduct electricity. The third contact terminal 2137 is provided so that the contact between the positive electrode elastic sheet 213 and the positive electrode of the PCB board 16 is a surface contact, thereby making the contact between the positive electrode elastic sheet 213 and the PCB board 16 closer, thereby further improving the contact stability and the conductive effect.

Specifically, on the basis of the embodiment that "the bottom wall of the bottom housing 19 is provided with a second limiting groove 196 opening towards the isolation cover 18; the positive electrode current-carrying piece 2131 is provided in the second limiting groove 196; the PCB board 16 is pressed on the bottom housing 19, and the battery accommodating cavity 22 is in corresponding communication with a part of the second limiting groove 196, so that the positive electrode resilient contact arm 2132 can be in contact with the positive electrode of the button battery 211", generally, in order to ensure that the positive electrode current-carrying piece 2131 contacts and conducts electricity with the PCB board 16, the groove depth of the second limiting groove 196 is the same as or slightly less than the thickness of the positive electrode current-carrying piece 2131. Namely, a side surface of the positive electrode current-carrying piece 2131 facing away from the bottom housing 19 is flush with or slightly higher than the opening end face of the second limiting groove 196. However, in combination with the embodiment that "the positive electrode current-carrying piece 2131 is provided with a second resilient contact pin 2136 for making contact and conducting electricity with the positive electrode of the PCB board 16; the second resilient contact pin 2136 extends obliquely from one end thereof connected to the positive electrode current-carrying piece 2131 in a direction towards the PCB board 16", a side surface of the positive electrode current-carrying piece 2131 facing away from the bottom housing 19 is flush with or lower than an opening end face of the second limiting groove 196. At least part of the second resilient contact pins 2136 extend out of the second limiting groove 196, so that it can be ensured that the positive electrode current-carrying piece 2131 is in good contact with the PCB board 16 by the inclined arrangement of the second resilient contact pins 2136 and the elastic property thereof. At the same time, since the positive electrode current-carrying piece 2131 is completely located in the second limiting groove 196, the thickness of the lower housing 142 can be further reduced.

In addition, the positive electrode resilient contact arm 2132 includes a connecting sheet 21321 and at least one conductive sheet 21322. The connecting sheet 21321 is connected to the positive electrode current-carrying piece 2131 and is arranged at an included angle with the positive electrode current-carrying piece 2131. The conductive sheet 21322 is arranged at the outer periphery of the connecting sheet 21321 and can bear and move elastically with respect to the connecting sheet 21321 under a force. One side surface of the conductive sheet 21322 is used for contacting the upper wall or the outer peripheral wall of the button battery 211, so as to realize the electrical connection between the positive electrode elastic sheet 213 and the button battery 211. More specifically, the connecting sheet 21321 is formed by bending from one end of the positive electrode current-carrying piece 2131. A bent connecting portion 2311 between the connecting sheet 21321 and the positive electrode current-carrying piece 2131 is provided in a circular arc shape surface so as to avoid breakage at the bent connecting portion, thereby extending the service life of the positive electrode elastic sheet 213.

Note that the connection position between the conductive sheet 21322 and the connection sheet 21321 is not limited. Referring to FIGS. 79 and 82-95, in some embodiments of the present invention, the connection sheet 21321 has a first end connected to the positive electrode current-carrying piece sheet 2131 and a second end opposite to the first end. The second end of the connecting sheet 21321 is bent and formed with the conductive sheet 21322 which is located on a side of the connecting sheet 21321 facing away from the positive electrode current-carrying piece sheet 2131 and is arranged at an included angle with the connecting sheet 21321 so as to contact and conduct electricity with an upper side wall or an outer peripheral wall of the button battery 211.

Of course, the arrangement of the included angle between the conductive sheet 21322 and the connecting sheet 21321 is different. The contact position between the conductive sheet 21322 and the button battery 211 is also different. Specifically, referring to FIGS. 79 and 82-91, in some embodiments of the present invention, the included angle between the conductive sheet 21322 and the connecting sheet 21321 is an acute angle. The conductive sheet 21322 faces away from a side surface of the connecting sheet 21321 so as to abut against the outer peripheral wall of the button battery 211. Meanwhile, referring to FIGS. 92 to 95, in some embodiments of the present invention, an angle between the conductive sheet 21322 and the connecting sheet 21321 is a right angle or an obtuse angle. The conductive sheet 21322 faces a side surface of the connecting sheet 21321 to abut against an upper side wall of the button battery 211.

In addition, based on the above-mentioned embodiment that "the connecting sheet 21321 has a first end connected to the positive electrode current-carrying piece sheet 2131 and a second end opposite to the first end", the connecting sheet 21321 also has a third end and a fourth end which are provided between the first end and the second end and are oppositely arranged. One end of the third end and the fourth end is bent to form the conductive sheet 21322. The conductive sheet 21322 is located on a side of the connecting sheet 21321 facing away from the positive electrode current-carrying piece 2131 and is arranged at an included angle with the connecting sheet 21321 so as to contact and conduct electricity with the outer peripheral wall of the button battery 211.

Compared to the structure in which the conductive sheet 21322 is in contact with the upper wall of the button battery 211, the structure in which the conductive sheet 21322 is in contact with the outer peripheral wall of the button battery 211 has a larger contact area with the button battery 211 and is more stable in electrical conductivity. In contrast to the structure in which the conductive sheet 21322 is in contact with the outer peripheral wall of the button battery 211, the structure in which the conductive sheet 21322 is in contact with the upper wall of the button battery 211 has the function of defining the button battery 211 in a direction perpendicular to the bottom wall of the battery accommodating cavity 22 together with the bottom wall of the battery accommodating cavity 22 while having the function of conducting electricity, thereby improving the mounting stability of the button battery 211 and the conducting stability of the button battery 211 and the negative electrode elastic sheet 212.

More specifically, referring to FIGS. 80 and 81, in an embodiment of the present invention, one end of the third end and the fourth end is bent and formed with the conductive sheet 21322. The conductive sheet 21322 is located on a side of the connecting sheet 21321 facing away from the positive electrode current-carrying piece sheet 2131, is arranged at an acute angle with the connecting sheet 21321, and is substantially parallel to the connecting sheet 21321. The side of the conductive sheet 21322 facing away from the connecting sheet 21321 is used for contacting and conducting with the outer peripheral wall of the button battery 211. An end of the conductive sheet 21322 away from the connecting sheet 21321 is bent in a direction facing away from the connecting sheet 21321 to form an attachment piece. A bent connecting portion 2311 between the conductive sheet 21322 and the attachment piece is provided in a circular arc shape surface so as to adapt to the outer peripheral wall of the button battery 211. It increases the contact area between the positive electrode elastic sheet 213 and the button battery 211 the conductive stability.

In addition, the number of the conductive sheets 21322 is also not limited, and the conductive sheets 21322 may be provided with one, two, etc. and thus conducting electricity can be achieved as long as one of the conductive sheets 21322 in a plurality of the conductive sheets 21322 is in good contact with the button battery 211. furthermore, the connection positions of a plurality of the conductive sheets 21322 and the connecting sheet 21321 are also not limited, and a plurality of the conductive sheets 21322 may be spaced at one end of the connecting sheet 21321, for example, referring to FIG. 95, in an embodiment of the present invention, the conductive sheets 21322 are provided with two. Two of the conductive sheets 21322 are spaced at the second end of the connecting sheet 21321 so as to contact and conduct electricity with the upper wall of the button battery 211, and limit the button battery 211 together with the bottom wall of the battery accommodating cavity 22. In addition, a plurality of the conductive sheets 21322 may also be arranged at intervals at the periphery of the connecting sheet 21321. With reference to FIG. 93, in an embodiment of the present invention, the conductive sheets

21322 are provided with three, and three of the conductive sheets 21322 are respectively arranged at the second end, the third end and the fourth end of the connecting sheet 21321, so as to contact and conduct electricity with the upper side wall and the peripheral wall of the button battery 211, and enable the button battery 211 to be fixed together by the conductive sheets 21322 arranged at the second end of the connecting sheet 21321 and the bottom wall of the battery accommodating cavity 22. In this way, in the present embodiment, the arrangement of a plurality of the conductive sheets 21322 not only makes the contact area between the positive electrode elastic sheet 213 and the button battery 211 larger, improving the conductive stability, but also limits the button battery 211, improving the installation stability of the button battery 211 and the conductive stability between the button battery 211 and the negative electrode elastic sheet 212. In addition, as long as one of the plurality of conductive sheets 21322 can contact with and conduct electricity with the button battery 211, the positive electrode elastic sheet 213 can be ensured to conduct electricity normally with the button battery 211, thereby improving the reliability of the positive electrode elastic sheet 213.

It should also be noted that the bent connection between the conductive sheet 21322 and the connecting sheet 21321 may be arranged in a sharp angle or in a curved plane. Specifically, referring to FIGS. 79-95, in some embodiments of the present invention, the bent connection between the conductive sheet 21322 and the connecting sheet 21321 is arranged in a curved plane, so as to avoid the breakage at the bent connection, thereby extending the service life of the positive electrode elastic sheet 213.

According to another aspect of the present invention, as shown in FIGS. 65-68, there is also provided a switch mounting frame 3 including a connector frame 31 configured to be capable of mounting a wall intelligent switch 101 and/or a wireless intelligent switch 102 as described above. At least one switch mounting position 32 is arranged on the connector frame 31. The wall intelligent switch 101 or the wireless intelligent switch 102 is detachably connected to the switch mounting position 32. The removable connection may include a magnetic removable connection, a bolted connection, a snap connection, a clamped connection, or other form of removable fixed connection. The purpose of the switch mounting frame 3 is as follows. 1, it facilitates quick mounting and orderly arrangement of a plurality of switches. 2, the wall intelligent switch 101 and the wireless intelligent switch 102 provided above have a magnetic attraction member structure. The switch mounting frame 3 is made of a ferrous material and is mounted on a wall, and is used in combination with the magnetic attraction member structure of the wireless intelligent switch 102, so that the wireless intelligent switch 102 can be quickly taken off from the wall and carried with one. It can be quickly loaded into the switch mounting frame 3, and the switches are kept orderly arranged, which is convenient and quick. 3, the installation of the wall intelligent switch 101 has a pre-fixing function, facilitating the fixing of the wall intelligent switch 101 to the wall.

Figure 65:
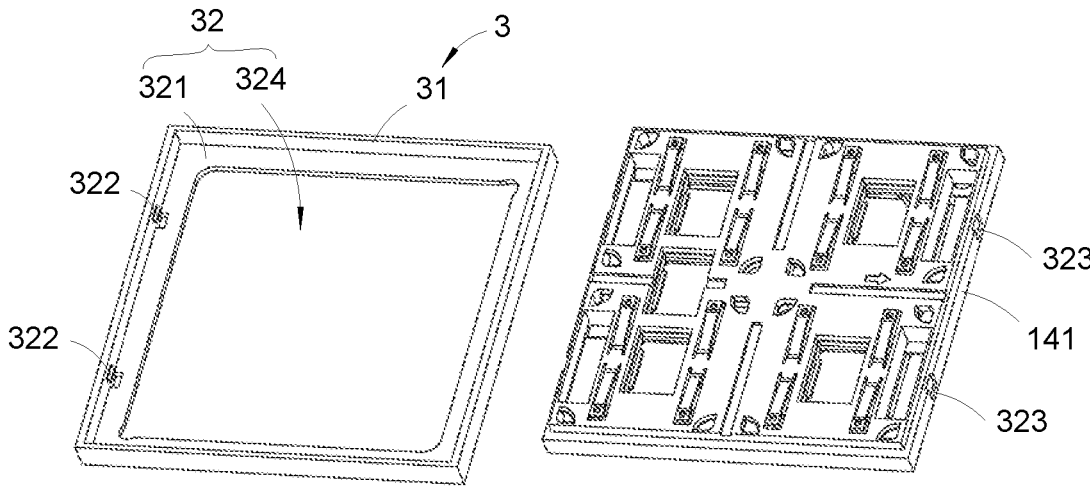
FIG. 65 is a structural diagram of a switch mounting frame according to an embodiment of the present invention.
Figure 66:
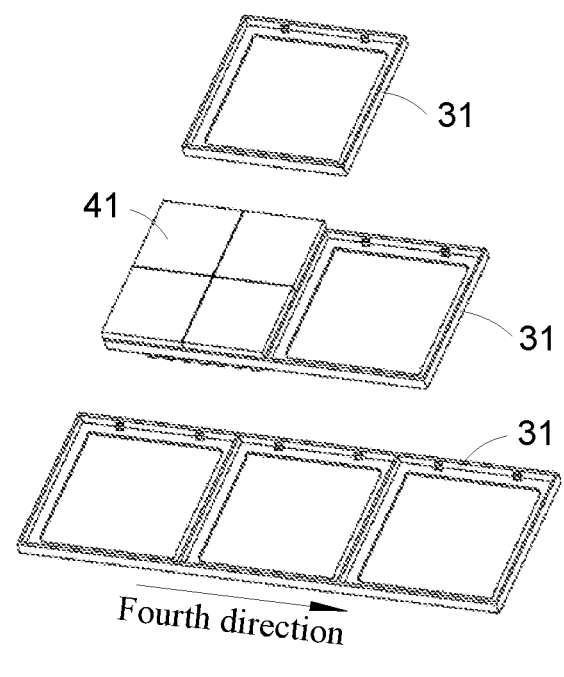
FIG. 66 is a structural diagram of a connector frame according to an embodiment of the present invention.

Furthermore, as shown in FIGS. 65 and 66, the wall intelligent switch 101 and the wireless intelligent switch 102 are respectively provided with a housing 14. The switch mounting position 32 is provided with a second positioning groove 321 adapted to the shape of the housing 14. A side wall of the second positioning groove 321 is sleeved on a side wall of the housing 14 so as to position the housing 14 in a horizontal direction. A bottom wall of the second positioning groove 321 fits at least a lower surface of the housing 14 so as to limit the vertical downward displacement of the housing 14. The second positioning groove 321 being adapted to the shape of the housing 14 of the intelligent switch can be understood that the size of the second positioning groove 321 is slightly greater than the size of the outer contour of the housing 14, so that when the housing 14 is arranged on the switch mounting position 32, the second positioning groove 321 is sleeved on the outer surface of the housing 14. The inner side wall of the second positioning groove 321 fits the outer side wall of the housing 14. The intelligent switch is positioned in the horizontal direction via the second positioning groove 321. It should be noted that the horizontal direction refers to the horizontal direction shown in the figure, not the horizontal direction when the intelligent switch is arranged on a wall. The bottom wall of the second positioning groove 321 being attached to at least one lower surface of the housing 14 can be understood that there is at least one surface of the housing 14 in contact with the bottom wall of the second positioning groove 321, so that the housing 14 is positioned by the second positioning groove 321 in the vertical direction. It should be noted that the vertical direction and the bottom wall need to determine the direction according to the figure, not referring to the direction when the intelligent switch is arranged on a wall. The at least one lower surface of the housing 14 is understood to mean at least one surface of the housing 14 facing downwardly, not referring to the lower surface of the bottom of the housing 14.

In addition, the center of the second positioning groove 321 is provided with a housing passing hole 324 shaped to fit to the housing 14. The housing 14 passes through the housing passing hole 324 so that the bottom wall of the second positioning groove 321 fits at least a lower surface of the housing 14. The purpose of the housing passing hole 324 is that when the intelligent switch is a wall switch, since the wall switch has a power supply board 17, a power supply line needs to be connected, and the controlled electric appliance needs to be controlled on and off, causing the housing 14 of the wall switch is bulky. The housing passing hole 324 can allow a part of the housing 14 of the wall switch to pass through and be placed inside the wall, so that when the switch mounting frame 3 simultaneously mounts the wall switch and the wireless switch, the thickness of the wall switch is consistent with that of the wireless switch in appearance.

Further, as shown in FIGS. 65 and 66, the switch mounting position 32 further includes a third snap 322 extending from a side wall of the second positioning groove 321. The third snap 322 is snap-fit to the housing 14 to limit vertical upward displacement of the housing 14, so that the housing 14 is removably secured to the switch mounting position 32. In a specific embodiment, the third snaps 322 are four in number, and are arranged in pairs on the left and right sides of the second positioning groove 321. The housing 14 includes an upper housing 141 and a lower housing 142. The key 11 is arranged on the upper housing 141. The upper housing 141 is provided with a third snap-fit position 323 adapted to the third snaps 322 at a corresponding position of the third snaps 322. When the intelligent switch is mounted on the switch mounting position 32, the third snaps 322 are snap-fitted to the third snap-fit position 323 so as to fixedly connect the intelligent switch with the switch mounting position 32.

In another embodiment, the switch mounting position 32 is provided with a bolt hole (not shown in the figures), the housing 14 is provided with a bolt passing hole at a corresponding position of the bolt hole. The hole diameter of the bolt passing hole is adapted to the bolt hole, so that a bolt passes through the bolt passing hole and is screwed into the bolt hole to fix the intelligent switch to the switch mounting position 32.

Figure 67:
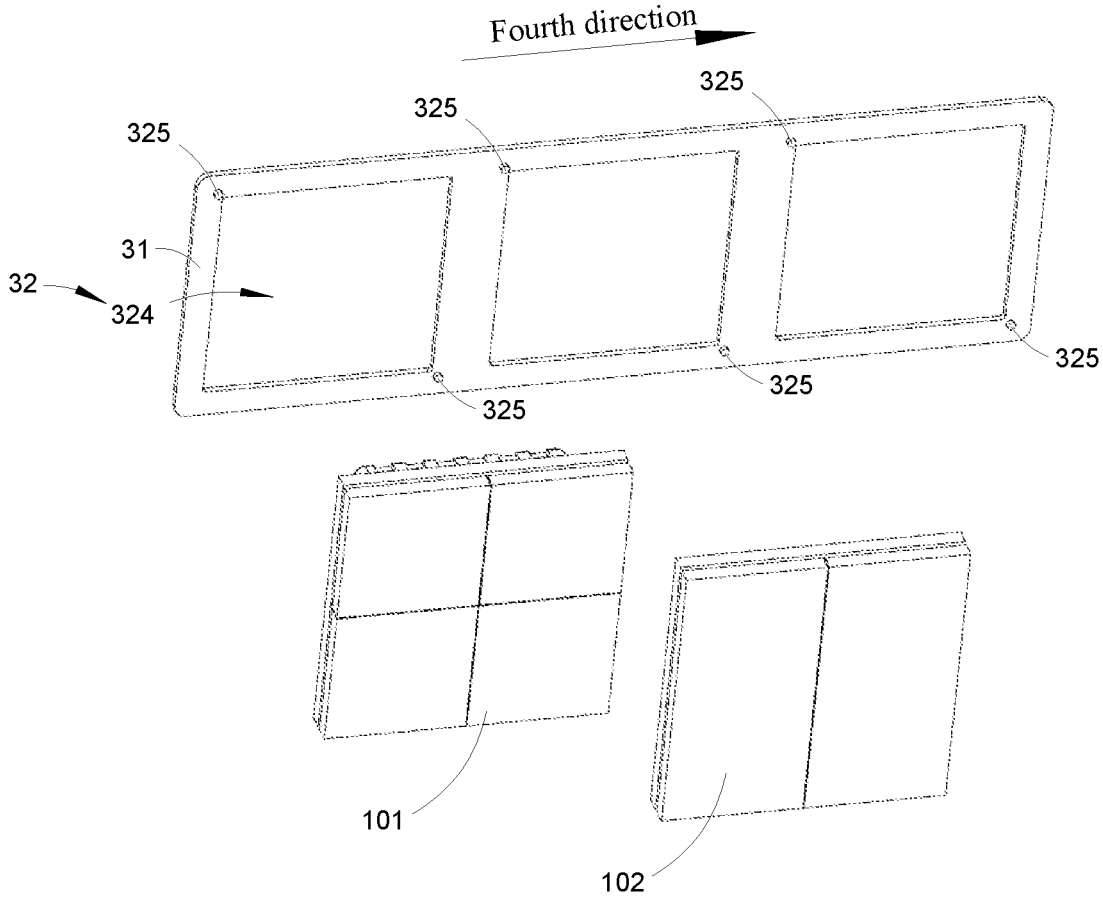
FIG. 67 is a structural diagram of a switch mounting frame according to an embodiment of the present invention.
Figure 71:
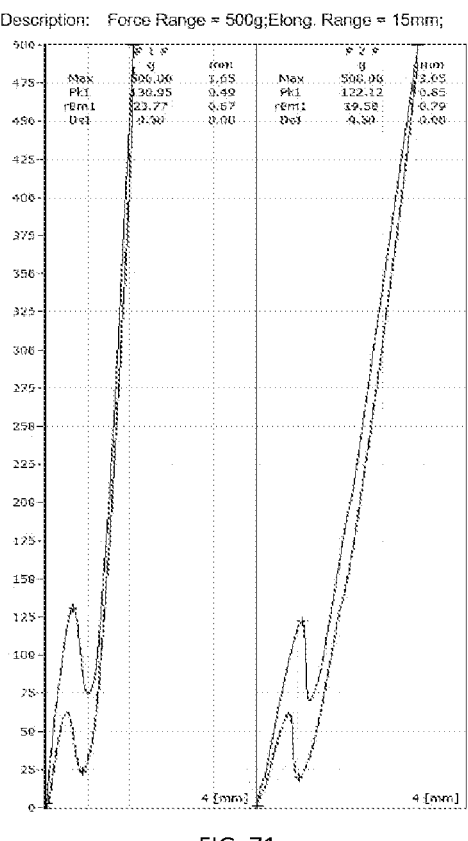
FIG. 71 is a curve graph of pressing force versus displacement of a key according to an embodiment of the present invention.
Figure 72:
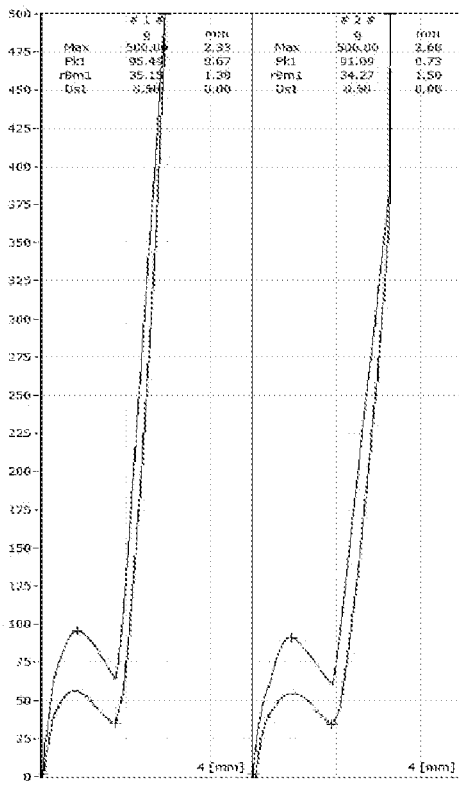
FIG. 72 is a curve graph of pressing force versus displacement of a key according to an embodiment of the present invention.
Figure 73:
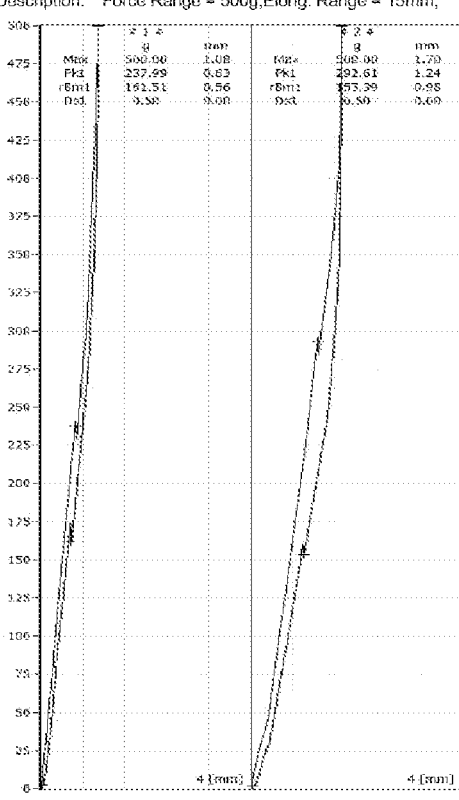
FIG. 73 is a curve graph of pressing force versus displacement of a key according to an embodiment of the present invention.
Figure 74:
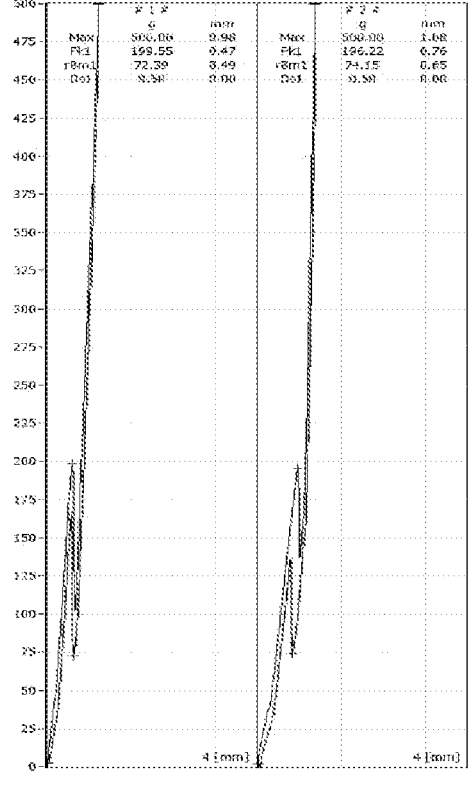
FIG. 74 is a curve graph of pressing force versus displacement of a key according to an embodiment of the present invention.

In another embodiment, as shown in FIGS. 67 and 68, the switch mounting position 32 is provided with a housing through hole 324 shaped to fit the housing 14, the housing 14 passing through the housing through hole 324 and fitting the switch mounting position 32 at least partially towards the surface of the switch mounting position 32. The switch mounting position 32 is convexly provided with at least one positioning protrusion 325. The housing 14 is provided with a positioning hole 326 in a shape adapted to the positioning protrusion 325 at a corresponding position of the positioning protrusion 325. The positioning protrusion 325 is inserted into the positioning hole 326 so as to position the housing 14 in a horizontal direction. As shown in FIG. 68, the positioning hole 326 of the wall intelligent switch 101 is opened on the sheet metal part 14221. The positioning hole 326 of the wireless intelligent switch 102 is opened on the bottom housing 19. When the wall intelligent switch 101 is mounted on a wall, the switch mounting frame 3 has a positioning function on the wall switch so as to facilitate the alignment of the wall intelligent switch 101. The purpose of the housing passing hole 324 is that when the intelligent switch is a wall switch, since the wall switch has a power supply board 17, a power supply line needs to be connected, and the controlled electric appliance needs to be controlled on and off, causing the housing 14 of the wall switch is bulky. The housing passing hole 324 can allow a part of the housing 14 of the wall switch to pass through and be placed inside the wall, so that when the switch mounting frame 3 simultaneously mounts the wall switch and the wireless switch, the thickness of the wall switch is consistent with that of the wireless switch in appearance. In this embodiment, the positioning protrusion 325 is integrally formed with the switch mounting frame.

Further, as shown in FIGS. 67 and 68, there are two of the positioning protrusions 325 corresponding to each of the switch mounting positions 32. The two positioning protrusions 325 are respectively provided at opposite corners of the switch mounting positions 32. Among other things, positioning the positioning protrusions 325 at opposite corners of the switch mounting position 32 maximizes the spacing between the two positioning protrusions 325, thereby improving the positioning accuracy of the positioning protrusions 325. In other embodiments, the positioning protrusion 325 may be single, with a single positioning protrusion 325 matched with the housing through hole 324 to effect positioning of the housing 14. Alternatively, the positioning protrusions 325 may be three or more to collectively position the housing 14.

Furthermore, the switch mounting position 32 is formed at least partially from a ferrous material, and the housing 14 is provided with a magnet 1416. The housing 14 is attracted to the switch mounting position 32 via the magnet 1416 so as to enable the wall intelligent switch 101 or the wireless intelligent switch 102 to be detachably connected to the switch mounting position 32. The intelligent switch is provided with a magnet 1416. The details of this technical solution are described in detail above, and will not be described again here. The switch mounting position 32 being formed at least partially from a ferrous material can be understood that the switch mounting position 32 may be partially formed with an iron plate, or the switch mounting position 32 may be formed entirely of a ferrous material, or in another embodiment, the entire switch mounting frame may be integrally formed of a ferrous material. The magnetic attraction member structure of the wireless intelligent switch 102 is used in combination with the positioning protrusion 325, so that the wireless intelligent switch 102 can be quickly dismounted, so that the wireless intelligent switch 102 can be quickly taken from a wall and carried with one. It can be quickly loaded into the switch mounting frame 3, and the switches are kept orderly arranged, which is convenient and quick.

Furthermore, as shown in FIG. 62, the housing 14 includes an upper housing 141 and a lower housing 142. The magnet 1416 is arranged on the upper housing 141. At least one magnetic attraction member 1422 is arranged on the lower housing 142 at a corresponding position of the magnet 1416. The magnet 1416 and the magnetic attraction member 1422 are mutually attracted so as to realize a magnetic attraction member connection between the upper housing 141 and the lower housing 142. The magnetic attraction member 1422 is located between the magnet 1416 and the switch mounting position 32. The magnet 1416 and the magnetic attraction member 1422 are attracted to the switch mounting position 32. The magnetic attraction member structure of the intelligent switch is described in detail above. A magnet 1416 is arranged on the upper housing 141. A magnetic attraction member 1422 is arranged on the lower housing 142. The magnet 1416 attracts the magnetic attraction member 1422 so that the upper housing 141 is attracted to the lower housing 142. At the same time, the magnet 1416 attracts the switch mounting position 32, so that the upper housing 141 and the lower housing 142 are attracted to the switch mounting position 32. Since the distance between the magnet 1416 and the magnetic attraction member 1422 is greater than the distance between the magnet 1416 and the switch mounting position 32, when the intelligent switch is attracted to the switch mounting position 32, the magnet 1416 attracts the switch mounting position 32 by the magnetic attraction member 1422. The magnetic attraction member force between the magnet 1416 and the magnetic attraction member 1422 is greater than the magnetic attraction member force between the magnet 1416 and the switch mounting position 32. When the intelligent switch is removed from the switch mounting position 32, a user can remove the upper housing 141 and the lower housing 142 together from the switch mounting position 32 by merely holding the upper housing 141 and pulling the upper housing 141 outwards, without removing only taking the upper housing 141 but leaving the lower housing 142. The advantage of this arrangement is that when the intelligent switch is arranged in the switch mounting position 32, only the upper housing 141 is exposed to the outside of the switch mounting position 32, and other parts are hidden, so that the user can only take the upper housing 141. When removing the upper housing 141, the whole switch can be removed, so as to facilitate the user's operation of replacing batteries, wiring, etc.

Furthermore, as shown in FIGS. 66 and 67, there are a plurality of the switch mounting positions 32, and each of the switch mounting positions 32 is juxtapositioned. A direction in which each of the switch mounting positions 32 is juxtapositioned is set as a fourth direction. The length of the wall intelligent switch 101 and the wireless intelligent switch 102 in the fourth direction is the same. The length of the wireless intelligent switch 102 in the fourth direction is set as a first length. In the fourth direction, the distance between the center positions of two adjacent switch mounting positions 32 is greater than or equal to the first length. Therefore, when the intelligent switch is arranged in the switch mounting position 32, there is sufficient clearance between two adjacent intelligent switches, so that the two adjacent intelligent switches do not interfere.

Further, in the fourth direction, the difference between the distance between the center positions of two adjacent switch mounting positions 32 and the first length is less than or equal to 5 mm. Therefore, when the intelligent switch is arranged at the switch mounting position 32, the distance between two adjacent intelligent switches is less than or equal to 5 mm.

It will be apparent to those skilled in the art that the invention is not limited to the details of the foregoing exemplary embodiments, and that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description. All changes which come within the meaning and range of equivalency of the claims are therefore intended to be embraced in the invention. Any reference sign in a claim should not be construed as limiting the claim concerned.

The invention claimed is:

1. A wall intelligent switch, comprising:
   a housing;
   at least one key arranged on the housing, wherein at least a part of the key can generate a pressing movement in response to an operation and control force, thereby generating a displacement, so that the key passes at least a first pressing position and a second pressing position in sequence, and generates a reaction force;
   a detection member provided for being triggered based on the displacement and generating a first rebound force against the displacement;
   a reset portion configured for supporting the key to deform directly or indirectly in response to the pressing movement and generating a reset acting force to overcome the deformation; and
   a wireless communication module electrically connected to the detection member to receive a trigger signal of the detection member and to control the on-off of the wall intelligent switch based on the trigger signal;
   wherein the detection member and the reset portion cooperate such that when the key moves to the first pressing position, the reaction force is F1; when the key moves from the first pressing position to the second pressing position, the reaction force jumps from F1 to F2, where F2<F1<400 g;
   the displacement S1 of the key at the first pressing position and the displacement S2 of the key at the second pressing position satisfy a relationship: S2−S1≤2 mm.

2. The wall intelligent switch according to claim 1, wherein the key is movably connected to the housing; the key is provided with an abutting portion in a direction towards the detection member for abutting and triggering the detection member;
   the detection member is provided with a force guide member at a corresponding position of the abutting portion; the force guide member generates a movement in response to the abutting pressure of the abutting portion and generates the first rebound force; when the force guide member moves to a preset position, the first rebound force jumps; and the positional relationship of the abutting portion with respect to the key is adapted to the force guide member, so that when the pressing movement of the key occurs, the reaction force jumps from F1 to F2.

3. The wall intelligent switch according to claim 1, wherein the key is movably connected to the housing, the housing being capable of limiting at least two degrees of freedom of displacement and at least one degree of freedom of rotation of the key, so that the key is capable of movement in displacement and/or rotation and triggering the detection member during the movement.

4. The wall intelligent switch according to claim 3, wherein the reset portion is provided as at least one resilient limiting member; the housing is provided with the resilient limiting member at the corresponding position of the key;
   the resilient limiting member comprises a fixing end and a free end away from the fixing end, wherein the fixing end is fixedly connected or integrally formed to the housing, and the free end abuts against the key to provide a reset acting force for the key.

5. The wall intelligent switch according to claim 4, wherein the free end of the resilient limiting member is positionally connected to the key to limit two degrees of freedom of displacement in the horizontal direction and one degree of freedom of rotation in the horizontal direction of the key, so that the key can have a superimposed movement of displacement plus rotation in the vertical direction.

6. The wall intelligent switch according to claim 5, wherein the free end is provided with a first positioning hole; the key is provided with a key positioning pin protruding at the corresponding position of the first positioning hole; and the key positioning pin is inserted into the first positioning hole so as to realize the positioning connection between the key and the free end.

7. The wall intelligent switch according to claim 1, wherein the housing comprises an upper housing and a lower housing, wherein the upper housing is provided with at least one magnet; the lower housing is provided with at least one magnetic attraction member which can be attracted by the magnet; and the upper housing is attracted to the magnetic attraction member by the magnet so as to achieve a magnetic attraction connection mode between the upper housing and the lower housing;
   the magnetic attraction member is a sheet metal part capable of being fixedly arranged on a mounting surface such that the lower housing is fixedly connected to the mounting surface.

8. The wall intelligent switch according to claim 7, further comprising at least one PCB board, wherein the detection member is arranged on the PCB board and electrically connected to the PCB board; the PCB board is respectively provided with at least one LED lamp at a corresponding position of each of the keys, and the light emitted by the LED lamp is projected onto a first surface of the keys; the first surface is provided as a face of the key facing towards the housing; the key is provided with a light guide portion, and the light emitted by the LED lamp is guided out to a third surface of the key, the third surface being provided as a face of the key facing away from the housing; wherein the shape of the light guide portion is set to a predetermined shape such that the light guide portion displays a predetermined pattern corresponding to the predetermined shape on the third surface of the key.

9. The wall intelligent switch according to claim 8, wherein a light uniforming shade is respectively provided at corresponding positions of each key; the light uniforming shade is arranged on the LED lamp corresponding to each key, and the light emitted by the LED lamp is projected to the key after being uniformed by the light uniforming shade; the surface of one side of the light uniforming shade facing towards the key is rectangular, and the light uniforming shade is a rectangular parallelepiped cover with an opening at the bottom; and the projection of the light uniforming shade onto the third surface of the keys covers the predetermined pattern.

10. The wall intelligent switch according to claim 9, wherein the detection member is covered on the light uniforming shade; the light uniforming shade is provided with a contact-pressure through hole at the corresponding position of the detection member; the key is provided with an abutting portion at the corresponding position of the detection member; the abutting portion passes through the contact-pressure through hole and is placed above the detection member; when the key generates the displacement in response to the operation and control force, the abutting portion abuts against and triggers the detection member; and the distance between the surface on a side of the light uniforming shade facing towards the key and the PCB board is greater than 3 mm.

11. A switch mounting frame, comprising a connector frame configured for mounting the wall intelligent switch according to claim 1;
   at least one switch mounting position is arranged on the connector frame; and the wall intelligent switch is detachably connected to the switch mounting position.

12. A wireless intelligent switch, comprising:
   a housing;
   at least one key arranged on the housing, wherein at least a part of the key can generate a pressing movement in response to an operation and control force, thereby generating a displacement, so that the key passes at least a first pressing position and a second pressing position in sequence, and generates a reaction force;
   a detection member provided for being triggered based on the displacement and generating a first rebound force against the displacement;
   a reset portion configured for supporting the key to deform directly or indirectly in response to the pressing movement and generating a reset acting force to overcome the deformation; and
   a wireless communication module which is communicatively connected to the detection member so as to receive a corresponding trigger signal and send a wireless message to the outside based on the trigger signal;
   wherein the detection member and the reset portion cooperate such that when the key moves to the first pressing position, the reaction force is F1; when the key moves from the first pressing position to the second pressing position, the reaction force jumps from F1 to F2, where F2<F1<400 g;
   the displacement S1 of the key at the first pressing position and the displacement S2 of the key at the second pressing position satisfy a relationship: S2-S1≤2 mm.

13. The wireless intelligent switch according to claim 12, wherein the key is movably connected to the housing; the key is provided with an abutting portion in a direction towards the detection member for abutting and triggering the detection member;
   the detection member is provided with a force guide member at a corresponding position of the abutting portion; the force guide member generates a movement in response to the abutting pressure of the abutting portion and generates the first rebound force; when the force guide member moves to a preset position, the first rebound force jumps; and the positional relationship of the abutting portion with respect to the key is adapted to the force guide member, so that when the pressing movement of the key occurs, the reaction force jumps from F1 to F2.

14. The wireless intelligent switch according to claim 12, wherein the key is movably connected to the housing, the housing being capable of limiting at least two degrees of freedom of displacement and at least one degree of freedom of rotation of the key, so that the key is capable of movement in displacement and/or rotation and triggering the detection member during the movement.

15. The wireless intelligent switch according to claim 14, wherein the reset portion is provided as at least one resilient limiting member; the housing is provided with the resilient limiting member at the corresponding position of the key;

the resilient limiting member comprises a fixing end and a free end away from the fixing end, wherein the fixing end is fixedly connected or integrally formed to the housing, and the free end abuts against the key to provide a reset acting force for the key.

16. The wireless intelligent switch according to claim 15, wherein the free end of the resilient limiting member is positionally connected to the key to limit two degrees of freedom of displacement in the horizontal direction and one degree of freedom of rotation in the horizontal direction of the key, so that the key can have a superimposed movement of displacement plus rotation in the vertical direction; the free end is provided with a first positioning hole; the key is provided with a key positioning pin protruding at a corresponding position of the first positioning hole; and the key positioning pin is inserted into the first positioning hole so as to realize the positioning connection between the key and the free end.

17. The wireless intelligent switch according to claim 12, wherein the housing comprises an upper housing and a lower housing, wherein the upper housing is provided with at least one magnet; the lower housing is provided with at least one magnetic attraction member which can be attracted by the magnet; and the upper housing is attracted to the magnetic attraction member by the magnet so as to achieve a magnetic attraction connection mode between the upper housing and the lower housing.

18. The wireless intelligent switch according to claim 17, further comprising at least one PCB board, wherein the detection member is arranged on the PCB board and elec-trically connected to the PCB board; the PCB board is respectively provided with at least one LED lamp at a corresponding position of each of the keys, and the light emitted by the LED lamp is projected onto a first surface of the keys; the first surface is provided as a face of the key facing towards the housing; the key is provided with a light guide portion, and the light emitted by the LED lamp is guided out to a third surface of the key, the third surface being provided as a face of the key facing away from the housing; wherein the shape of the light guide portion is set to a predetermined shape such that the light guide portion displays a predetermined pattern corresponding to the pre-determined shape on the third surface of the key.

19. The wireless intelligent switch according to claim 18, wherein the lower housing comprises a bottom housing and an isolation cover, wherein the isolation cover is covered on the bottom housing and forms an accommodating cavity with the bottom housing, and the PCB board is accommo-dated inside the accommodating cavity; the isolation cover is provided between the keys and the PCB board; the isolation cover is respectively provided with a light uni-forming shade at corresponding positions of each of the keys; the light uniforming shade is arranged on the LED lamp corresponding to each of the keys, and the light emitted by the LED lamp is projected to the keys after being uniformed by the light uniforming shade; the surface of a side of the light uniforming shade facing towards the key is rectangular, and the light uniforming shade is a rectangular parallelepiped cover with an opening at the bottom; and the projection of the light uniforming shade onto the third surface of the keys covers the predetermined pattern.

20. The wireless intelligent switch according to claim 19, wherein the detection member is covered on the light uniforming shade; the light uniforming shade is provided with a contact-pressure through hole at the corresponding position of the detection member; the key is provided with an abutting portion at the corresponding position of the detection member; the abutting portion passes through the contact-pressure through hole and is placed above the detec-tion member; when the key generates the displacement in response to the operation and control force, the abutting portion abuts against and triggers the detection member; and the distance between the surface on a side of the light uniforming shade facing towards the key and the PCB board is greater than 3 mm.

* * * * *